(12) United States Patent
Redmann et al.

(10) Patent No.: US 8,315,498 B2
(45) Date of Patent: Nov. 20, 2012

(54) FIBER MANAGEMENT PANEL

(75) Inventors: Tim Redmann, Carver, MN (US); Scott C. Sievers, Jordan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 636 days.

(21) Appl. No.: 12/421,878

(22) Filed: Apr. 10, 2009

(65) Prior Publication Data

US 2009/0257726 A1    Oct. 15, 2009

Related U.S. Application Data

(60) Provisional application No. 61/044,356, filed on Apr. 11, 2008.

(51) Int. Cl.
*G02B 6/00* (2006.01)
(52) U.S. Cl. ........................................................ 385/135
(58) Field of Classification Search ................... 385/135
See application file for complete search history.

(56) References Cited

U.S. PATENT DOCUMENTS

| | | | |
|---|---|---|---|
| 4,708,430 A | 11/1987 | Donaldson et al. |
| 4,792,203 A | 12/1988 | Nelson et al. |
| 4,912,615 A | 3/1990 | Bluband |
| 4,995,681 A | 2/1991 | Parnell |
| 5,142,606 A | 8/1992 | Carney et al. |
| 5,339,379 A | 8/1994 | Kutsch et al. |
| 5,402,515 A | 3/1995 | Vidacovich et al. |
| 5,740,299 A | 4/1998 | Llewellyn et al. |
| 5,946,440 A | 8/1999 | Puetz |
| 6,160,946 A | 12/2000 | Thompson et al. |
| 6,234,240 B1 | 5/2001 | Cheon |
| 6,263,141 B1 | 7/2001 | Smith |
| 6,272,009 B1 | 8/2001 | Buican et al. |
| 6,301,424 B1 | 10/2001 | Hwang |
| 6,418,264 B1 | 7/2002 | Hough et al. |
| 6,442,022 B1 | 8/2002 | Paul |
| 6,529,373 B1 | 3/2003 | Liao et al. |
| 6,538,879 B2 | 3/2003 | Jiang |

(Continued)

FOREIGN PATENT DOCUMENTS

DE    44 13 136 C1    5/1995

(Continued)

OTHER PUBLICATIONS

International Search Report and Written Opinion mailed Sep. 22, 2009.

(Continued)

*Primary Examiner* — Ryan Lepisto
(74) *Attorney, Agent, or Firm* — Merchant & Gould P.C.

(57) ABSTRACT

A telecommunications termination panel includes a housing having a top, a bottom, a first side and a second opposing side defining a front opening and a rear opening. The housing defines a cable entry adjacent the rear opening and a cable exit adjacent the rear opening, wherein the rear opening is adjacent the first side. A tray is pivotably mounted within the front opening of the housing, pivoting about a vertical axis located adjacent the first side and including a cable entry and a cable exit adjacent the vertical pivot axis and a plurality of connection locations. A cable path is defined between the rear opening of the housing and the tray, the cable path defined by a cable guide defining a channel for receiving cables, the cable guide including a slidable structure configured for pushing cables into the channel defined by the cable guide.

17 Claims, 102 Drawing Sheets

U.S. PATENT DOCUMENTS

| | | |
|---|---|---|
| 6,560,099 B1 | 5/2003 | Chang |
| 6,600,665 B2 | 7/2003 | Lauchner |
| 6,738,261 B2 | 5/2004 | Vier et al. |
| 6,788,544 B1 | 9/2004 | Barsun et al. |
| 6,870,734 B2 | 3/2005 | Mertesdorf et al. |
| 7,086,539 B2 | 8/2006 | Knudsen et al. |
| 7,090,084 B2 | 8/2006 | Knudsen et al. |
| 7,102,884 B2 | 9/2006 | Mertesdorf et al. |
| 2002/0125800 A1 | 9/2002 | Knudsen et al. |
| 2002/0159745 A1 | 10/2002 | Howell et al. |
| 2002/0179485 A1 | 12/2002 | Shih |
| 2004/0074852 A1 | 4/2004 | Knudsen et al. |
| 2004/0079711 A1 | 4/2004 | Hartman et al. |
| 2004/0251220 A1* | 12/2004 | Mertesdorf et al. ............ 211/26 |
| 2006/0118497 A1 | 6/2006 | Knudsen et al. |
| 2007/0127201 A1 | 6/2007 | Mertesdorf et al. |

FOREIGN PATENT DOCUMENTS

| | | |
|---|---|---|
| EP | 0 293 183 A2 | 5/1988 |
| EP | 1 203 974 A2 | 10/2001 |
| WO | WO 02/19005 A2 | 3/2002 |
| WO | WO 02/21182 A1 | 3/2002 |

OTHER PUBLICATIONS

Invitation to Pay Additional Fees with Partial International Search mailed Jul. 7, 2009.

ADC Telecommunications, Inc., FL2000 Products Catalog, Literature No. 803, front cover, table of contents, pp. 1-32, rear cover (Dec. 2000).

ADC Telecommunications, Inc., Next Generation Frame Product Family Ordering Guide, Literature No. 820, front cover, table of contents, pp. 1-43, rear cover (Apr. 2002).

* cited by examiner ion panel with pivoting bulkheads.

FIBER MANAGEMENT PANEL

CROSS REFERENCE TO RELATED APPLICATION

This application claims the benefit of U.S. Provisional Patent Application Ser. No. 61/044,356, filed Apr. 11, 2008, which application is hereby incorporated by reference in its entirety.

TECHNICAL FIELD

The present disclosure relates generally to telecommunications termination panels with pivoting bulkheads.

BACKGROUND

In telecommunications infrastructure installations, equipment for switching, cross-connecting and inter-connecting a variety of panels is used. Many of these panels are installed in telecommunications equipment racks to permit organized, high-density installations to be achieved in limited space available for equipment. Due to the increasing demand for telecommunications system capacity, it is desirable to increase the density of connections within a given space that can be achieved. Commensurate with the demand for increased capacity from the same installation footprint is a desire to improve the organization and handling of the cables used to link the equipment within the installation and the outside plant and facilities cables.

One approach to increasing the density of connections within the same footprint is to increase the number of connections supported within a given panel. Access to these connections within panels of higher densities is necessary for the installation, operation and maintenance of the panels. Preferably, access to any one connection within a panel will not cause unnecessary strain on cables extending from other adjacent connections. Modification of the layout of the interior of these panels to improve connector access is desirable.

In commonly assigned and related U.S. Pat. Nos. 6,870,734, 7,086,639, 7,090,084, and 7,102,884, a panel with a variety of improvements to the density of connections within the panel and access thereto was described. The disclosures of these patents are incorporated herein by reference. Additional improvements to the panels of these earlier patents are desirable.

SUMMARY

The present disclosure relates to a telecommunications termination panel with a pivoting tray having a plurality of cable connection locations. The tray is hingedly mounted within the front opening of a housing. Optical fiber cables enter and exit the panel through the rear of the housing. The tray includes cable management structures which direct the cables to the cable connection locations. Cable connections locations may include adapters configured to intermate incoming connectorized cables and outgoing connectorized cables. Cable connection locations may also include telecommunications modules configured to house fiber optic equipment. The termination panel may manage preconnectorized cables that are intermated at the connection locations or may include splice trays for providing splices within the tray.

The present disclosure further relates to telecommunications termination panel that includes a pair of vertically stacked cable guides configured to guide cables from a rear opening of the panel into the tray. The cable guides define troughs for keeping the incoming cables separate from the outgoing cables. The cable guides further include slidable pusher structures that can be used to push the cables into the troughs defined by the cable guides as the pusher structures are slid over the top edges of the vertical walls of the cable guides.

BRIEF DESCRIPTION OF THE DRAWINGS

The accompanying drawings, which are incorporated in and constitute a part of the specification, illustrate several inventive aspects of the present disclosure and together with the description, serve to explain the principles of the disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

Figure 1:
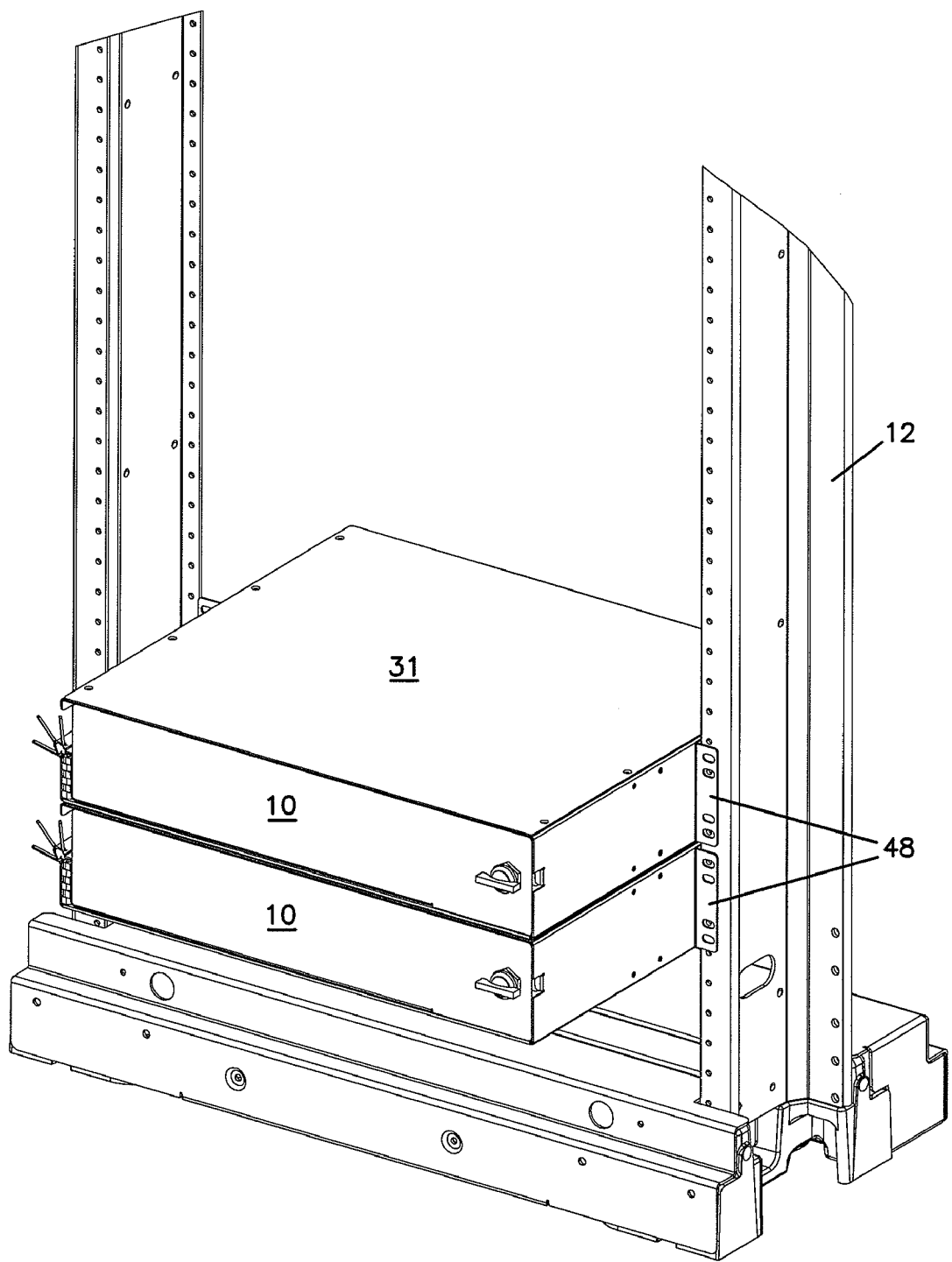
FIG. 1 is a perspective view of a telecommunications equipment rack with two termination panels according to the present disclosure mounted thereon.

Referring now to the FIGS., telecommunications connections panels 10 provide a plurality of connection locations for linking telecommunications cables within a single panel. These panels 10 may electrically connect copper cables or optically connect optical fiber cables at these connection locations. Such a panel 10 is shown in FIG. 1, mounted to a telecommunications equipment rack 12 adjacent a second panel 10. Additional panels 10 or other telecommunications equipment may also be mounted to rack 12. Rack 12 is shown as a nineteen inch wide rack. It is anticipated that panel 10 could also be adapted for use with a twenty-three inch wide rack or with other widths of racks within the scope of the present disclosure.

Figure 2:
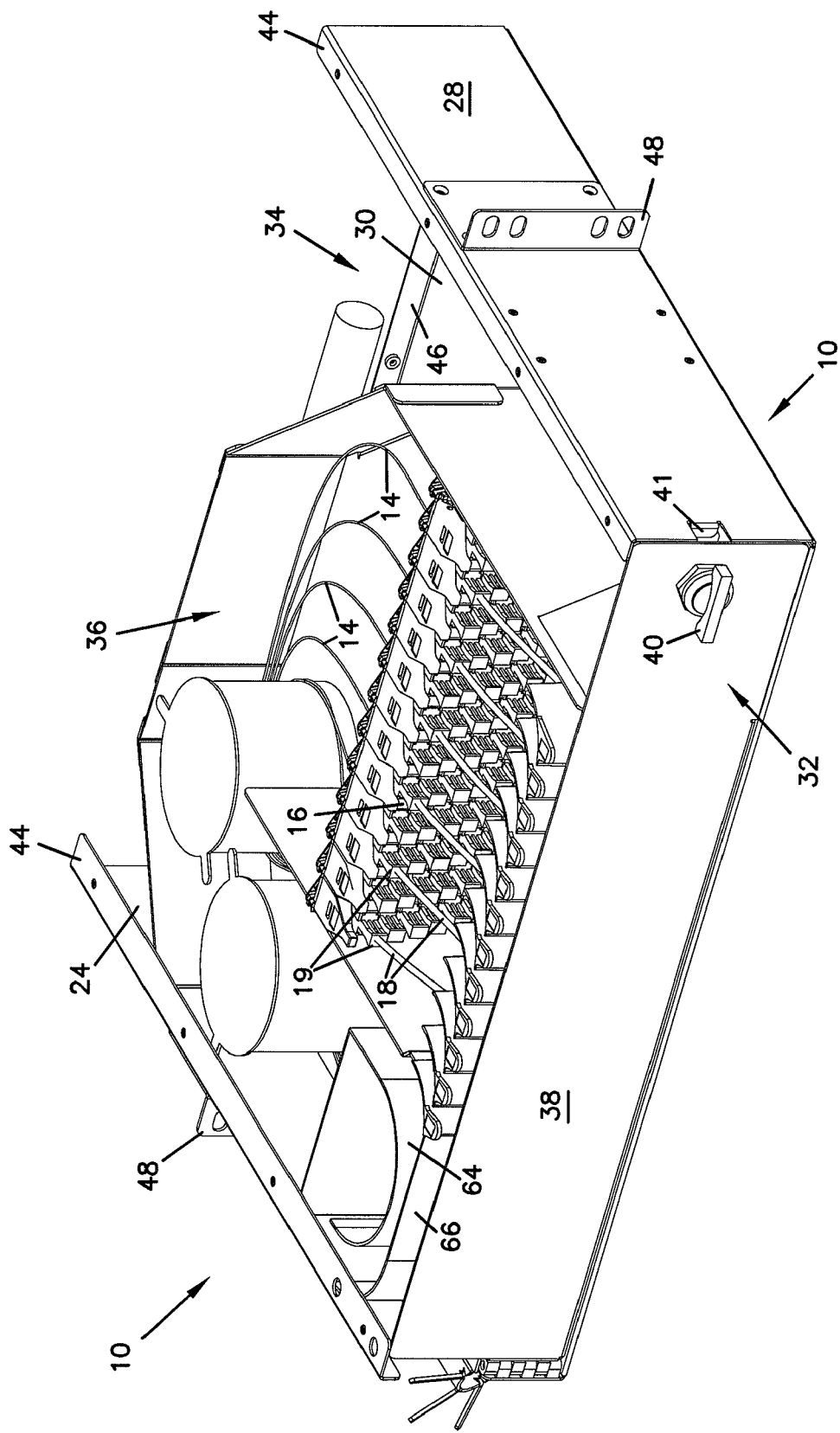
FIG. 2 is a front perspective view of a first embodiment of a termination panel according to the present disclosure, with the top removed for clarity.
Figure 4:
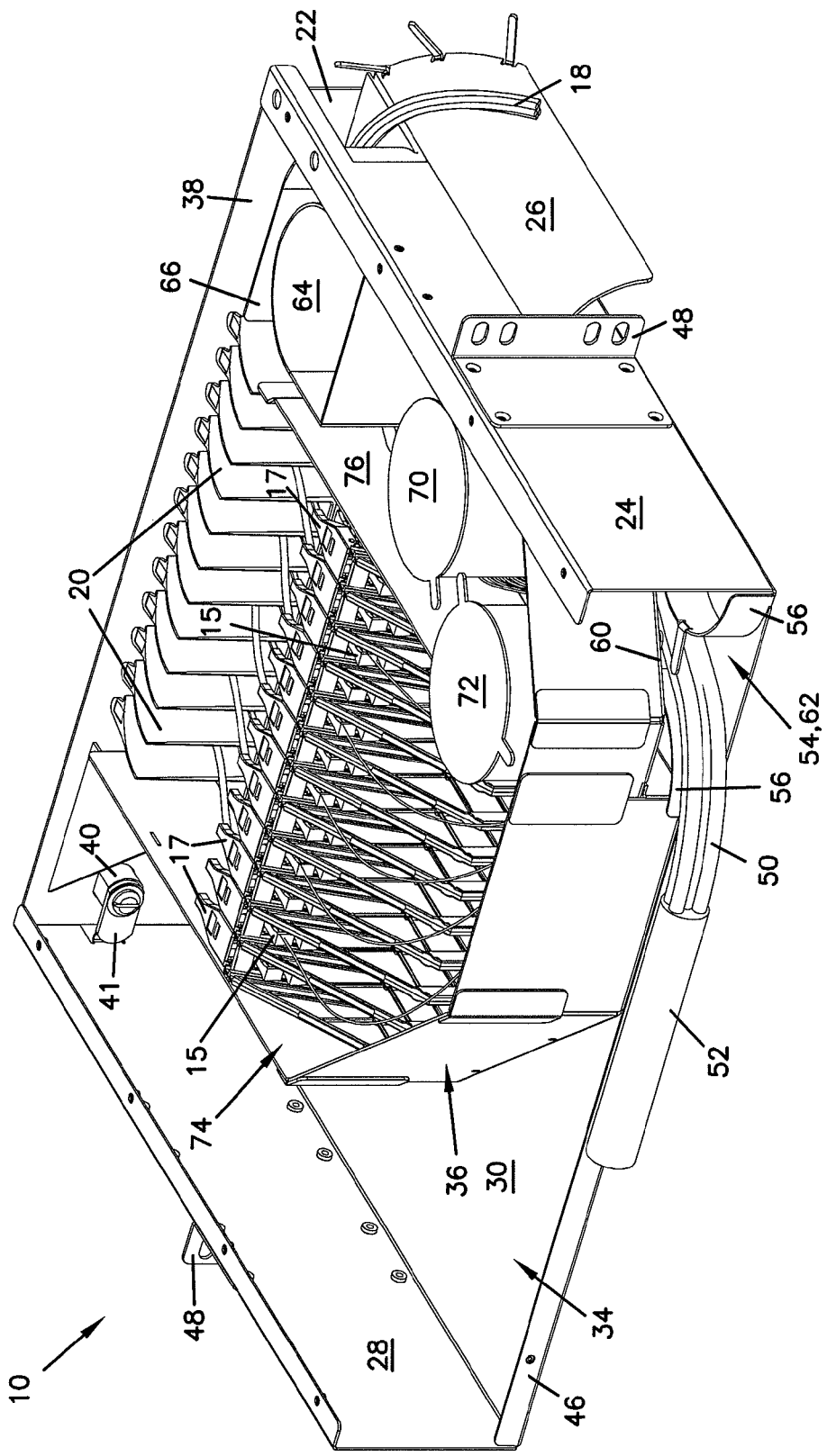
FIG. 4 is a rear perspective view of the termination panel of FIG. 2.

Referring now to FIG. 4, a plurality of optical fiber cables 14 are each terminated by a connector 15. These connectors 15 are connected to a first side or rear of a plurality of connection locations or adapters 16. A plurality of optical fiber patch cords, such as cables 18 are each terminated with a connector 19. These connectors 19 are connected to a second side or front of adapters 16. Adapters 16 align and optically link the optical fiber within a cable 14 with the optical fiber within a cable 18. As seen in FIG. 2, cables 18 extend away from adapters 16, passing through a plurality of vertically oriented fingers 20 which provide bend radius protection as cables 18 are directed toward and through an opening 22 in a side 24 of panel 10. After passing through opening 22, cables 18 may be directed across a ramp 26 (also providing bend radius protection) into an adjacently mounted cableway and extended to other telecommunications equipment.

Figure 3:
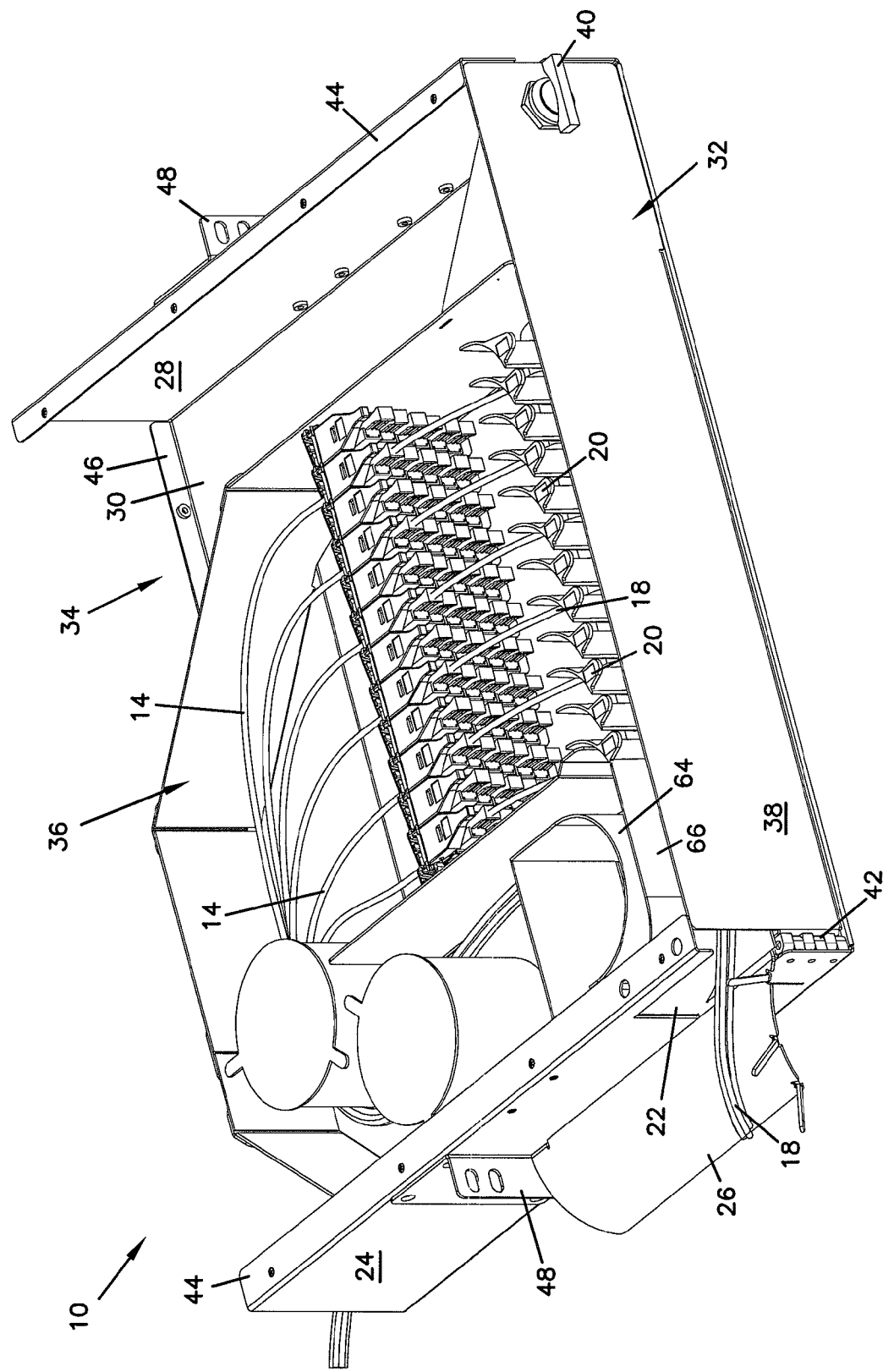
FIG. 3 is a second front perspective view of the termination panel of FIG. 2.

Referring now to FIGS. 2 and 3, panel 10 includes a housing made up of side 24, opposing side 28, and a bottom 30. A top 31 (shown in FIG. 1 and removed from the other drawings for clarity) cooperates with sides 24 and 28 and bottom 30 to define a front opening 32 and a rear opening 34. Mounted within front opening 32 is a pivoting tray 36 with a front wall 38 substantially closing off front opening 32 with tray 36 positioned as shown in FIGS. 2 through 6. Tray 36 pivots about an axis defined by a hinge 42 adjacent side 24. Front wall 38 includes a releasable latch 40 opposite hinge 42 which engages tab 41 in side 28 to releasably hold tray 36 in a closed position within front opening 32. Latch 40 as shown is a rotating finger latch. It is anticipated that latch 40 could be a lock requiring a key to release, providing additional security to the interior of panel 10.

Sides 24 and 28 include flanges 44 for mounting top 31 to panel 10. Bottom 30 includes a rear mounting flange 46 so that a rear wall (not shown) can be mounted to substantially close off rear opening 34. Sides 24 and 28 also include mounting brackets 48 along an outer side to aid in mounting panel 10 to rack 12.

Figure 5:
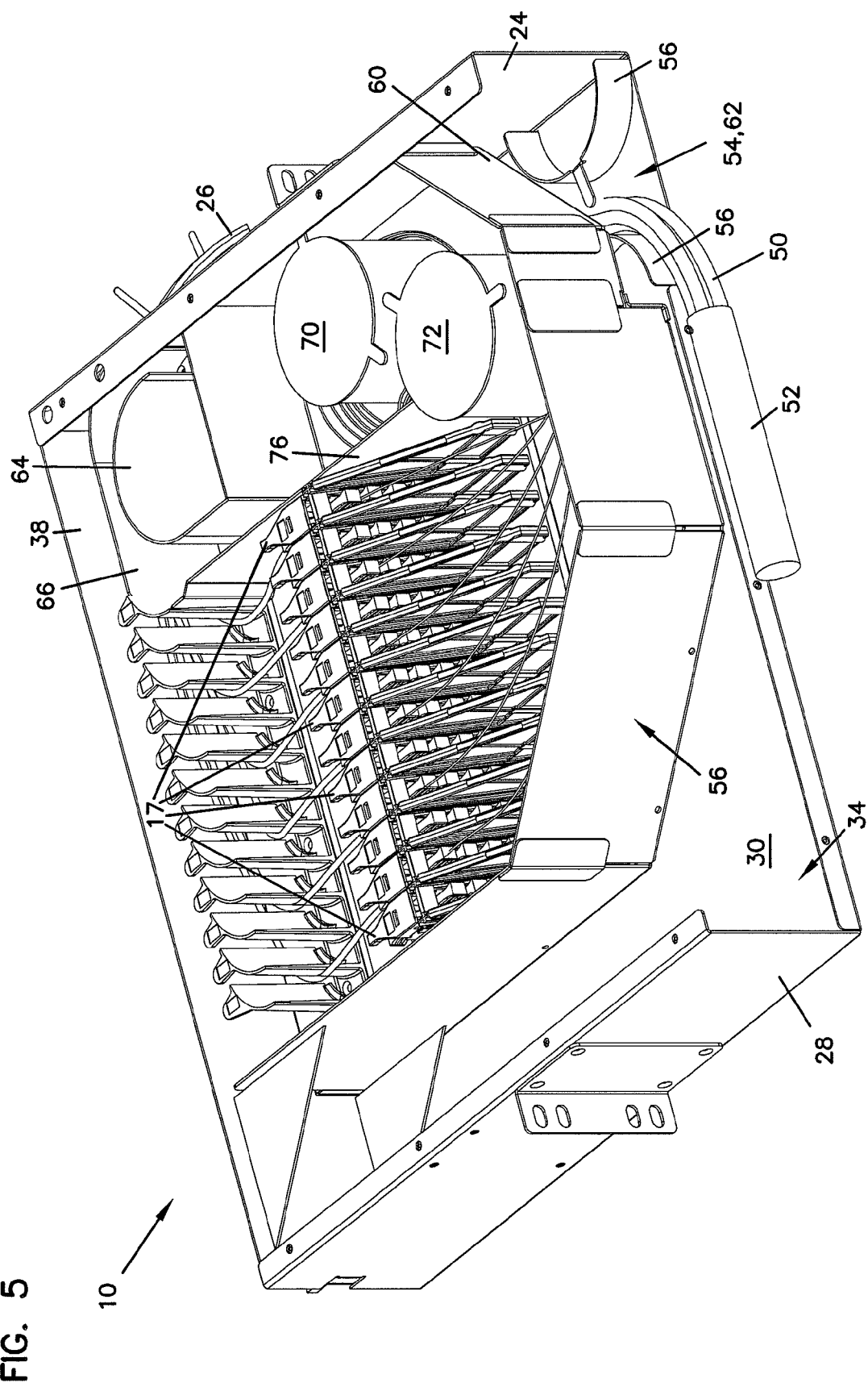
FIG. 5 is a second rear perspective view of the termination panel of FIG. 2.

Referring now to FIGS. 4 and 5, adapters 16 are mounted in a series of parallel, vertically oriented modules 17. As shown in the FIGS., six adapters are mounted in each module 17 and twelve modules 17 are mounted on tray 36. Thus configured, panel 10 is capable of supporting up to seventy-two optical connections between optical fiber cables 14 and patch cords 18. Optical fiber cables 14 enter panel 10 through rear opening 34 within a multi-strand cable such as an inter-facility cable 50. Cable 50 is held to panel 10 by a cable clamp 52 adjacent rear opening 34 and enters panel 10 through a cable access port 54. If a rear wall were mounted to panel 10 to close off rear opening 34, cable access port 54 should remain unobstructed to permit entry of cable 50. Cable 50 includes at least some of optical fibers 14 bundled together in a common casing.

Cable access port 54 includes a pair of opposing bend radius protection curves 56 to ensure that cable 50 (or any other optical fiber cables extending into panel 10 through port 54) are not bend through too tight of a curve as the cables enter port 54. Each curve 56 includes a finger 58 positioned with respect to each other to permit cable 50 to be laid between curves 56 and prevent cable 50 from extending above curves 56. Tray 36 includes a raised floor 60 which is positioned above curves 56, fingers 58 and cable 50. Raised floor 60 cooperates with side 24 and bottom 30 to define a cable path 62. Cable path 62 permits cable 50 to extend through cable access port 54 and into panel 10 along bottom 30 and side 24 in the direction of hinge 42.

Figure 6:
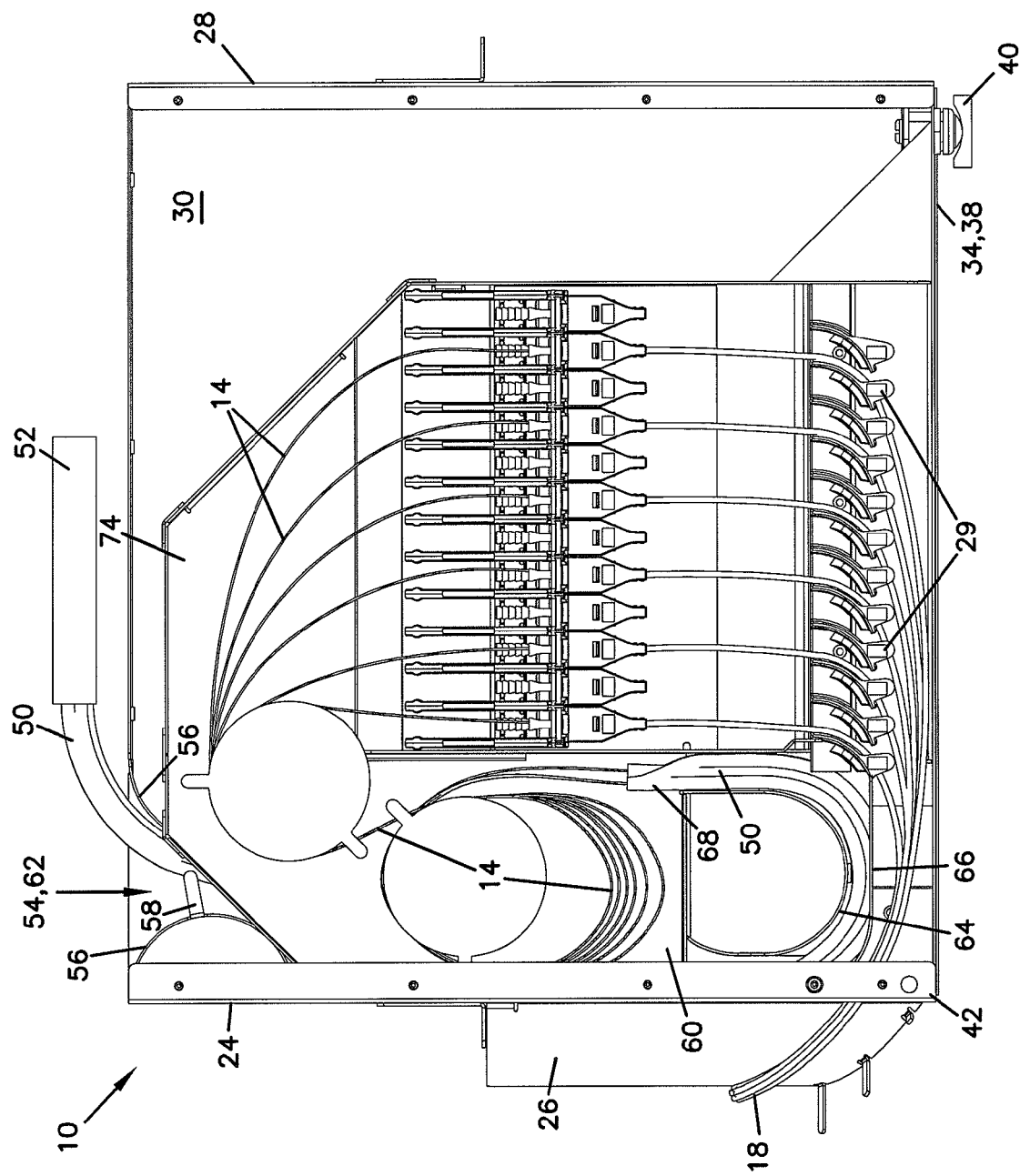
FIG. 6 is a top view of the termination panel of FIG. 2.

Referring now to FIG. 6, cable 50 extends through cable path 62 along side 24 to enter tray 36 adjacent hinge 42, extending up out of cable path 62 and entering tray 36 above raised floor 60. Cable 50 extends between an inner wall 64 and an outer wall 66. Located between walls 64 and 66 is a ramp 65 which lifts cable 50 from beneath raised floor 60 into tray 36 above raised floor 60. Walls 64 and 66 cooperate to carry cable 50 through a semicircular arc without violating bend radius rules. As cable 50 enters tray 36, it is held by an anchor 68. Cable 50 is then broken down into individual fiber cables 14. To ensure that additional slack is available to repair damage to cables 14 without having to adjust the position of cable 50, cables 14 are wrapped around a first drum 70 before extending about a second drum 72 into an area 74 behind adapters 16 within modules 17. From area 74, connectors 15 of cables 14 are connected to adapters 16 which will permit cables 14 to be optically connected to cables 18. Outer wall 66 also provides bend radius protection to cables 18 extending from fingers 20 through opening 22 in side 24 and across ramp 26.

Figure 7:
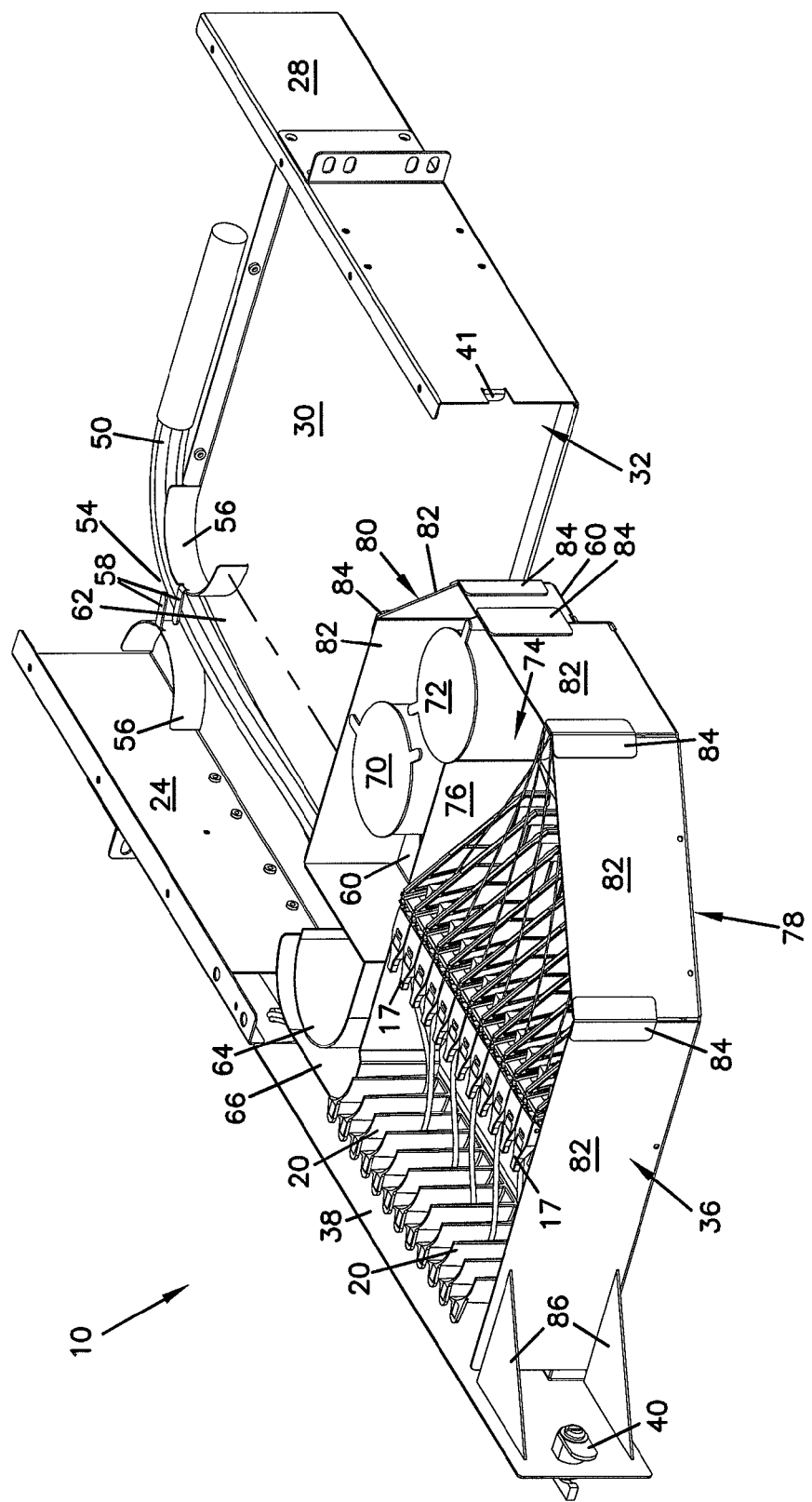
FIG. 7 is a front perspective view of the termination panel of FIG. 2, with the tray swung to an open position allowing access to the connections.
Figure 8:
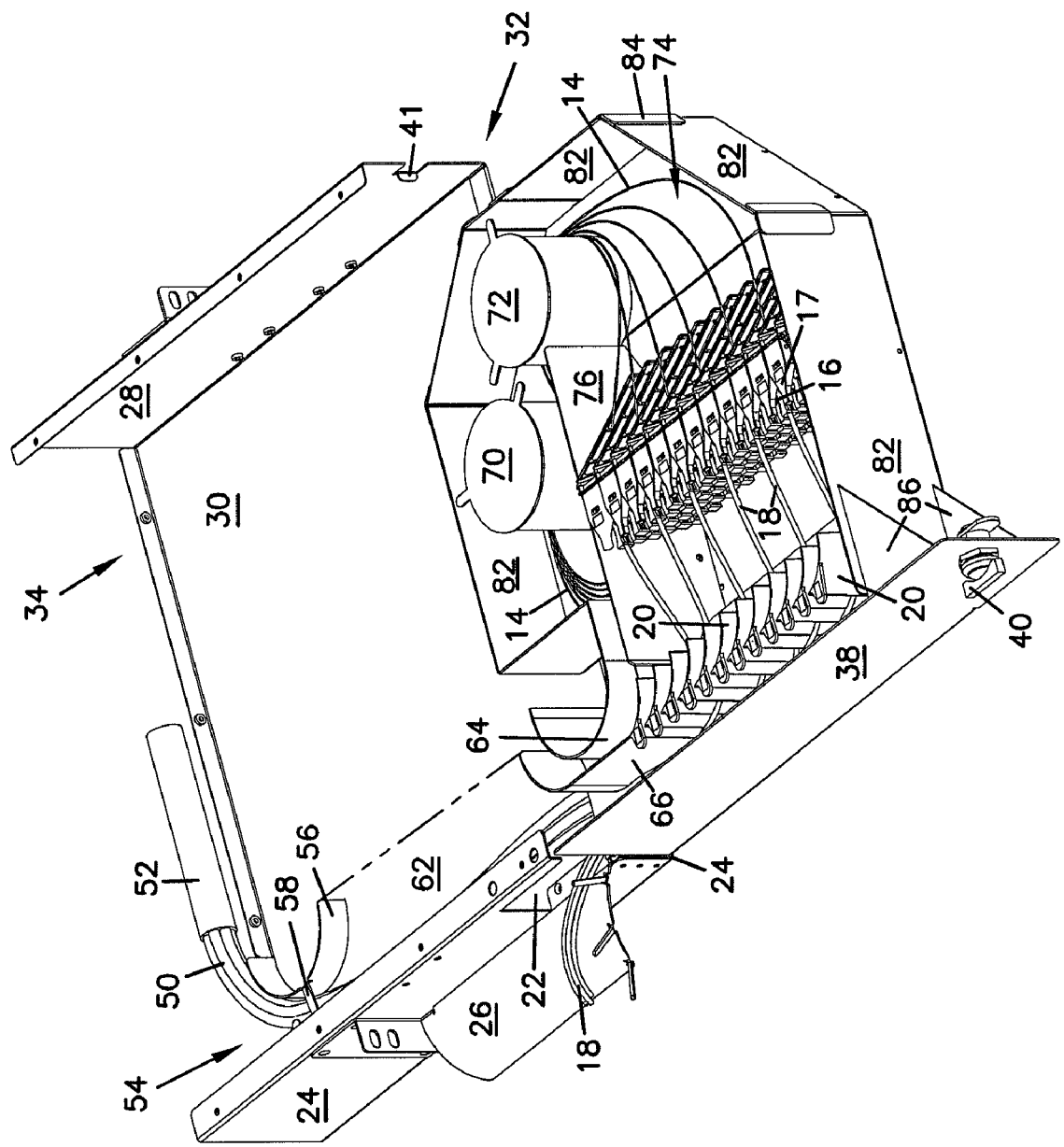
FIG. 8 is a second front perspective view of the termination panel of FIG. 7.
Figure 9:
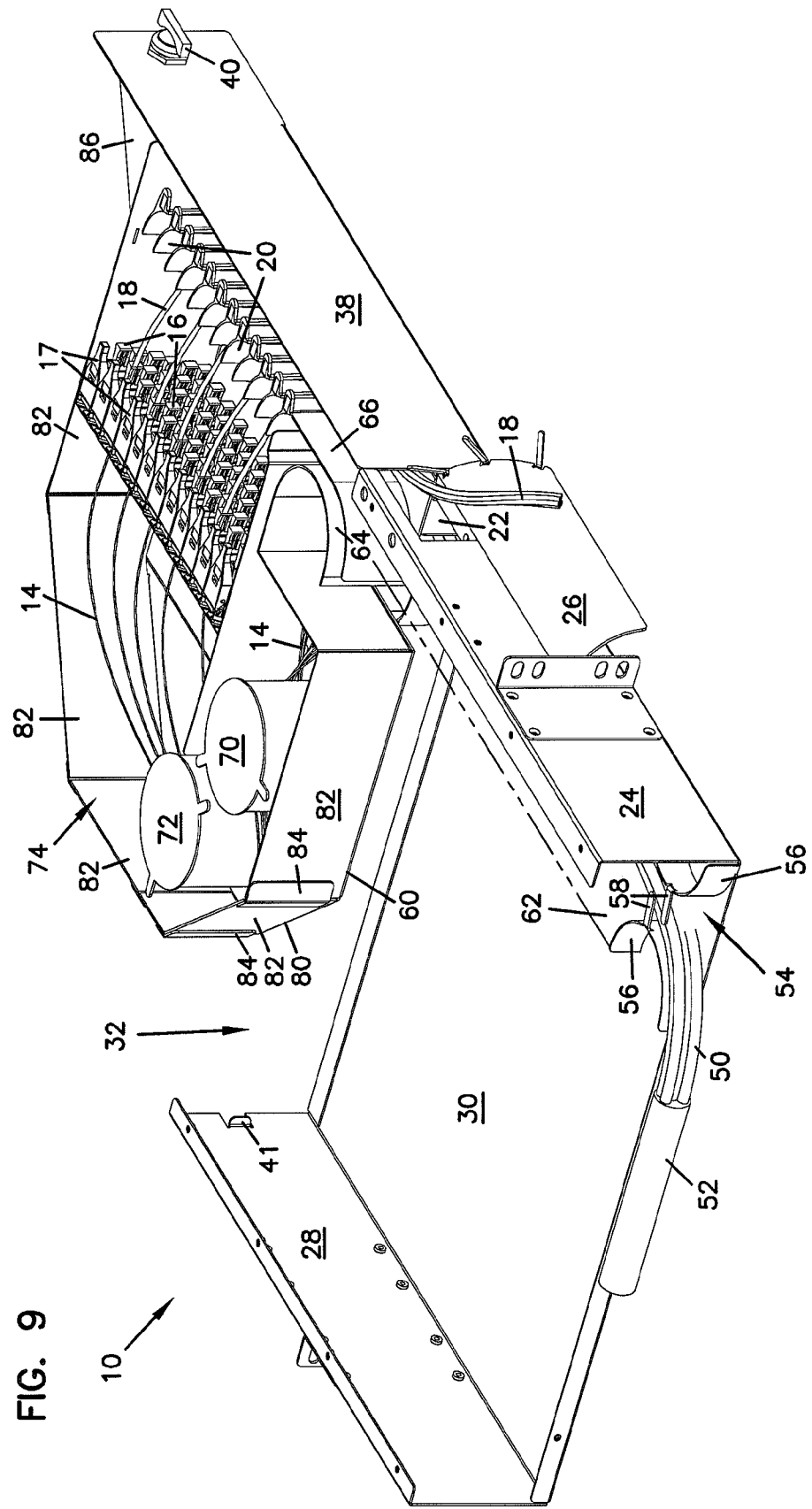
FIG. 9 is a rear perspective view of the termination panel of FIG. 7.

Referring now to FIGS. 7 through 9, a dashed line on bottom 30 indicates the location of cable path 62 along side 24. In this FIG., tray 36 is swung to an open position about hinge 42 allowing entry into panel 10 through front opening 32. Along an end of tray 36 opposite front wall 38, both corners have been relieved or angled. A first angled corner 78 allows tray 36 to pivot about hinge 42 without being impeded by side 28. A second angled corner 80 allows greater access into panel 10 through front opening 32 between tray 36 and side 28 when tray 36 is in the open position.

Tray 36 includes a plurality of bulkheads 82 along the sides and rear of tray 36, and a central bulkhead 76 separating area 74 from the area above raised floor 60. Bulkheads 82 and 76 cooperate to organize optical fibers 14 and keep optical fibers 14 within tray 36 as tray 36 is swung from the open position shown in FIGS. 7 through 11 to the closed position shown in FIGS. 1 through 6. This will help prevent optical fibers 14 from being pinched or otherwise damaged. A plurality of connectors 84 are located between the various bulkheads 82 to physically connect adjacent bulkheads 82 and reinforce the structure of tray 36. Also reinforcing bulkheads 82 and the overall structure of tray 36 are a pair of triangular gussets 86 connecting a bulkhead 82 to front wall 38 adjacent latch 40.

Figure 10:
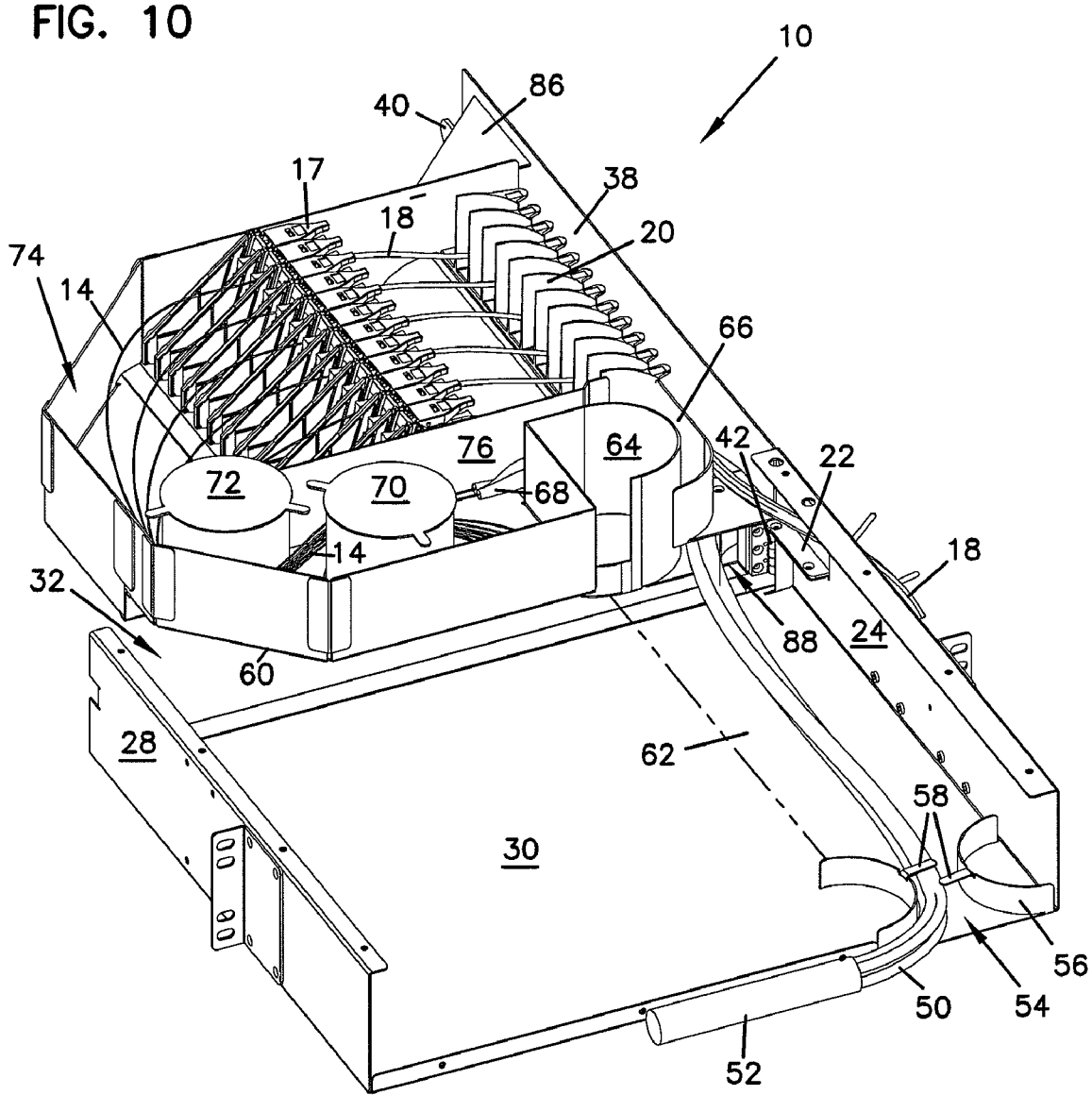
FIG. 10 is a second rear perspective view of the termination panel of FIG. 7.

Referring now to FIG. 10, cable 50 is shown entering tray 36 along ramp 65 between walls 64 and 66 through an opening 88 adjacent hinge 42. Between opening 88 and anchor 68, a ramp elevates cable 50 from the level of bottom 30 to the level of raised floor 60. Positioning opening 88 as close as possible to hinge 42 minimizes the amount of slack required in cable 50 within cable path 62 to permit tray 36 to swing between the open and closed positions. The further from hinge 42 that opening 88 is located, the more slack in cable 50 is required to permit tray 36 to move unhindered.

Similarly, cables 18 from the front of adapters 16 extend around fingers 20 and forward of outer wall 66 to exit through opening 22 which is also positioned as close as possible to hinge 42. This relative location helps reduce the amount of slack required in cables 18 to permit unhindered movement of tray 36.

Figure 11:
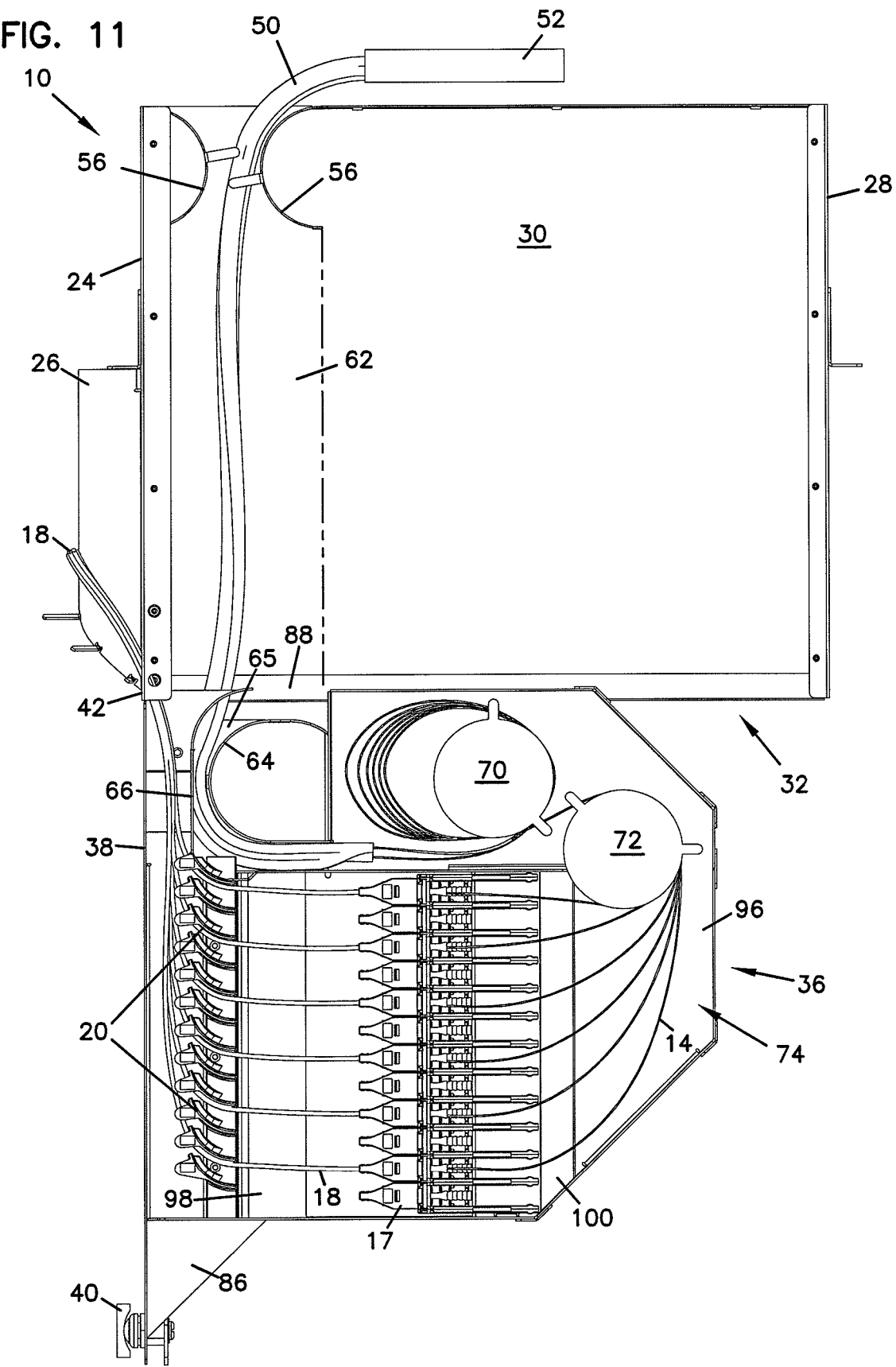
FIG. 11 is a top view of the termination panel of FIG. 7.
Figure 18:
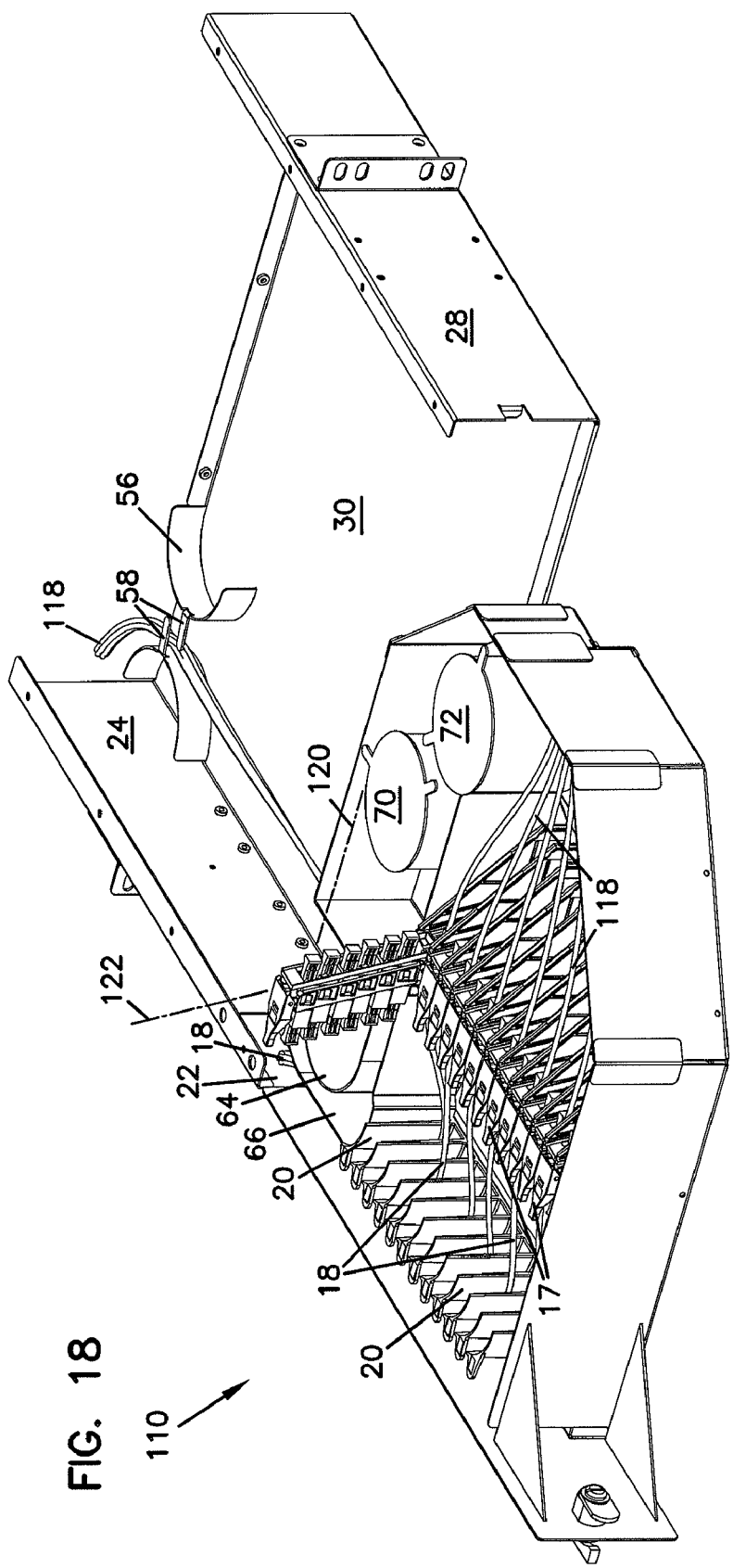
FIG. 18 is a front perspective view of the termination panel of FIG. 13, with the tray swung to an open position allowing access to the connections and one of the sliding connector modules extended upward to provide access to the connections of the modules.
Figure 19:
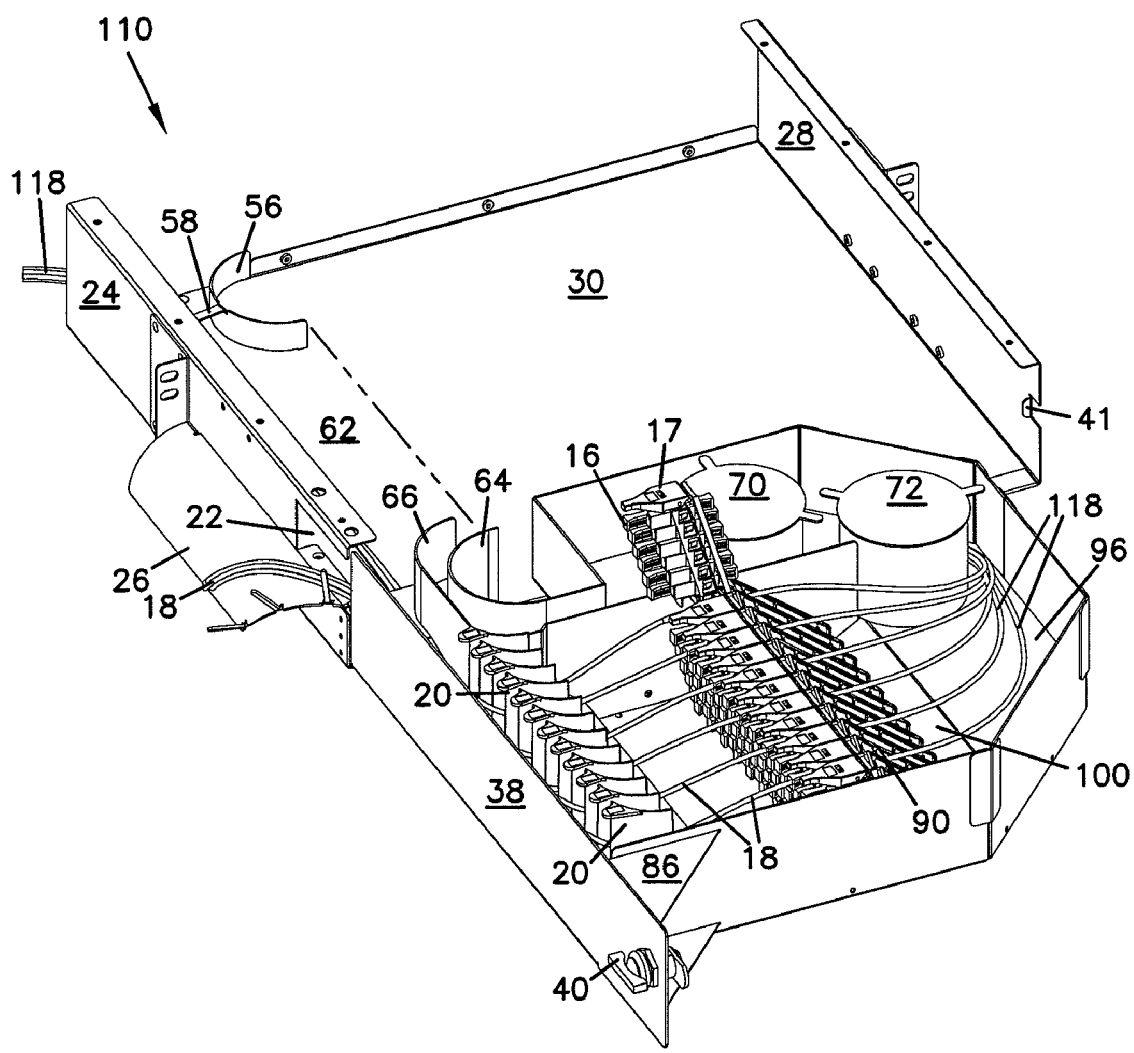
FIG. 19 is a second front perspective view of the termination panel of FIG. 18.
Figure 20:
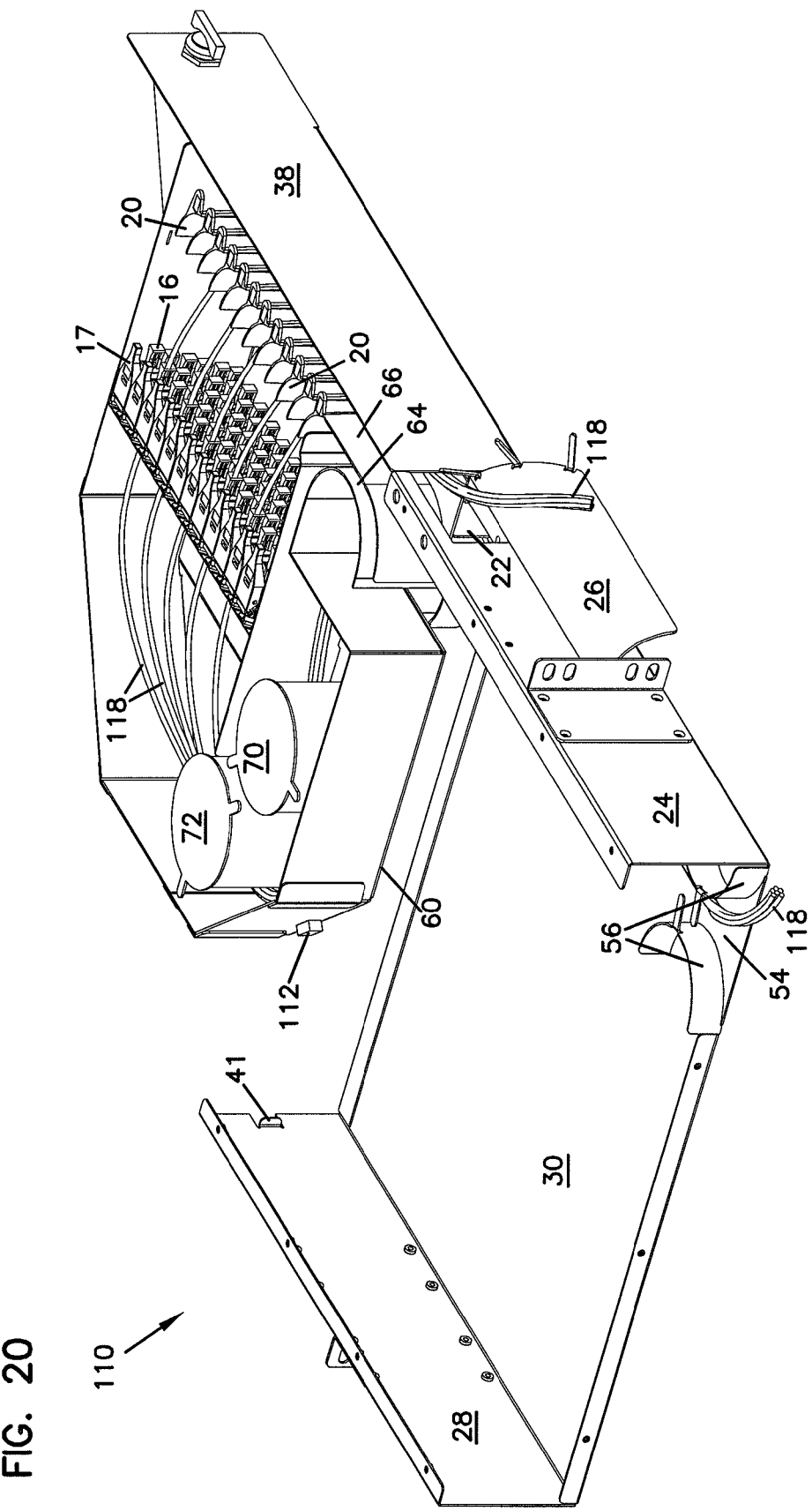
FIG. 20 is a rear perspective view of the termination panel of FIG. 18 with the connector module retracted.

When working with optical fibers within a telecommunications panel, it is desirable that direct viewing down the axis of any optical fibers be avoiding. Exposure to the high intensity laser light transmitted through optical fibers can cause significant harm to the vision of a worker subjected to accidental exposure. Orientation of the fiber within a panel or other device so that the axis of the fibers and any adapters is directed away from where a worker would be standing is desirable. Referring now to FIGS. 11 and 18, cables 14, adapters 16 and cables 18 are oriented parallel to the front of panel 10, as indicated by dashed line 120 in FIG. 18, when tray 36 is the open position. A worker accessing adapters 16 or the cables 14 and 18 connected to adapters 16 would most likely be standing directly in front of panel 10 when opening tray 36 and accessing the contents of panel 10. In this arrangement, with tray 36 in the open position, the risk of accidental exposure is reduced.

Figure 12:
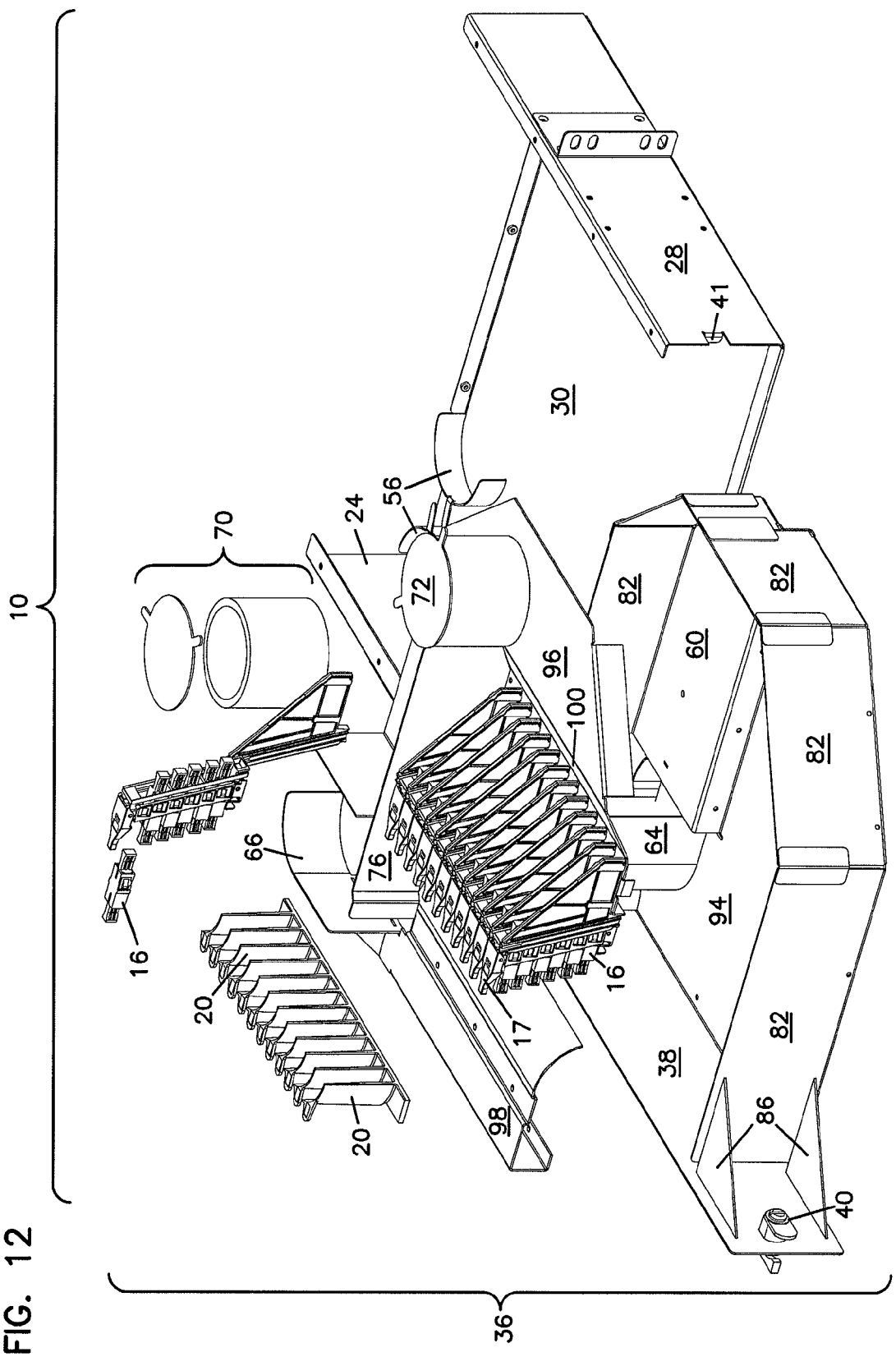
FIG. 12 is a partially exploded view of the termination panel of FIG. 7.
Figure 13:
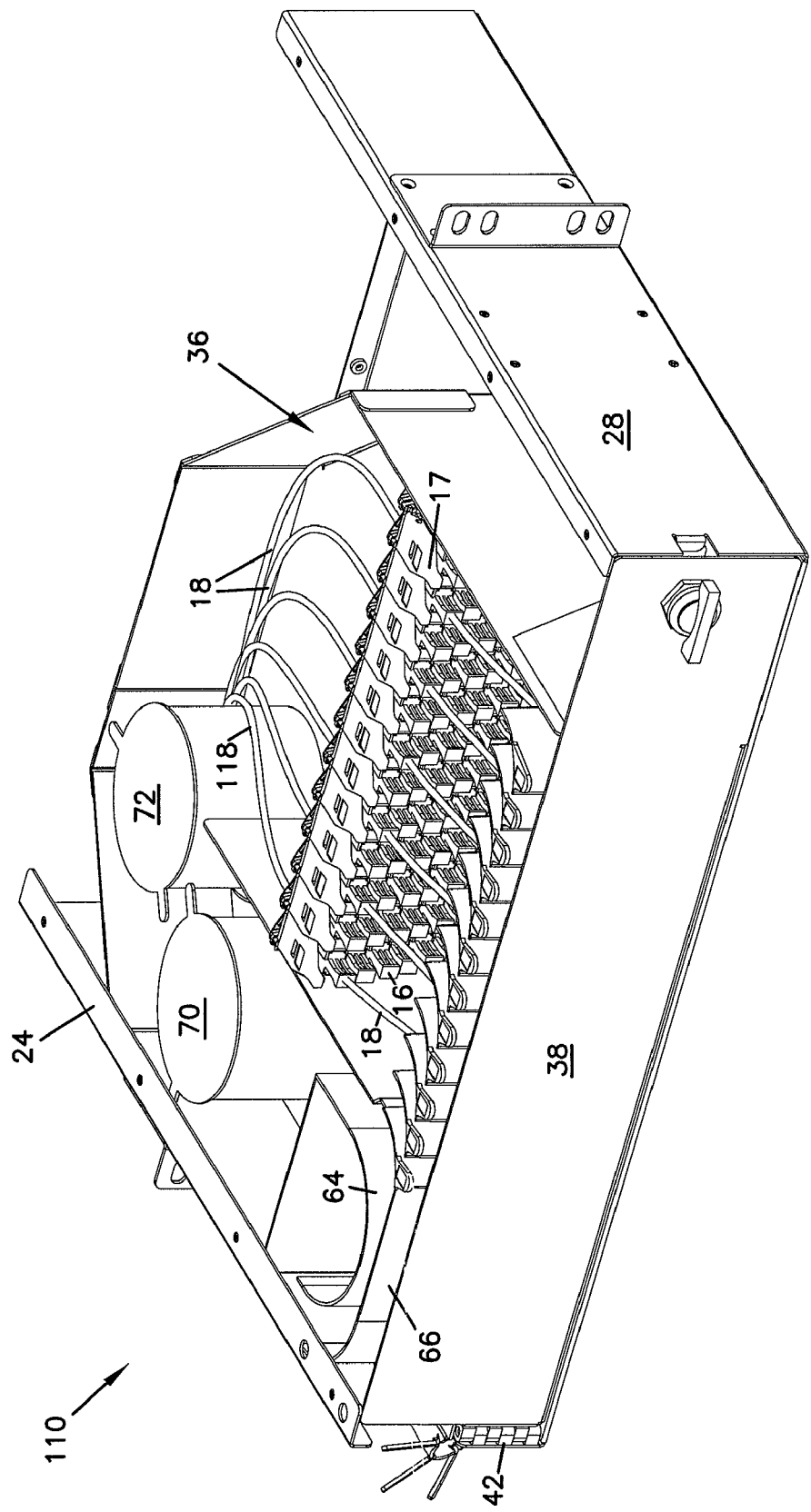
FIG. 13 is a front perspective view of a second embodiment of a termination panel according to the present disclosure.

FIG. 12 shows additional detail regarding items mounted to tray 36, including the arrangement of adapters 16 within modules 17. Commonly owned U.S. Pat. Nos. 5,497,444, 5,717,810 and 5,758,003, and U.S. patent application Ser. No. 09/991,271, the disclosures of which are incorporated herein by reference, further describe and show the structure and features of modules 17. Briefly, each module 17 includes locations for mounting a plurality of adapters 16. As shown also in FIG. 18, discussed in more detail below, each module 17 is slidably mounted between a pair of walls 90 and may be extended generally upward above tray 36, in the direction of dashed line 122 in FIG. 18. Thus positioned, access to adapters 16 mounted to module 17 and any optical fiber cables attached to adapters 16 is improved. Walls 90 are configured to receive a sliding module 17 on each side, so that a total of thirteen walls 90 are required to support the twelve modules 17.

As disclosed in U.S. patent application Ser. No. 09/991,271, and as shown in FIG. 18, modules 17 extend at an angle toward front 38. Adapters 16 are mounted at a corresponding angle to modules 17 so that the axis of insertion of fiber optic cables to the front and rear of each adapter 16 is substantially parallel to floor 94 of tray 36. Alternatively, walls 90 and modules 17 could be configured so that modules 17 slide vertically, with adapters 16 mounted horizontally to modules 17.

Tray 36 includes a floor 94 above which is a second raised floor 96 within area 74 adjacent the rear of adapters 16. As described above, raised floor 60 is offset above bottom 30 of panel 10 and cable path 62 is defined between raised floor 60 and bottom 30 adjacent side 24. Drums 70 and 72 are mounted to raised floor 96, a portion of which extends over raised floor 60. Raised floor 96 includes a ramp 100 extending down to the full depth of floor 94 and leading from area 74 to the rear of adapters 16. Forward of adapters 16 is a transition piece 98, to which are mounted the fingers 20. Cables 18 from the front of adapters 16 extend through and around fingers 20, forward of outer wall 66 and through opening 22 in side 24.

FIGS. 13 through 22 illustrate a second embodiment 110 of a telecommunications connection panel in accordance with the present disclosure. This embodiment is constructed and configured substantially the same as panel 10. The principal difference is that panel 110 has patch cords or cables 118 extending through cable access port 54 instead of cable 50. The routing of cables 118 entering cable access port 54 follows cable path 62 along bottom 30 beneath raised floor 60 to opening 88 adjacent hinge 42. After being directed between walls 64 and 66, cables 118 extend about drum 72 into area 74 adjacent the rear of adapters 16. It is not necessary to pass cables 118 through anchor 68 as cables 118 emerge above raised floor 60. It is also not necessary to pass cables 118 about drum 70 to store slack. If a connector 19 of one of the cables 118 is damaged, the particular cable 118 can be removed and replaced entirely. Alternatively, since cables 118 are not clamped in a bundle by clamp 52, additional length can be pulled into panel 110 for a single cable 118 to be repaired or reterminated without unduly disturbing the other cables 118.

Panel 10 and panel 110 may be configured so that either will accept a multi-strand optical fiber cable such as cable 50 or single strand optical fiber cables such as cables 118 through cable access port 54. The presence of the features such as anchor 68 and first drum 70 for cables 50 do not impair the ability of panel 10 to accept and direct cables 118 to the rear of adapters 16.

Figure 15:
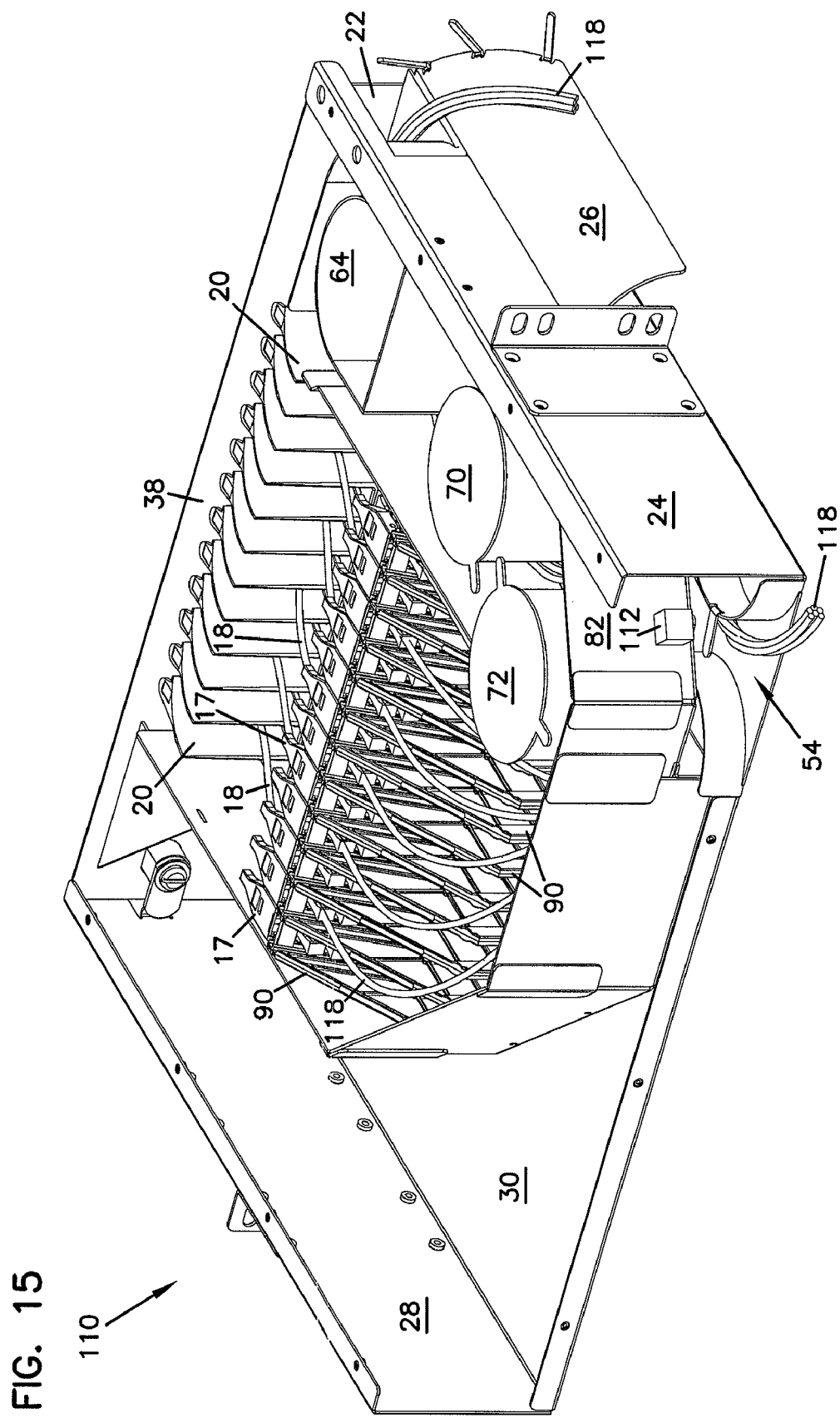
FIG. 15 is a rear perspective view of the termination panel of FIG. 13.
Figure 16:
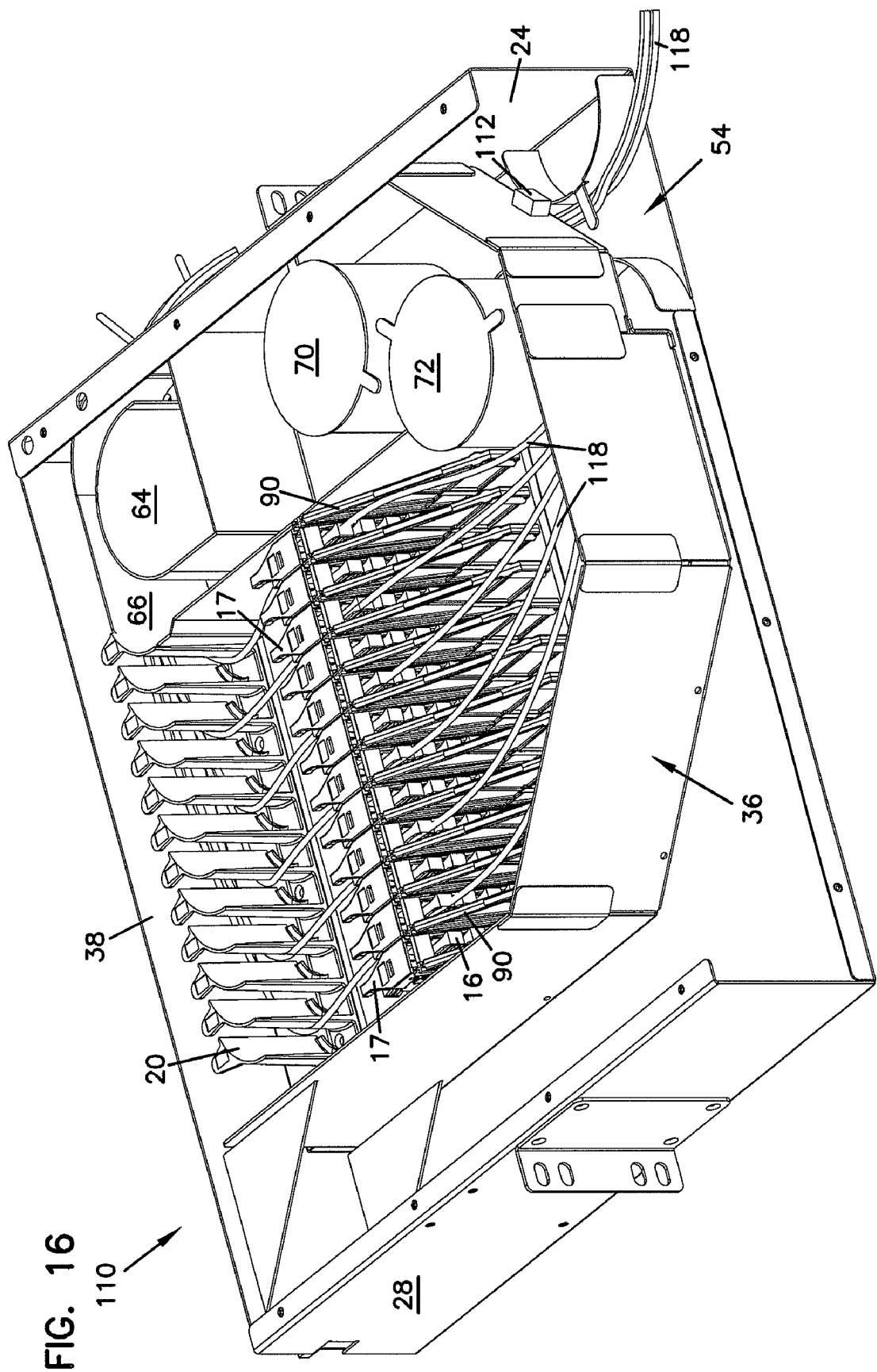
FIG. 16 is a second rear perspective view of the termination panel of FIG. 13.
Figure 17:
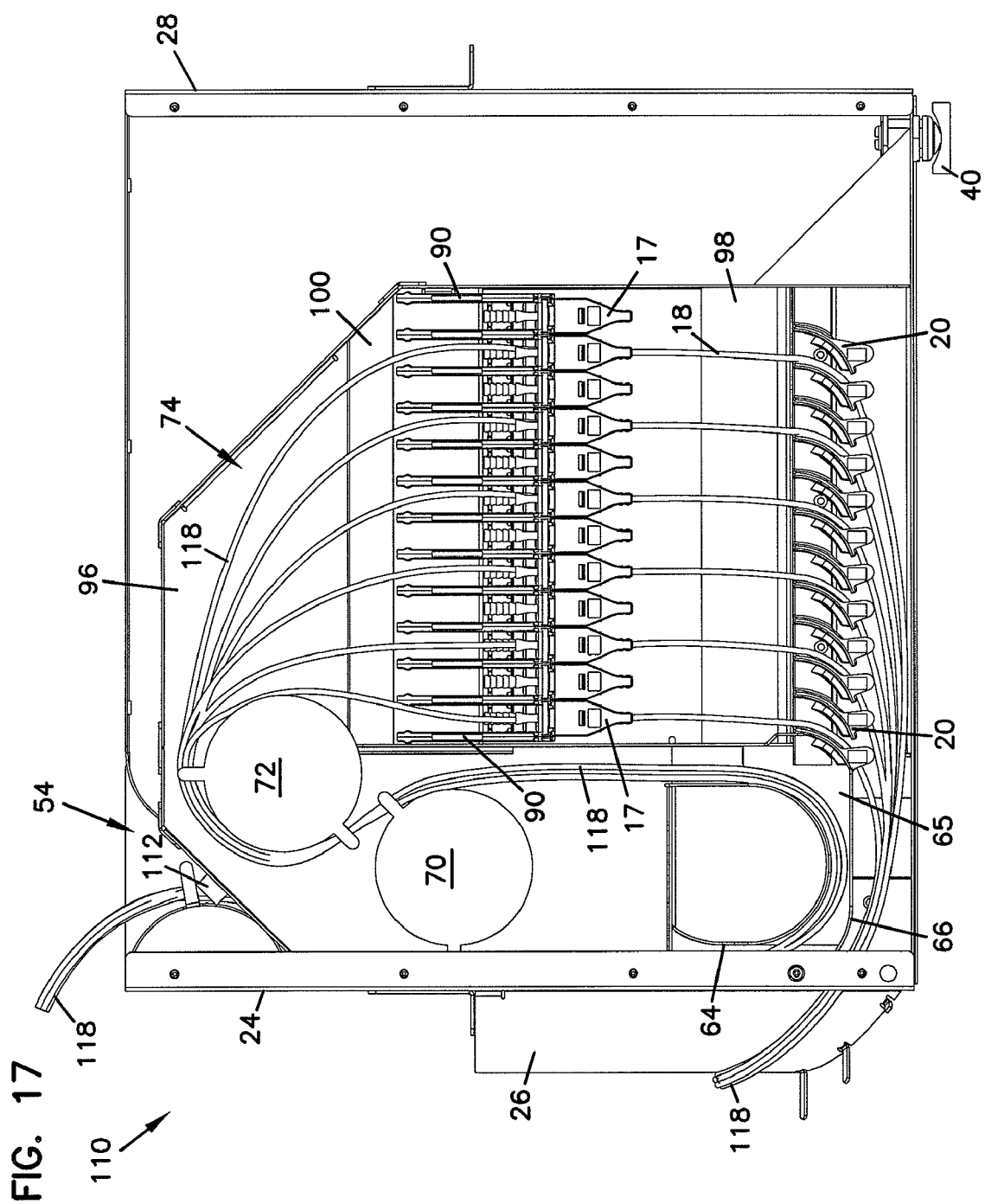
FIG. 17 is a top view of the termination panel of FIG. 13.
Figure 21:
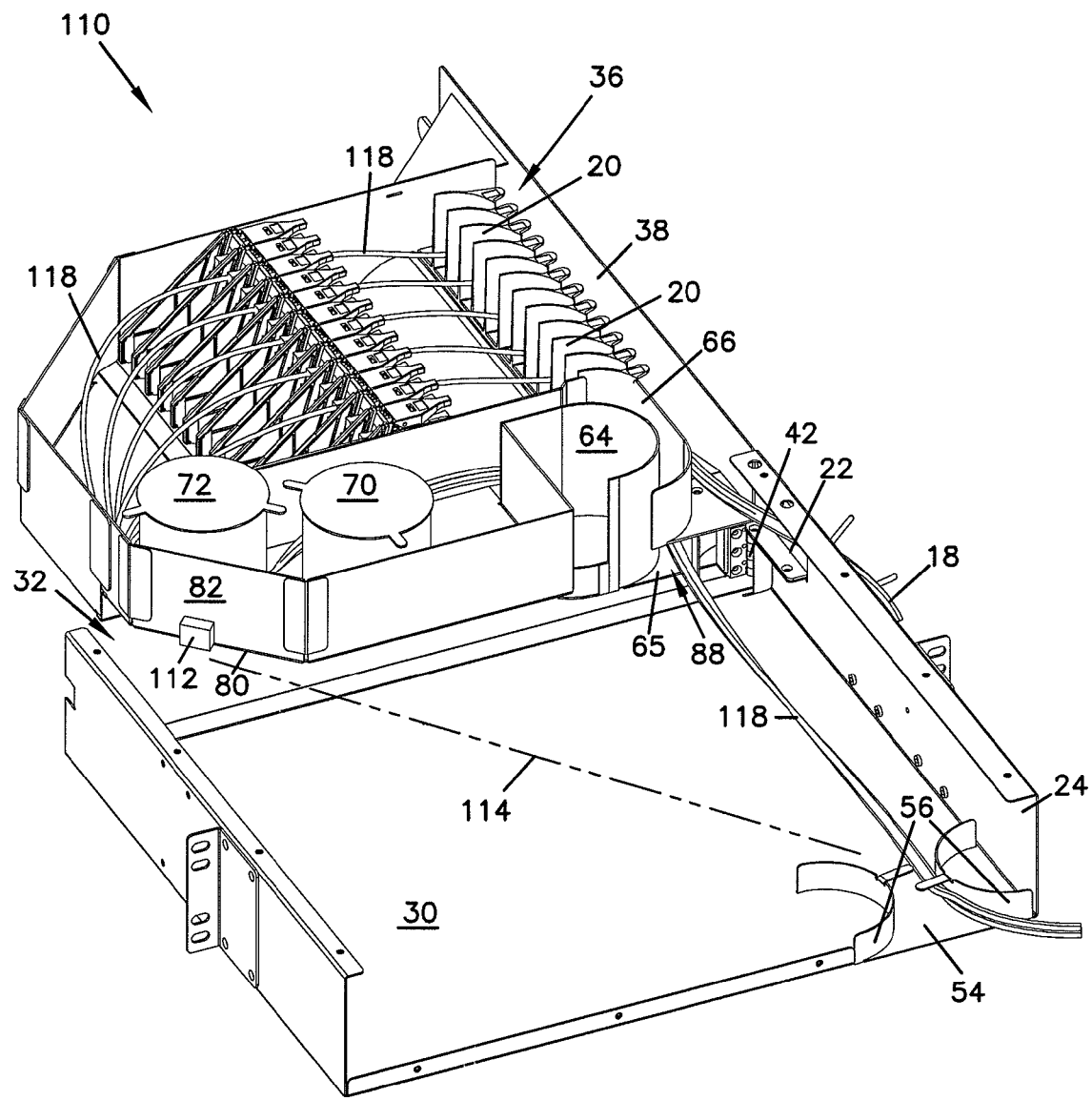
FIG. 21 is a second rear perspective view of the termination panel of FIG. 20.
Figure 22:
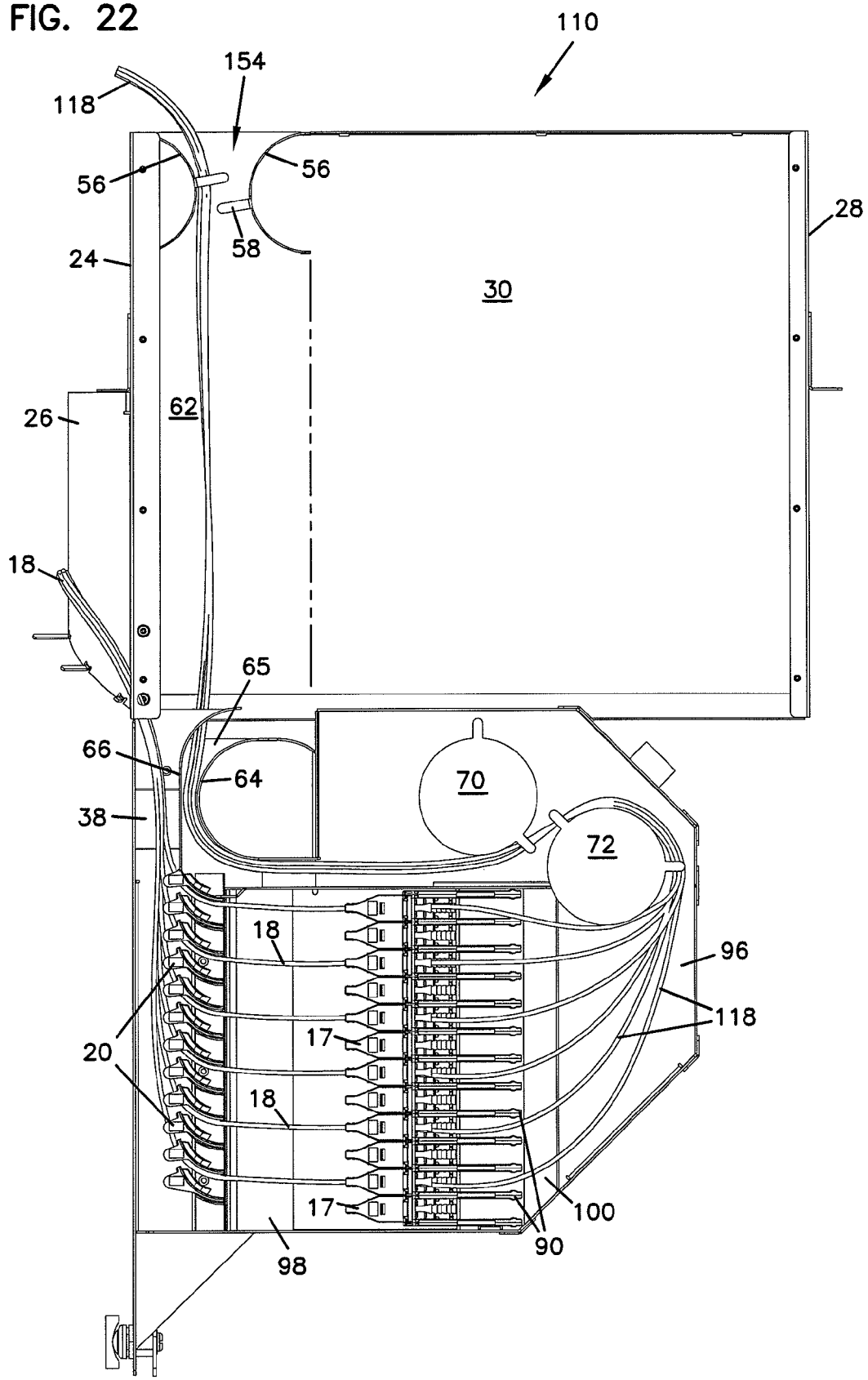
FIG. 22 is a top view of the termination panel of FIG. 20.

Referring now to FIG. 15, mounted to bulkhead 82 along second angled corner 80 of tray 36 is a temporary cable clamp 112. Clamp 112 is directly above cable access port 54 and aids in the loading of cables into tray 36 of panel 110. To load a new cable 118 (or a cable 50) into tray 36 without clamp 112, a worker would need to swing tray 36 to the open position, allowing access through front opening 32 adjacent side 28, as shown in FIG. 21. The worker would then have to reach through opening 32 across the entire diagonal distance of panel 110 to reach the new cable 118 at cable access port 54 adjacent side 24. Panel 110 may be approximately nineteen to twenty-three inches wide between sides and similarly dimensioned front to rear. Reaching across this diagonal distance when panel 110 is mounted within rack 12 may be difficult for some workers, particularly if panel 110 is mounted near the top or bottom of rack 12.

Clamp 112 permits loading of cables 118 into panel 110 without the need to extend an arm through the interior of panel 110. When tray 36 is in the closed position, as shown in FIG. 15, clamp 112 is accessible through cable access port 54. An end of a new cable 118 is lead to cable access port 54 and attached to clamp 112. Tray 36 is then swung to the open position, as shown in FIG. 21. The end of new cable 118 is pulled through panel 110 and out opening 32. As indicated by the dashed line 114 in FIG. 21, new cable 118 extends across the diagonal of bottom 30. New cable 118 can then be detached from clamp 112 and routed through opening 88 into tray 36 along the other cables 118.

It is anticipated that panels 10 and 110 may modified to provide connection locations for high speed copper cables as well as optical fiber cables. As copper cables are used to transmit data at higher speed, bend radius rules similar to those for optical fiber cables need to be enforced within the network. As with optical fiber, it is desirable to have higher densities of connections within copper panels as well.

Figure 23:
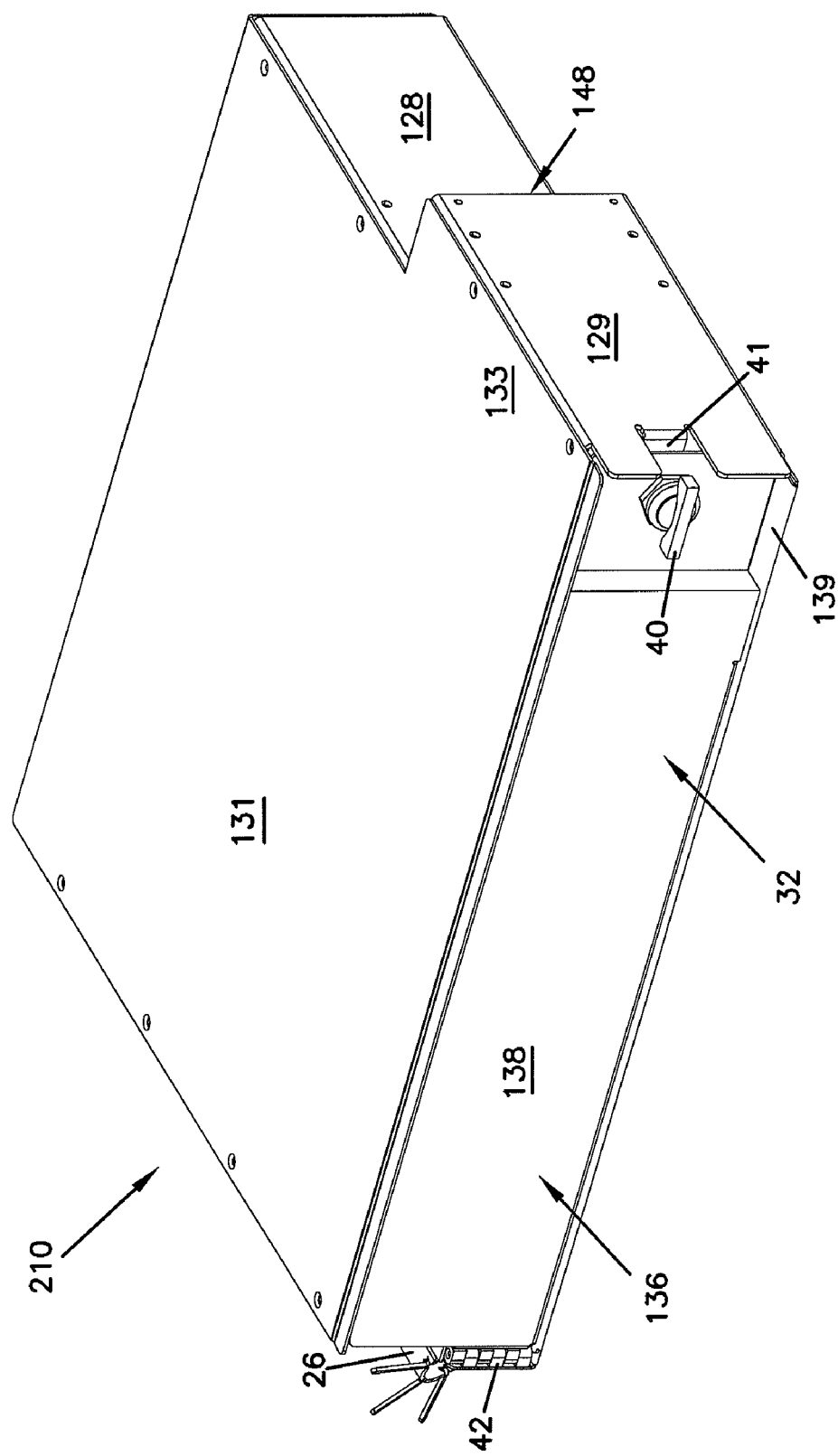
FIG. 23 is a front perspective view of a third embodiment of a termination panel according to the present disclosure, with the tray in the closed position.

Referring now to FIG. 23, a third alternative embodiment of a telecommunications termination panel 210 is illustrated. Panel 210 includes a top 131 with an extension 133 which overlays an extended portion 129 of side 128. Side 128 also includes a mounting portion 148 forming a mounting flange for mounting panel 210 to rack 12. A front wall 138 includes a recessed portion 139 adjacent latch 40 and extended portion 129. Front wall 138 closes off opening 32 when a tray 136 of panel 210 is in the closed position as shown in FIG. 23.

Figure 24:
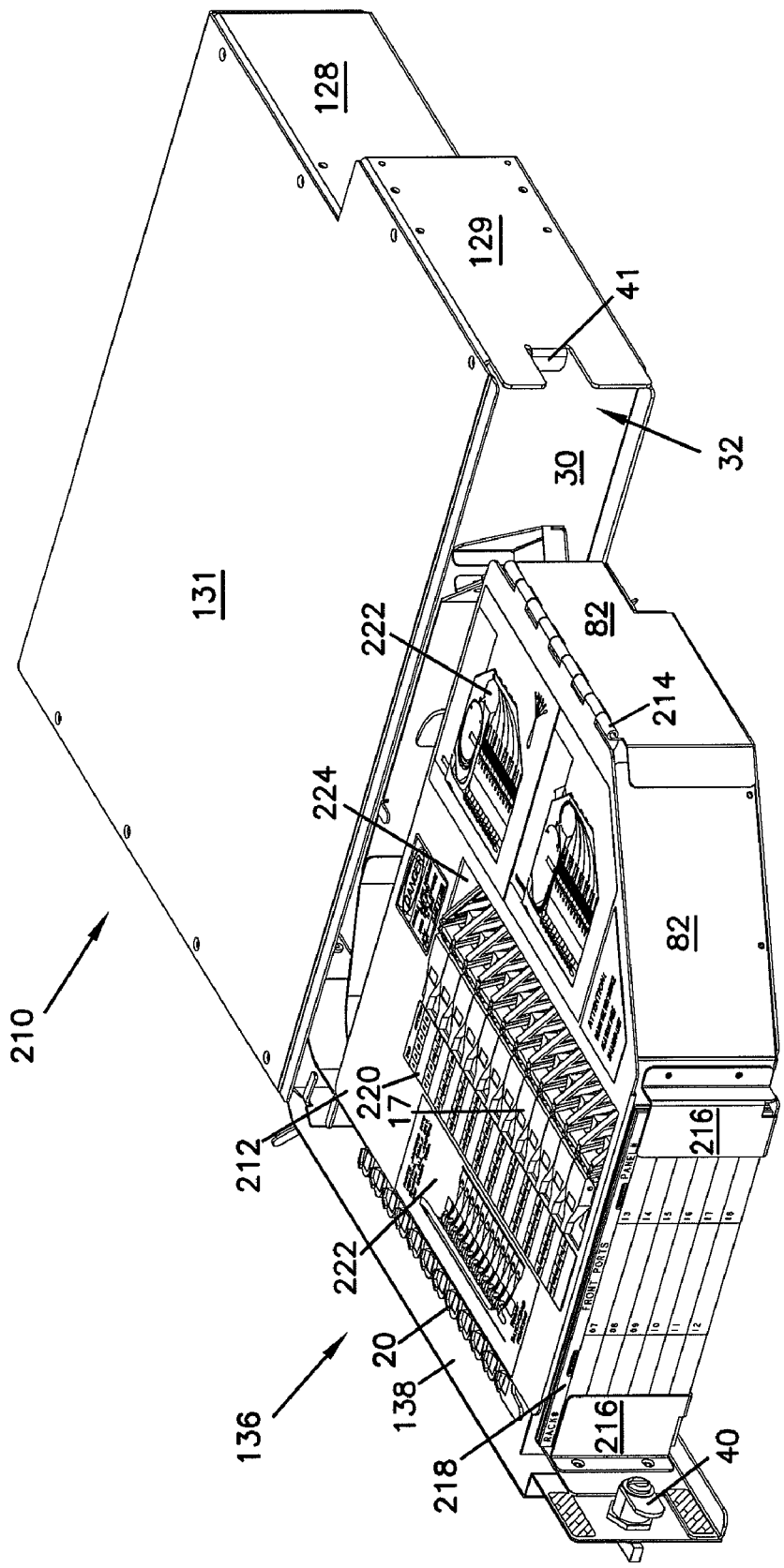
FIG. 24 is a front perspective view of the termination panel of FIG. 23, with the tray in the open position.

Referring now to FIG. 24, tray 136 is shown pivoted to the open position. A cover 212 is hingedly mounted to tray 136 by a hinge 214 along a rear bulkhead 82. As shown in FIG. 24, cover 212 is in an operational position, allowing tray 136 to be moved between the open and closed positions. Also mounted along a bulkhead 82 is a pair of card holders 216 for holding information cards 218. Information cards 218 may be instruction cards, warning labels, routing information cards or designation strips related to the configuration and use of panel 210. Card holders 216 are positioned so that cards 218 are housed within panel 10 when tray 136 is in the closed position but are easily accessible to a user when tray 136 is in the open position. Cover 212 also includes an opening 224 through which modules 17 are visible. Opening 224 permits any identification or other information printed or attached to modules 17 to be visible when cover 212 is in the operational position. Designation labels 220 may be positioned adjacent opening 224 to indicate the source and destination of cables attached to adapters 16. Cover 212 may also include one or more routing diagrams 222 to illustrate to the user the recommended path of cables within panel 210.

Figure 25:
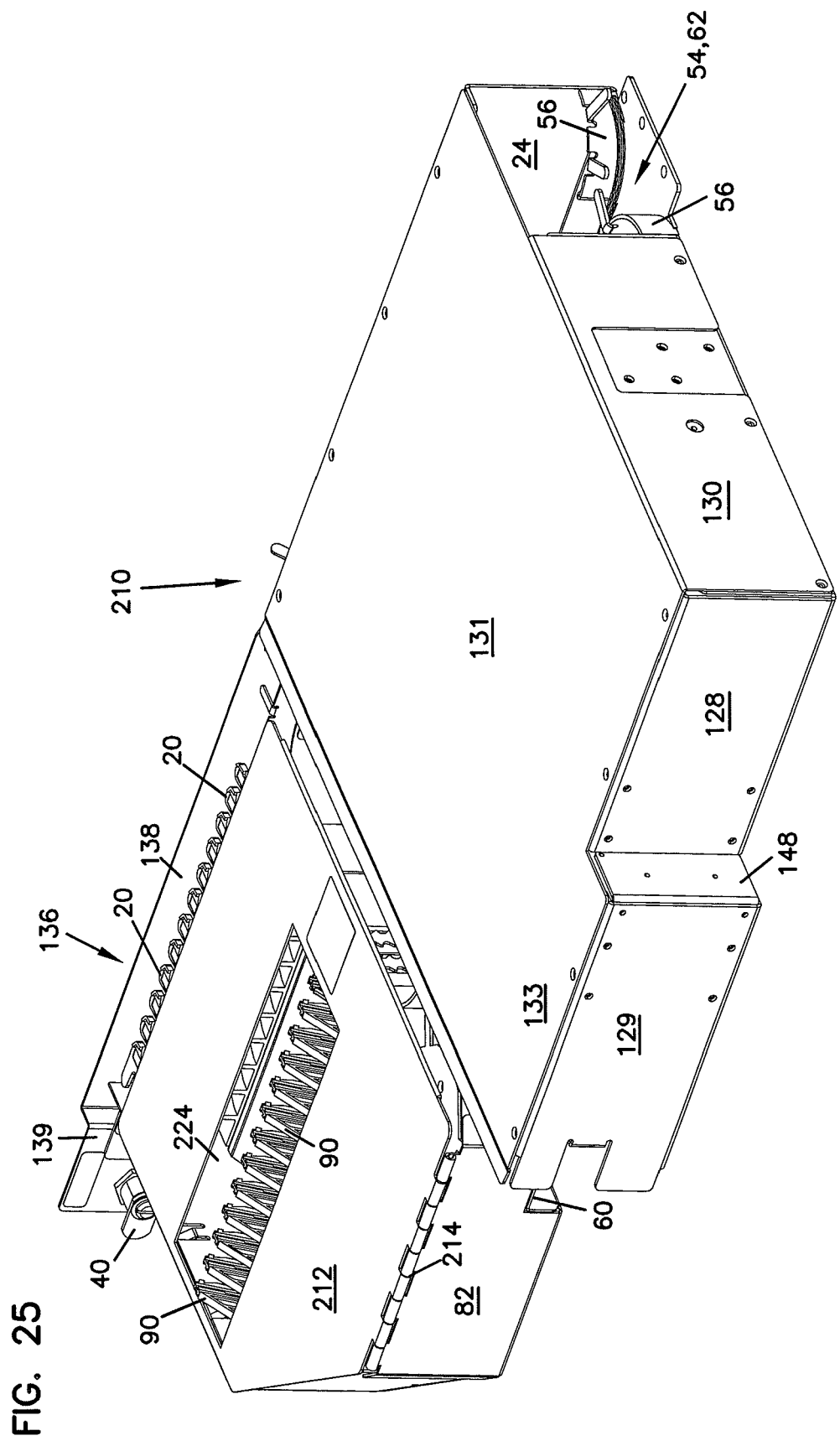
FIG. 25 is a rear perspective view of the termination panel of FIG. 24, with the modules, designation strips, and warning labels removed for clarity.

Referring now to FIG. 25, rear wall 130 substantially closes off the rear of panel 210 except for rear opening 54. As shown, rear wall 130 is a downward extension of top 131. It is anticipated that a rear wall closing off the rear of the housing except for the rear opening could be an upward extending portion of bottom 30 (as shown in the FIGS. below) or a separate piece fastened to panel 210.

Figure 26:
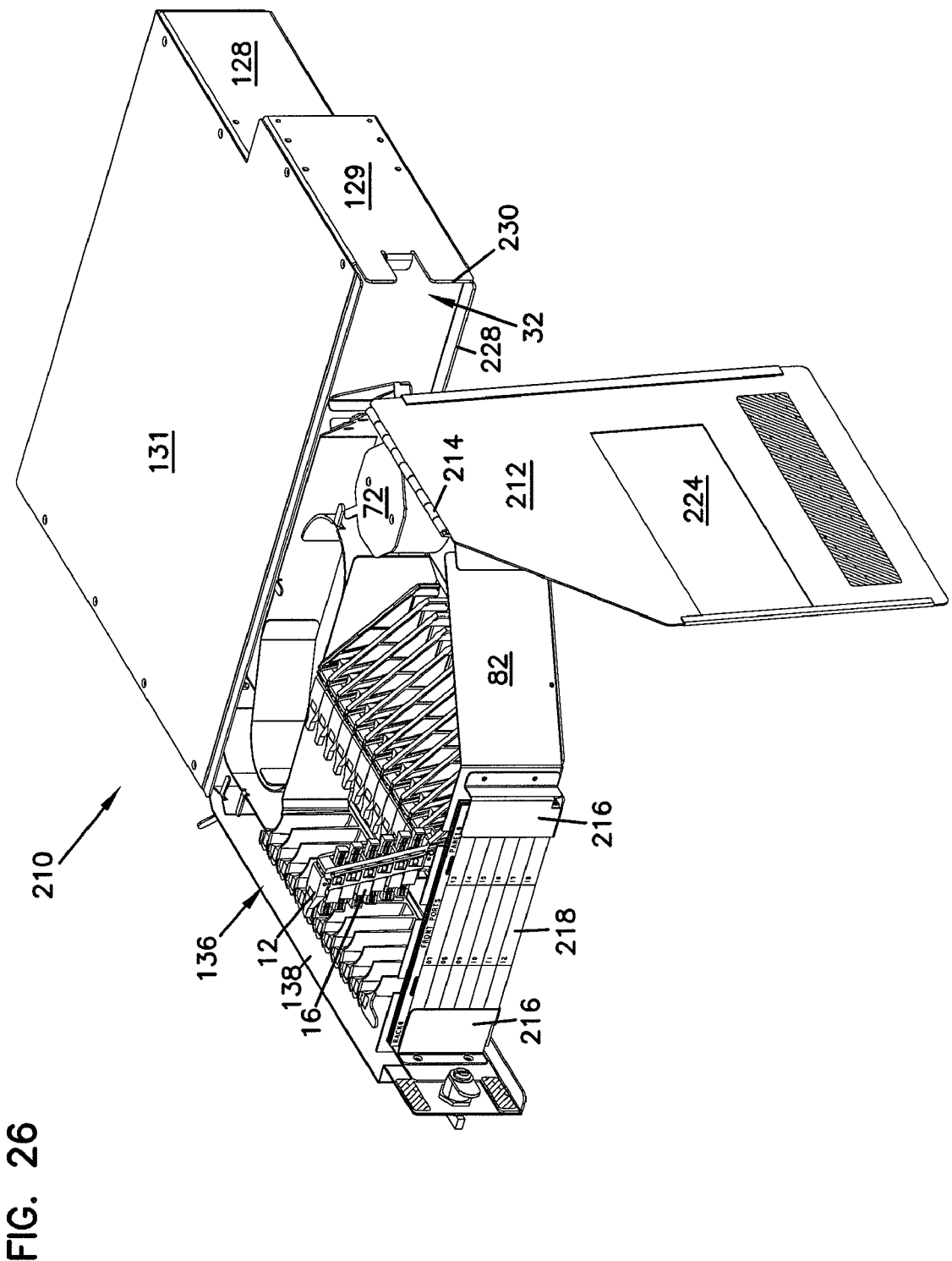
FIG. 26 is a front perspective view of the termination panel of FIG. 24, with the cover in an access position and one of the modules extended upward.
Figure 27:
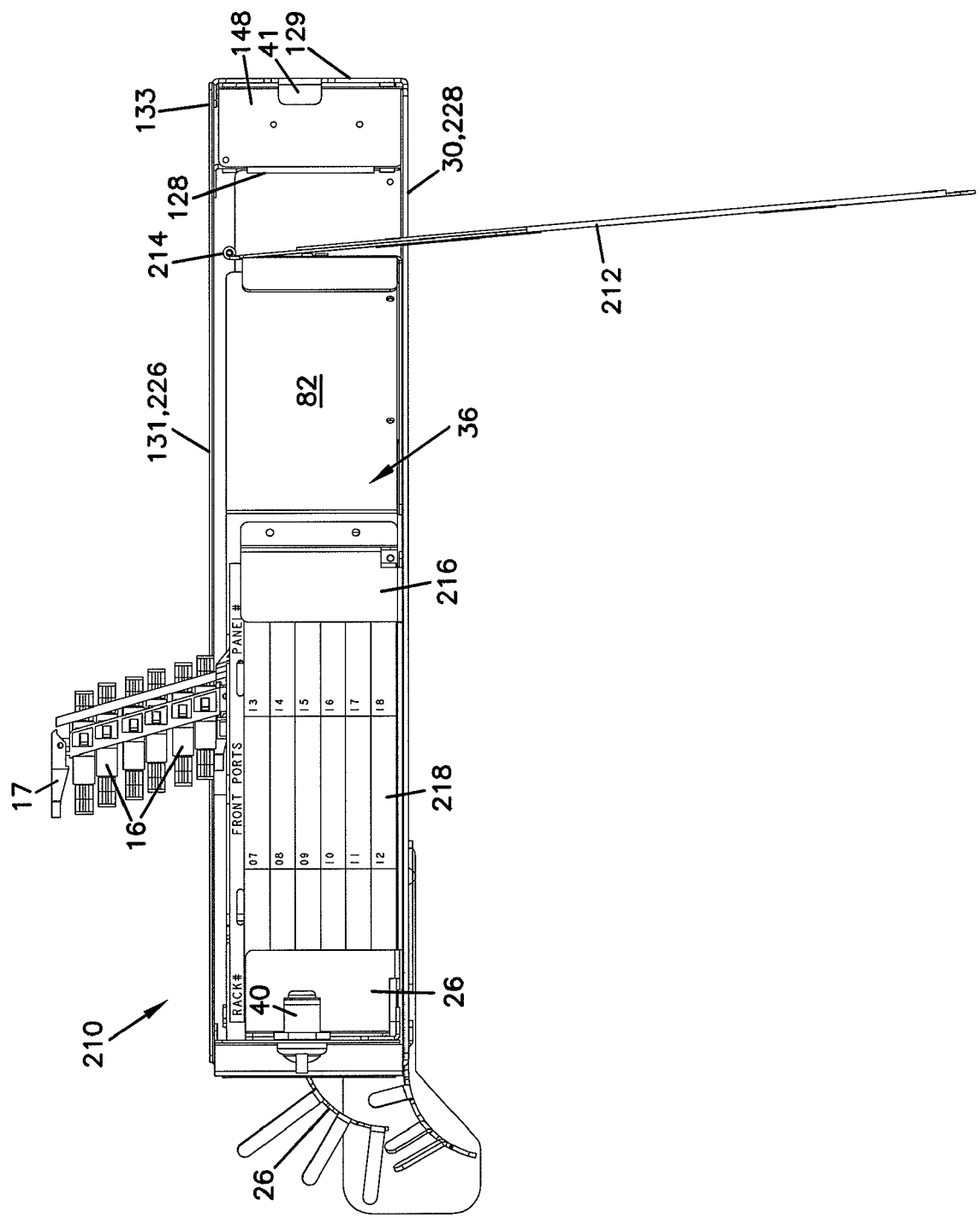
FIG. 27 is a front view of the termination panel of FIG. 26.
Figure 28:
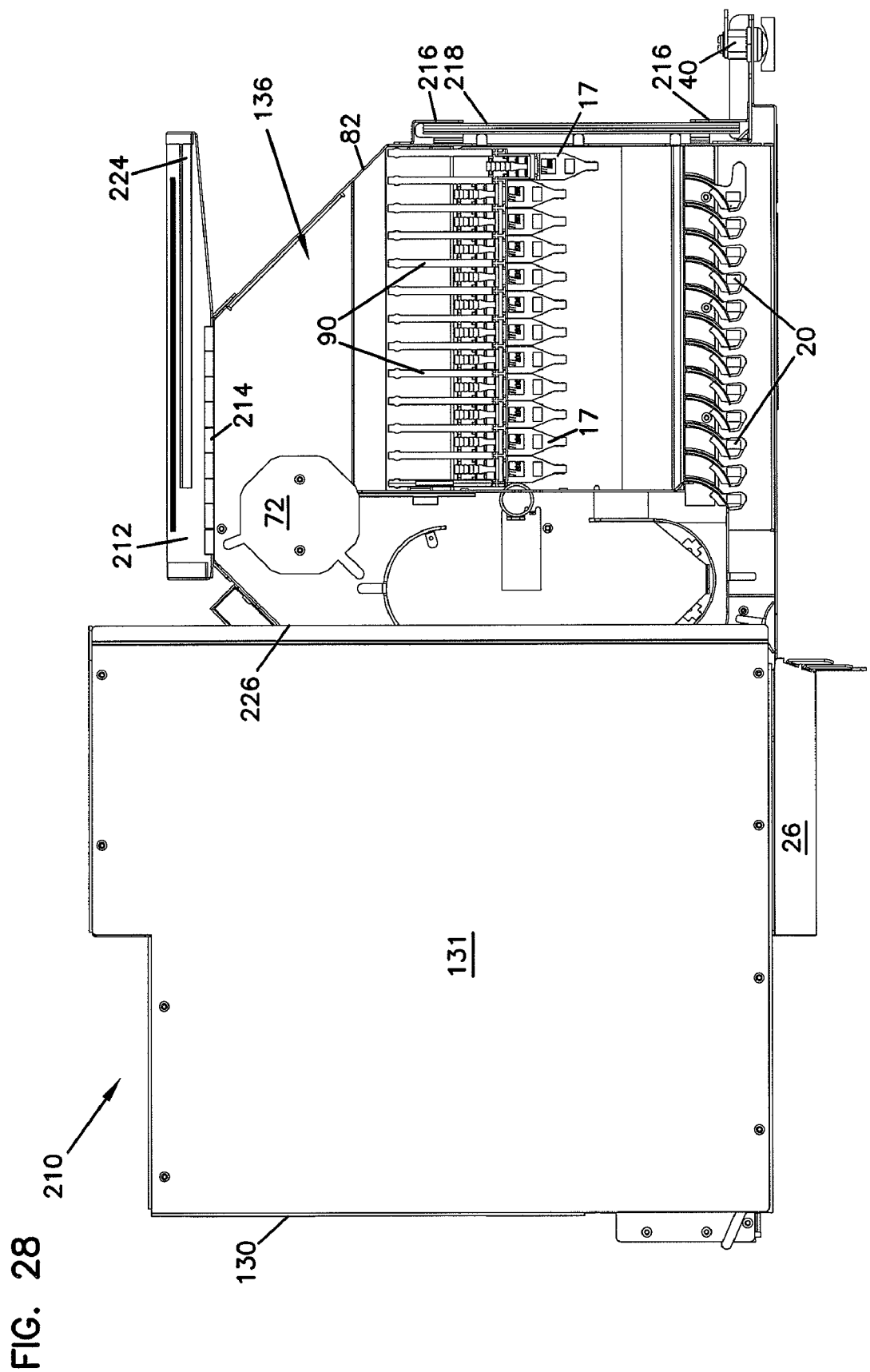
FIG. 28 is a top view of the termination panel of FIG. 26.

Referring now to FIGS. 26 to 28, panel 210 is illustrated with tray 136 in the open position and cover 212 in a position permitting access to adapter 16, modules 17 and any cables which might lead to or away from adapters 16. If tray 136 were closed with module 17 so extended, front edge 226 of top 131 might damage module 17, one or more of the adapters 16 mounted to module 17 or any cables leading to or from these adapters 16. To prevent such a closure and the potential resulting damage, cover 212 is configured to prevent movement of tray 136 to the closed position when cover 212 is not in the operational position (as shown in FIGS. 24 and 25). As shown in FIGS. 26 to 28, cover 212 is in the access position and any attempt to close tray 136 will result in cover 212 hitting a front edge 228 of bottom 30. If cover 212 is in an intermediate position between the operational and access positions (as shown below in FIGS. 29 to 31), cover 212 will hit front edge 226 of top 131, preventing closure of tray 136. Also, when cover 212 is in the operational position, cover 21 will ensure that no cables within tray 136 extend above bulkheads 82. Any cables extending above bulkheads 82 may be pinched or otherwise damaged by front edge 226 of top 131.

Figure 29:
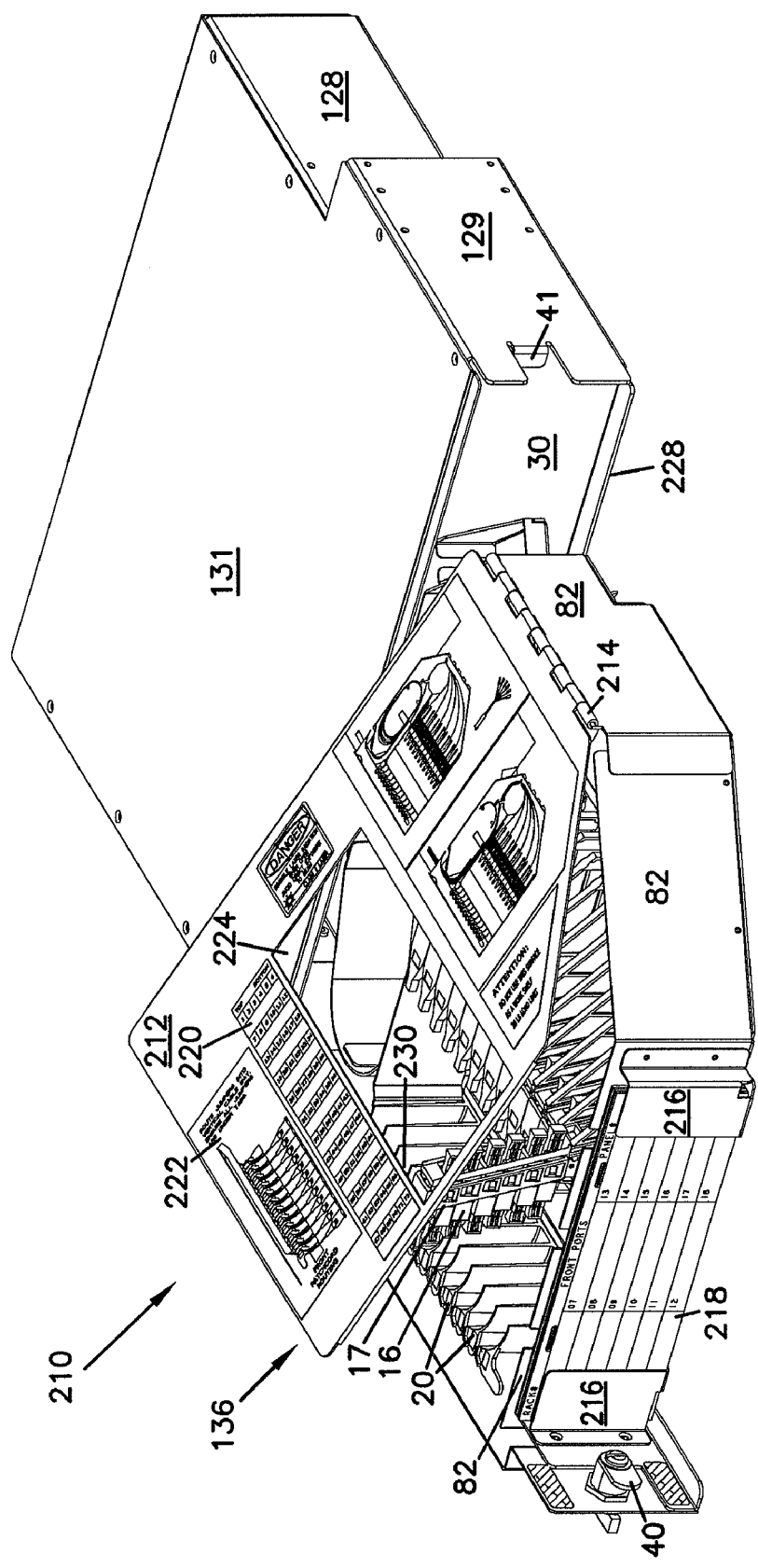
FIG. 29 is a front perspective view of the termination panel of FIG. 24, with one of the modules extended upward and the cover in an intermediate position between the access position and the operational position.
Figure 30:
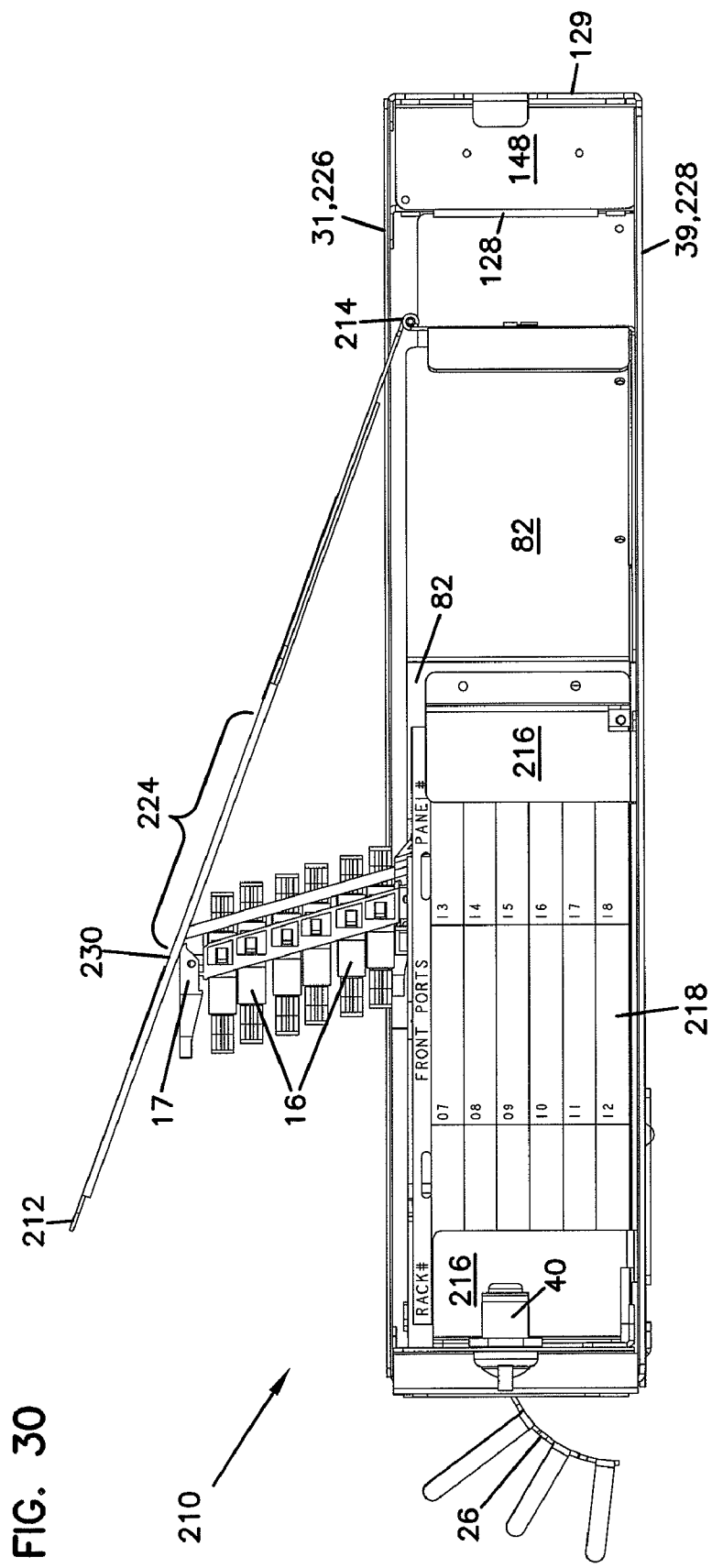
FIG. 30 is a front view of the termination panel of FIG. 29.
Figure 31:
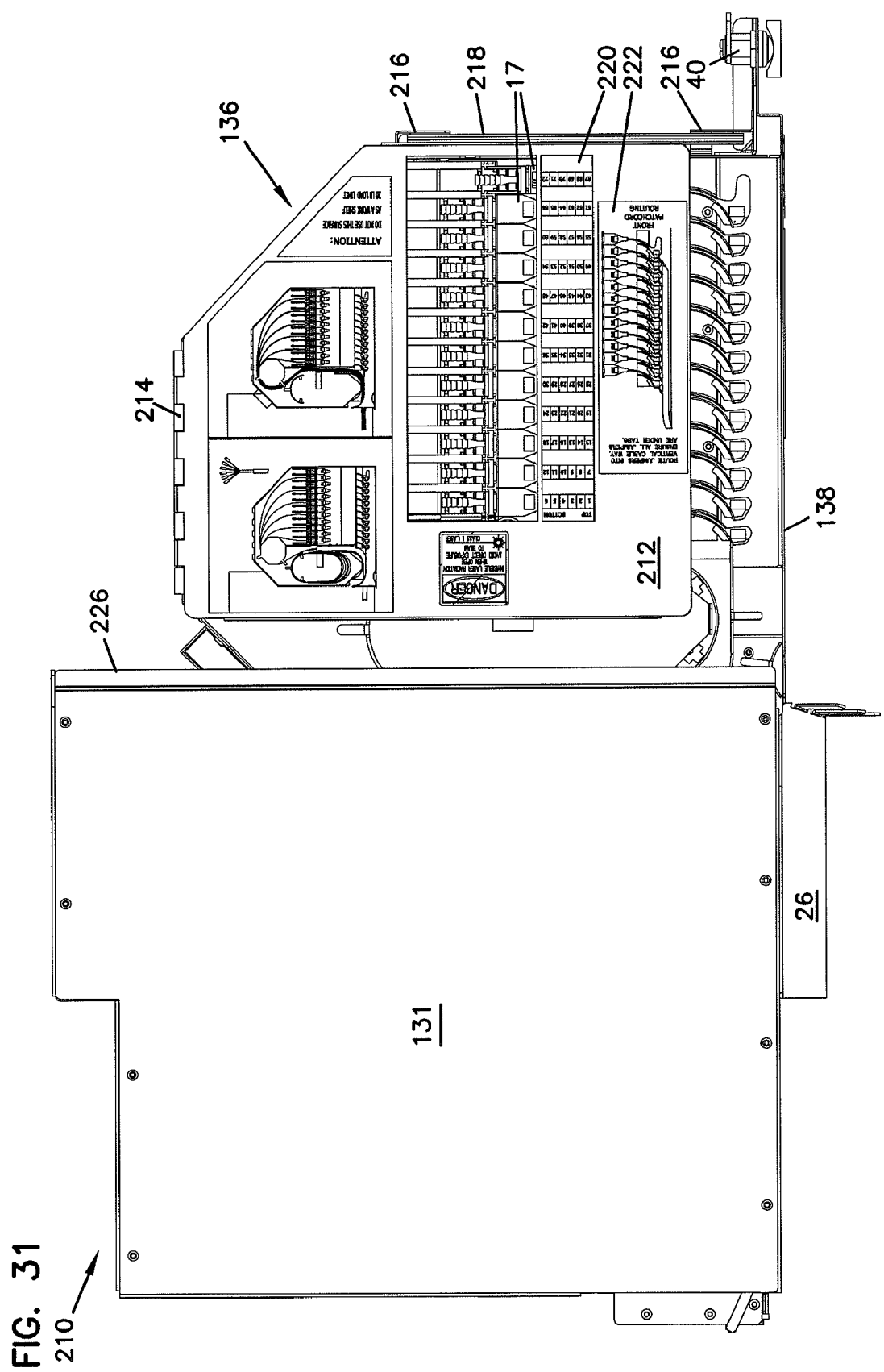
FIG. 31 is a top view of the termination panel of FIG. 29.

Referring now to FIGS. 29 to 31, cover 212 is shown in an intermediate position between the access and operational positions. These FIGS. illustrate how cover 212 interacts with a module 17 which was extended upward and not retracted prior to cover 212 being moved from the access position of FIGS. 26 to 28 to the operational position of FIGS. 24 and 25. The upper end of the extended module 17 strikes cover 212 adjacent an edge 230 of opening 224. Opening 224 is positioned and configured to prevent cover 212 from being closed with a module 17 extended upward while still allowing visibility of modules 17 when cover 212 is in the operational position. When a module 17 is extended and interacts with cover 212 as shown in FIGS. 29 to 31, cover cannot be moved to the operational position and tray 136 cannot be closed. This prevent damage to the extended module 17 as described above.

Opening 224 is also configured and positioned so as to prevent any cables connected to the rear of the upper most adapters 16 of the extended module 17 from being pinched or otherwise damaged when cover 212 interacts with the extended module 17. In the absence of opening 224 configured and positioned as shown, such a cable would be struck by cover 212 before cover 212 strikes the extended module 17. The pressure of cover 212 could cause the cable to kink or bend tighter than the desired bend radius and possibly degrade the ability of the cable to transmit optical signals.

Figure 32:
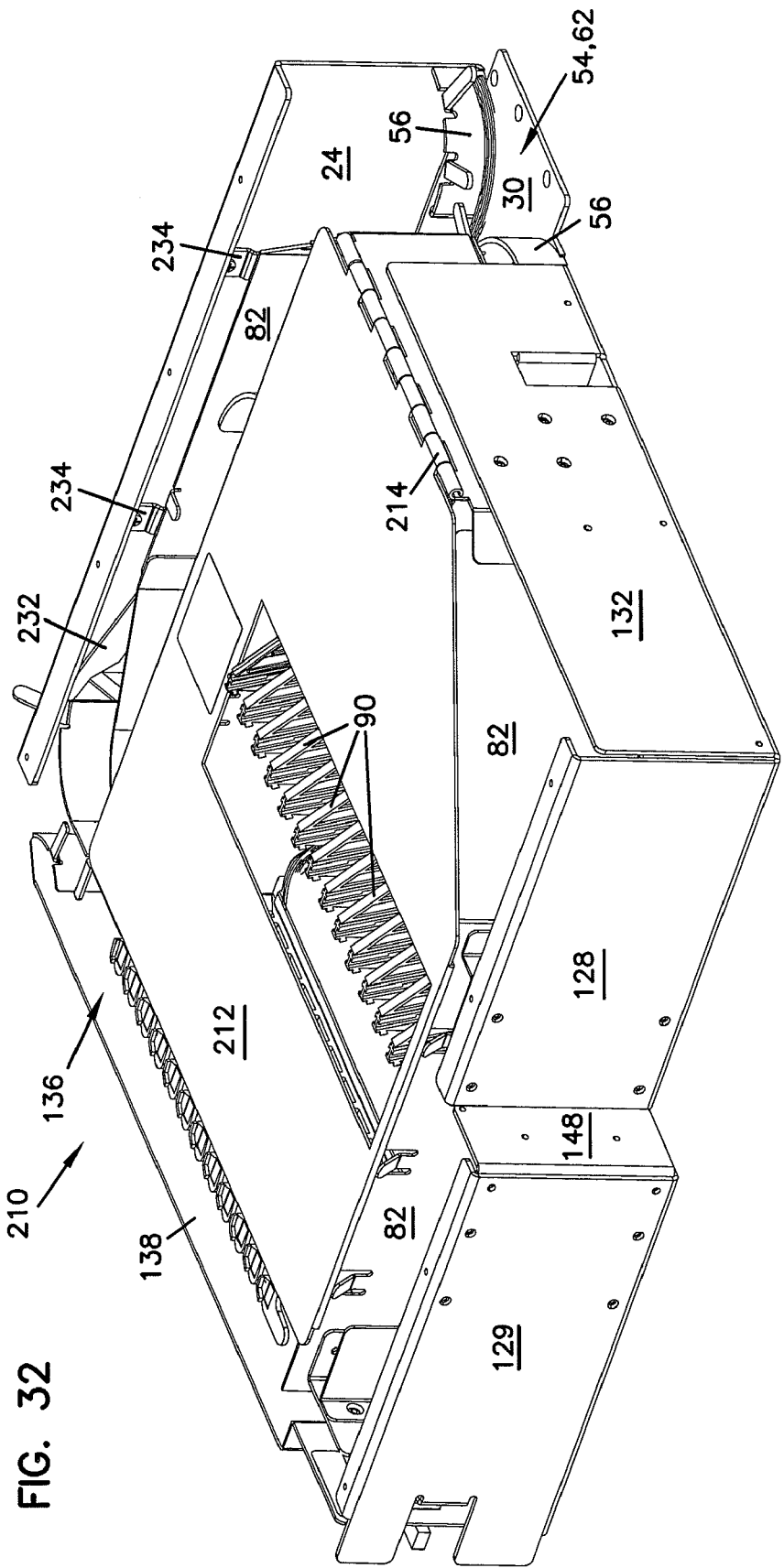
FIG. 32 is a rear perspective view of the termination panel of FIG. 23, with the top removed for clarity.
Figure 33:
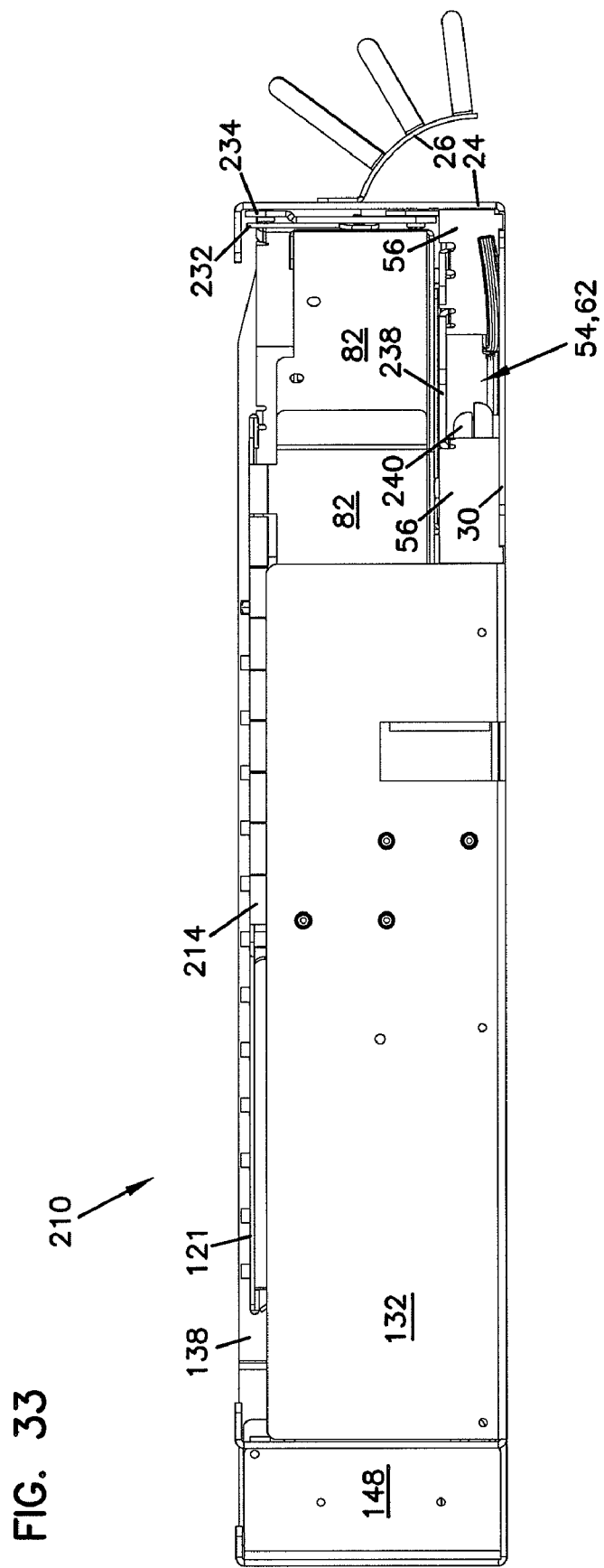
FIG. 33 is a rear view of the termination panel of FIG. 32.
Figure 34:
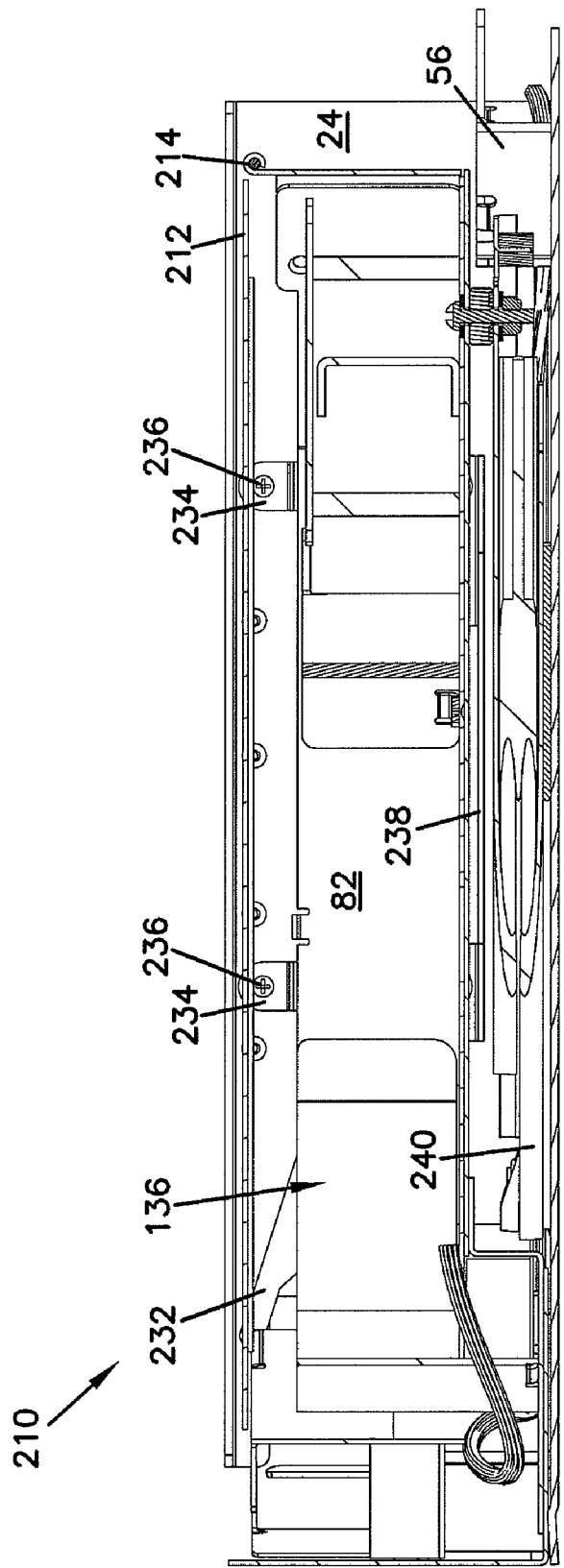
FIG. 34 is a side cross-sectional view of the termination panel of FIG. 33 taken along the middle of the cable path through the panel.

Referring now to FIGS. 32 to 34, panel 210 is shown with cover 131 removed to permit viewing of the interior of panel 210 as tray 136 is moved from the closed position (shown in FIGS. 32 to 34) and the open position (shown in the FIGS. below). A back wall 132 extends upward from the rear of bottom 30 and cooperates with rear wall 130 extending downward from top 131 (shown in the FIGS. above) to close off the back of panel 210. Along side 24 adjacent cable path 62 are an actuator 232 which extends between tray 136 and one of two swinging links 234. Links 234 and actuator 232 are positioned between side 24 and the bulkhead 82 immediately adjacent side 24. Each link 234 includes an upper end pivotably connected to side 24 by a fastener 236. Each link 234 includes a bottom end pivotably connected to a movable plate 238 which is positioned along and defines the top edge of cable path 62 beneath tray 136. When tray 136 is in the closed position as shown in FIGS. 32 to 34, cables are trapped between bottom 30 and the plate. In this manner, plate 238 prevents any cables within cable path 62 from contacting or possibly interfering with the movement of tray 136.

Shown in FIG. 34 is an extendable rotatable support 240 pivotably attached to bottom 30 adjacent cable path 62 and tray 136 underneath raised floor 60. As tray 136 is moved from the close position to the open position, support 240 rotates and extends out of front opening 32 to provide additional support to tray 136. Without support 240, only hinge 42 is supporting tray 136 and tray 136 may sag or otherwise bind hinge 42 (shown in FIG. 3, above) due to the weight of tray 136 and the components installed in tray 136. Support 240 provides additional support to tray 136 in the open position and aids in the movement of tray 136.

Figure 35:
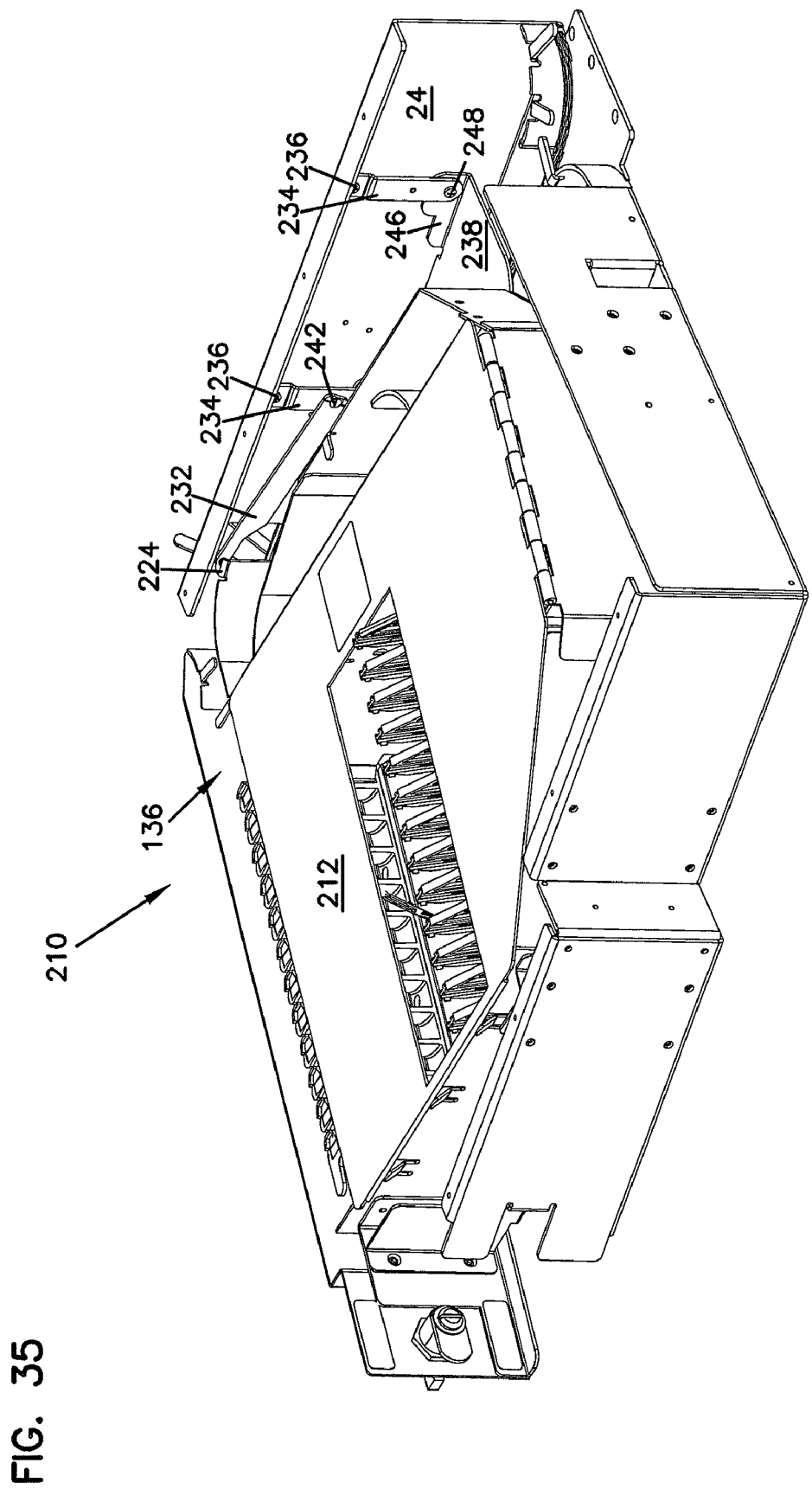
FIG. 35 is a rear perspective view of the termination panel of FIG. 23, with the tray moved approximately 15 degrees from the closed position toward the open position.
Figure 36:
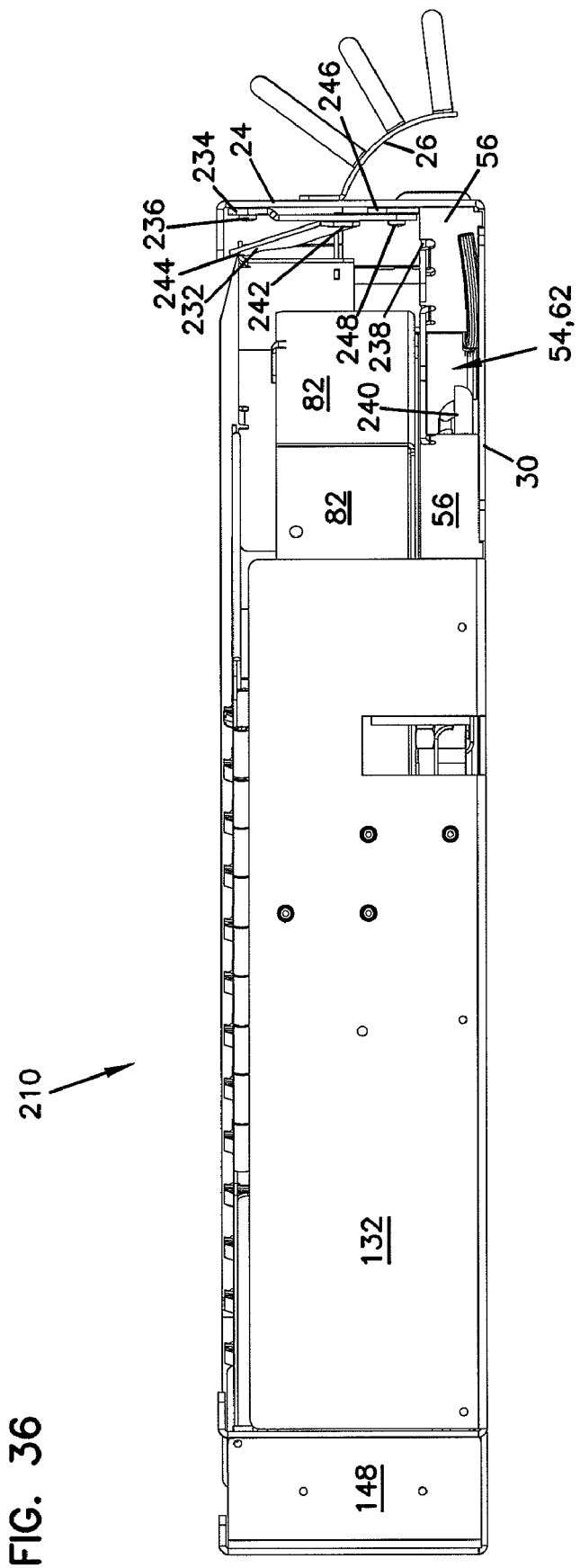
FIG. 36 is a rear view of the termination panel of FIG. 35.
Figure 37:
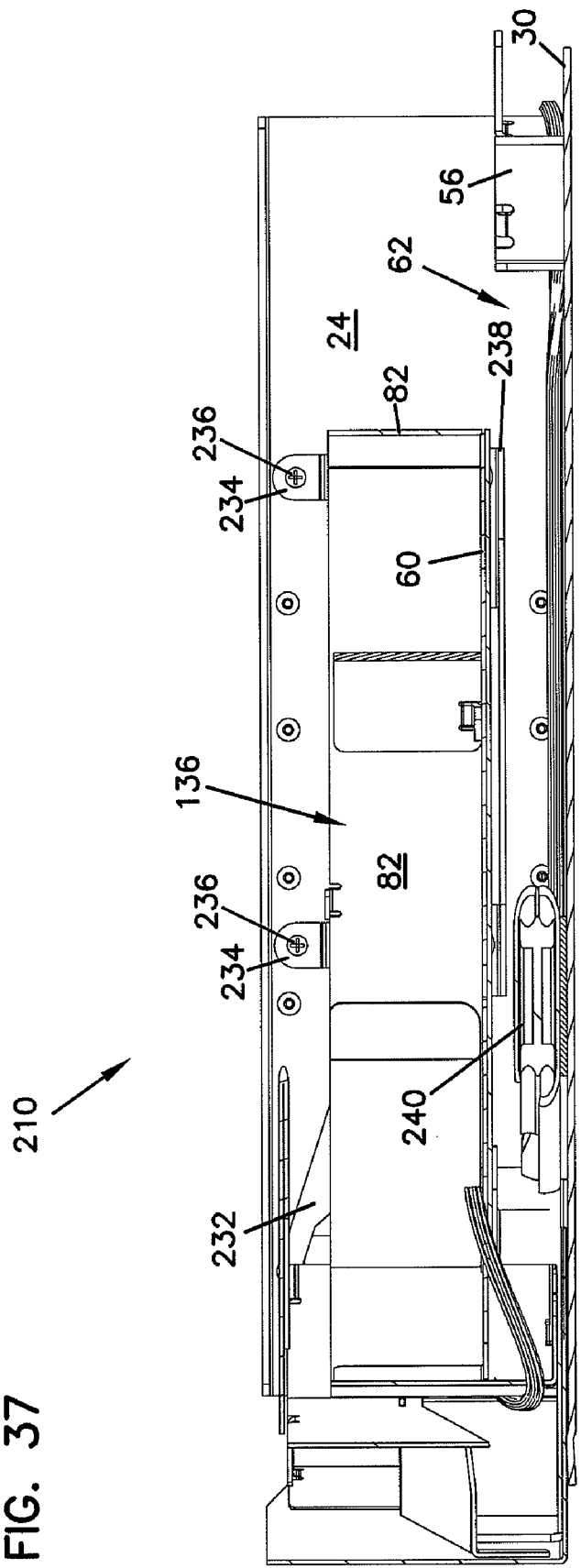
FIG. 37 is a side cross-sectional view of the termination panel of FIG. 35 taken along the middle of the cable path through the panel.

Referring now to FIGS. 35 to 37, tray 136 has been moved approximately 15 degrees from the closed position toward the open position. Actuator 232 is attached to tray 136 at an attachment point 244 permitting three-dimensional movement of actuator 232 relative to tray 136. As shown in FIG. 36, actuator 232 has been displaced from side 24 but has not significantly displaced link 234 to which is it attached. Actuator 232 is pivotably attached to the forwardmost link 234 at a attachment point 242 which also permit some articulation of link 232 are tray 136 is moved. Plate 238 extends essentially parallel to bottom 30 and includes a pair of tabs 246 extending upward adjacent side 24. Links 234 are pivotably attached to tabs 246 by fasteners 248.

Figure 38:
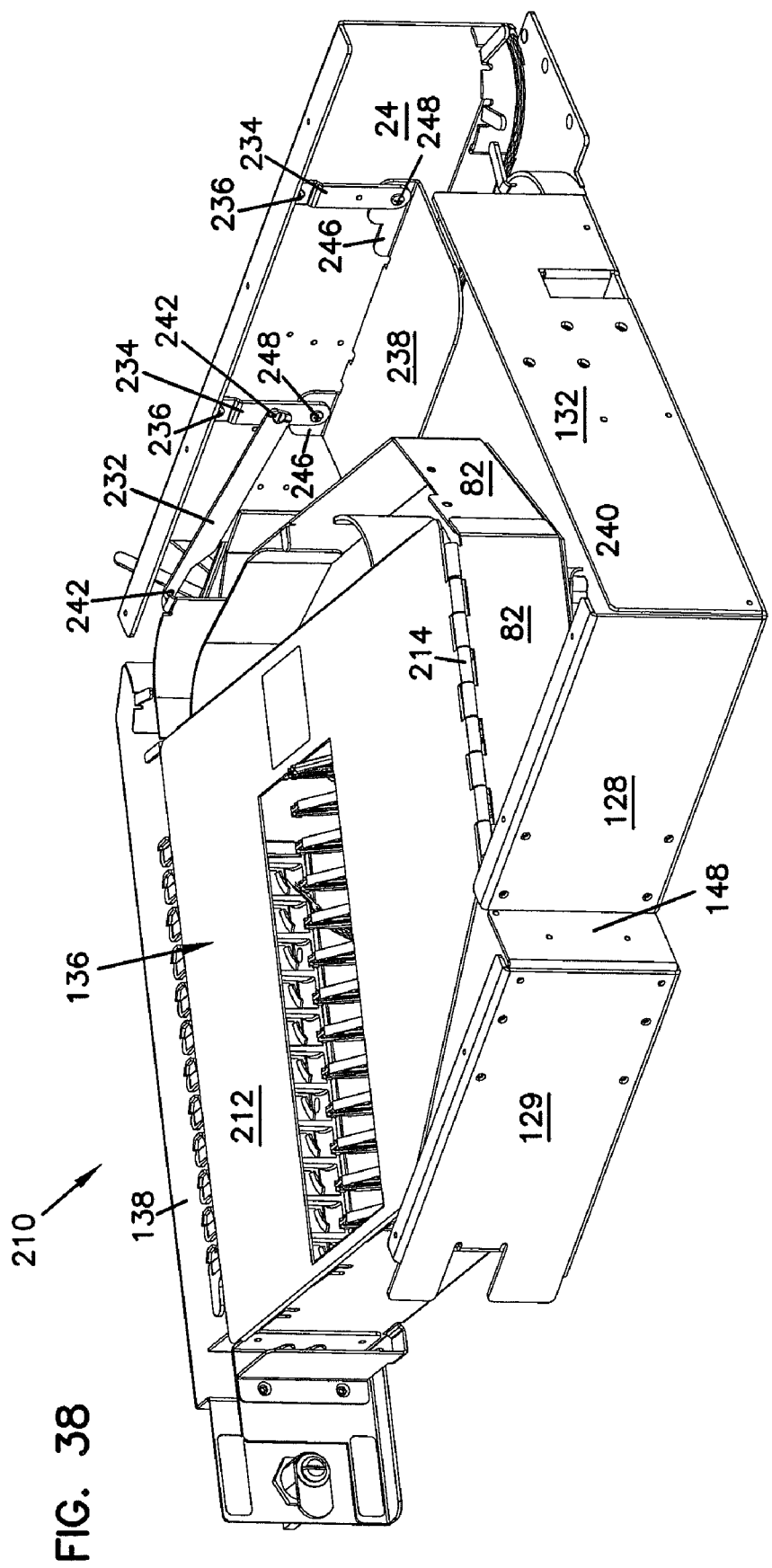
FIG. 38 is a rear perspective view of the termination panel of FIG. 23, with the tray moved approximately 30 degrees from the closed position toward the open position.
Figure 39:
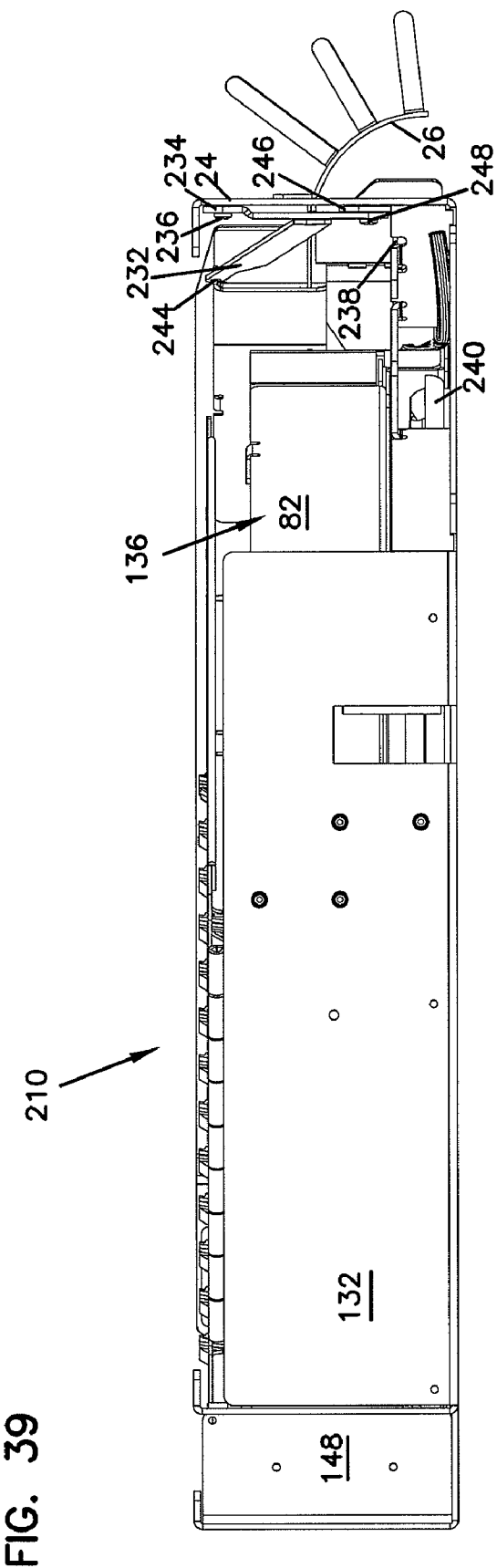
FIG. 39 is a rear view of the termination panel of FIG. 38.
Figure 40:
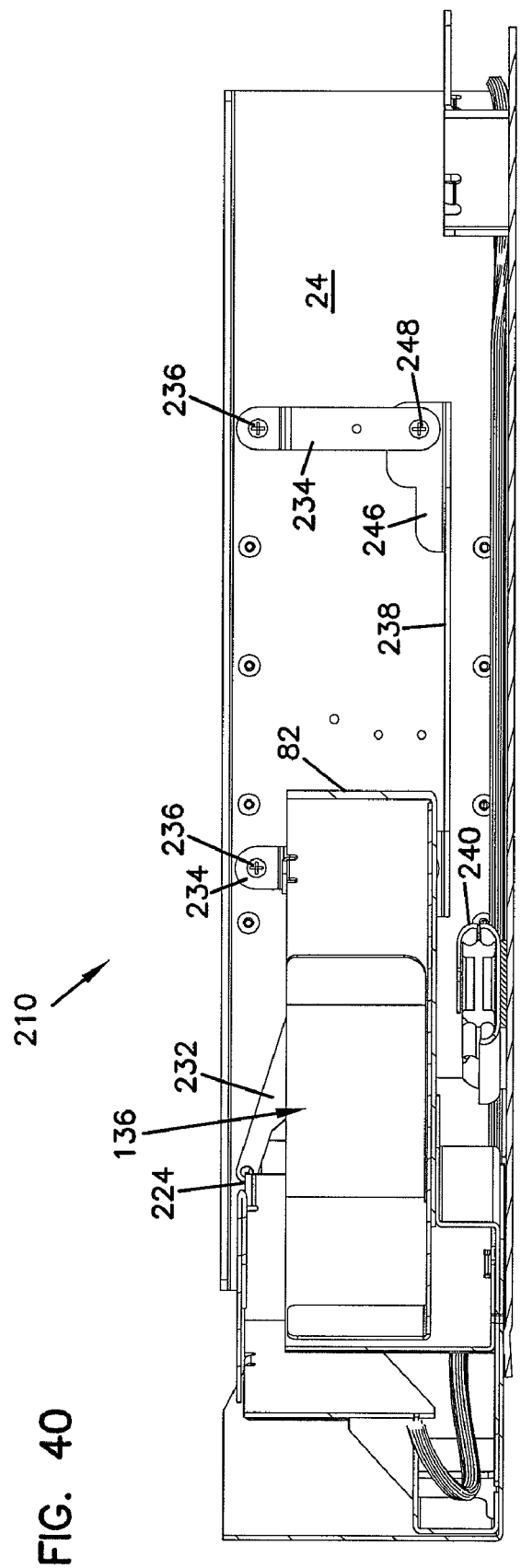
FIG. 40 is a side cross-sectional view of the termination panel of FIG. 38 taken along the middle of the cable path through the panel.

Referring now to FIGS. 38 to 40, tray 136 has been moved approximately 30 degrees from the closed position toward the open position. As shown in FIG. 40, actuator 232 has been further displaced from side 24 and has begun to pull link 234 to which it is attached toward the front of panel 210. As this link moves forward, it will begin to swing upward and draw plate 238 up from cable path 62. Note that this upward movement is not yet visible in FIGS. 38 to 40, although some forward displacement of links 234 has taken place.

Figure 41:
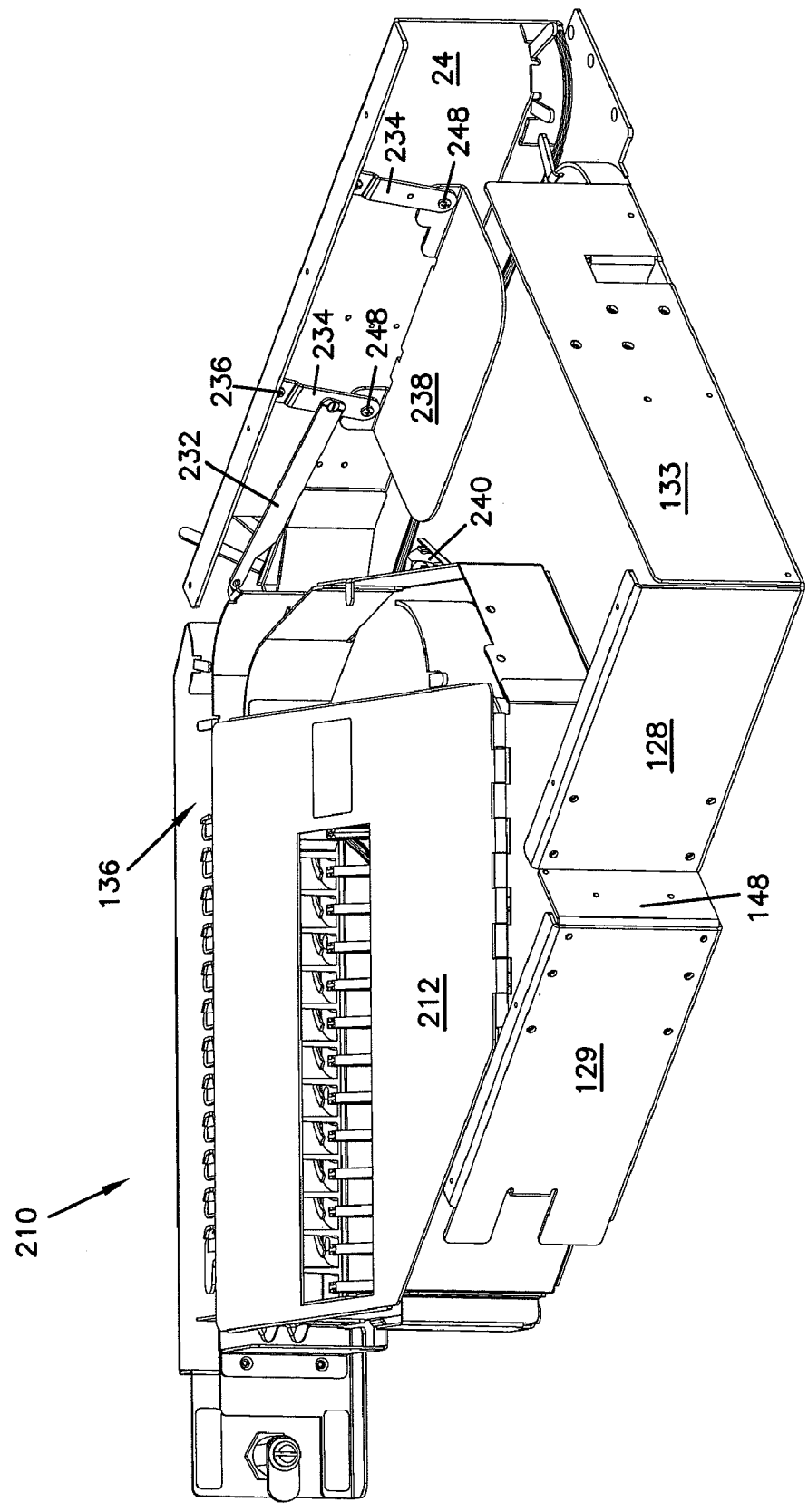
FIG. 41 is a rear perspective view of the termination panel of FIG. 23, with the tray moved approximately 45 degrees from the closed position toward the open position.
Figure 42:
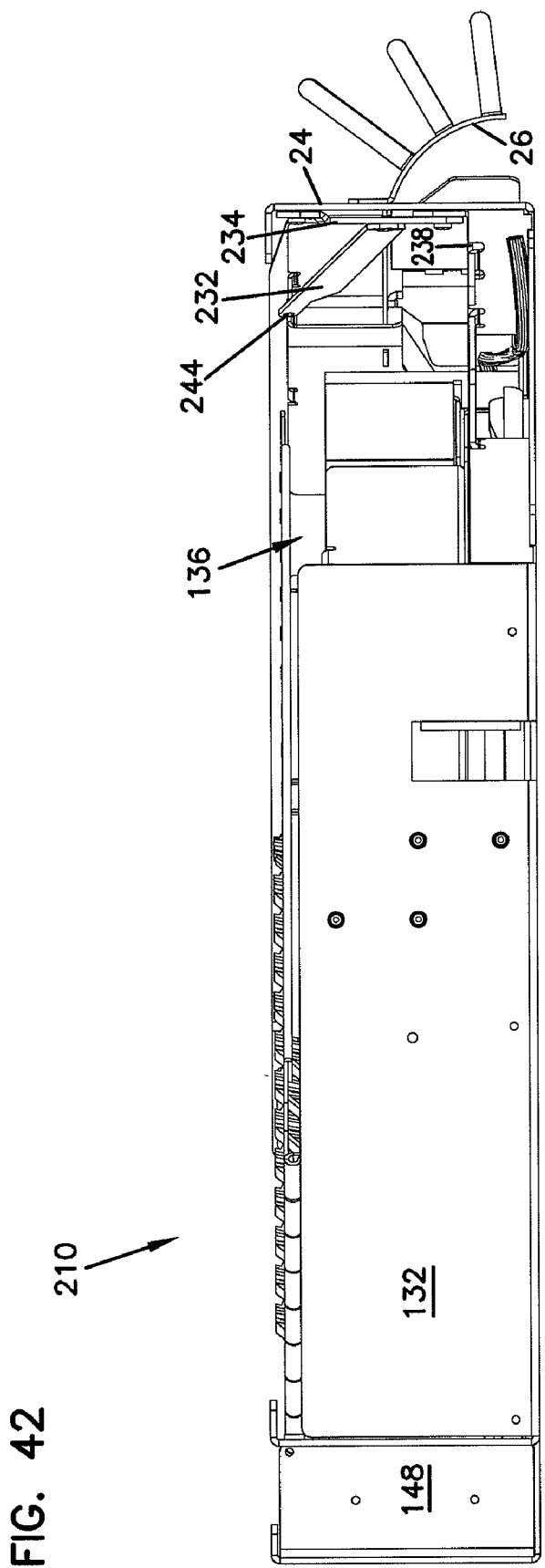
FIG. 42 is a rear view of the termination panel of FIG. 41.
Figure 43:
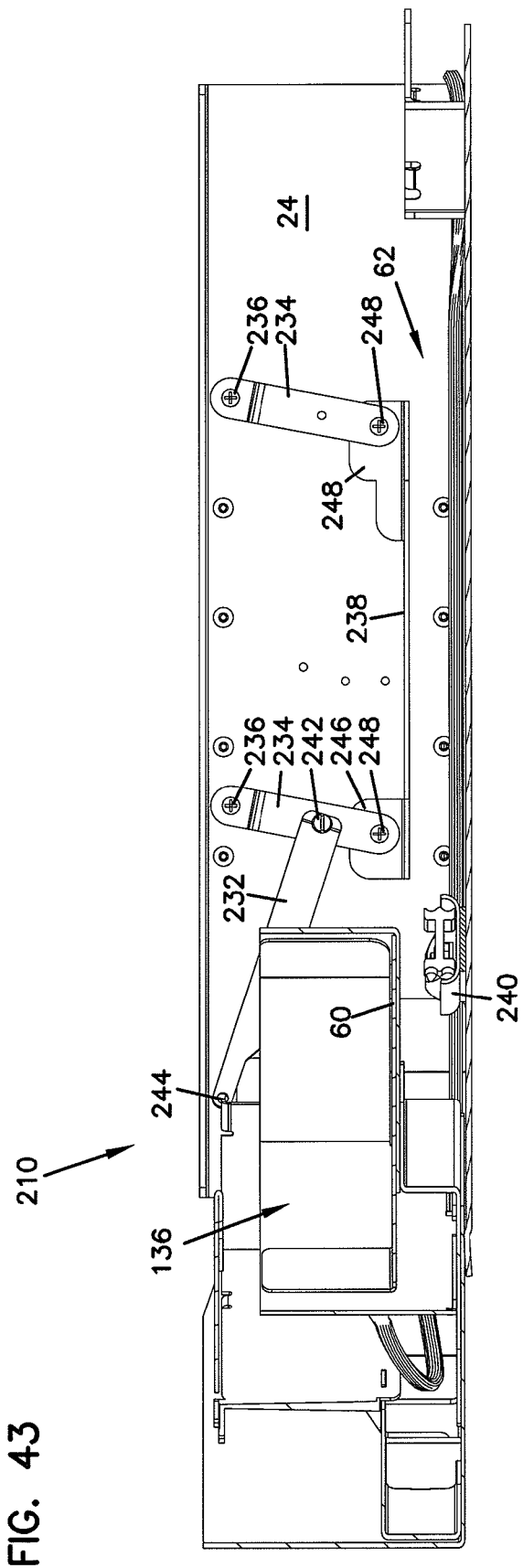
FIG. 43 is a side cross-sectional view of the termination panel of FIG. 41 taken along the middle of the cable path through the panel.

Referring now to FIGS. 41 to 43, tray 136 has been moved approximately halfway between the open and closed positions. As shown in FIGS. 42 and 43, plate 238 has begun to be vertically displaced away from bottom 30 above cable path 62 as actuator 232 is further displaced from side 24 and pulled forward by the movement of tray 136. Actuator 232 in turn pulls on forwardmost link 234 at attachment point 244 and pulls plate 238 and rearmost link 234 forward. This causes links 234 to pivot about fasteners 236 which in turn raises plate 238.

Figure 44:
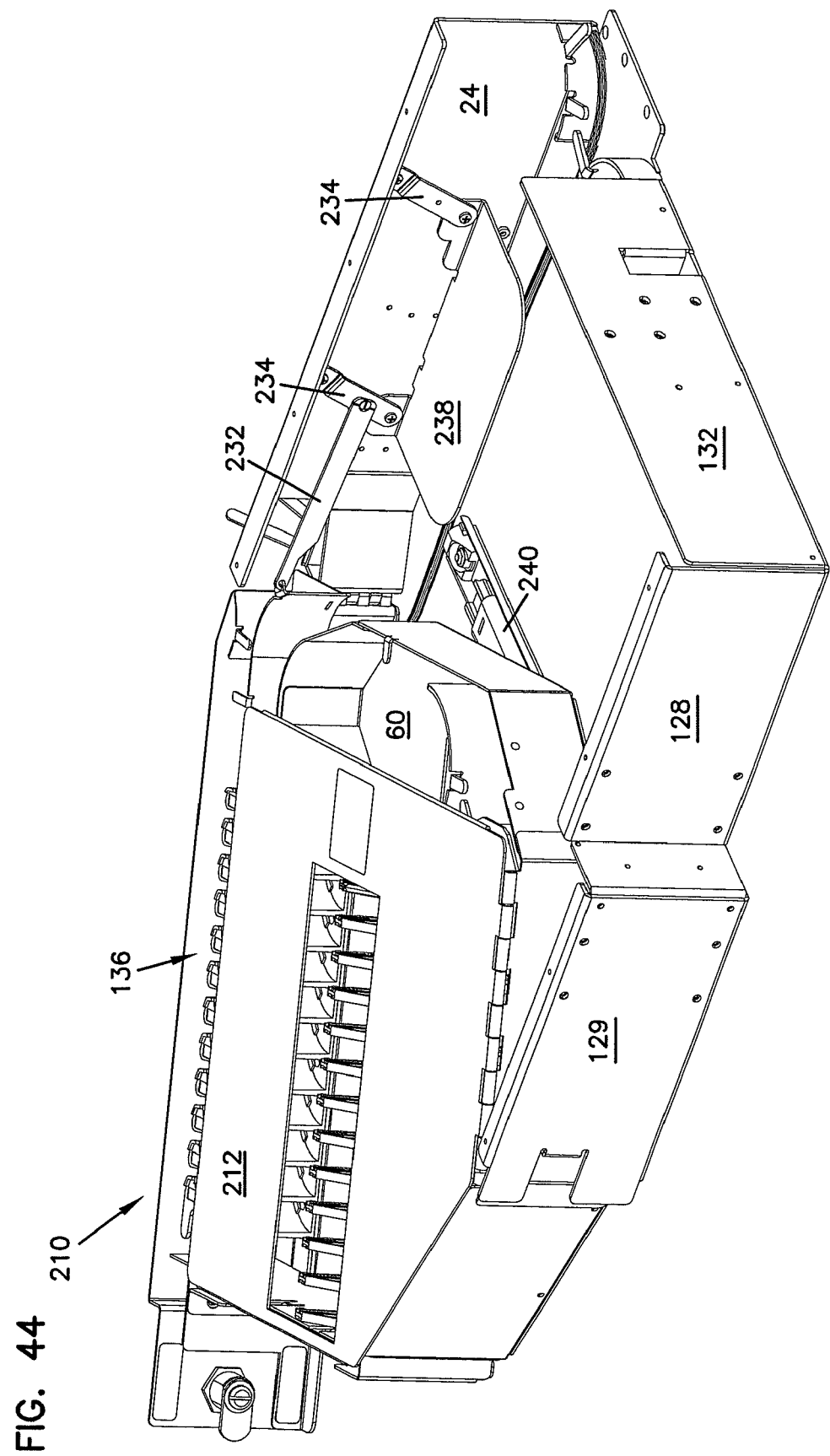
FIG. 44 is a rear perspective view of the termination panel of FIG. 23, with the tray moved approximately 60 degrees from the closed position toward the open position.
Figure 45:
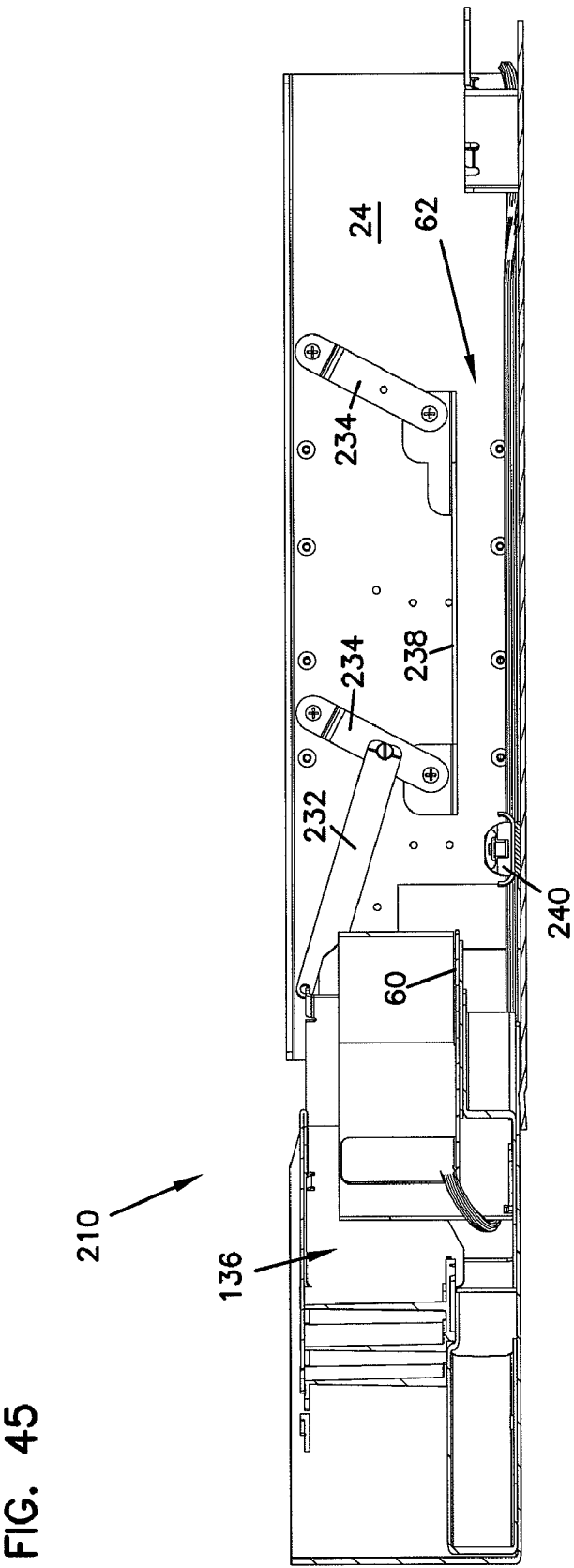
FIG. 45 is a rear view of the termination panel of FIG. 44.
Figure 46:
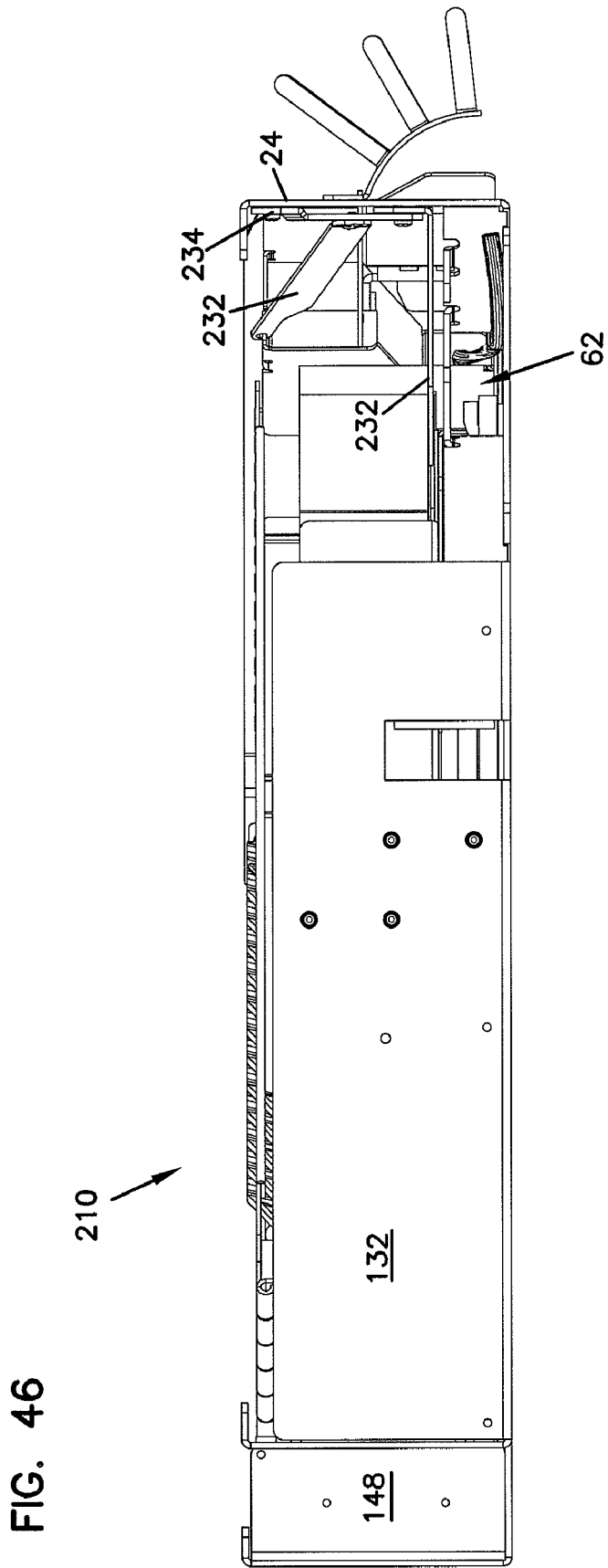
FIG. 46 is a side cross-sectional view of the termination panel of FIG. 44 taken along the middle of the cable path through the panel.

Referring now to FIGS. 44 to 46, tray 136 has now been moved to approximately 60 degrees from the closed position to the open position. Actuator 232 has further displaced links 234 forward. Links 234 have pivoted about fasteners 236 and drawn plate 238 further above cable path 62. Note that for the first time in the sequence illustrated by the FIGS. above, plate 238 has been displaced above the level of raised floor 60. As plate 238 moves higher, cables within cable path 62 are no longer held down to the level defined by raised floor portion 60 of tray 136. As plate 238 extends beneath raised floor 62 of tray 136, the timing of plate 238 being displaced away from bottom 30 by actuator 232 and links 234 is preferably set so that plate 238 does not interfere with or impact tray 136. While such interference may not be significant issue when moving tray 136 as shown from the closed position to the open position, such interference may prevent tray 136 from being moved from the open position to the closed position.

Figure 47:
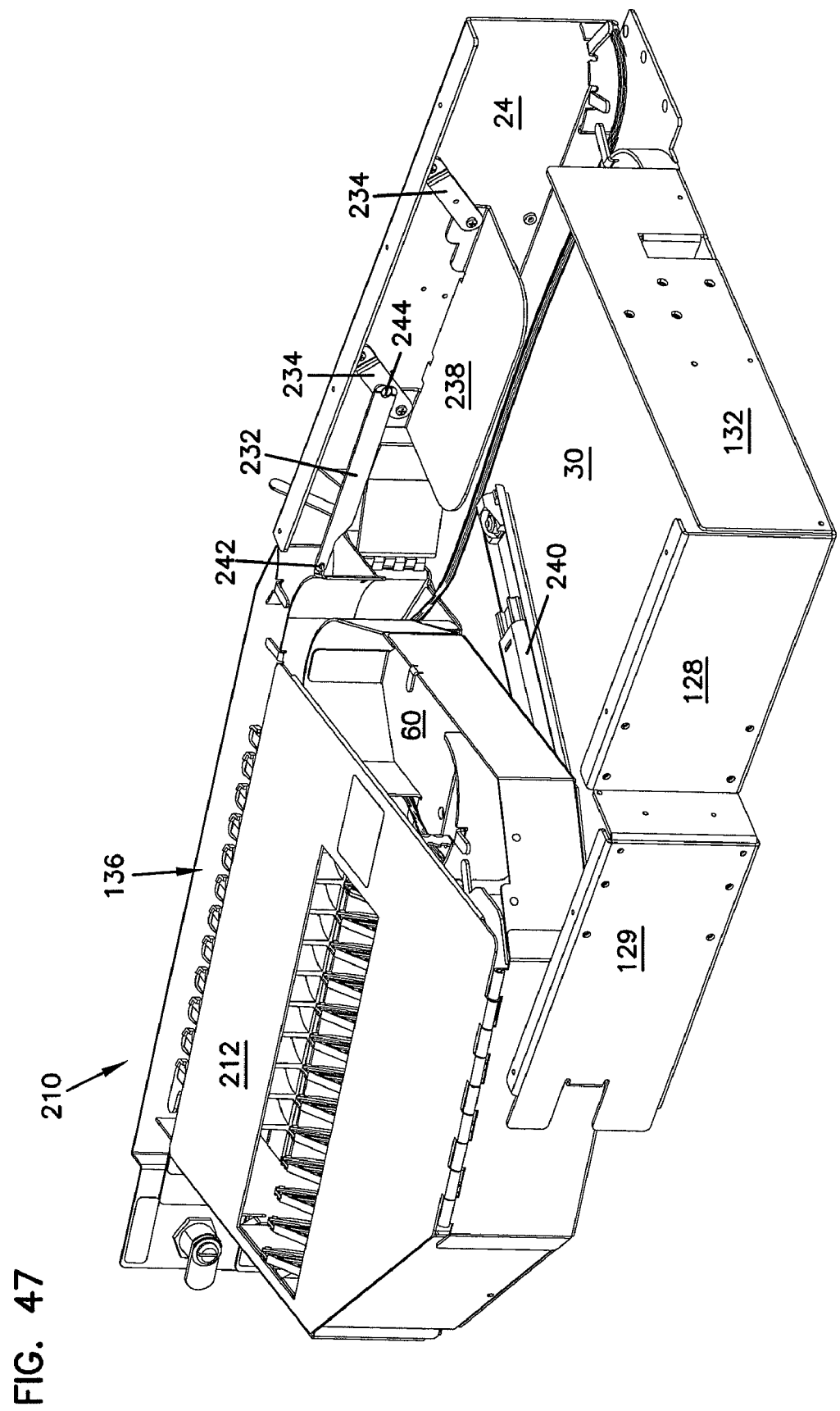
FIG. 47 is a rear perspective view of the termination panel of FIG. 23, with the tray moved approximately 75 degrees from the closed position toward the open position.
Figure 48:
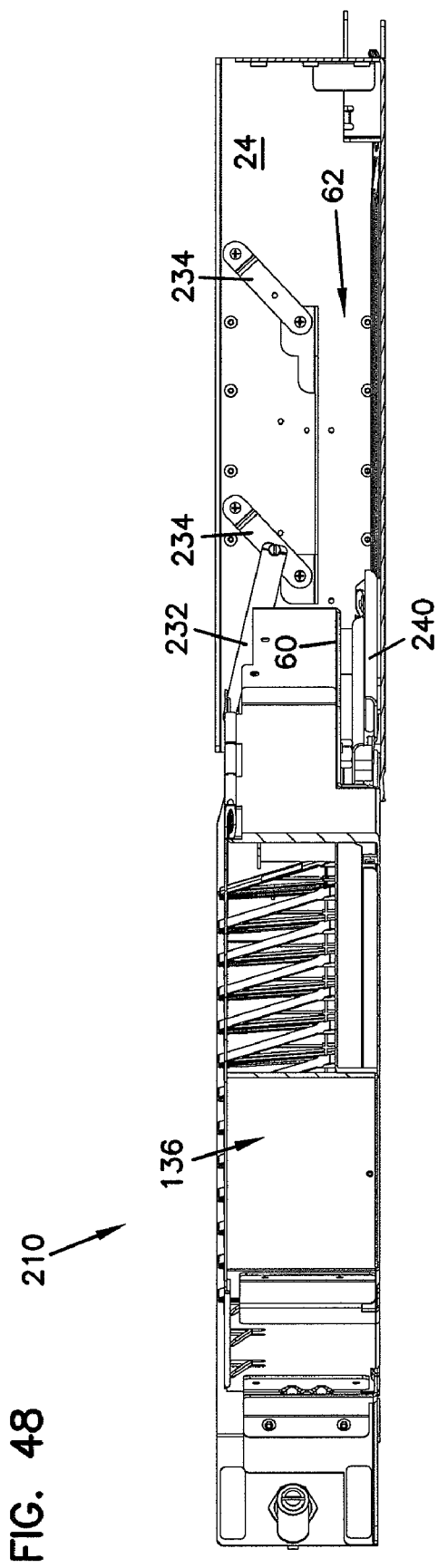
FIG. 48 is a rear view of the termination panel of FIG. 47.
Figure 49:
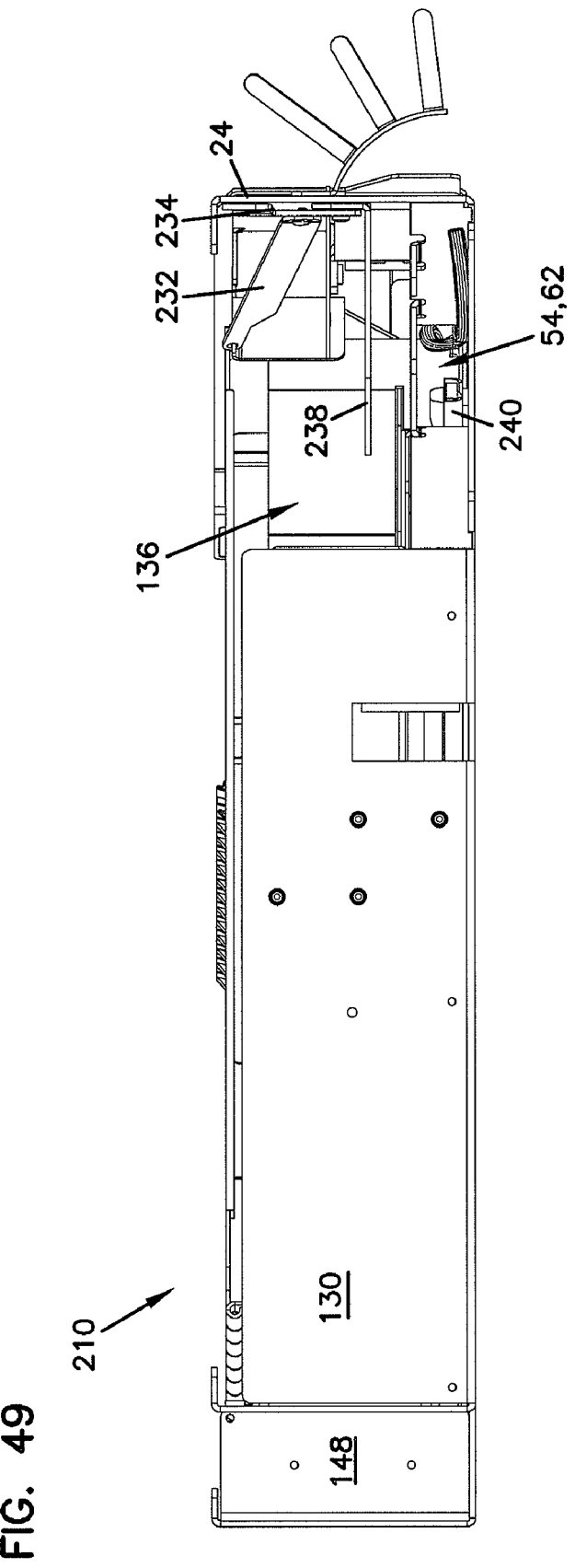
FIG. 49 is a side cross-sectional view of the termination panel of FIG. 47 taken along the middle of the cable path through the panel.

Referring now to FIGS. 47 to 49, tray 136 has now been moved to approximately 15 degrees from the open position. As raised floor portion 60 no longer overlays any portion of plate 238, further displacement of plate 238 from bottom 30 is desirable to open up access to cable path 62.

Figure 50:
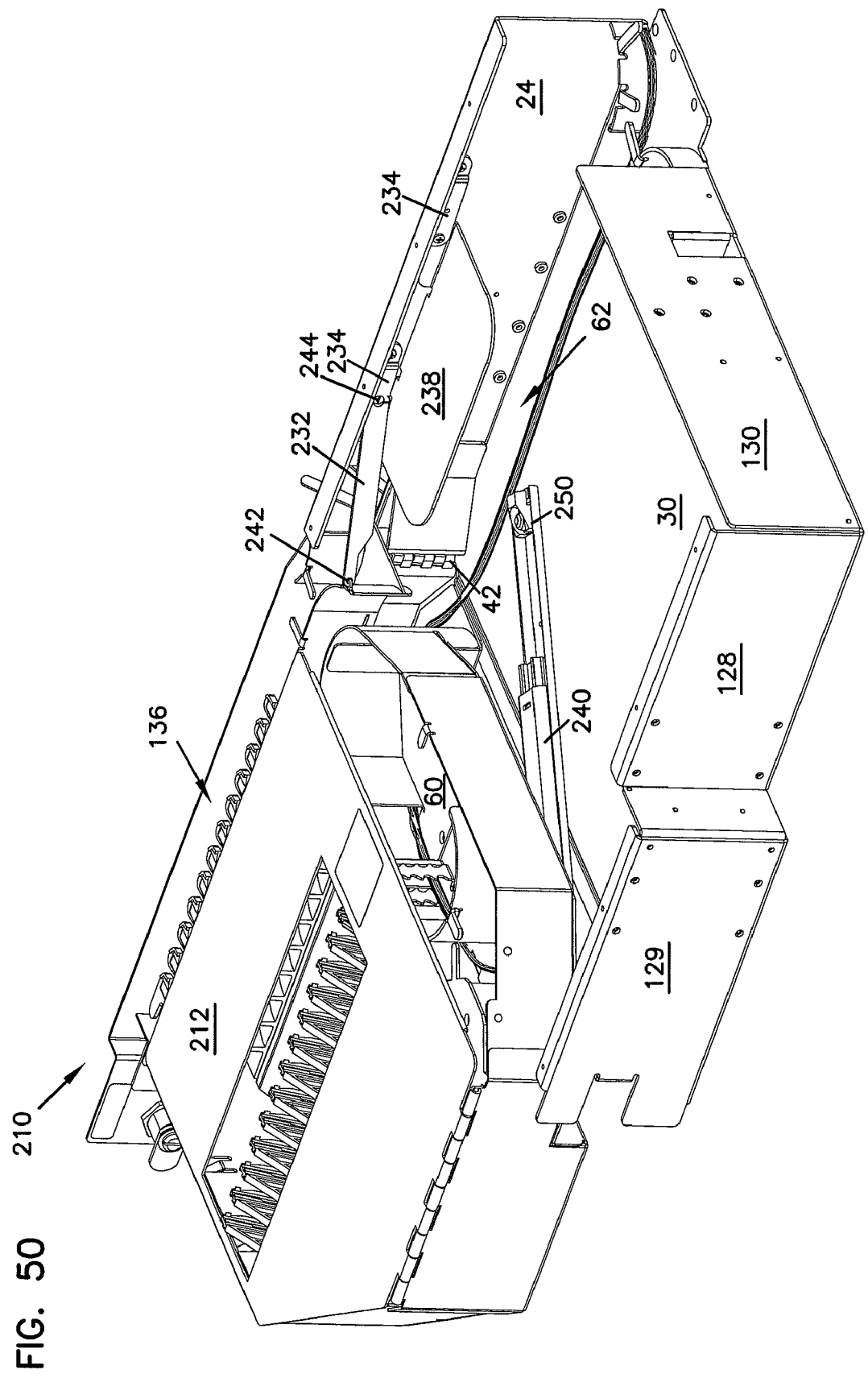
FIG. 50 is a rear perspective view of the termination panel of FIG. 23, with the tray in the open position.
Figure 51:
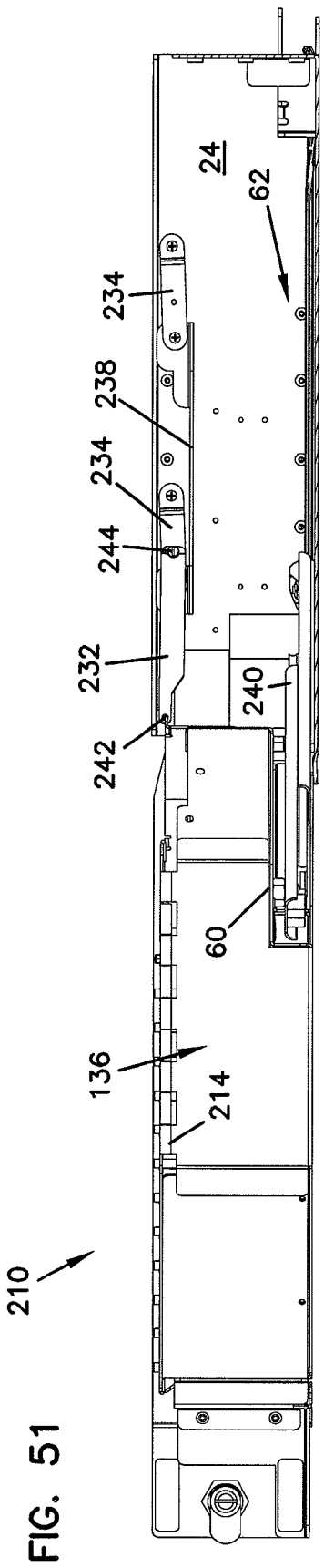
FIG. 51 is a rear view of the termination panel of FIG. 50.
Figure 52:
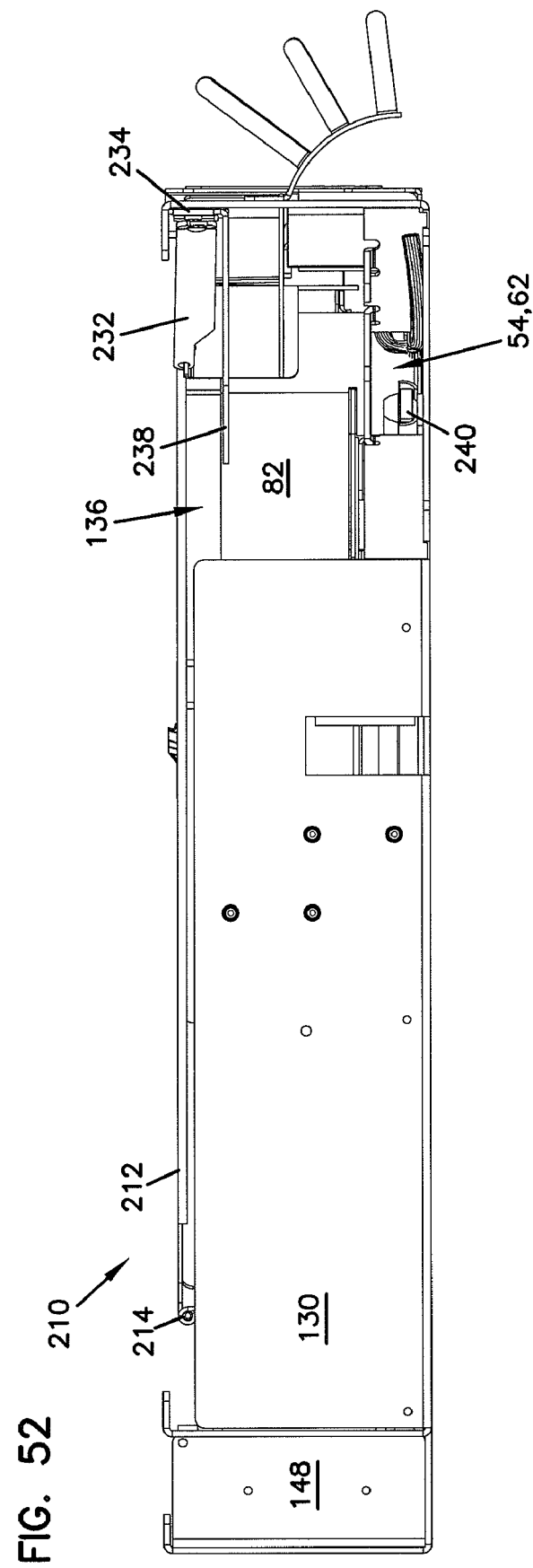
FIG. 52 is a side cross-sectional view of the termination panel of FIG. 50 taken along the middle of the cable path through the panel.

Referring now to FIGS. 50 to 52, tray 136 is now in the open position, rotated approximately 90 degrees from the closed position about hinge 42. Support 240 has rotated from a position approximately parallel to cable path 62 through more than 90 degrees about a pivot point 250 in bottom 30 and now extends underneath raised floor 60 out of front opening 32. Plate 238 is now at a point of maximum displacement from bottom 30 to provide unobstructed access to cable path 62. In the open position, cable path 62 is at it most accessible state to aid the routing of cables through rear opening 54 into tray 136. In the closed position, as illustrated in FIGS. 32 to 34, above, plate 238 defines the upper limit of cable path 62 beneath raised floor 60 of tray 136. As plate 238 moves from the open position to the closed position, plate 238 presses down any cables within cable path 62 to ensure that tray 136 does not pinch any cables or trap any cables against side 24. Such pinching or trapping may result in temporary or permanent obstruction of the optical path within the cable and degrade to cable's ability to transmit optical signals.

Alternative configurations of links 234 are anticipated and may include an attachment point 244 for actuator 232 positioned above fastener 236 pivotably connecting link 234 to side 24. Relative placement of the pivotable attachment of links 234 to side 24 and plate 238 with regard to the position of attachment point 244 may be varied to alter the extent of vertical and horizontal displacement of plate 238 and the timing of the displacement relative to the movement of tray 136.

Referring now to FIGS. 53-64, a fourth alternative embodiment of a telecommunications termination panel 310 is illustrated. The termination panel 310 is similar in construction and functionality to the termination panels 10, 110, and 210 illustrated in FIGS. 1-52, except for a number of differences, which will be highlighted hereinafter.

The termination panel 310 includes a housing 312 made up of a first sidewall 314, a second sidewall 316, a rear wall 318, and a bottom 320. A top 322 (shown in FIGS. 53-55 and removed from the other drawings for clarity) cooperates with the first sidewall 314, the second sidewall 316, the rear wall 318, and the bottom 320 to define a front opening 324 and a rear opening 326 of the housing 312. As in the previous embodiments, the sidewalls include flanges 328 for mounting the top 322 to the panel 310.

The rear wall 318 substantially closes of the rear of the panel 310 except for the rear opening 326. It should be noted that the rear wall closing off the rear of the housing 312 except for the rear opening 326 may be defined by an upward extension of the bottom 320 or a downward extension of the top 322, or both.

As in the embodiment of the panel 210 of FIGS. 23-52, the top 322 of the panel 310 includes an extension 330 which overlays an extended portion 332 of the first sidewall 316. However, unlike the panel 210 of FIGS. 23-52, the flange 334 formed by the extended portion 332 of the first sidewall 316 is not used for mounting the panel 310 to a telecommunications rack, such as the rack 12 shown in FIG. 1. Instead of utilizing mounting brackets toward the middle of the sidewalls 314, 316, the sidewalls 314, 316 include mounting brackets 336 mounted adjacent the front opening 324 of the panel 310. In this manner, when the panel 310 is mounted to a telecommunications rack 12, the front of the panel 310 is substantially flush with the front of the rack 12 instead of protruding from the rack 12, as shown in FIG. 1. The panel 310 may be mounted to a standard nineteen inch wide rack. In other embodiments, the panel 310 may be adapted to be mounted on a twenty-three inch wide rack or to racks of other widths.

Figure 53:
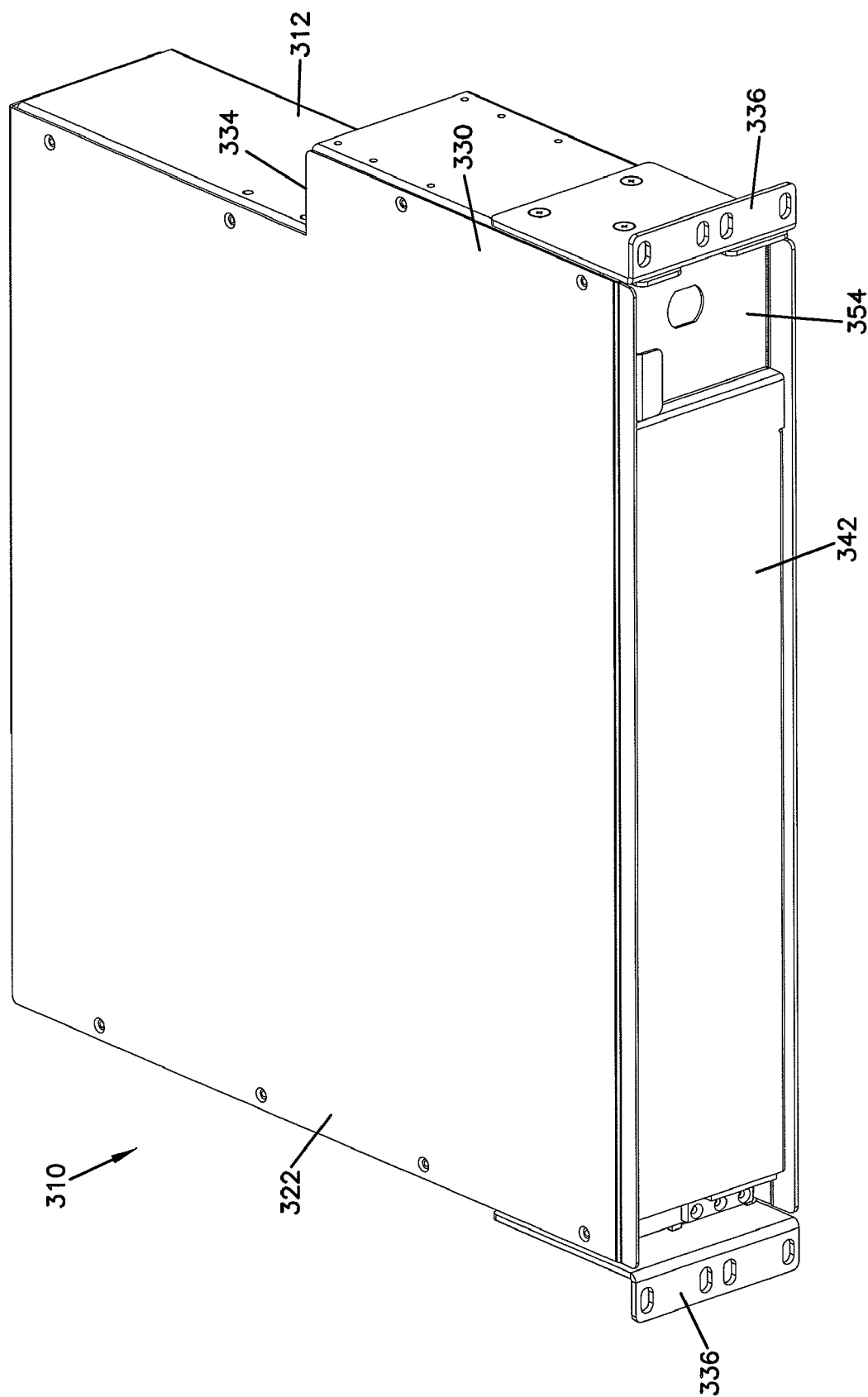
FIG. 53 is a front perspective view of a fourth embodiment of a termination panel according to the present disclosure, with the tray in the closed position.
Figure 54:
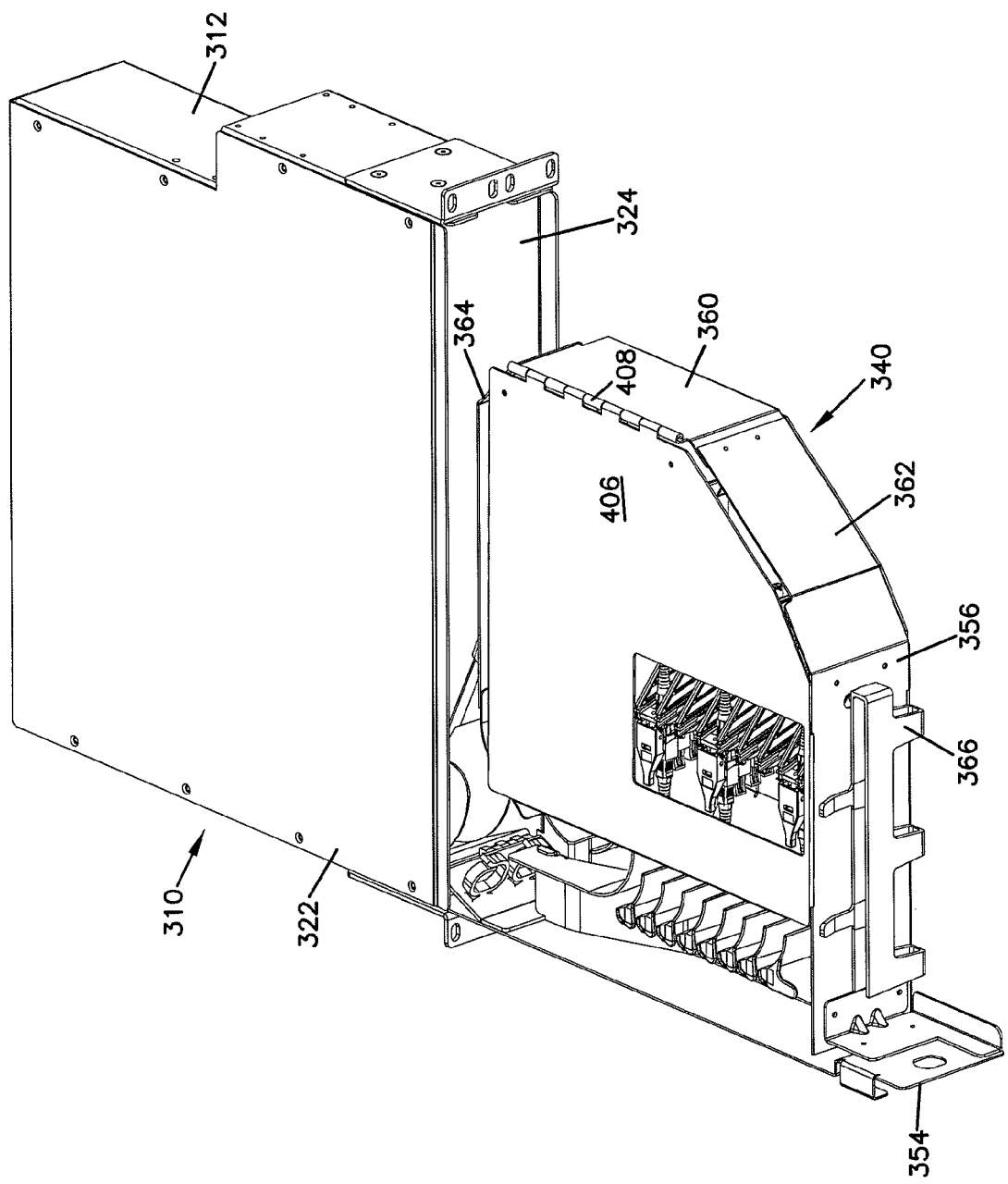
FIG. 54 is a front perspective view of the termination panel of FIG. 53, with the tray in the open position.

The panel 310 includes a pivoting tray 340 movable between an open position and a closed position, as in the panels 10, 110, and 210 illustrated in FIGS. 1-52. The tray 340 includes a front wall 342 that substantially closes off the front opening 324 of the panel 310 when the tray 340 is in the closed position (FIGS. 53 and 61). Tray 340 pivots about an axis defined by a hinge 344 adjacent the second sidewall 316. Similar to the panels 10, 110, and 210 of FIGS. 1-52, the hinge 344 is supported between an inward extension 346 of the second sidewall 316 adjacent the front of the panel 310 and a rearward extension 348 of the front wall 342 of the tray 340, as shown in FIG. 56. However, unlike the hinge 42 included in the panels of FIGS. 1-52, the hinge 344 may extend all the way up from the bottom 320 of the panel 310 to the top 322 of the panel 310. As will be described further below, in the panel 310 of FIGS. 53-64, all of the cables enter and exit the panel through the rear of the panel 310. Thus, since the panel 310 does not define a side cable opening adjacent the hinge 344 for exiting cables and since the second sidewall 316 of the housing 312 does not have to accommodate the portion of the tray defining the cable path leading to a side opening, the flanges 346, 348 supporting the hinge 344 may extend all the way from the bottom 320 to the top 322 of the panel 310.

Figure 63:
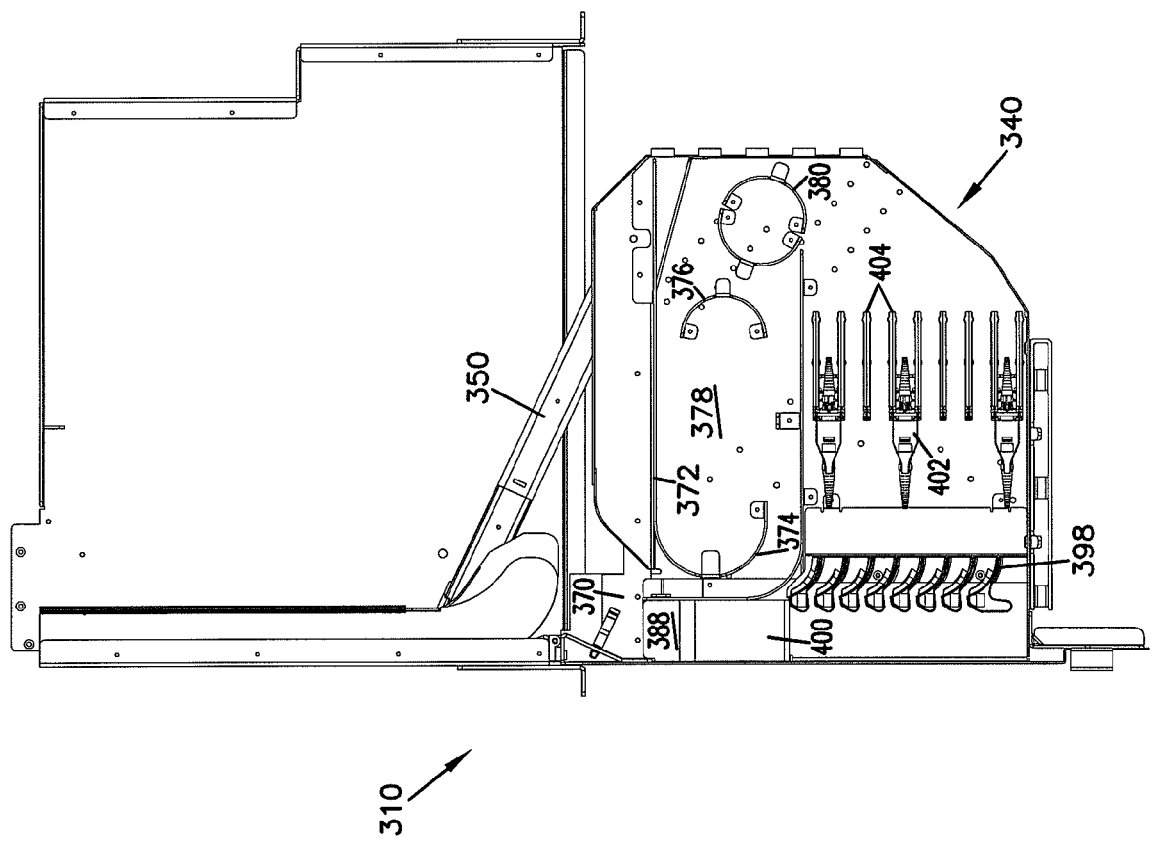
FIG. 63 is a top plan view of the termination panel of FIG. 61, with the tray in the open position.
Figure 64:
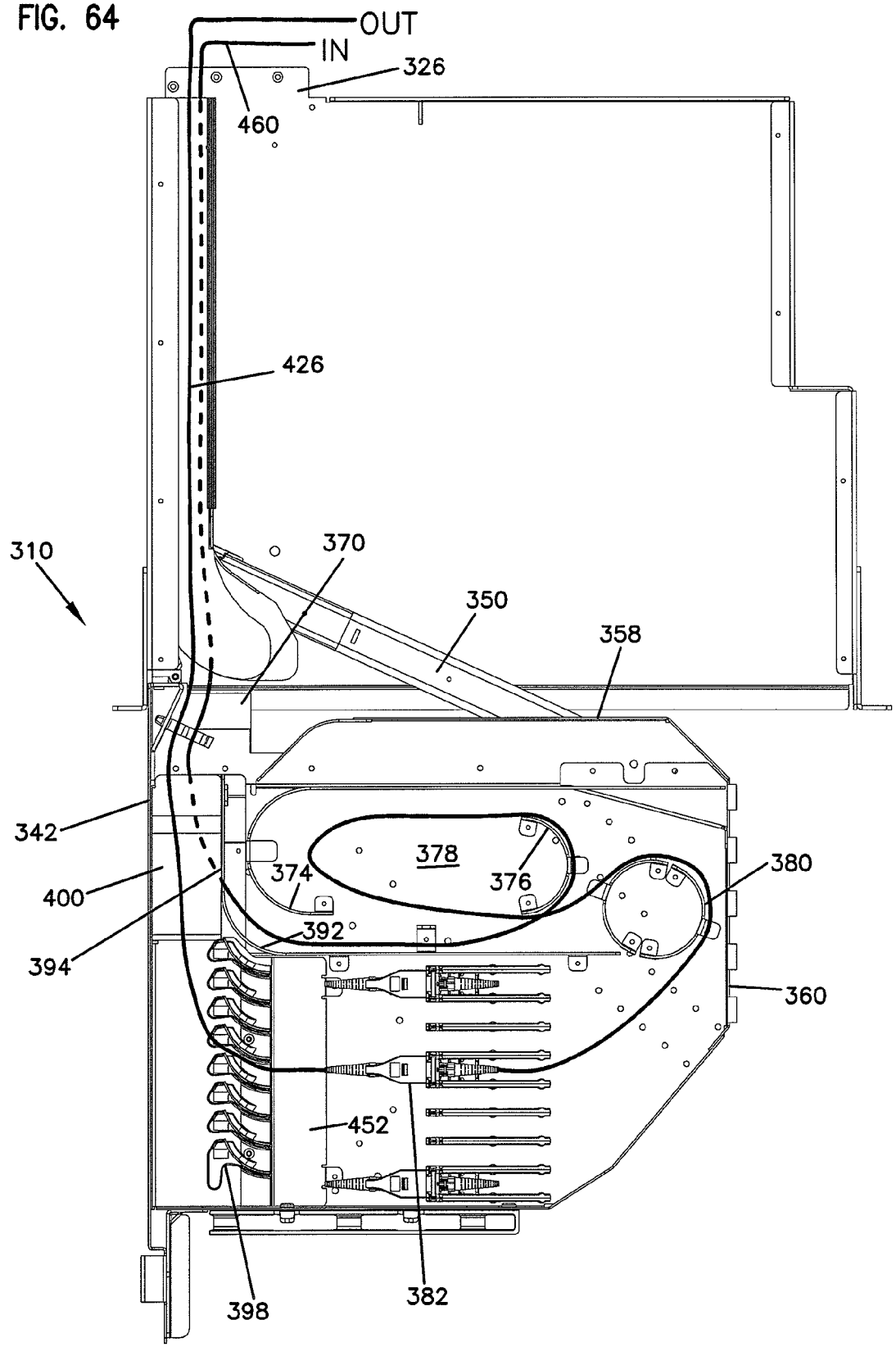
FIG. 64 illustrates the termination panel of FIG. 63 with an example cable routing configuration.

Referring to FIGS. 56, 63, and 64, as in the previous embodiments, the panel 310 includes an extendable rotatable support 350 that is pivotally attached to bottom 320 of the housing 312 and to the tray 340 underneath a raised floor 352 of the tray 340. As the tray 340 is moved from the closed position to the open position, support 350 rotates and extends out of front opening 324 of the housing 312 to provide additional support to the tray 340. Without support, only the hinge 344 is supporting the tray 340 and the tray 340 may sag or otherwise bind hinge due to the weight of the tray 340 and the components installed in the tray 340. Support 350 provides additional support to the tray 340 in the open position and aids in the movement of the tray 340.

The tray 340 may include a latch similar to those shown for panels 10, 110, and 210 of FIGS. 1-52 for releasably holding the tray 340 in a closed position within the front opening 324. As discussed above, the latch could include a lock requiring a key to release, providing additional security to the interior of the panel 310. As in the embodiment of the panel 210 shown in FIGS. 23-52, the front wall 342 of the tray 340 includes a recessed portion 354 adjacent the latch.

Figure 55:
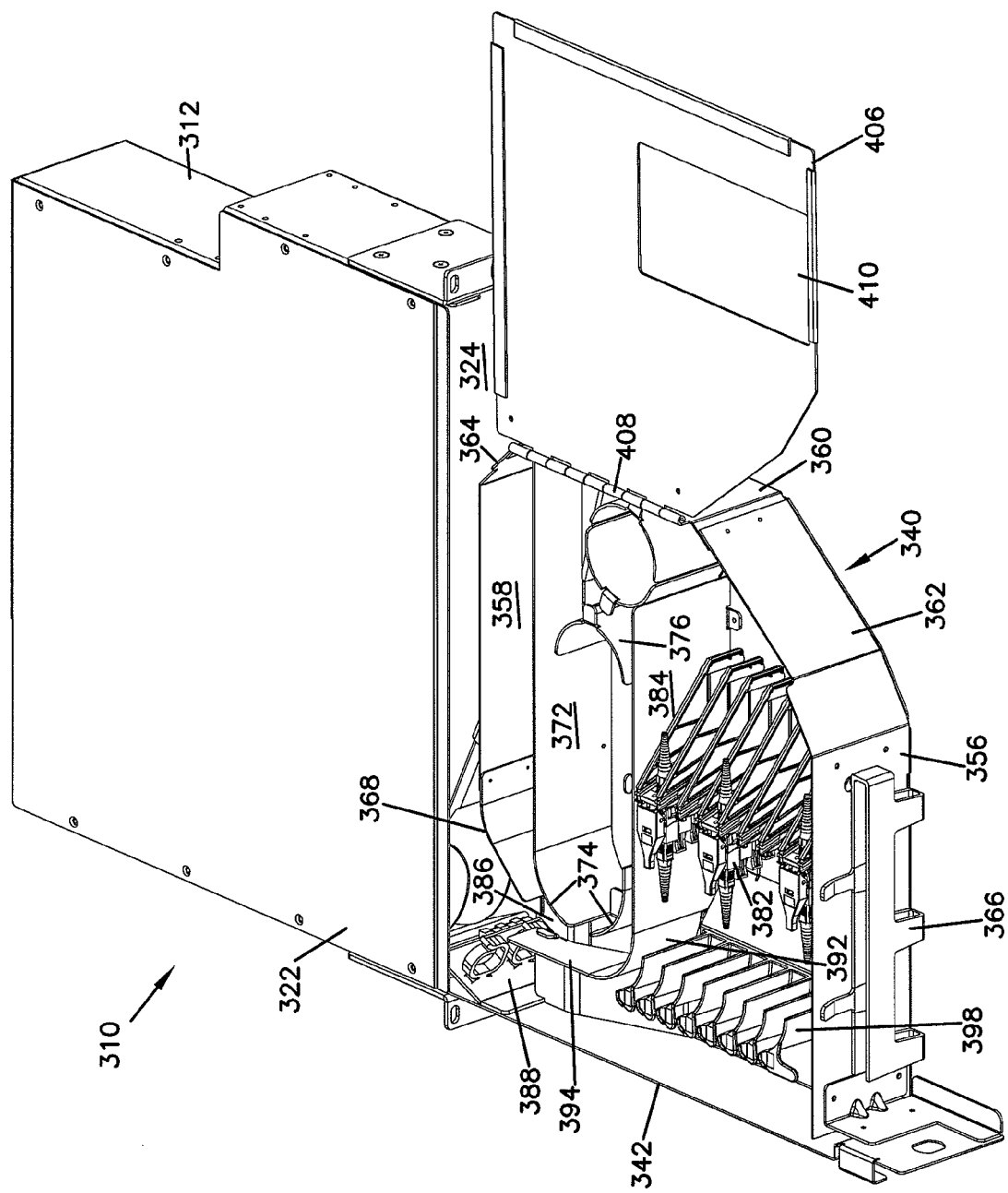
FIG. 55 is a front perspective view of the termination panel of FIG. 54, with the cover in an access position.
Figure 56:
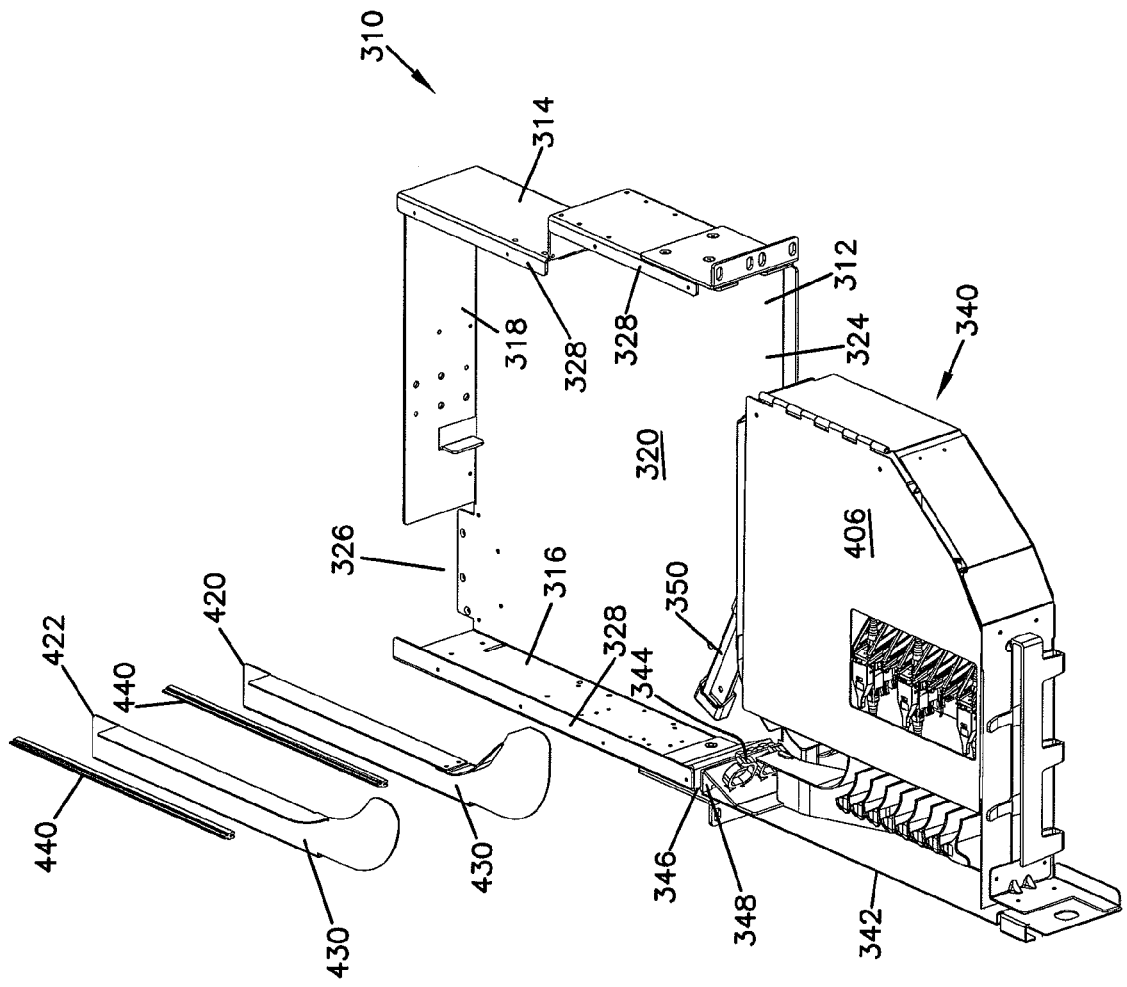
FIG. 56 is a partially exploded view of the termination panel of FIG. 54, the top removed for clarity.
Figure 57:
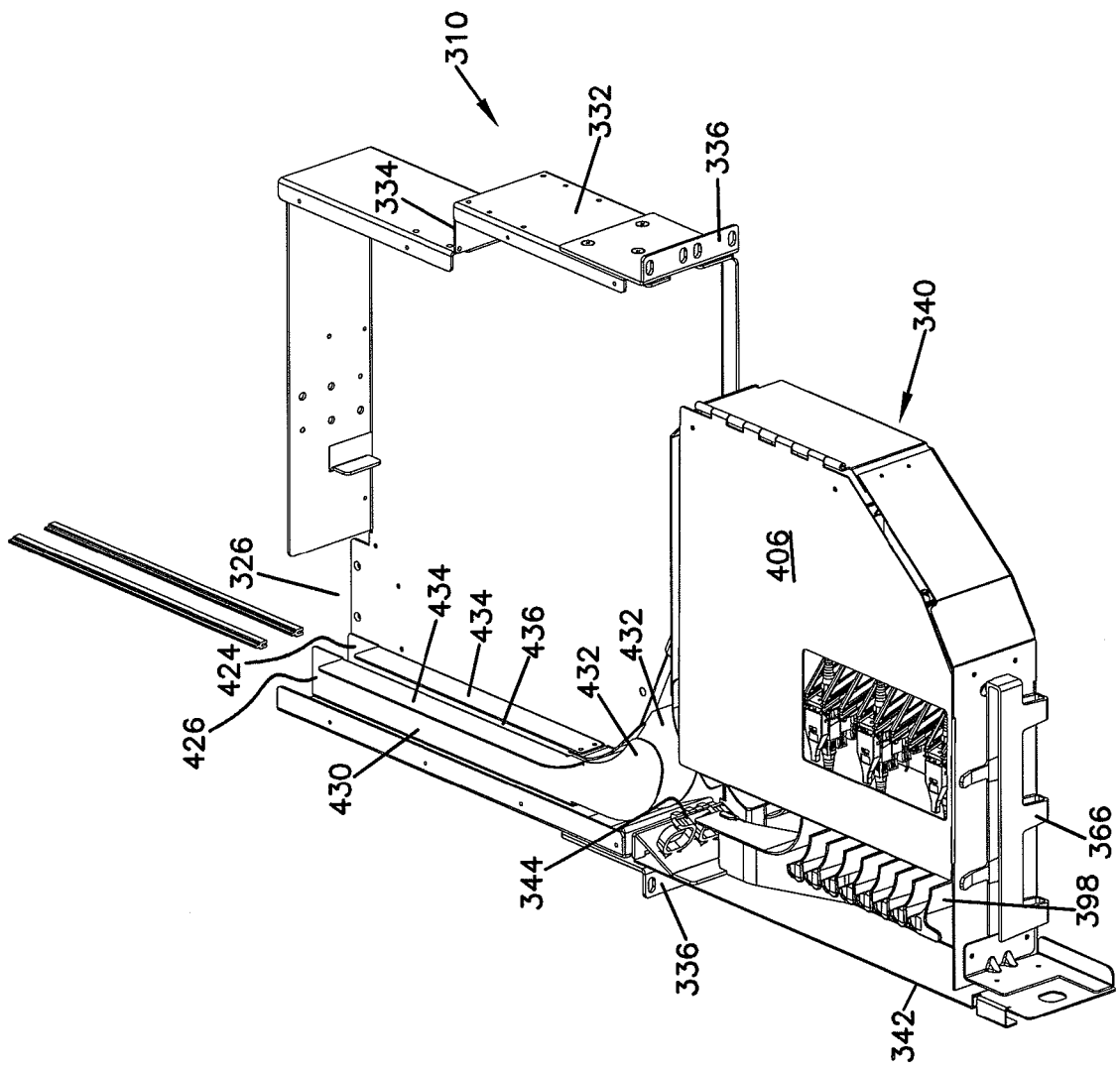
FIG. 57 is a partially assembled view of the termination panel of FIG. 56.
Figure 58:
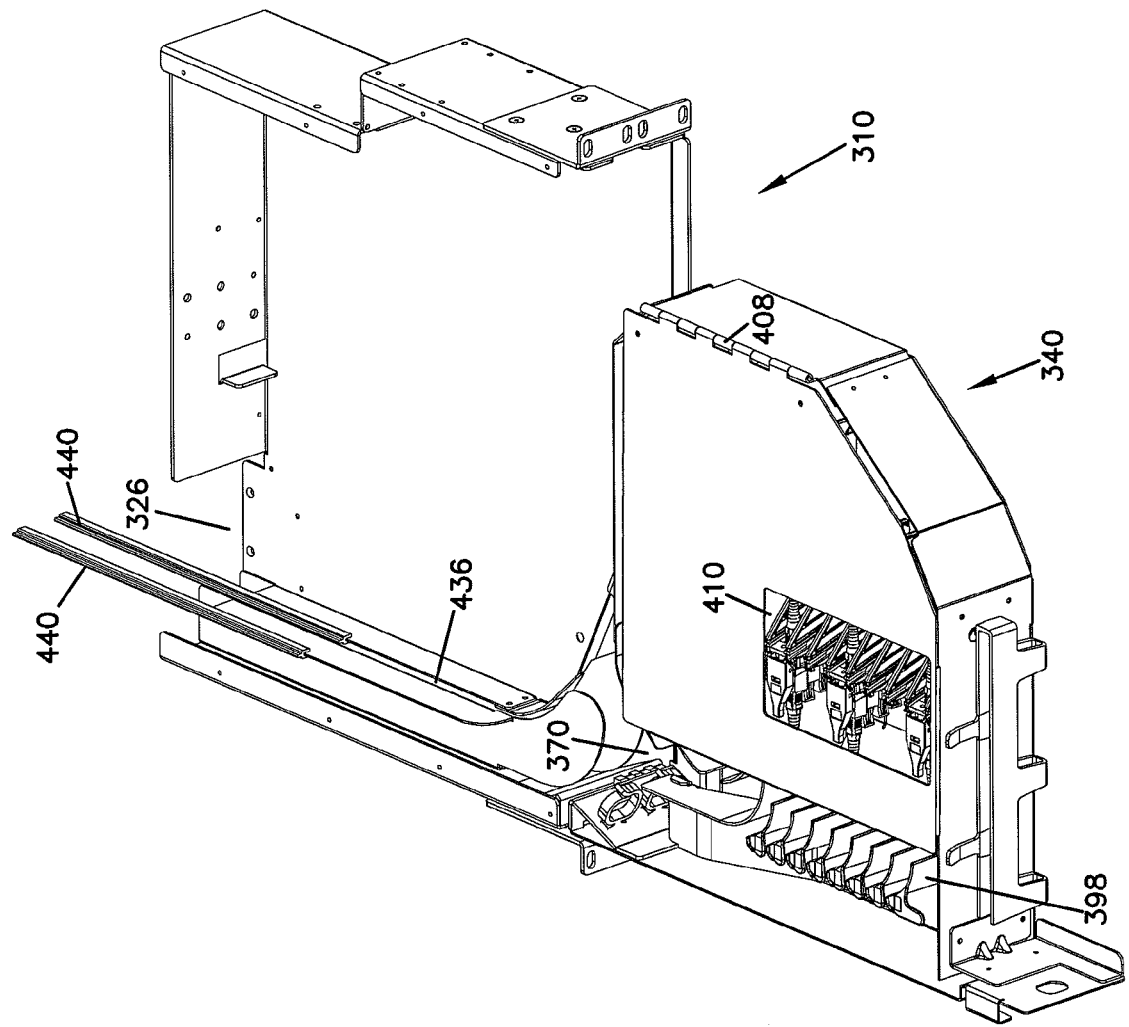
FIG. 58 is a partially assembled view of the termination panel of FIG. 57.
Figure 59:
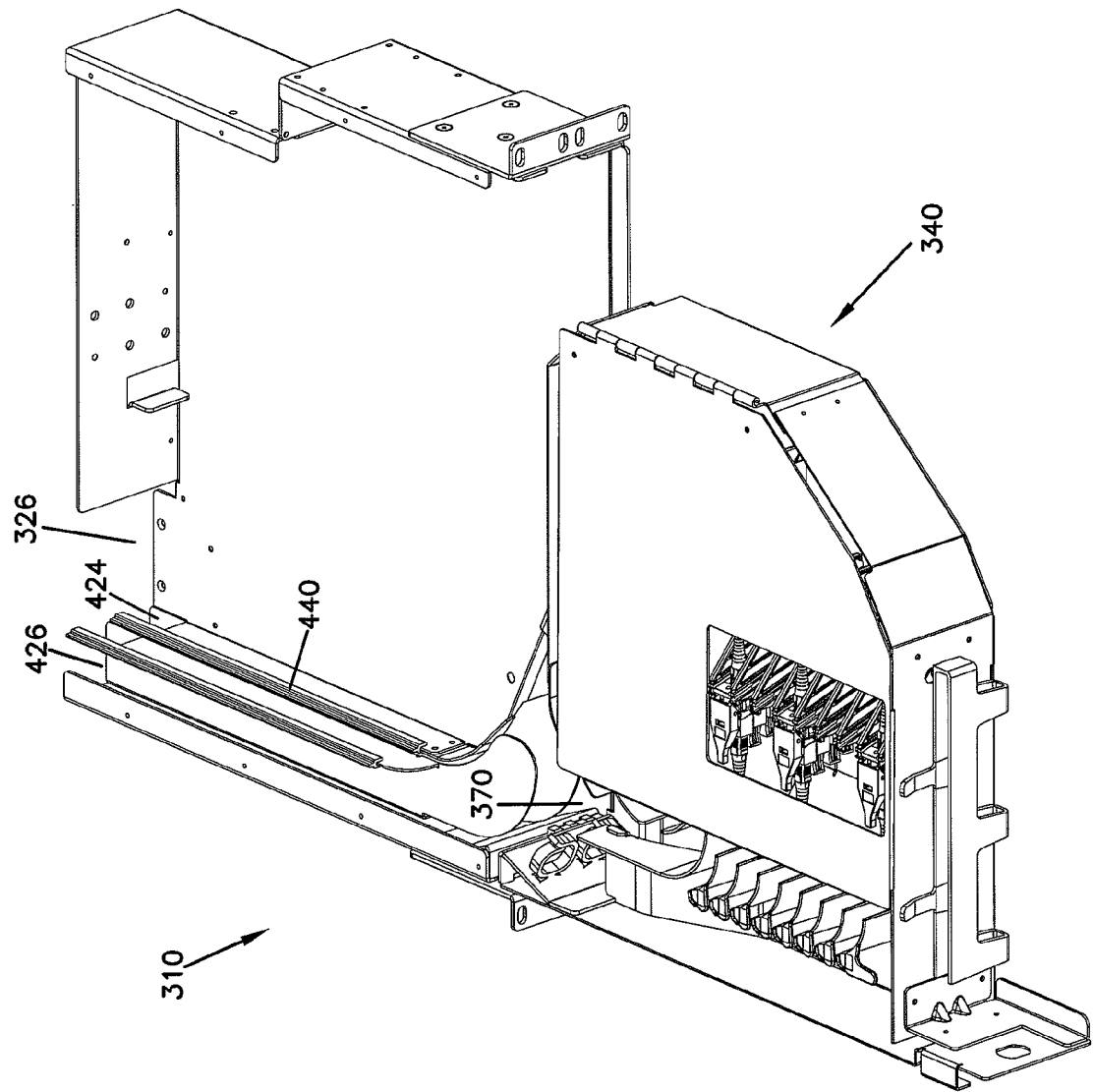
FIG. 59 is a fully assembled view of the termination panel of FIG. 58.

Referring to FIG. 55, the tray 340 is shown in an open configuration allowing entry into the panel 310 through the front opening 324. In addition to the front wall 342 and the raised floor 352 of the tray 340, the tray 340 also includes a first sidewall 356, a second sidewall 358, and a rear wall 360. As in the previous embodiments, at the rear wall 360 of the tray 340, both of the corners 362, 364 have been relieved or angled. The first angled corner 362 allows the tray to pivot about hinge 344 without being interfered by the first sidewall 314 of the housing 312. The second angled corner 364 allows greater access into the panel 310 through the front opening 324 when the tray 340 is in the open position.

As in the panel 210 of FIGS. 23-52, the first sidewall 356 of the tray 340 includes a cardholder 366 mounted thereon for holding information cards. Information cards may be instruction cards, warning labels, routing information cards or designation strips related to the configuration and use of panel 310. Card holder 366 is positioned so that cards are housed within panel 310 when tray 340 is in the closed position but are easily accessible to a user when tray 340 is in the open position.

As shown in FIG. 55, the second sidewall 358 of the tray 340 includes a curved portion 368 adjacent the front of the tray 340. The curved portion 368 is configured to guide cables into the tray 340 without violating bend radius rules.

The tray 340 defines an opening 370 between the front wall 342 of the tray 340 and the curved portion 368 of the second sidewall 358. As will be discussed in further detail below, cables enter and exit the tray 340 through the opening 370. Positioning the opening 370 as close as possible to the hinge 344 minimizes the amount of cable slack required in the cables to permit the tray 340 to swing between open and closed positions. The farther from hinge 344 the opening 370 is located, the more slack in cables is required to permit tray 340 to move unhindered. Cables, whether incoming or outgoing, extend between the opening 370 of the tray and the rear opening 326 of the housing 312, as will be discussed in further detail below.

Still referring to FIG. 55, the tray 340, similar to the earlier embodiments, includes a plurality of bulkheads located within the tray 340 extending upwardly from the floor 352 of the tray. Bulkhead 372 extends from the rear wall 360 toward the front of the tray 340. Bulkhead 372 defines a semi-circular radius 374 adjacent the front side of the tray 340. Another semi-circular bulkhead 376 is located closer to the rear of the tray 340. The semicircular bulkhead 376 adjacent the rear of the tray 340 cooperates with the front portion 374 of the bulkhead 372 to form a spool for storing cable slack within the tray 340 (see FIG. 64). The bulkheads 372, 376 define a cable slack storage area 378 of the tray 340.

Adjacent the rear wall 360 of the tray 340 is another bulkhead 380 in the form of a circular drum or spool providing cable management within the tray 340 and guiding incoming cables toward the cable connection locations or adapters 382, as will be discussed in further detail below.

A central bulkhead 384 separates the cable entry 386 and cable slack storage area 378 from the cable connection area 382 and the cable exit 388. The central bulkhead 384 includes a portion 390 that extends from the cable spool 380 toward the front of the tray 340. Adjacent the front of the tray 340, the central bulkhead 384 defines a portion 392 that gradually curves toward the opening 370 of the tray 340. A straight portion 394 of the central bulkhead 384 extends parallel to the front wall 342 of the tray 340. The curved portion 392 includes a curve matching that of the bulkhead 374 in defining the cable entry path 386 into the cable slack storage area 378. The portion 394 of the central bulkhead 384 that runs parallel to the front wall 342 of the tray 340 separates the cable entry path 386 from a cable exit path 388.

Figure 60:
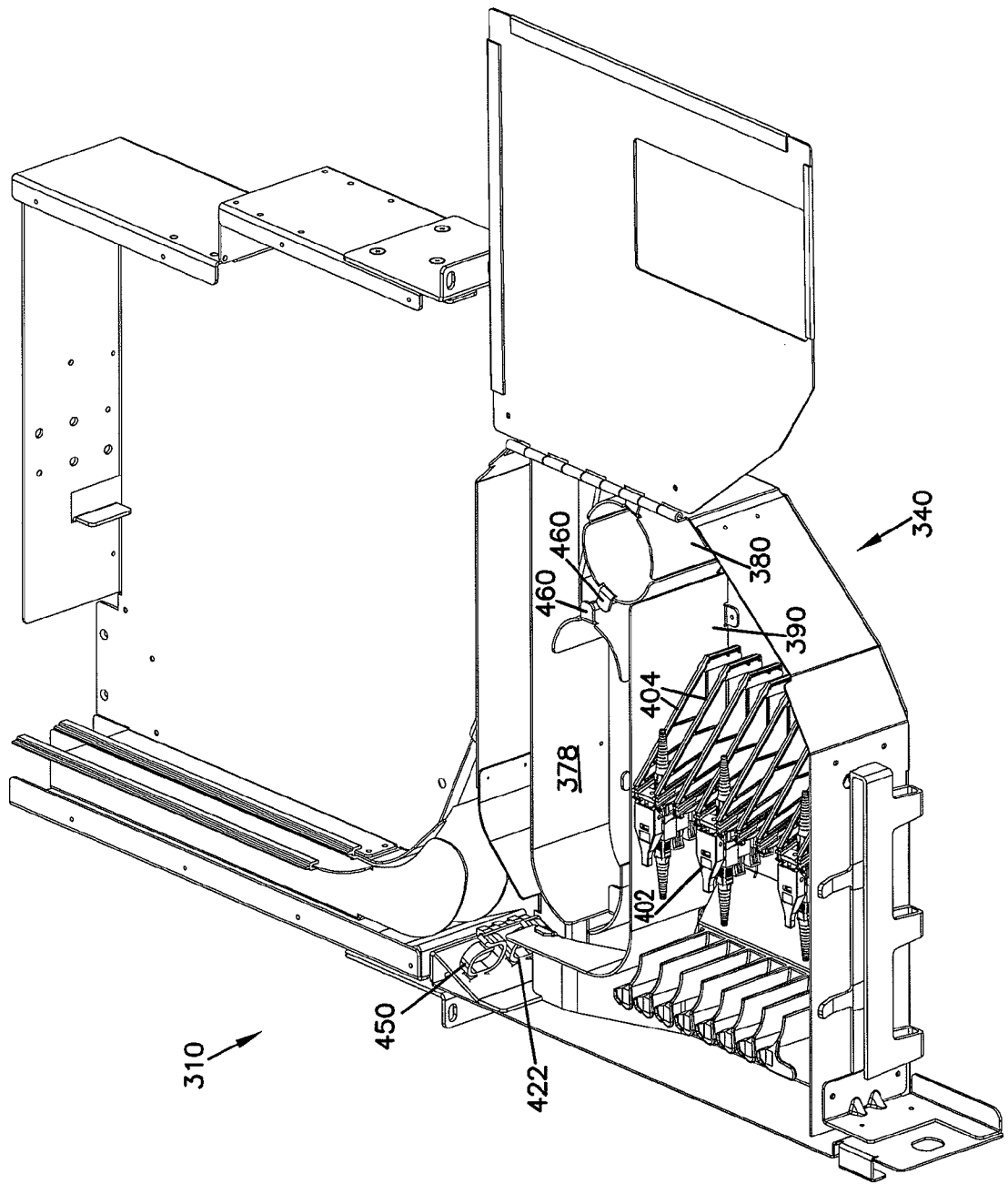
FIG. 60 is a front perspective view of the termination panel of FIG. 59, with the cover in the access position.
Figure 61:
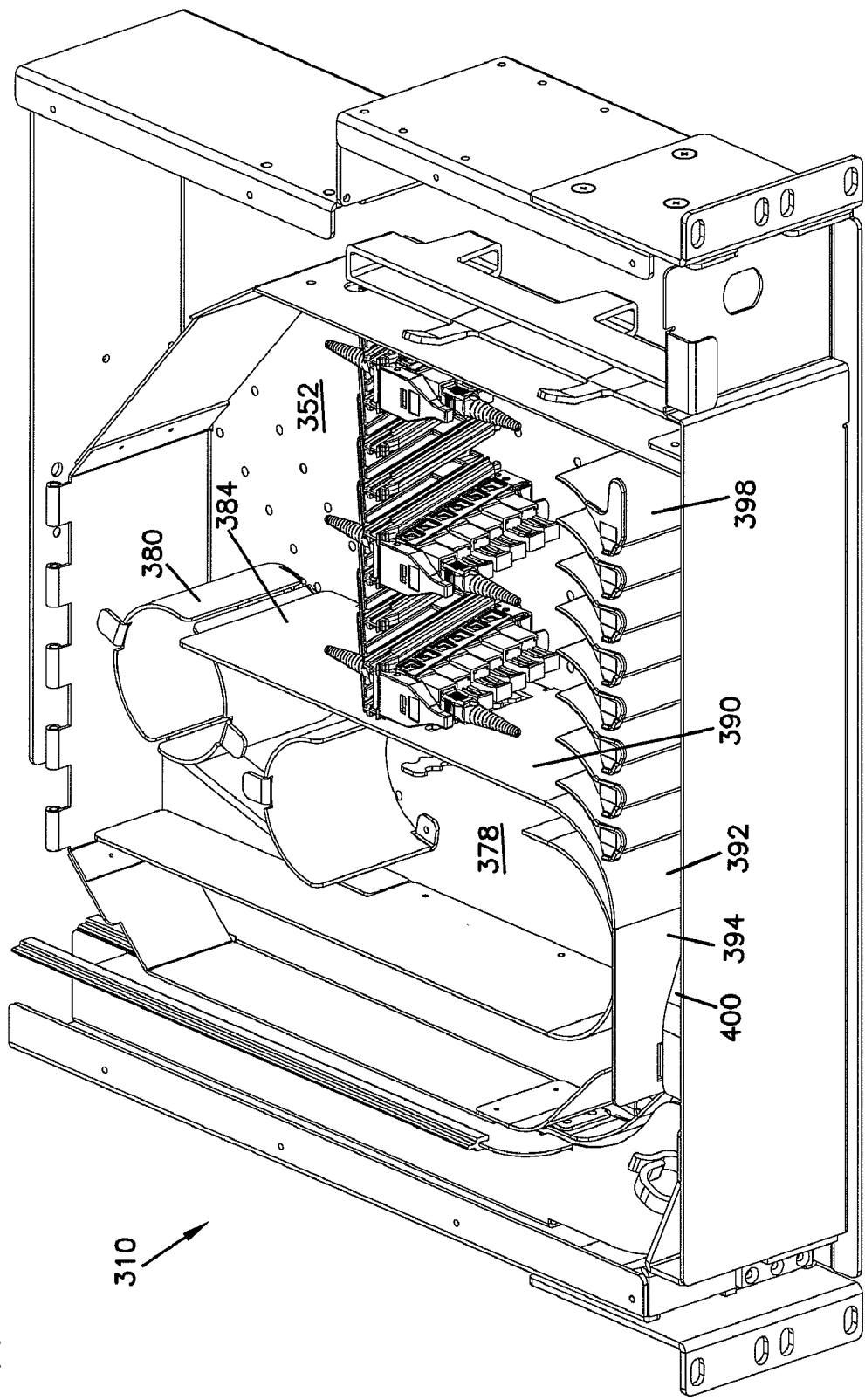
FIG. 61 is a front perspective view of the termination panel of FIG. 53, with the tray in the closed position and with the cover of the tray and the top of the termination panel removed for clarity.
Figure 62:
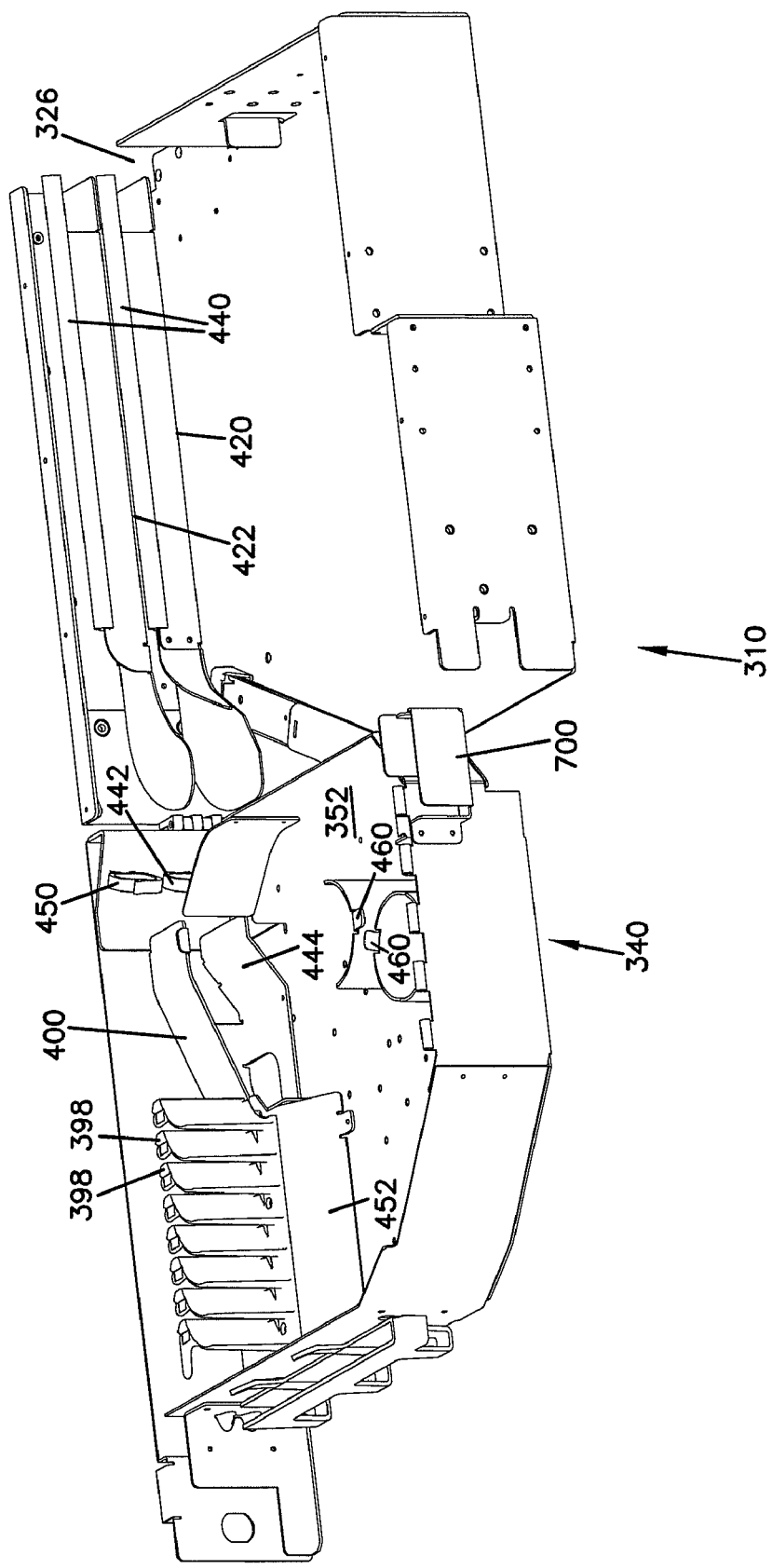
FIG. 62 is right, front perspective view of the termination panel of FIG. 61, with the tray in the open position, the tray shown with a number of features removed therefrom for clarity.

Referring now to FIGS. 55, 60, and 61, as in the previous embodiments, the tray 340 houses a plurality of connection locations or adapters 382 for aligning and optically linking incoming fiber optic cables with outgoing fiber optic cables. As will be described in further detail below, after the outgoing cables extend from the adapters 382, they pass through a plurality of vertically oriented fingers 398 which provide bend radius protection to the cables as cables are directed toward the opening 370 of the tray 340 through the cable exit path 388. As shown in FIG. 62, the cable exit path 388 includes a ramp 400 going from the cable management fingers 398 toward the opening 370 of the tray 340.

Referring back to FIG. 55, the adapters 382 are positioned between the first sidewall 356 of the tray 340 and the central bulkhead 384. As in the previous embodiments of the tray, the adapters 382 are mounted in a series of parallel, vertically oriented modules 402. Each module 402 is slidably mounted between a pair of walls 404 and may be extended generally upward above the tray 340. Thus positioned, access to adapters 382 mounted to module 402 and any optical fiber cables attached to adapters 382 is improved. In the depicted embodiment, six adapters 382 are mounted in each module 402 and eight modules 402 are mounted on the tray 340. Thus configured, panel 310 is capable of supporting up to forty-eight optical connections between incoming optical fiber cables and outgoing optical fiber cables. Walls 404 are configured to receive a sliding module 402 on each side, so that a total of nine walls 404 are required to support the eight modules 402.

As in the previous embodiments, the adapter modules 402 extend at an angle toward the front. The axis of insertion of fiber optic cables to the front and rear of each adapter 382 is substantially parallel to the floor 352 of the tray 340. Alternatively, walls 404 and modules 402 could be configured so that modules 402 slide vertically, with adapters 382 mounted horizontally to modules 402.

Now referring to FIGS. 54-60, as in the embodiment of the tray of FIGS. 23-52, tray 340 includes a cover 406 hingedly mounted to the rear wall 360 of the tray 340 by a hinge 408. The cover 406 is movable between an operational position (FIG. 54) and an access position (FIG. 55). When the cover 406 is in an operational position, the tray 340 is allowed to be moved between the open and closed positions with respect to the panel 310. Cover 406 includes an opening 410 through which the modules 402 are visible. Opening 410 permits any identification or other information printed or attached to modules 402 to be visible when cover 406 is in the operational position.

As in the embodiment of the panel 210 of FIGS. 23-52, the cover 406 is configured to prevent movement of the tray 340 to the closed position when cover 406 is not in the operational position. In this manner, any damage to adapter modules 402, when they are in an extended position, is prevented if the tray 340 is brought from the open position to the closed position, as described with respect to the earlier embodiments.

The cover 406 is also configured such that, when in the operational position, the cover 406 will ensure that no cables within tray 340 extend above the bulkheads located within the tray 340. In this manner, any cables extending above bulkheads are prevented from being pinched or otherwise damaged by front edge of top 322 of the housing 312.

As in the previous embodiment of the panel, the cover 406 also interacts with modules 402 which were extended upward and not retracted prior to cover 406 being moved from the access position. The upper end of an extended module 402 strikes the cover 406 adjacent an edge of the opening 410. The opening 410 is positioned and configured to prevent cover 406 from being closed with a module 402 extended upward while still allowing visibility of modules 402 when cover 406 is in the operational position. When a module 402 is extended and interacts with cover 406, cover 406 cannot be moved to the operational position and tray 340 cannot be closed. This prevents damage to the extended module 402 as described above.

The opening 410 is also configured and positioned so as to prevent any cables connected to the rear of the upper most adapters 382 of the extended module 402 from being pinched or otherwise damaged when cover 406 interacts with the extended module 402. In the absence of the opening 410 configured and positioned as shown, such a cable would be struck by the cover 406 before the cover 406 strikes the extended module 402. The pressure of the cover 406 could cause the cable to kink or bend tighter than the desired bend radius and possibly degrade the ability of the cable to transmit optical signals.

In FIGS. 61-64, the panel 310 is shown with cover 406 removed to permit viewing of the interior of panel 310 as tray 340 is moved between the closed position (shown in FIG. 61) and the open position (shown in the FIGS. 62-64).

Referring now to FIGS. 56-60 and 64, optical fiber cables which is supported by the panel 310 enter the panel 310 through the rear opening 326. The panel 310 may be configured so that it will either accept a multi-strand optical fiber cable or single strand optical fiber cables. Adjacent the rear opening 326, the panel includes two elongate cable guides 420, 422 mounted in a stacked arrangement. The lower cable guide 420 defines a first trough 424 for guiding incoming cables from the rear opening 326 toward the opening 370 of the tray 340. The upper cable guide 422 defines a second trough 426 for guiding outgoing cables from the opening 370 of the tray 340 to the rear opening 326 of the panel 310. Each of the cable guides 420, 422 includes a bottom wall or platform 430 that extends parallel to but raised above from the bottom 320 of the housing 312. The bottom walls 430 of the cable guides 420, 422 include portions 432 adjacent the hinge 344 of the housing 312 that are curved toward the interior of the housing 312. The curvature of the bottom walls 430 are configured to accommodate the front portion 368 of the second sidewall 358 of the tray 340 when the tray 340 is pivoted from an open position to a closed position (see FIG. 61). The curvature of the bottom walls 430 of the cable guides 420, 422 also help guide the cables to and from the opening 370 of the tray 340.

To define the troughs 424, 426, the cable guides 420, 422 include vertical walls 434 inset from and parallel to the second sidewall 316 of the housing 312. The vertical walls 434 follow the curvature of the bottom walls 430 adjacent the front portion of the cable guides 420, 422. The vertical walls 434 are configured in height so that a small gap 436 is left above the vertical wall 434 of the lower cable guide 420 and between the vertical wall 434 of the upper cable guide 422 and the top 322 of the panel 340. As shown in FIGS. 56-62, cable pushers 440 may be utilized to close these gaps 436. The cable pushers 440 are slidably inserted over the top edges 438 of the vertical walls 434. Once the incoming cables are initially inserted into the troughs 424, 426 through the gaps 436 above the vertical walls 434, the cable pushers 440 can be used to push the remaining portions of the cables into the troughs 424, 426 in the transverse direction. As the cable pusher 440 is slidably moved from the rear of the cable guide 420/422 toward the front of the cable guide 420/422, sliding on the top edge 438 of the vertical wall 434, portions of the cables that are protruding sideways out of the troughs 424, 426 and located toward the interior of the panel 340 are contacted and moved toward the second sidewall 316 into the troughs 424, 426. In this manner, when the pushers 440 have been slid all the way forward, all incoming and outgoing cables will be in the troughs 424, 426 and be out of the way of the tray 340 in allowing the tray 340 to be pivoted.

The cable pushers 440 also provide a way to close up the gaps 436 above the vertical walls 434 of the cable guides 420, 422 so that already inserted cables cannot come out of the troughs 424, 426 during movement of the tray 340.

When the cable guides 420, 422 are mounted on the panel 310, there is some room left between the lower cable guide 420 and the bottom 320 of the panel 310. It should be noted that since the cable pushers 440 are removable pieces, additional pushers 440 may be supplied with the panel 310, wherein the additional pushers 440 may be stored in the space between the bottom 320 of the housing and the lower cable guide 420. For example, the extra pushers 440 may be attached to the second sidewall 316 of the housing 312 with a snap fit structure in this space.

The bottom walls 430 of the cable guides 420, 422 are configured such that they position the incoming cables and the outgoing cables at the correct height for a smooth transition into the tray 340. As seen FIG. 62, the bottom cable guide 420 is configured to lead incoming fibers into the opening 370 of the tray 340 through a cable management ring 442 and down a ramp 444 to the level of the floor 352 of the tray 340. From the bottom of the ramp 444, the cables can follow the radius 374 of the bulkhead 372 and enter the cable slack storage area 378 of the tray 340. It should be noted that a cable path 386 is created for the incoming cables between the curved portion 374 of the bulkhead 372 and the front portion 392 of the central bulkhead 384.

The upper cable guide 422 is at a level where outgoing cables that exit the fingers 398 upwardly from the ramp 400 and go through an upper cable management ring 450 will be at the correct height to enter the upper trough 426. The upper and the lower cable management guides 422, 420 keep the incoming cables completely separated from the outgoing cables and assist in guiding the cables between the rear opening 326 of the panel 310 and the tray 340.

As shown in FIG. 62, the tray includes another ramp 452 that angles upwardly from the tray floor 352 toward the fingers 398. The ramp 452 is configured to guide cables from the adapters 382 to the fingers 398.

It should be noted that all of the cable management structures and all of the transition structures are preferably configured to ensure that the cables are not bent through too tight of a curve as the cables are managed within the panel 310.

The bulkheads and the walls of the tray 340 cooperate to organize fiber optic cables and keep the cables within the tray 340 as the tray 340 is swung between the open and closed positions. The bulkheads and the walls help prevent optical fibers from being pinched or otherwise damaged.

As shown in FIG. 60, structures such as the cable spool 380 and the semicircular bulkhead 376 located at the cable slack storage area 378 may include outwardly extending fingers 460 for keeping the cables around these structures and prevent the cables from popping up during operation of the tray 340. The cable rings 442, 450 located adjacent the entry and exit of the tray 340 also serve the purpose of keeping the cables in a stored configuration to ensure smooth pivotal operation of the tray 340. It should be noted that cable management structures such as the fingers 460 and the rings 442, 450 may be mounted at other various locations around the tray 340 for keeping the cables organized.

Now referring to FIG. 64, a sample routing configuration for a cable 460 is shown. It should be noted that although the routing is shown for a single cable 460, the routing is representative of a plurality of cables managed by the panel 310. In the diagram shown in FIG. 64, the top 322 of the panel 310 has been removed to illustrate the internal features thereof and for clarity. As shown in FIG. 64, an incoming cable 460 enters the panel 310 through the rear opening 326. After being positioned within the trough 424 defined by the lower cable guide 420, the cable 460 is directed toward the opening 370 located between the second sidewall 358 of the tray 340 and the front wall 342 of the tray 340. The incoming cable 460, after entering the tray 340, is inserted through the lower cable ring 442. From the cable ring 442, the cable 460 goes down the ramp 444 (see FIG. 62) and toward the cable slack storage area 378. In going toward the cable slack storage area 378, the cable 460 passes between the curved portion 374 of the bulkhead 372 and the front portion 392 of the central bulkhead 384. As shown, the cable 460 can be wrapped around the semicircular bulkhead 376 and directed toward the cable spool 380. Once cable 460 goes around the spool 380, it passes between the rear wall 360 of the tray 340 and the spool 380 toward the adapters 382.

From the adapters 382, the cable 360 is directed upwardly over the ramp 452 and through the fingers 398. From the fingers 398, the cable 460 is curved toward the cable exit path 388 defined between the front wall 342 of the tray 340 and the front portion 394 of the central bulkhead 384. The cable 460 is then directed upwardly over the ramp 400 (see FIG. 62) and through the cable ring 450 before it enters the trough 426 defined by the upper cable guide 422. By the cable guide 422, the cable exits out the back of the housing 312 through the rear opening 326. Please note that in FIG. 64, portions of the cable 460 that are covered by solid structures and may not be visible from a top plan view of the panel 310 have been shown in dashed lines. The visible portions of the cable 460 from a top plan view have been shown in solid lines.

Figure 65:
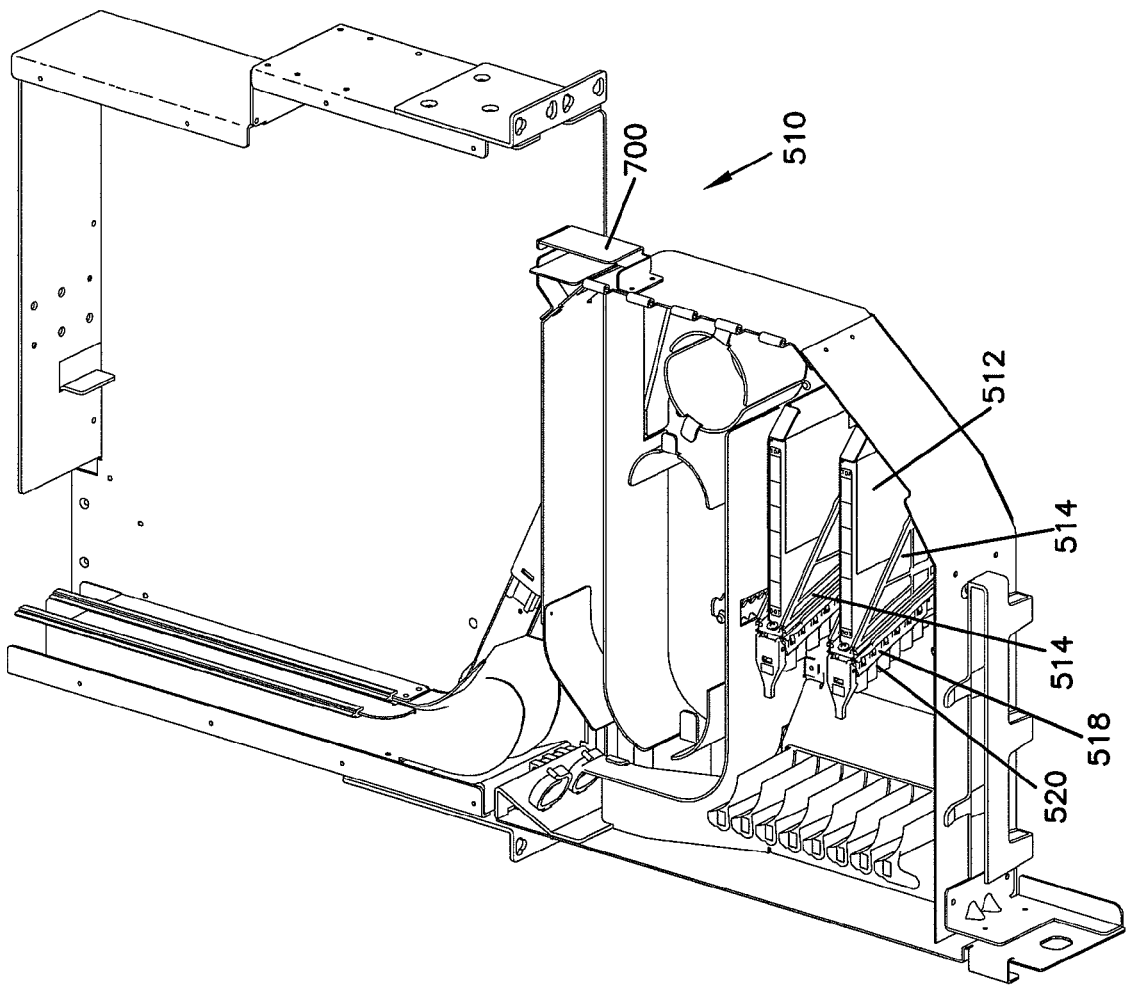
FIG. 65 is a front perspective view of a fifth embodiment of a termination panel according to the present disclosure, with the tray in the open position and with the cover of the tray and the top of the termination panel removed for clarity.
Figure 65A:
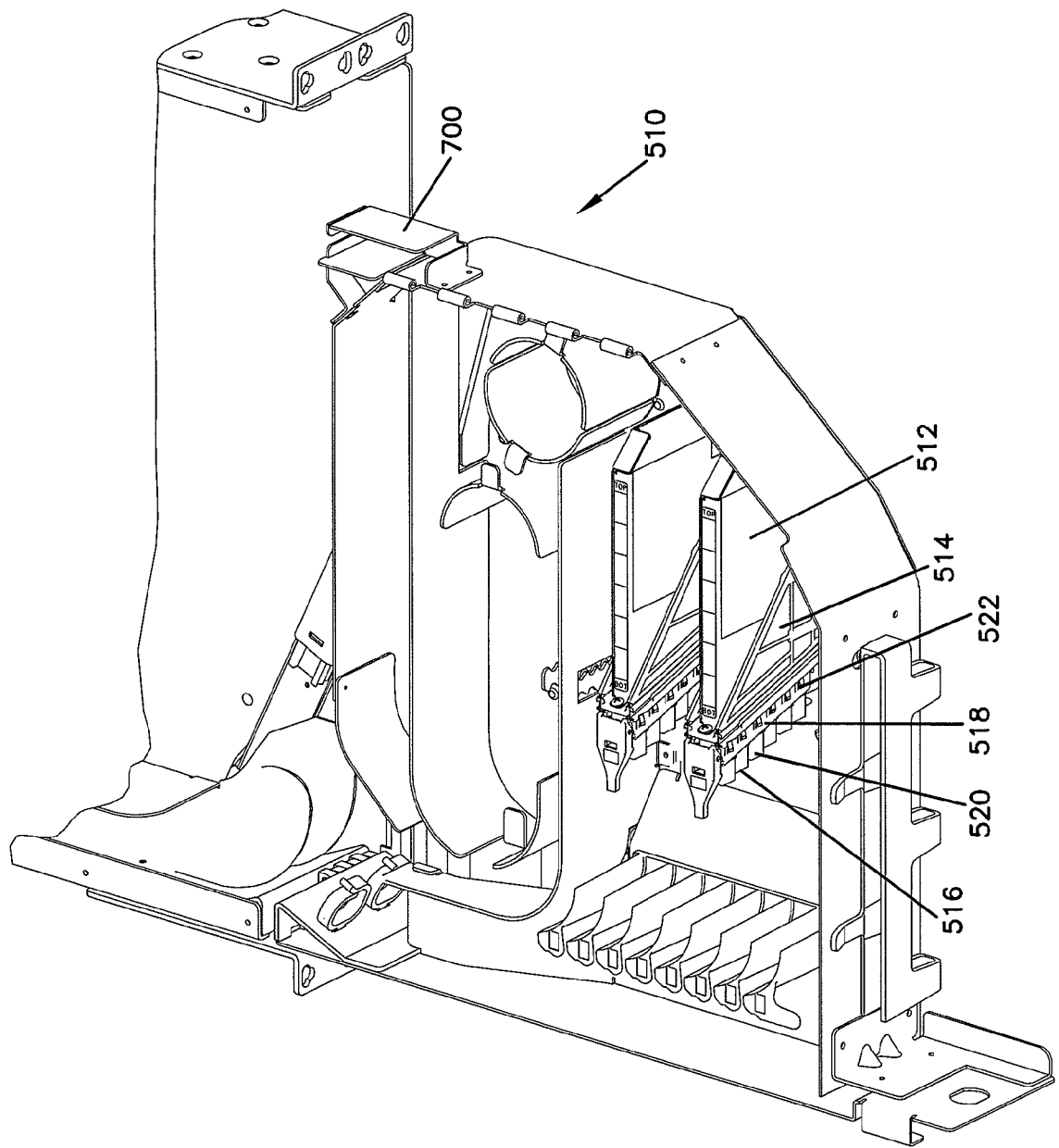
FIG. 65A is a close-up view of the tray of the termination panel of FIG. 65.
Figure 66:
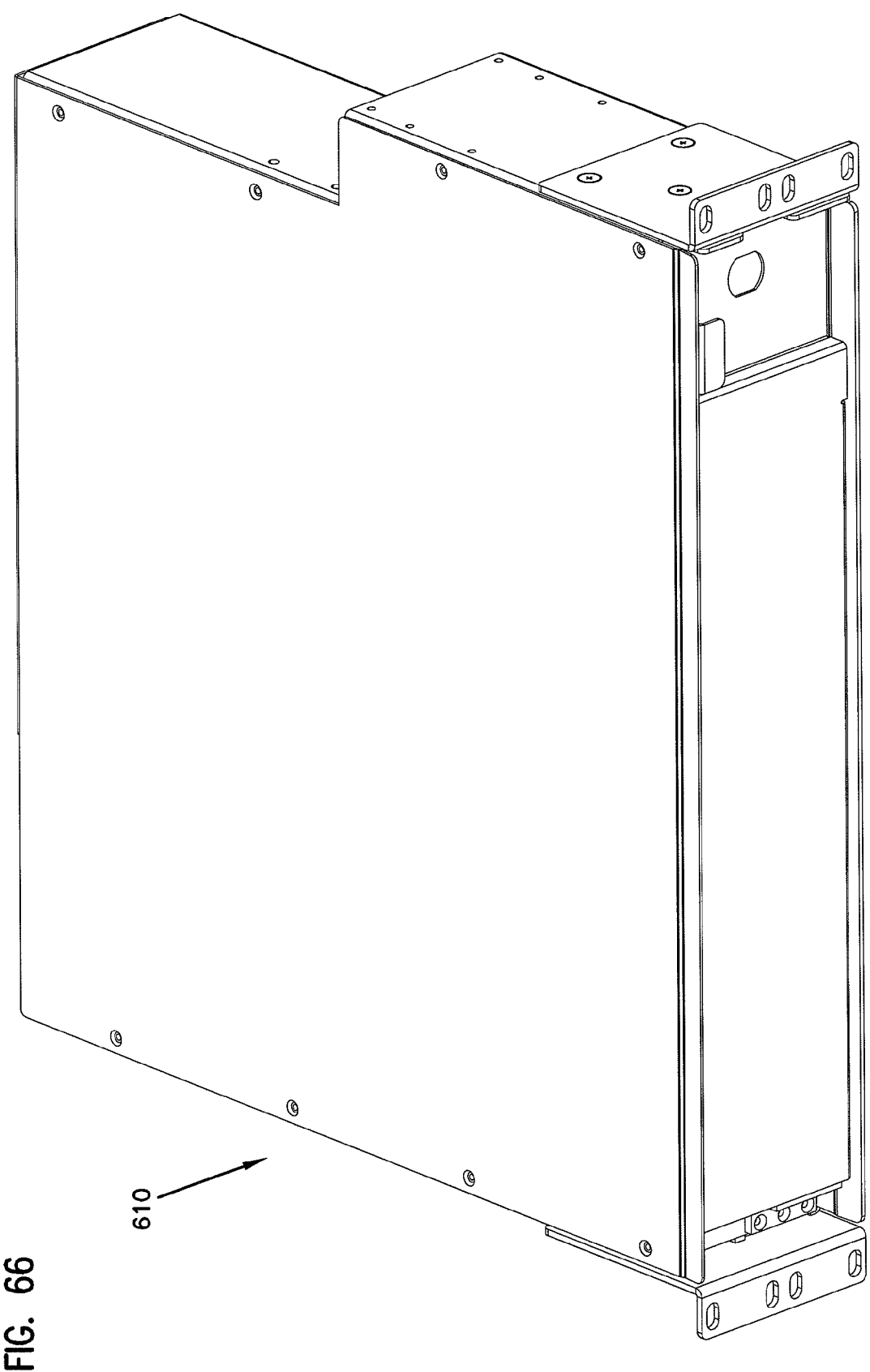
FIG. 66 is a front perspective view of a sixth embodiment of a termination panel according to the present disclosure, with the tray in the closed position.
Figure 67:
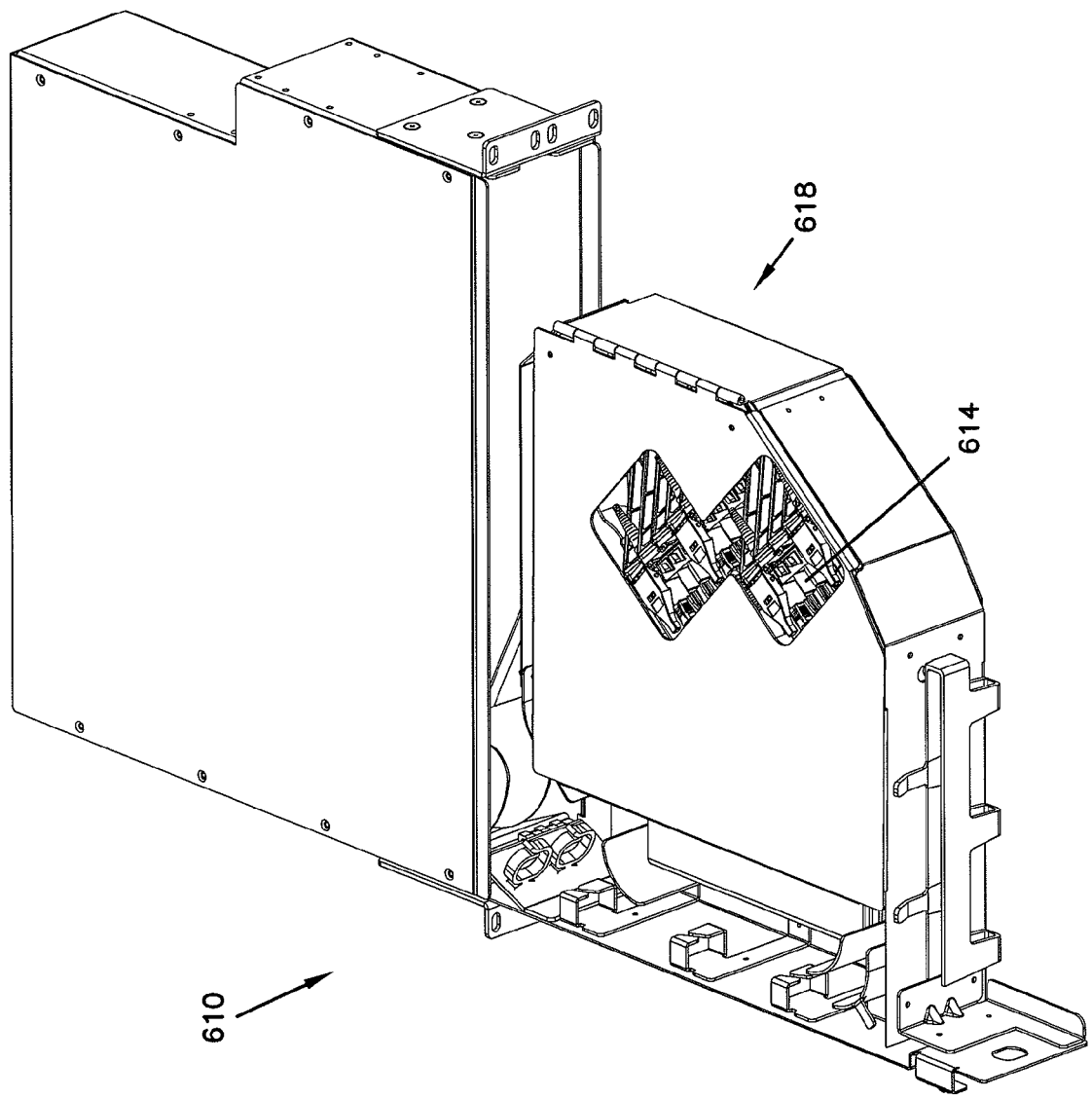
FIG. 67 is a front perspective view of the termination panel of FIG. 66, with the tray in the open position.

Referring now to FIGS. 65 and 65A, a fifth alternative embodiment of a telecommunications termination panel 510 is illustrated. The termination panel 510 is similar in construction and functionality to the termination panel 310 illustrated in FIGS. 53-64, except for a number of differences, which will be highlighted hereinafter.

The termination panel 510 is different than the panel 310 of FIGS. 53-64 in that the termination panel 510 houses telecommunications modules 512 instead of adapter modules 402 (that are configured to simply mate two fiber optic connectors) in the cable connection area. The telecommunications modules 512 are slidably disposed between parallel walls 514 as in the panel 310 of FIGS. 53-64. The telecommunication modules 512 can be configured to house different types of fiber optic equipment including couplers, splitters, combiners, wave division multiplexers, etc. The telecommunications modules 512 depicted each includes a plurality of connection locations 516 defined by fiber optic adapters 518. Adapters 518 define connection locations 520 for receiving connectors on the ends of fiber optic cables. The opposite back ends 522 of the adapters 518 are disposed within the telecommunications modules 512 and are configured to receive fiber optic connectors associated with the internal circuitry of the telecommunications modules 512.

In the depicted embodiment, the tray is configured to accommodate four telecommunications modules 512, each having six connection locations for a total of twenty-four cables. Other numbers are possible.

For further description relating to the configuration of modules 512 and the types of optical equipment that may be housed within the modules, please refer to U.S. Pat. Nos. 6,556,763 and 7,142,765, the entire disclosures of which are incorporated herein by reference. Examples of telecommunications modules that are suitable for use in the panel 510 are available from ADC Telecommunications, Inc. under the Model Name MicroVAM (Value-Added Module).

The cable routing for the embodiment of the panel 510 shown in FIGS. 65 and 65A is similar to the cable routing shown in FIG. 64. However, since the adapters 518 mounted to the telecommunications modules 512 are used to both input a signal and output a signal, instead of cables leading to the rear ends of the adapters 518, connectorized cables will enter and exit the adapters from the same, front side 516 of the adapters 518.

The cover of the tray may include an opening that provides visibility to the modules 512 and to information located on the modules 512 to determine the types of modules that are within the tray without having to open the cover.

Referring now to FIGS. 66-77, a sixth alternative embodiment of a telecommunications termination panel 610 is illustrated. The termination panel 610 is similar in construction and functionality to the termination panel 310 illustrated in FIGS. 53-64, except for a number of differences, which will be highlighted hereinafter.

Figure 77:
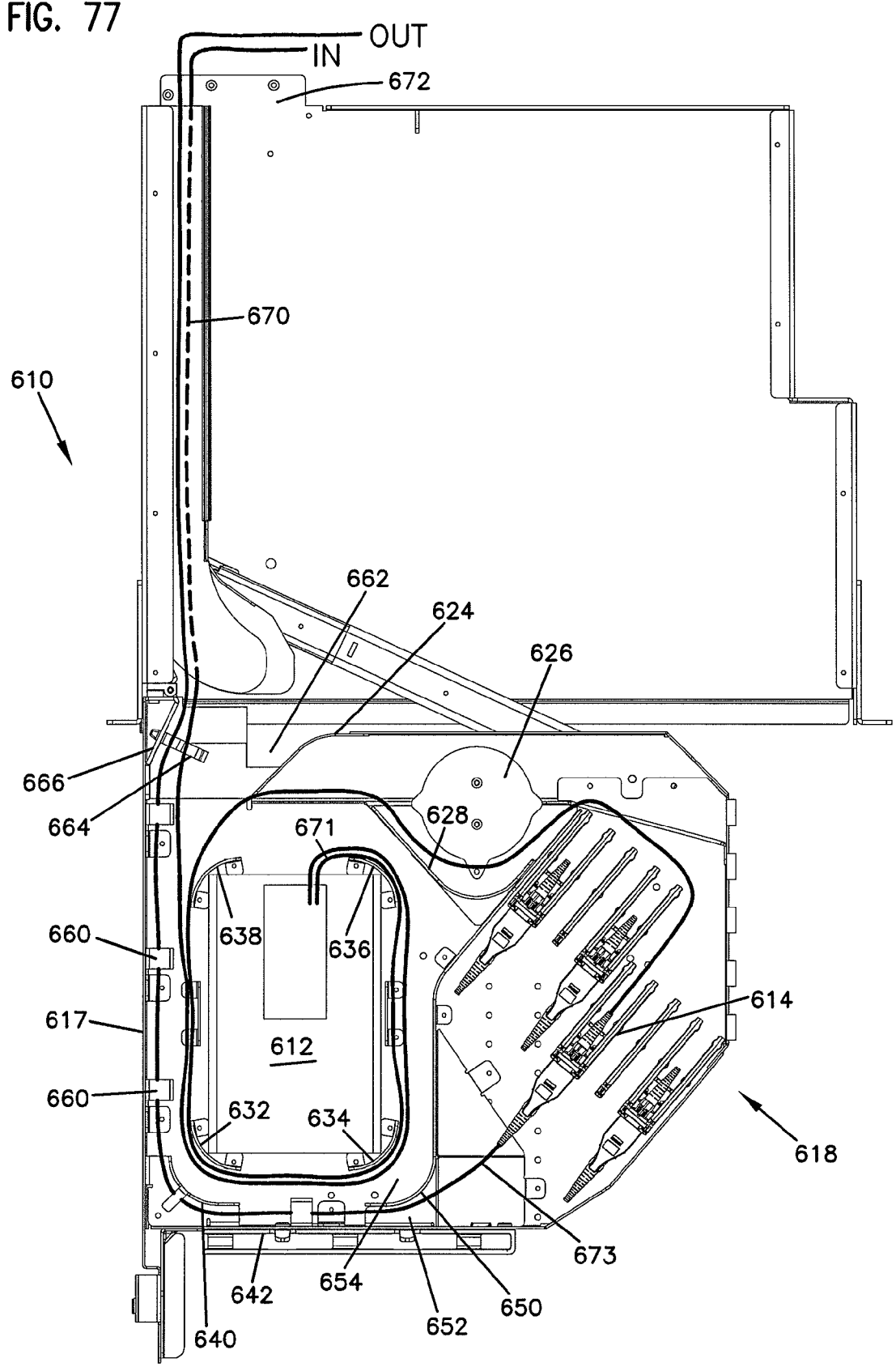
FIG. 77 illustrates the termination panel of FIG. 76 with an example cable routing configuration.

As shown in FIGS. 66-77, instead of utilizing adapters 382 for intermating pre-terminated connectorized cables, the panel 610 includes splice trays 612 for performing a splice in establishing the connection between the incoming fibers and the outgoing fibers. As shown in FIG. 77, incoming non-connectorized fibers are spliced at the splice trays 612 to connectorized fibers. The connectorized fibers are then mated to outgoing connectorized fibers through the adapters 614.

Figure 68:
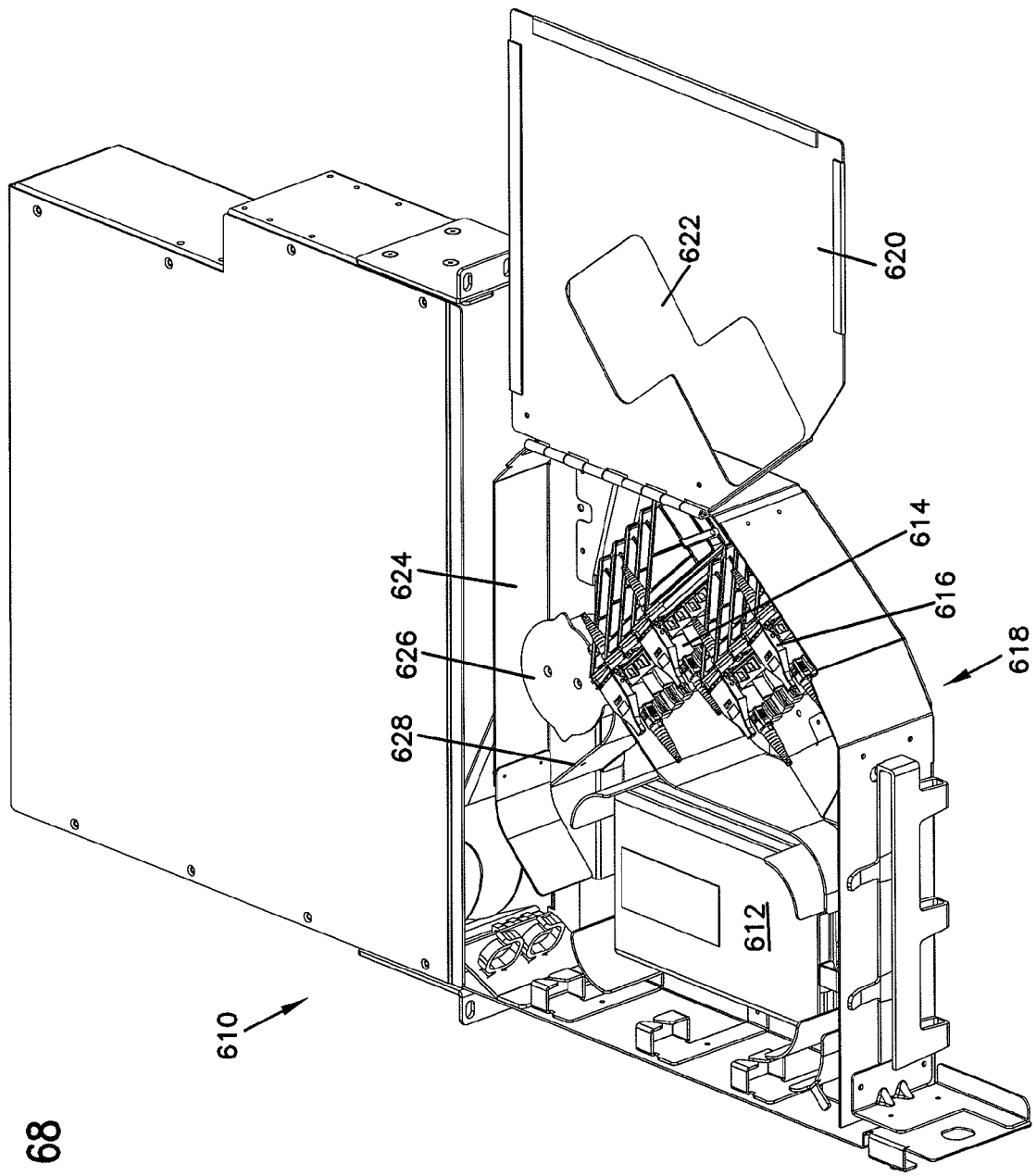
FIG. 68 is a front perspective view of the termination panel of FIG. 67, with the cover in an access position.
Figure 69:
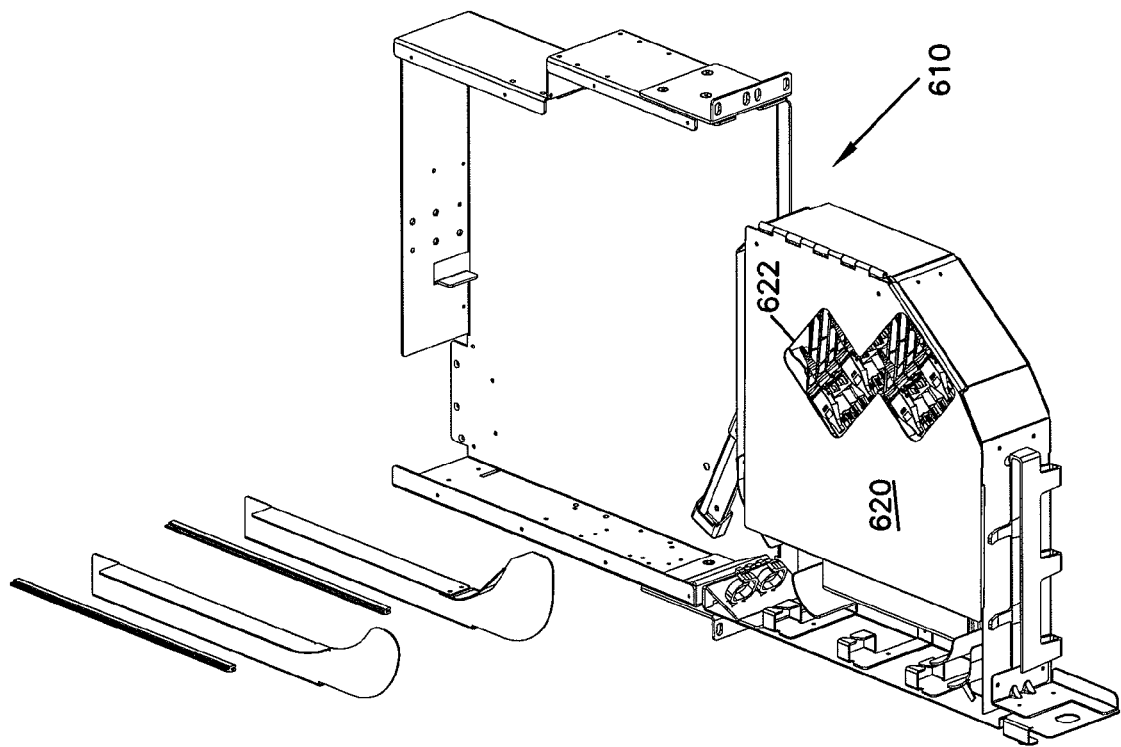
FIG. 69 is a partially exploded view of the termination panel of FIG. 67, the top removed for clarity.
Figure 70:
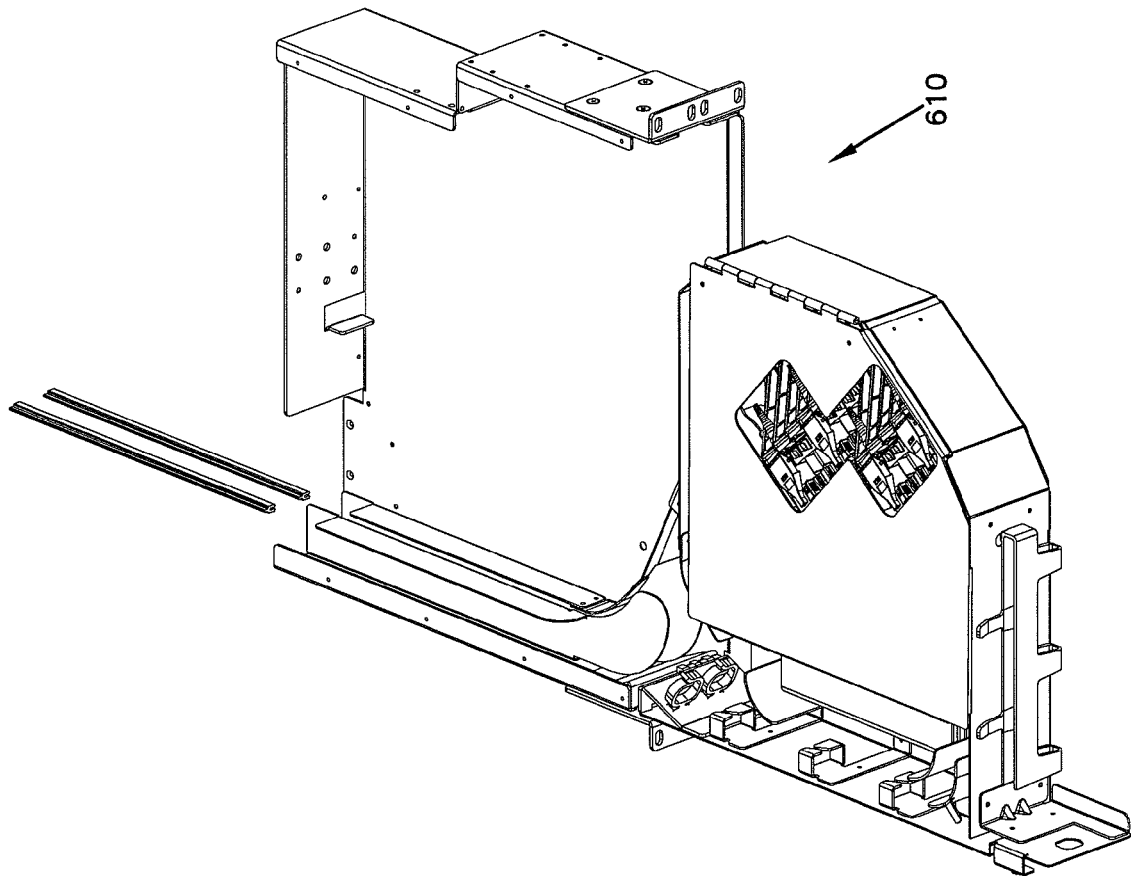
FIG. 70 is a partially assembled view of the termination panel of FIG. 69.
Figure 71:
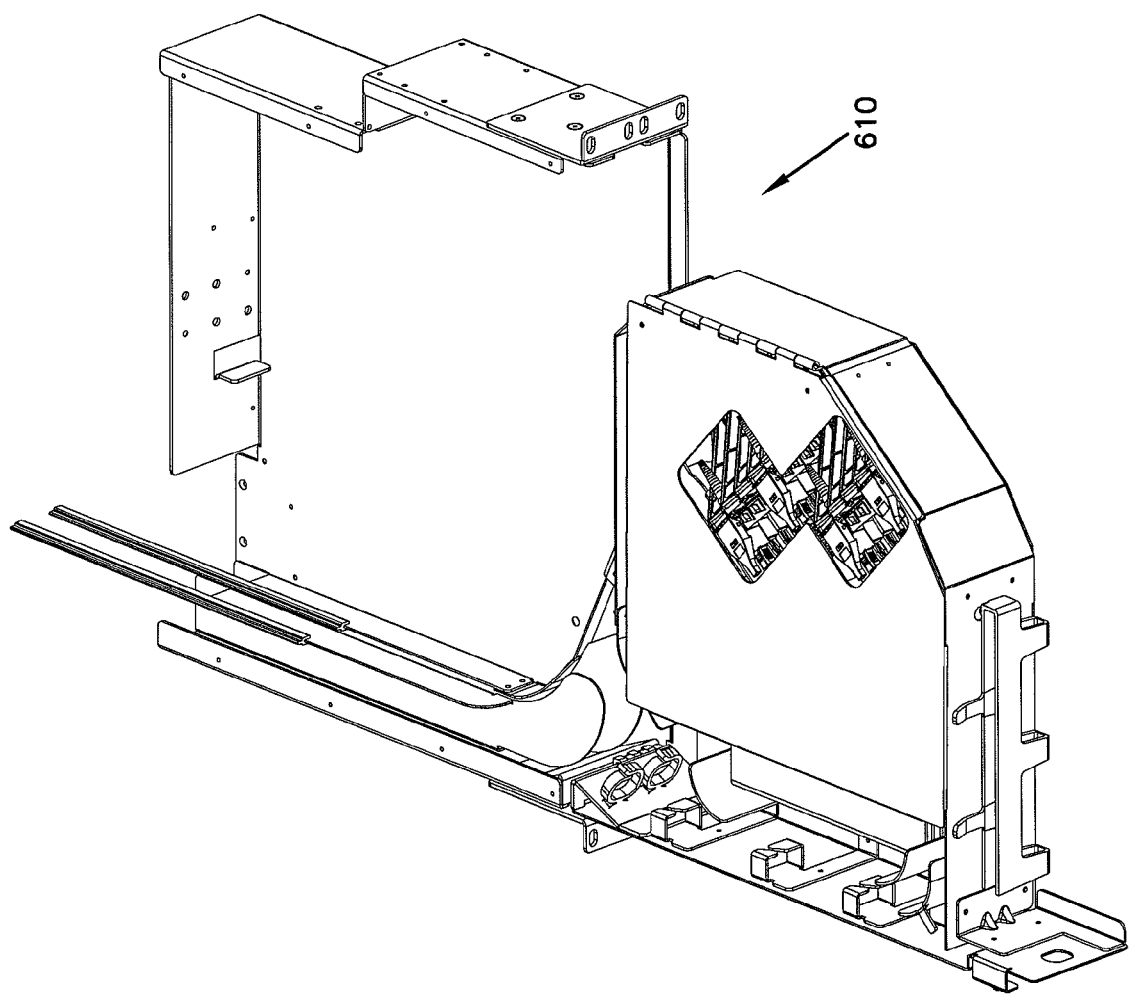
FIG. 71 is a partially assembled view of the termination panel of FIG. 70.
Figure 72:
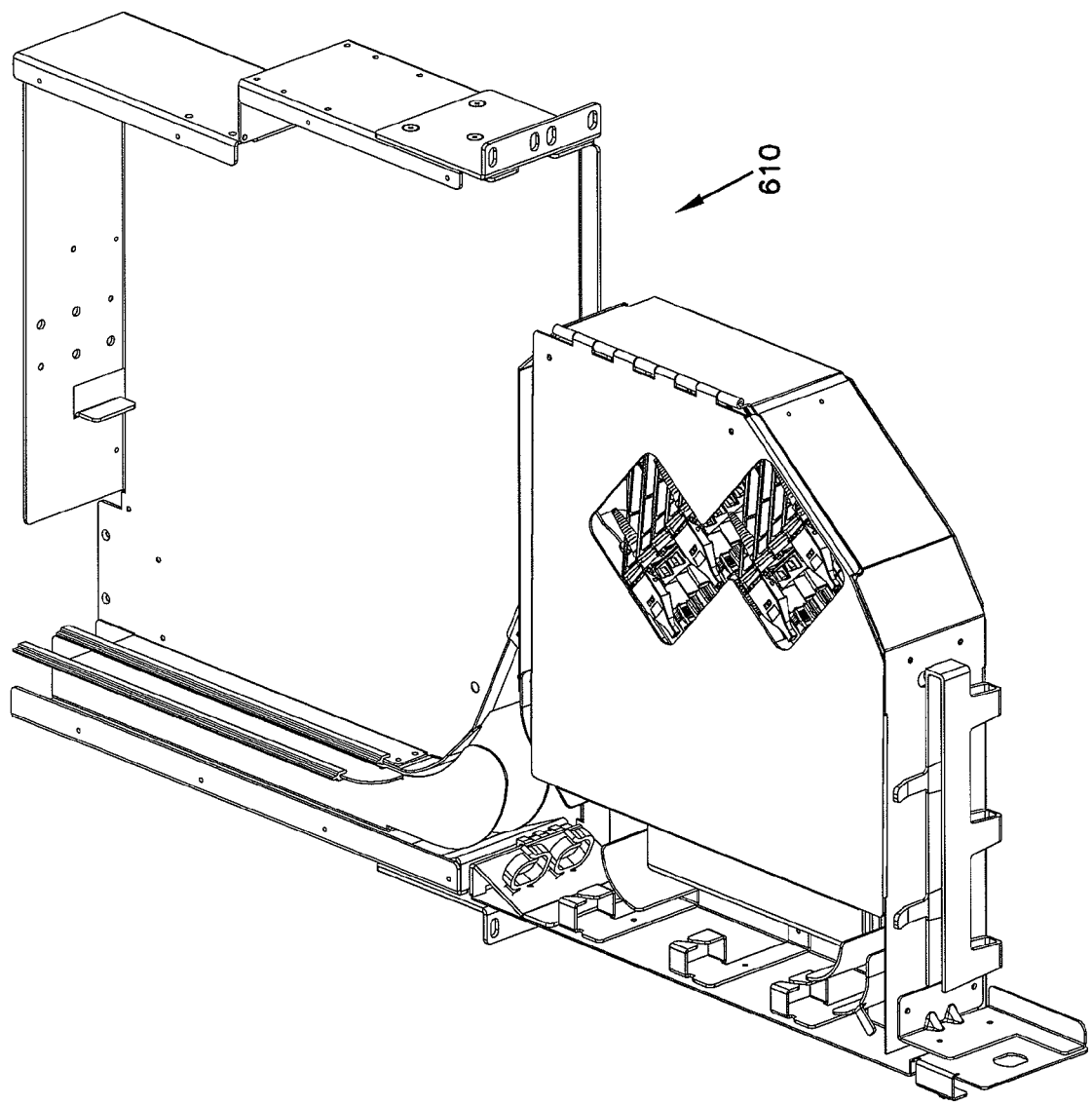
FIG. 72 is a fully assembled view of the termination panel of FIG. 71.
Figure 73:
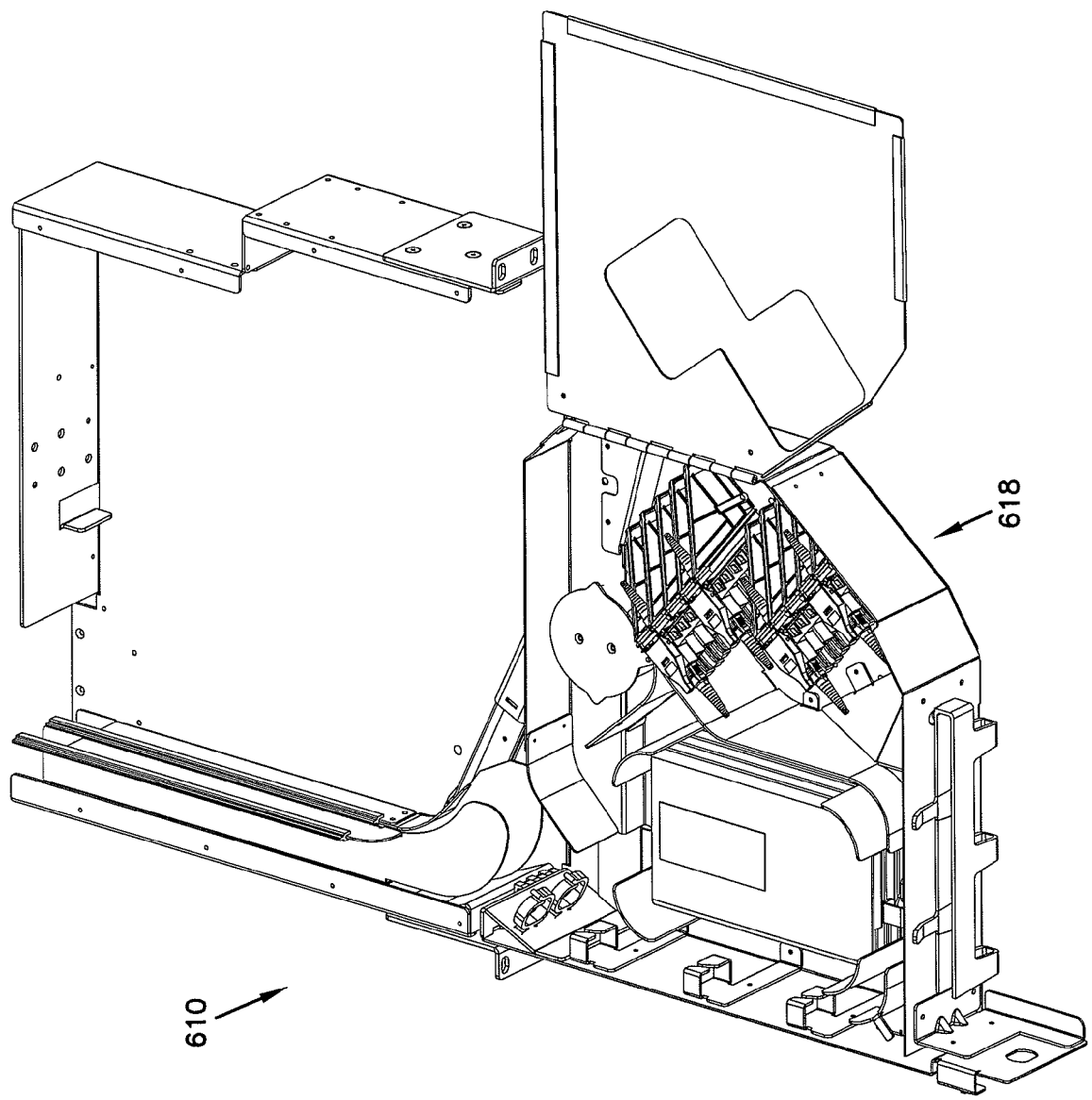
FIG. 73 is a front perspective view of the termination panel of FIG. 72, with the cover in the access position.
Figure 74:
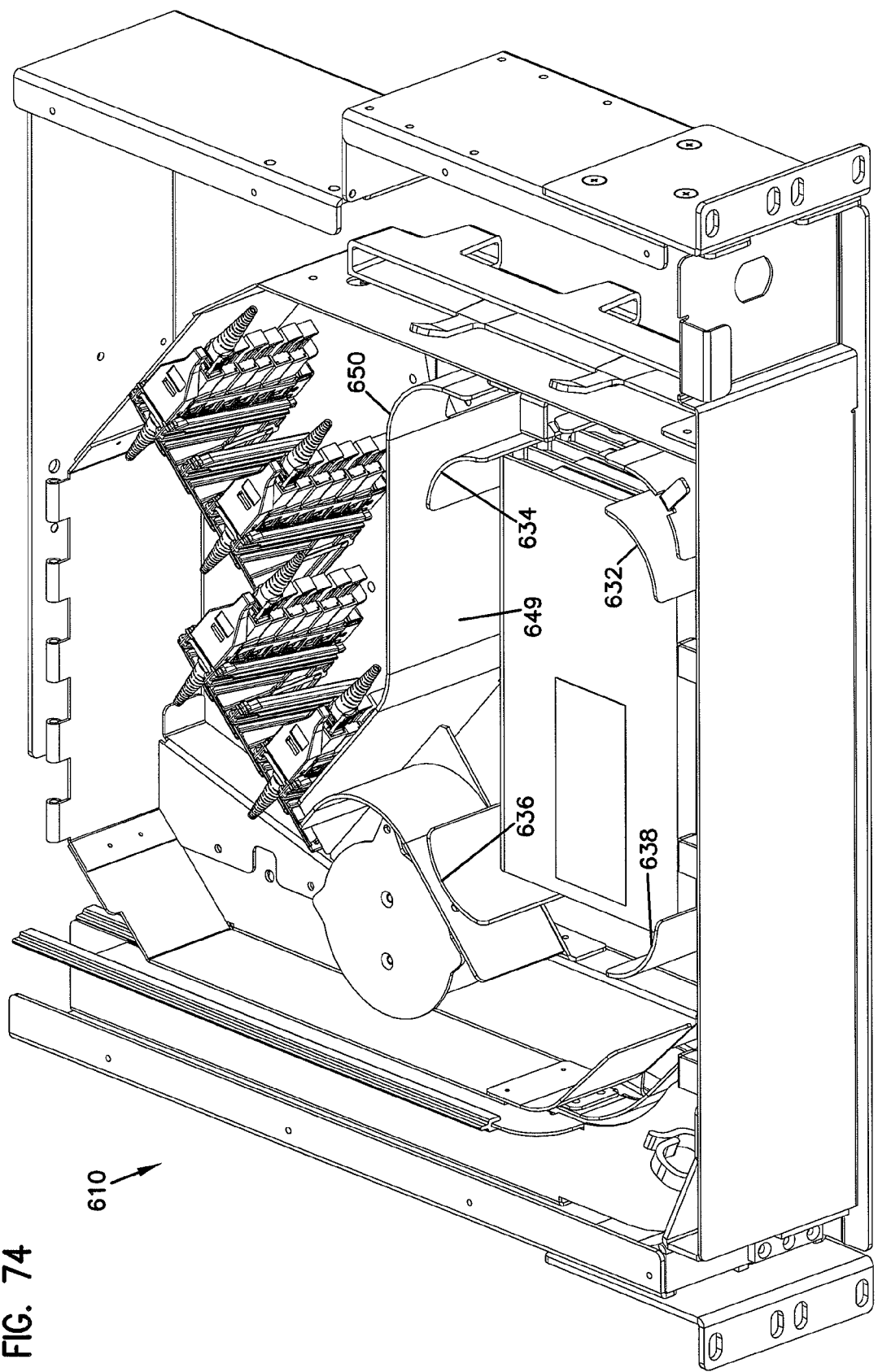
FIG. 74 is a front perspective view of the termination panel of FIG. 66, with the tray in the closed position and with the cover of the tray and the top of the termination panel removed for clarity.
Figure 75:
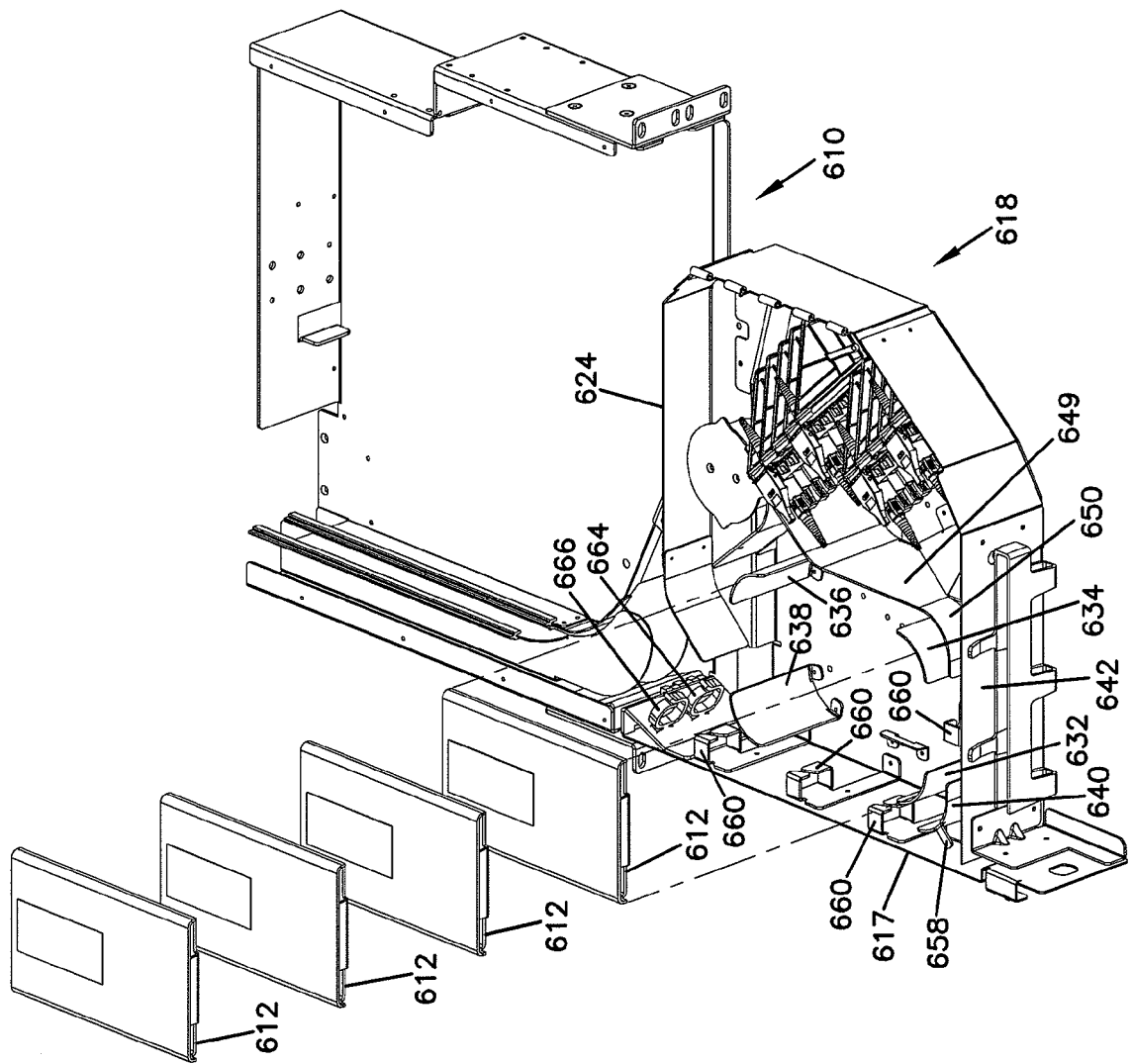
FIG. 75 is a partially exploded view of the termination panel of FIG. 74, with the tray in the open position.
Figure 76:
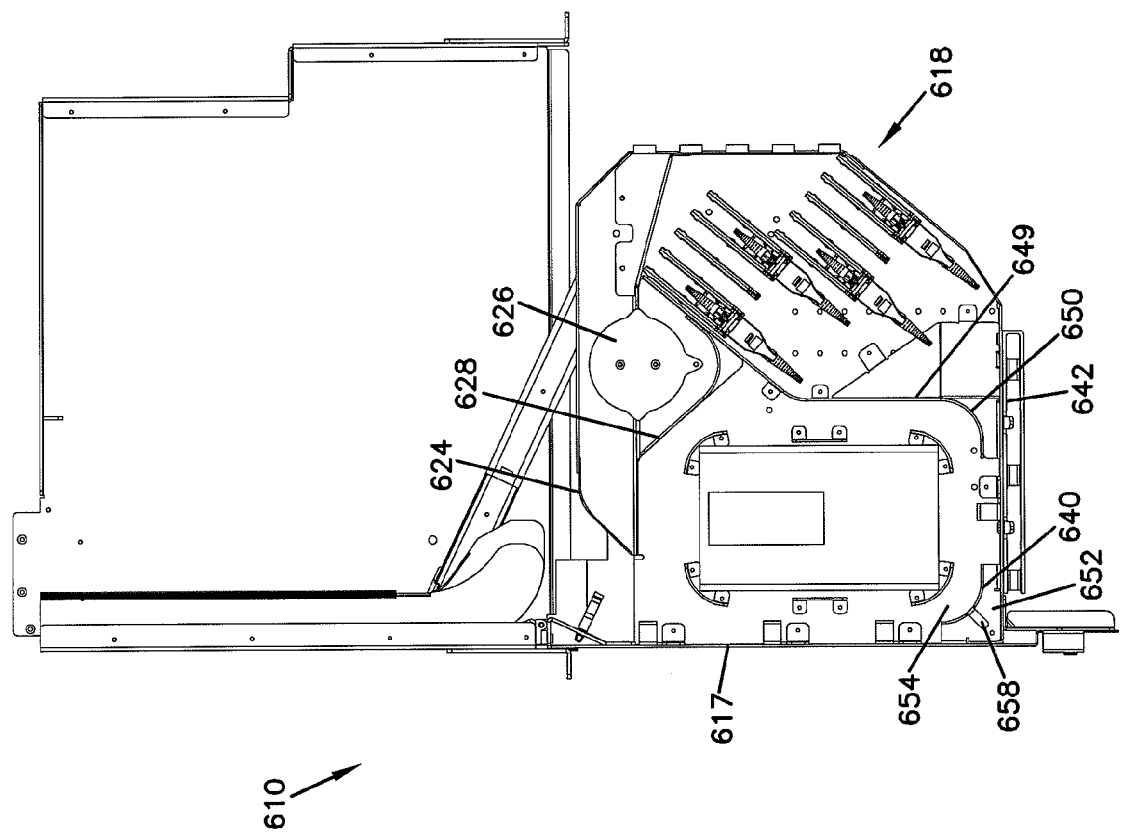
FIG. 76 is a top plan view of the termination panel of FIG. 74, with the tray in the open position.

The panel 610 of FIGS. 66-77 includes a number of differences from the panel 310 of FIGS. 53-64 for accommodating the splice trays 612. As shown in FIG. 68, the adapter modules 616 are arranged differently than in the panel 310 of FIGS. 53-64. The adapter modules 616 are arranged in two sets that are offset/staggered with respect to each other. The two sets of adapter modules 616 are arranged at an angle, wherein the longitudinal axes of the adapters 614 lie parallel to the relieved corner of the rear wall of the tray 618. The adapter modules 616 are arranged to provide proper cable management and to increase the density of the possible connections within the tray 618.

In the embodiment depicted, the tray 618 accommodates two sets of four adapter modules 616, each having six adapters 614 for a total number of forty-eight connections. In the depicted embodiment, four splice trays 612 are provided in a stacked arrangement (see FIG. 75) for accommodating a total of forty-eight cable splices for the panel 610 (i.e., twelve splices per splice tray). The spliced fibers may be 900 micron fiber.

The cover 620 of the tray 618 includes an opening 622 having a shape corresponding to the arrangement of the adapters 614. The opening 622 of the cover 620 of the tray 618 of FIGS. 66-77 serves the same functionality, in the same way, as the cover opening 410 of the tray 340 of FIGS. 53-64.

The second sidewall 624 of the tray 618 has a similar shape to the second sidewall 358 of the tray 340 shown in FIGS. 53-64. The panel 610 includes a cable spool 626 positioned between the second sidewall 624 and a curved bulkhead 628. The curved bulkhead 628, cooperating with the cable spool 626, is configured to lead cables from the splice trays 612 to the rears of the adapters 614 (see FIG. 77).

The splice trays 612 are positioned adjacent the front wall 617 of the tray 618 at a splice area 630. The splice area 630 is defined by four frame members 632, 634, 636, 638. The splice trays 612 are placed in a stacked configuration in between the frame members 632, 634, 636, 638. The frame members 632, 634, 636, 638 are defined by curved bulkheads that are configured to provide bend radius protection as the spliced cables are wrapped around the frame members.

The tray 618 further includes a cable management structure 640 defined by a curved bulkhead adjacent the corner of the tray defined by the first sidewall 642 and the front wall 617. Further back from the bulkhead 640, the tray includes another cable management structure 649 defined by a bulkhead. Bulkhead 649 divides the splice area from the adapter location. The bulkhead 649 defines a curved portion 650.

The bulkhead 640 and the curved portion 650 are shaped to follow the contour of the adjacent corresponding frame members 632 and 634 of the splice area 630. As seen in FIG. 77, a cable path 652 is defined for the outgoing cables between the first sidewall 642 and the curved bulkheads 640 and 650. A second cable path 654 is defined between the bulkheads 640 and 650 and the adjacent frame members 632 and 634 for guiding cables from the splice trays 612 to the adapters 614, as shown in FIG. 77.

The curved bulkhead 640 adjacent the front wall 617 of the tray 618 includes a finger 658 for keeping the cables below the top of the tray 618 to prevent pinching or damage to the cables and to ensure smooth pivoting motion of the tray 618. There are cable rings 660 positioned on the first sidewall 642 as well as the front wall 617 of the tray 618 for managing cables going from the adapters 614 toward the opening 662 of the tray 618. As in the embodiment of the panel 310 of FIGS. 53-64, the tray 618 defines two cable rings 664, 666 adjacent the tray opening 662. The lower ring 664 is configured to receive incoming cables from the trough of the lower cable guide and the upper ring 666 is configured to guide outgoing cables toward the trough of the upper cable guide.

Now referring to FIG. 77, a sample routing configuration for a cable 670 is shown. It should be noted that although the routing is shown for a single cable 670, the routing is representative of a plurality of cables managed by the panel 610. In the diagram shown in FIG. 77, the top of the panel 610 has been removed to illustrate the internal features thereof and for clarity. As shown in FIG. 77, an incoming cable 670 enters the panel 610 through the rear opening 672. After being positioned within the trough defined by the lower cable guide, the cable 670 is directed toward the opening 662 located between the second sidewall 624 of the tray 618 and the front wall 617 of the tray 618. The incoming cable 670, after entering the tray 618, is inserted through the lower cable ring 664. Once the cable 670 enters the tray 618, the cable 670 is lead down a cable path adjacent the front wall 617 of the tray 618. Once the cable 670 reaches the first sidewall 642, the cable 670 is turned toward the rear of the tray 618 and then around the frame members 632, 634 toward the second sidewall 624 of the tray 618. After going around the frame member 636, the cable 670 is directed toward the front of the tray 618 and into a splice tray 612. At the splice tray 612, the cable 670 is spliced to another fiber optic cable 671 that is connectorized.

The connectorized cable 671 then exits the splice tray 612 toward the rear wall of the tray 618 and around the frame member 636 toward the first sidewall 642 of the tray 618. The cable 671 is then wrapped all the way around the frame members 634, 632, and 638 (i.e., around the splice trays 612) and is directed toward the curved portion of the second sidewall 624. From the second sidewall 624, the cable is directed toward the cable spool 626, passing between the cable spool 626 and the curved bulkhead 628. Once the cable 671 passes between the cable spool 626 and the curved bulkhead 628, the cable 671 is led to the adapters 614. At the adapters 614, the connectorized cable 671 is mated with another connectorized cable 673. From the front of the adapters 614, the cable 673 is directed toward the front wall 617 of the tray 618. After going around the cable management structures 640, 650 and also through the cable path defined between the front wall 617 and the splice location, the cables 673 are directed toward the opening 662 of the tray 618. Going from the adapters 614 to the cable exit, the cables 673 are passed through the cable rings 660 for cable management purposes.

Although not shown, in other embodiments, the cable path defined between the front wall 617 and the splice location may include a ramp structure to raise the cables 673 from the tray floor to the height of the upper cable ring 666 for the outgoing cables 673. In this manner, the cables 673 may be raised to the level of the ring 666 at the opening 662 in a gradual manner.

Once the outgoing cable 673 is inserted through the upper cable ring 666 adjacent the tray opening 662, the cable 673 is directed into the trough of the upper cable guide and exits the panel 610 out the rear opening.

It should be noted that, if the cable 671 coming from the splice tray 612 is going to be inserted into one of the first four rows of adapters 614 closer to the cable spool 626, since there might be additional cable slack, the cable 671 may be wrapped once around the spool 626 rather than going simply between the spool 626 and the curved bulkhead 628 before being mated at the adapter 614. If the cable 671 is going to be inserted into one of the adapters 614 in the second set of four rows of adapters adjacent the corner, the cable routing as shown in FIG. 77 may be used.

Please note that in FIG. 77, portions of the cable that are covered by solid structures and may not be visible from a top plan view of the panel 610 have been shown in dashed lines. The visible portions of the cable from a top plan view have been shown in solid lines.

As in the previous embodiments of the panel, the panels 310, 510, and 610 of FIGS. 53-77 may include a cable puller structure 700 to aid in the loading of cables into the tray of the panel. A cable clamp 700 (shown in FIGS. 62, 65, and 65A) may be used to pull cables from the rear opening toward the front opening of the panel without the need to extend an arm through the interior of the panel. When the tray is in the closed position, the clamp 700 may be configured to be accessible from the rear opening. An end of a new cable may be attached to the clamp 700. When the tray is swung to the open position, the end of the new cable will be pulled through the panel and out of the front opening.

Figure 14:
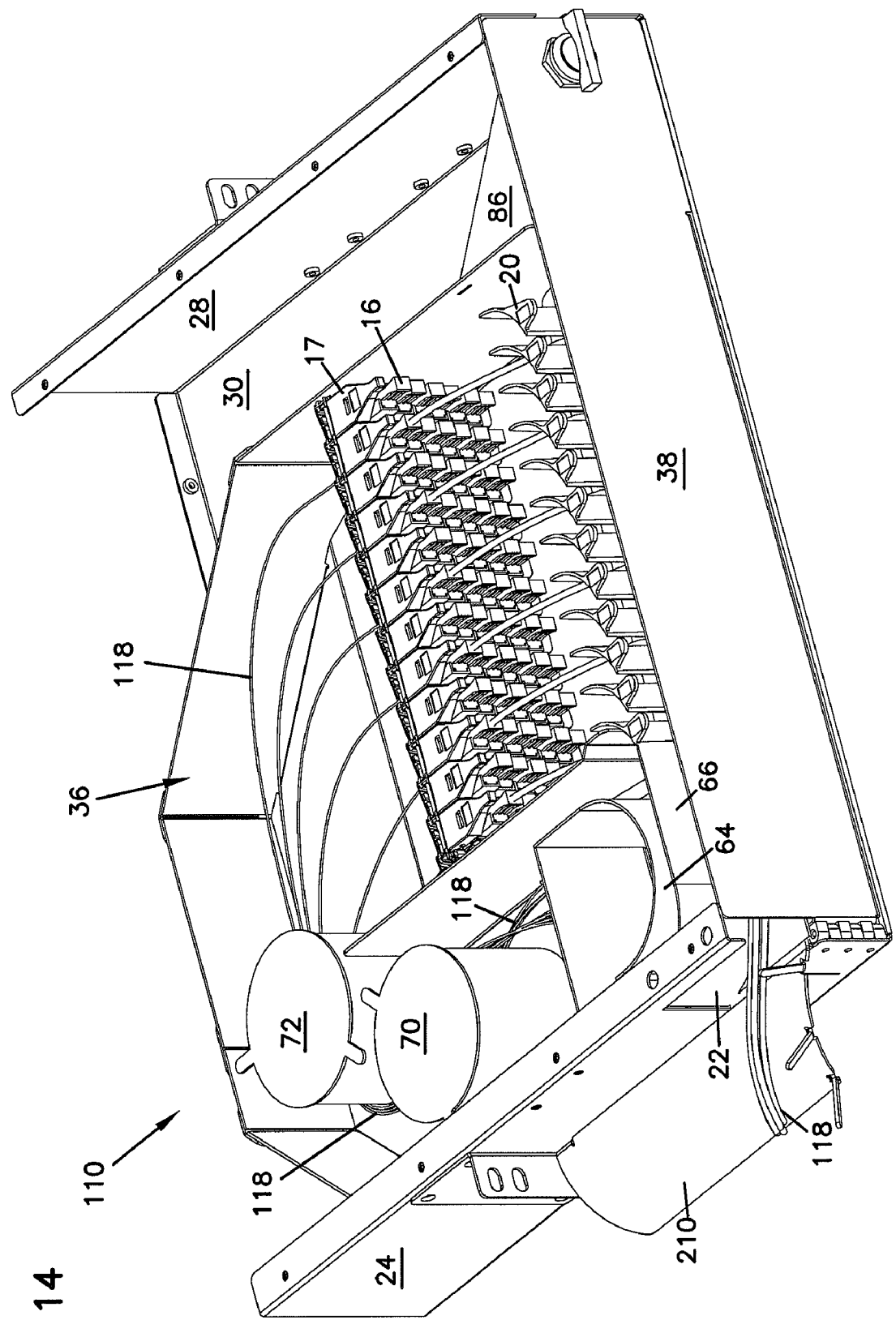
FIG. 14 is a second front perspective view of the termination panel of FIG. 13.

As in previous embodiments of the panel, the panels shown in FIGS. 53-77 may also include features such as a radius limiter 26 shown in FIG. 14. In different embodiments, the radius limiter may be configured to direct the cables upwardly, downwardly or toward one of the sides from the rear opening of the panel.

In the panels 310, 510, and 610 shown in FIGS. 53-77, a cable such as a multi-strand inter-facility cable 50 may be used for the incoming cables and may be clamped to the rear wall of the panels. The cable may be held to the panels by a cable clamp similar to cable clamp 52 located adjacent the rear opening of the panel (see FIGS. 9-11).

FIGS. 78-85 illustrate a seventh embodiment of a termination panel 710 according to the present disclosure. The seventh embodiment of the termination panel 710 is similar to the fourth embodiment of the termination panel 310 of FIGS. 53-64, except for a number of differences, which will be highlighted hereinafter.

As discussed previously, the fourth, fifth, and sixth embodiments of the termination panels 310, 510, and 610, respectively, may include a latch similar to those shown for panels 10, 110, and 210 of FIGS. 1-52 for releasably holding the tray 340 in a closed position within the front opening 324. A latch 712 similar to latch 40 of FIG. 23 is shown in the seventh embodiment of the terminal panel 710 of FIGS. 78-85. A latch 812 is also shown in the eighth embodiment of the panel 810 of FIGS. 86-87 and the ninth embodiment of the panel 910 of FIGS. 88-94. As discussed previously, the latch 712 may include a key for release, providing additional security to the interior of the panels.

Figure 85:
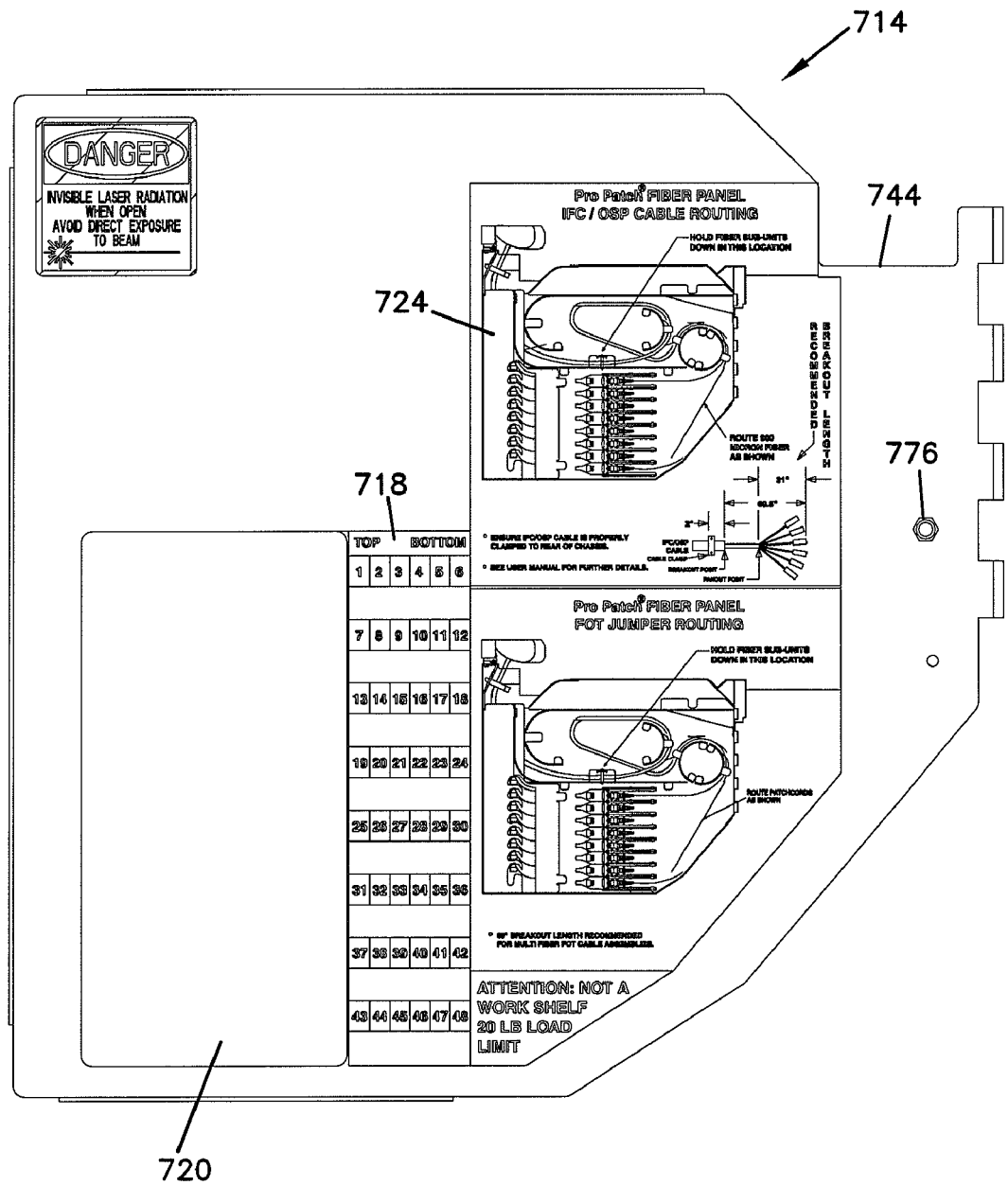
FIG. 85 illustrates the cover of the tray of the termination panel of FIG. 78 in isolation.

The tray 340 of the fourth embodiment of the terminal panel 310 of FIGS. 53-64 was shown with the designation strips and labels removed for clarity. On the cover 714 of the tray 716 of the seventh embodiment of the termination panel 710 are the designation labels 718 shown. The designation labels 718 may be positioned adjacent opening 720 to indicate the source and destination of cables attached to adapters 722 that may extend through opening 720. The cover 714 may also include one or more routing diagrams 724 to illustrate to the user the recommended path of cables within panel 710 as shown in the seventh embodiment of the termination panel 710. FIG. 85 illustrates a top view of the cover 714 of the tray 716 of the termination panel 710 of FIG. 78 in isolation.

Please note that designation labels 918 and routing diagrams 924 have also been shown on the cover 914 of the tray 916 of the ninth embodiment of the termination panel 910 of FIGS. 88-94. The designation labels 918 and the routing diagrams 924 can be seen in FIGS. 88, 88A, and 89.

Other labels such as warning labels may also be included on various parts of the different embodiments of the termination panels. For example, please see FIG. 82 for a warning label 726 adjacent the latch 712 of the tray 716 of the seventh embodiment of the termination panel 710.

In the seventh embodiment of the termination panel 710, vertical walls 730 of cable guides 731, 732 defining troughs 734 extend all the way to the rear end 736 of the cable guides 731, 732. As such, the notches at the rear ends of the cable guides 420, 422 seen in the fourth embodiment of the termination panel 310 (see, e.g., FIGS. 56-60) are eliminated. A similar variation is also included in the eighth (FIG. 86) and ninth (FIG. 89) embodiments of the termination panels 810, 910, respectively.

The previous embodiments of the termination panel were discussed as including a cable puller structure to aid in the loading of cables into the tray of the panel. For example, panels 310 and 510 of FIGS. 53-65 were shown with a cable puller structure 700 to aid in the loading of cables into the tray of the panel. The cable clamp 700 (shown in FIGS. 62, 65, and 65A) is used to pull cables from the rear opening toward the front opening of the panel without the need to extend an arm through the interior of the panel. When the tray is in the closed position, the clamp 700 may be configured to be accessible from the rear opening. An end of a new cable may be attached to the clamp 700. When the tray is swung to the open position, the end of the new cable will be pulled through the panel and out of the front opening.

The seventh embodiment of the termination panel 710 is also shown with a cable puller 740 (i.e., temporary cable transporter or temporary cable clamp), the cable puller 740 including features similar to those shown in and discussed with respect to FIGS. 15-17, 20-22, 24, 26, 29, 62, 65, and 65A. FIG. 78A illustrates a close-up view of a cable transporter 740 of the seventh embodiment of the termination panel 710. The eighth (FIG. 86) and ninth (FIG. 88) embodiments of the termination panels 810, 910, respectively, are also shown with a cable puller feature.

As shown in FIG. 85, a corner 742 of the cover 714 of the tray 716 adjacent the cable puller structure 740 includes a notch 744 for accommodating the cable puller structure 740. A similar variation is also included in the eighth and ninth embodiments of the termination panels 810, 910, respectively. For example, the cover 914 of the tray 916 of the ninth embodiment of the termination panel 910 is shown in isolation in FIG. 88A, illustrating a notch 944.

Figure 82:
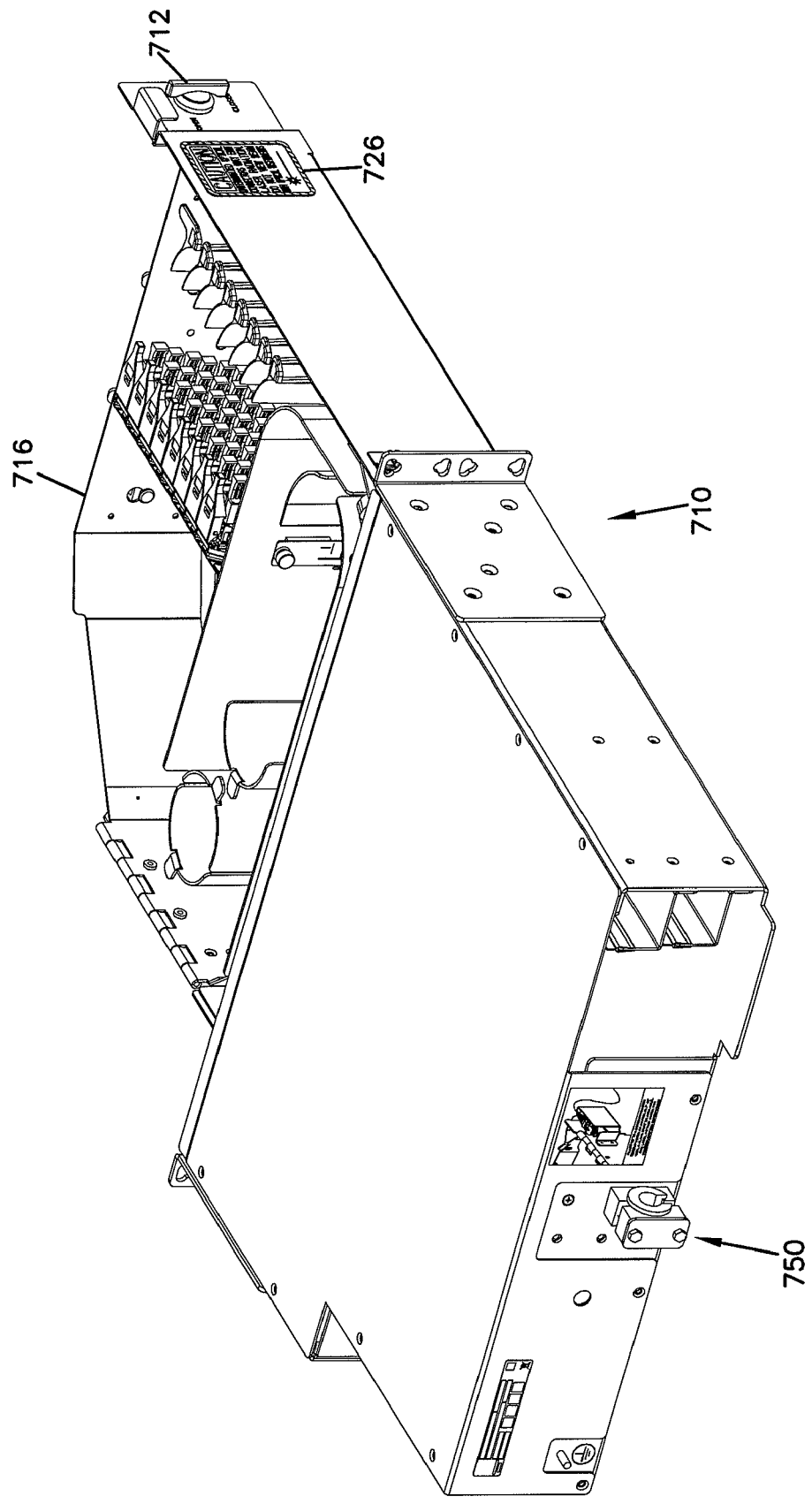
FIG. 82 is a rear perspective view of the termination panel of FIG. 78, with the tray in the open position and with the cover of the tray removed for clarity.
Figure 82A:
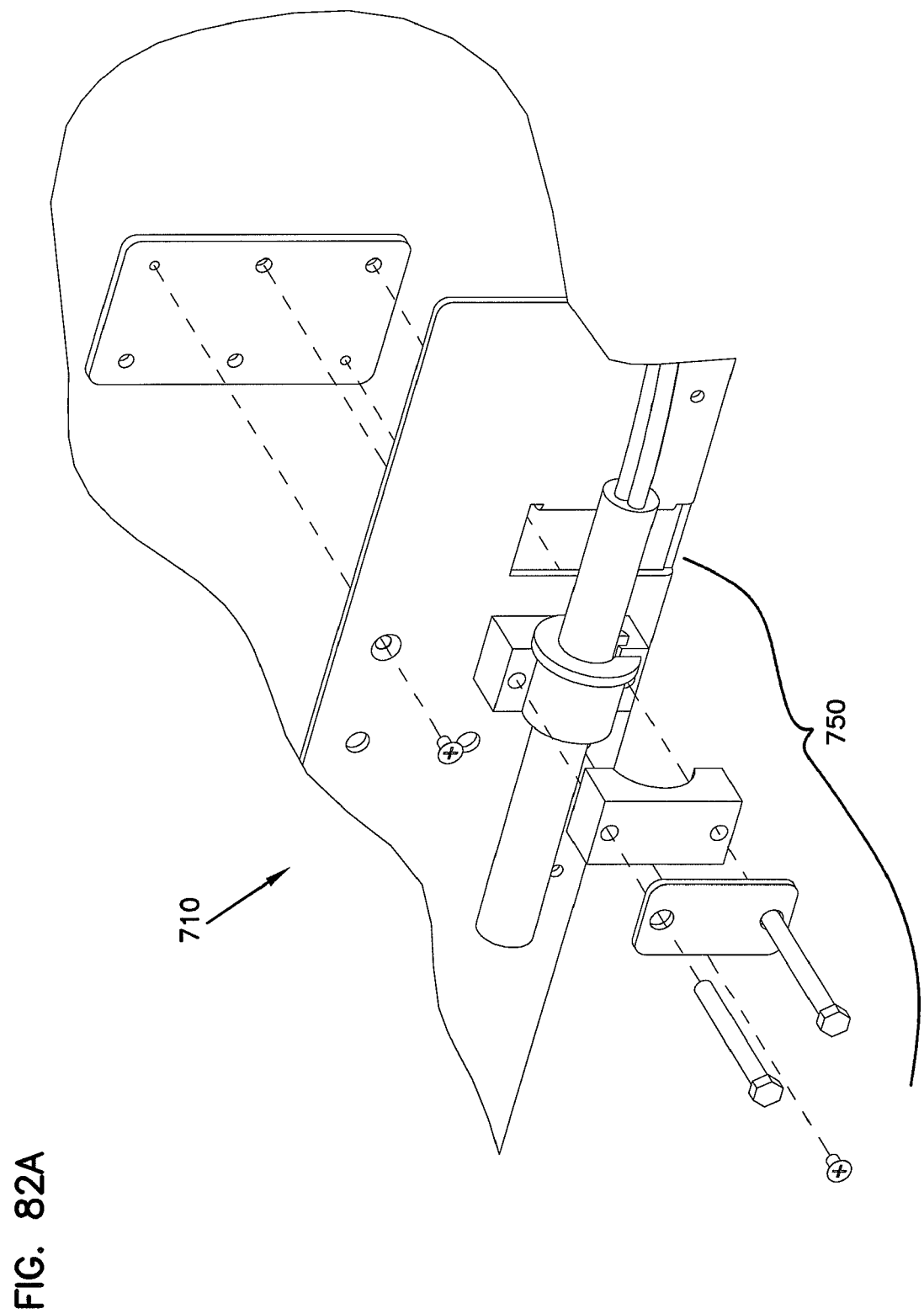
FIG. 82A illustrates a close-up view of a cable clamp assembly, the cable clamp assembly including features similar to the cable clamp shown in FIGS. 4-11.

The fourth, fifth, and sixth embodiments of the termination panels 310, 510, and 610, respectively, were discussed as having the option of including a cable clamp similar to cable clamp 52 located adjacent the rear opening of the panel (see FIGS. 9-11). A cable such as a multi-strand inter-facility cable 50 may be used for the incoming cables and may be clamped to the rear wall of the panels. The cable may be held to the panels by such a cable clamp. A version of a cable clamp 750 is shown in the seventh embodiment of the terminal panel 710 of FIGS. 78-85. FIG. 82A illustrates a close-up view of a cable clamp assembly 750. A cable clamp may also be included in the eighth embodiment of the panel 810 of FIGS. 86-87 and is shown on the ninth embodiment of the panel 910 of FIGS. 88-94.

Figure 80:
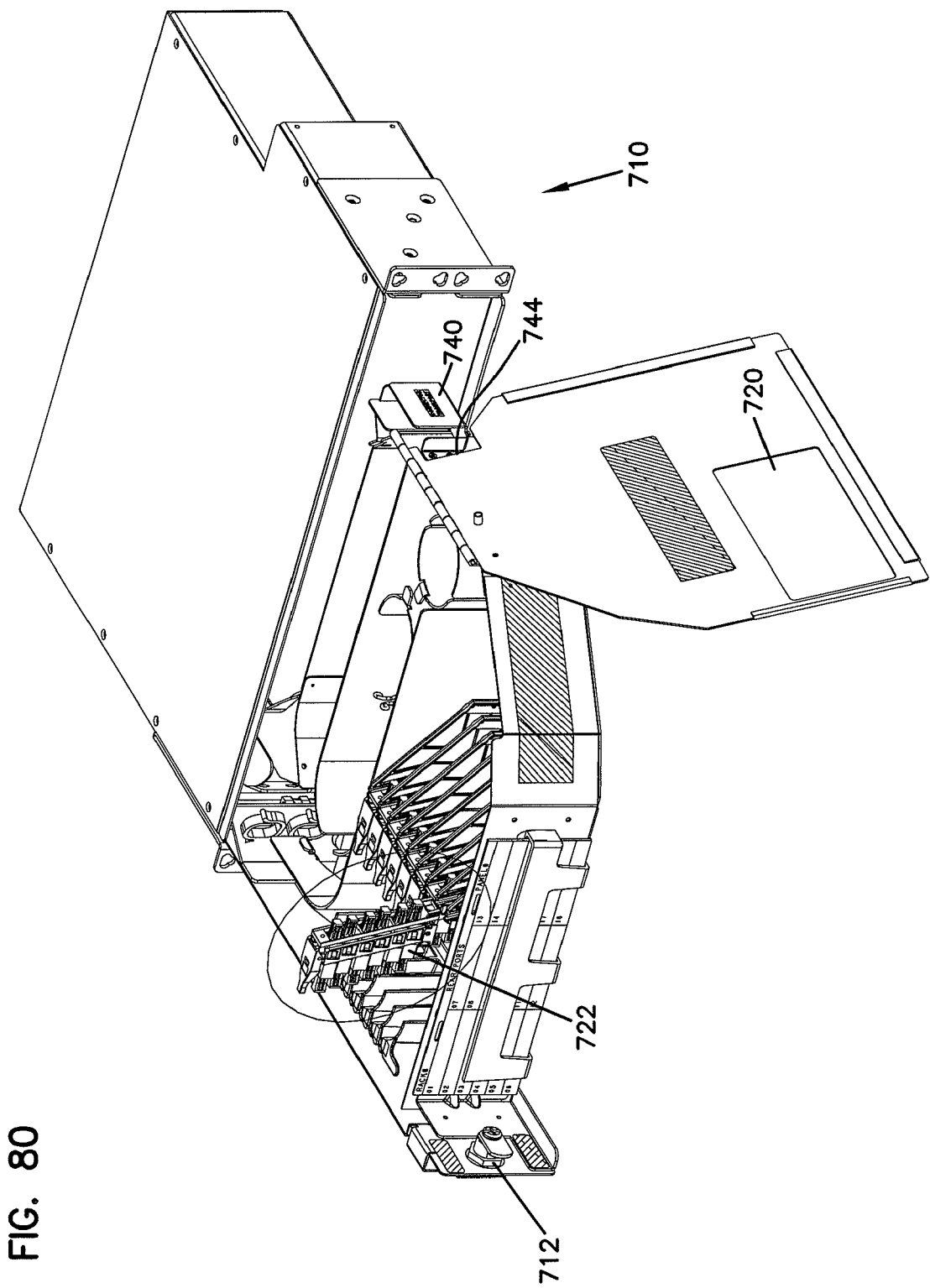
FIG. 80 is a front perspective view of the termination panel of FIG. 78, with the cover in an access position.
Figure 80A:
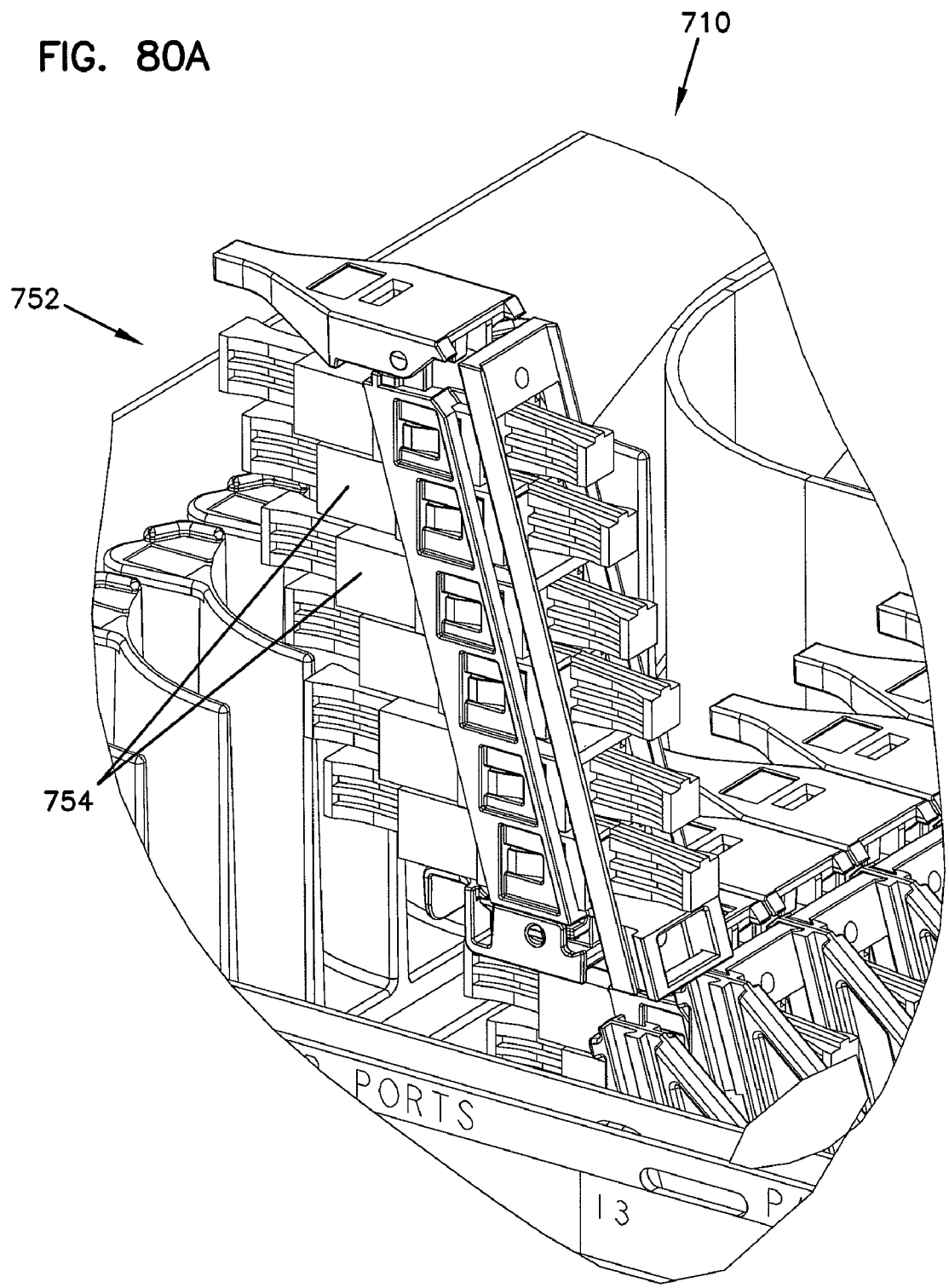
FIG. 80A illustrates a close-up view of a fiber optic adapter module configured for mounting within the termination panel of FIG. 78, the fiber optic adapter module including a plurality of SC-type fiber optic adapters.
Figure 80B:
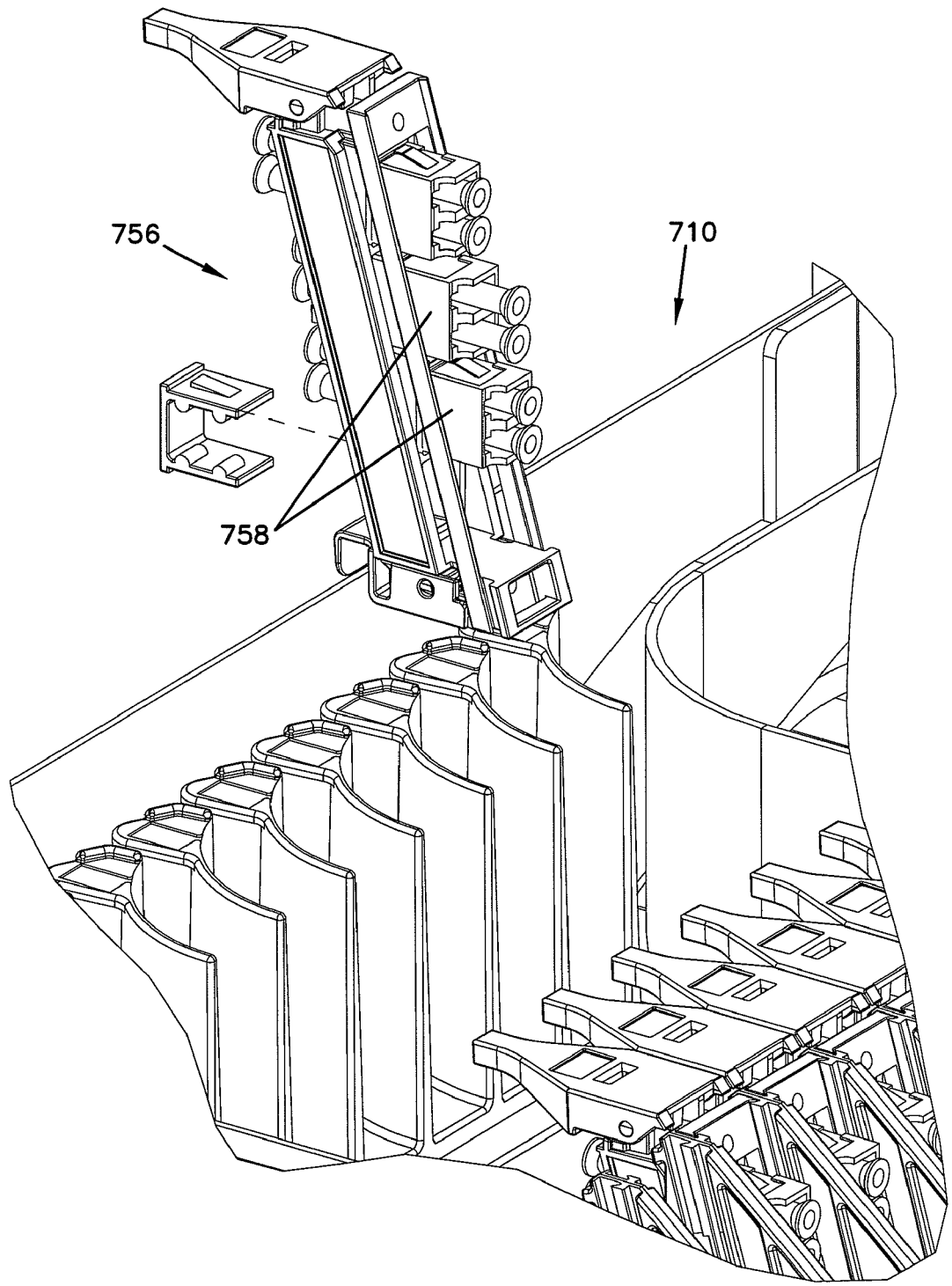
FIG. 80B illustrates a close-up view of an alternative embodiment of a fiber optic adapter module configured for mounting within the termination panel of FIG. 78, the fiber optic adapter module including a plurality of LC-type fiber optic adapters.
Figure 81:
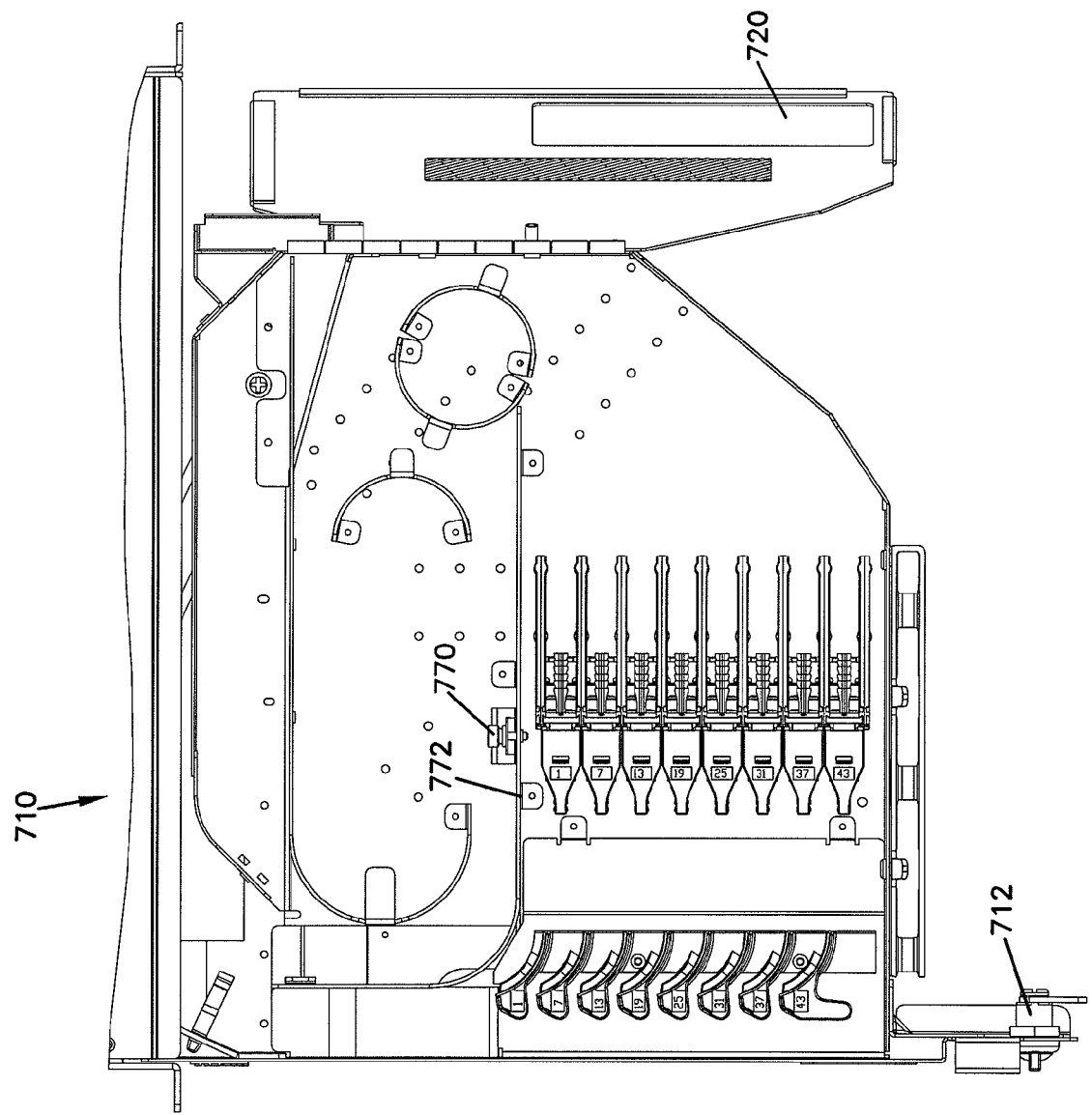
FIG. 81 is a top plan view of the termination panel of FIG. 80, with the cover of the tray in the access position.

As discussed previously for all of the first, second, third, fourth, and sixth embodiments of the termination panels, 10, 110, 210, 310, and 610, respectively, adapters mounted within the trays of the termination panels may be mounted in a series of parallel, vertically oriented modules. Different types or styles of fiber optic adapters may be used depending upon the type or style of fiber optic connector being terminated within the panels. FIG. 80A illustrates a close-up view of a fiber optic adapter module 752 configured for mounting within the termination panel 710 of FIG. 78 or within other embodiments of the termination panels, the fiber optic adapter module 752 including a plurality of SC-type fiber optic adapters 754. FIG. 80B illustrates a close-up view of an alternative embodiment of a fiber optic adapter module 756 configured for mounting within the termination panel 710 of FIG. 78 or within other embodiments of the termination panels, the fiber optic adapter module 756 including a plurality of LC-type fiber optic adapters 758.

Figure 83:
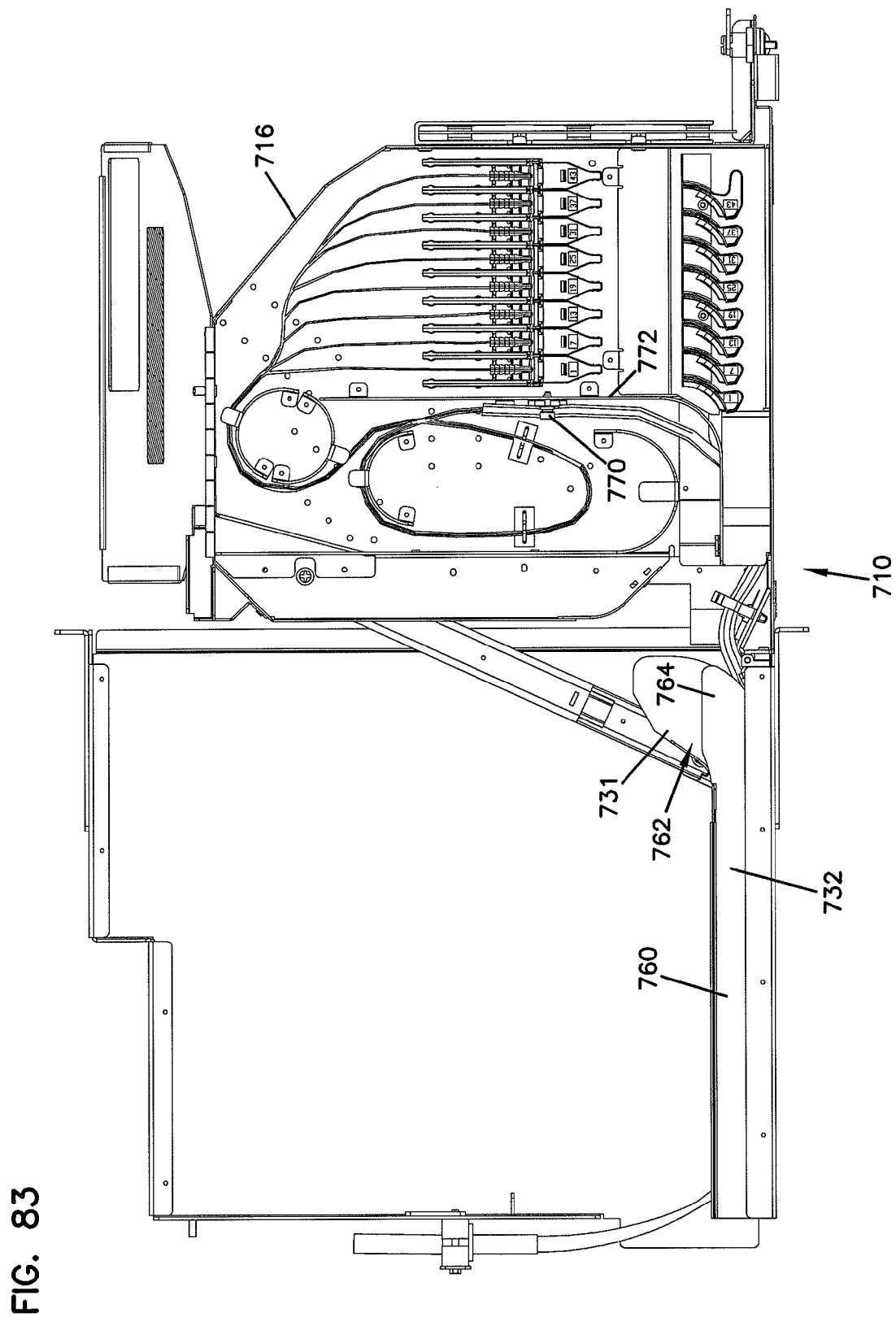
FIG. 83 is a top plan view of the termination panel of FIG. 78, with the tray in the open position, illustrating an example cable routing configuration similar to the configuration shown in FIG. 64.
Figure 84:
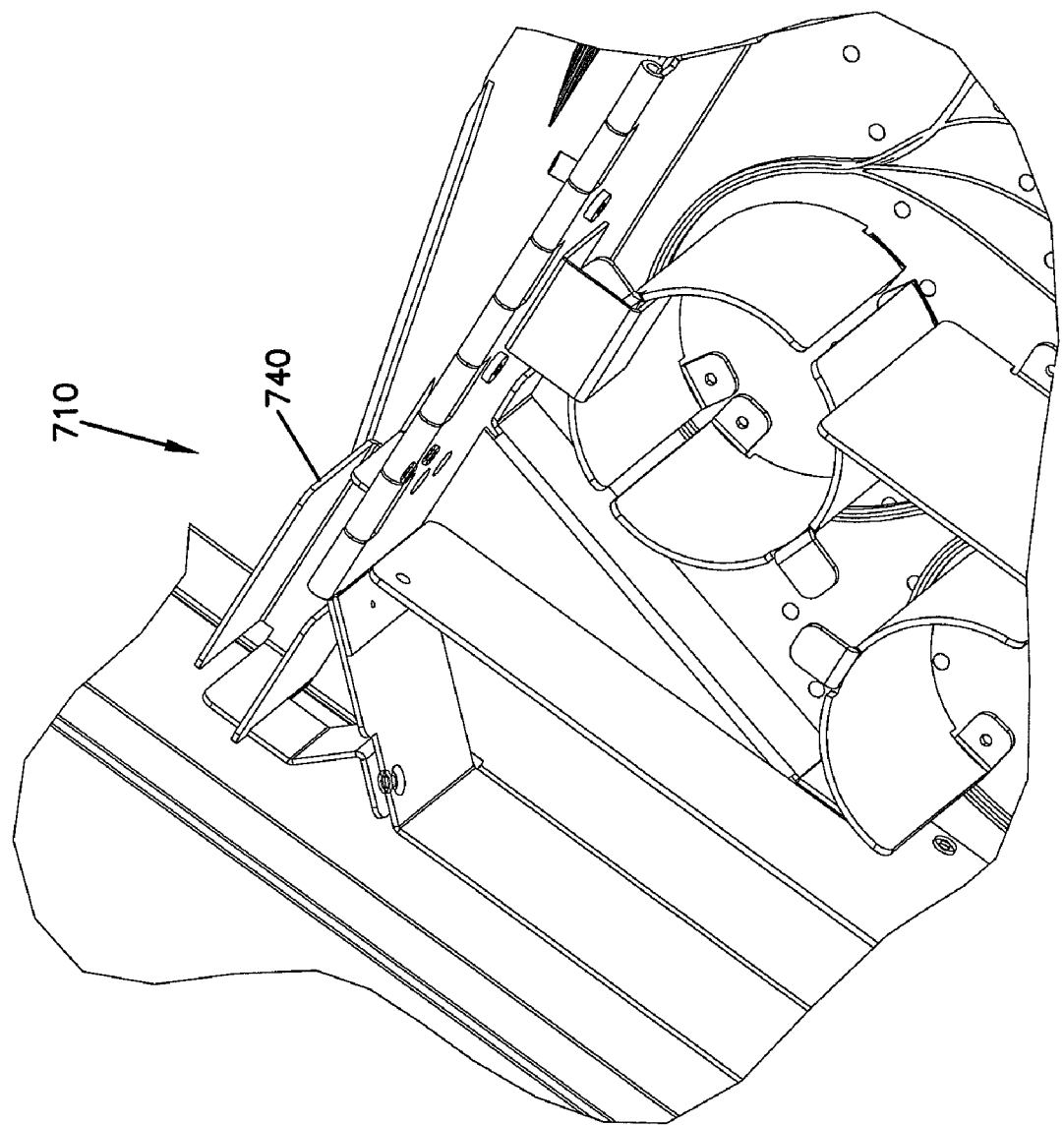
FIG. 84 illustrates a close-up view of a cable spool configured for mounting in the tray of the termination panel of FIG. 78.

Referring now to FIGS. 63 and 83, one of the differences between the fourth embodiment of the termination panel 310 and the seventh embodiment of the termination panel 710 is the shape of the bottom walls of the upper cable guide 422. The bottom wall 760 of the upper cable guide 732 in the seventh embodiment of the termination panel 710 does not define as large a curve adjacent the front portion 762 of the cable guide 732 as in the fourth embodiment of the termination panel 310. The portion 764 of the bottom wall 760 that protrudes toward the interior of the housing is reduced in length. In this manner, the bottom wall 760 provides greater amount of space to accommodate cabling as the tray 716 is pivoted between closed and open positions.

A similar variation is also included in the ninth embodiment of the termination panel 910. Please see FIG. 91 for an illustration of the revised bottom wall 960 of the upper cable guide 932.

Figure 78:
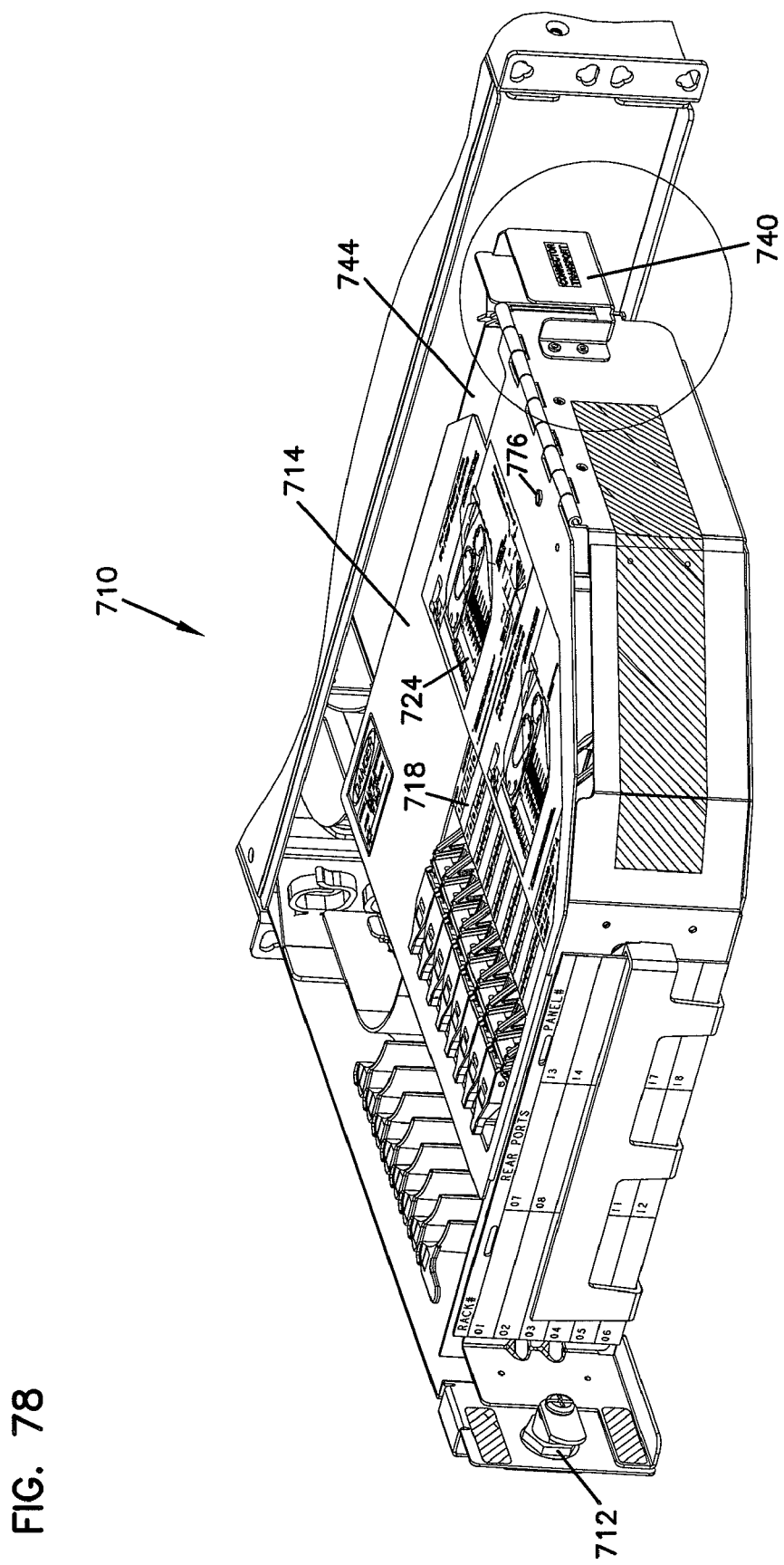
FIG. 78 is a partial front perspective view of a seventh embodiment of a termination panel according to the present disclosure, with the tray in the open position, the seventh embodiment of the termination panel including features similar to the fourth embodiment of the termination panel of FIGS. 53-64.
Figure 78A:
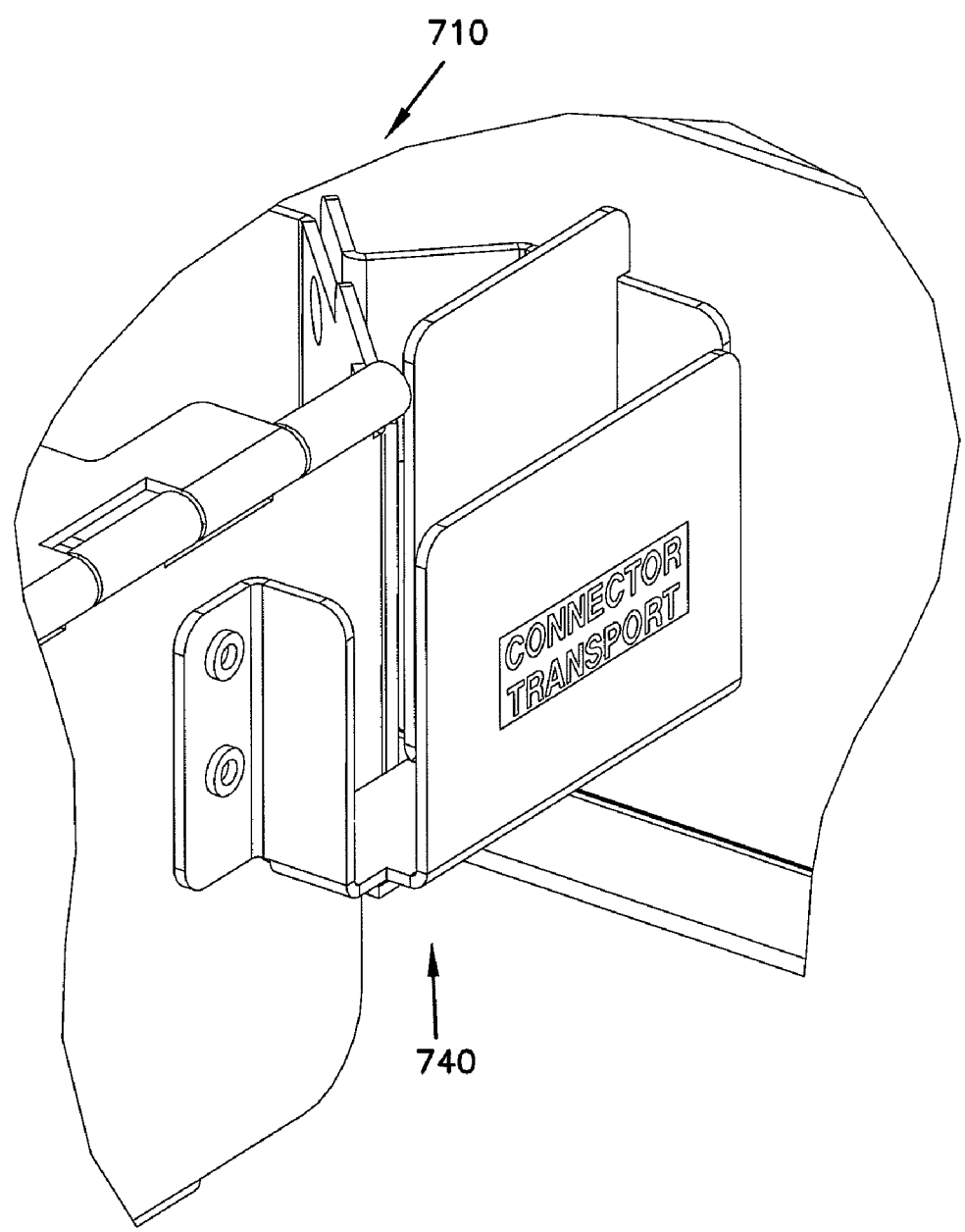
FIG. 78A illustrates a close-up view of a cable transporter, the cable transporter including features similar to the temporary cable clamp shown in FIGS. 15-17, 20-22, 24, 26, and 29.
Figure 79:
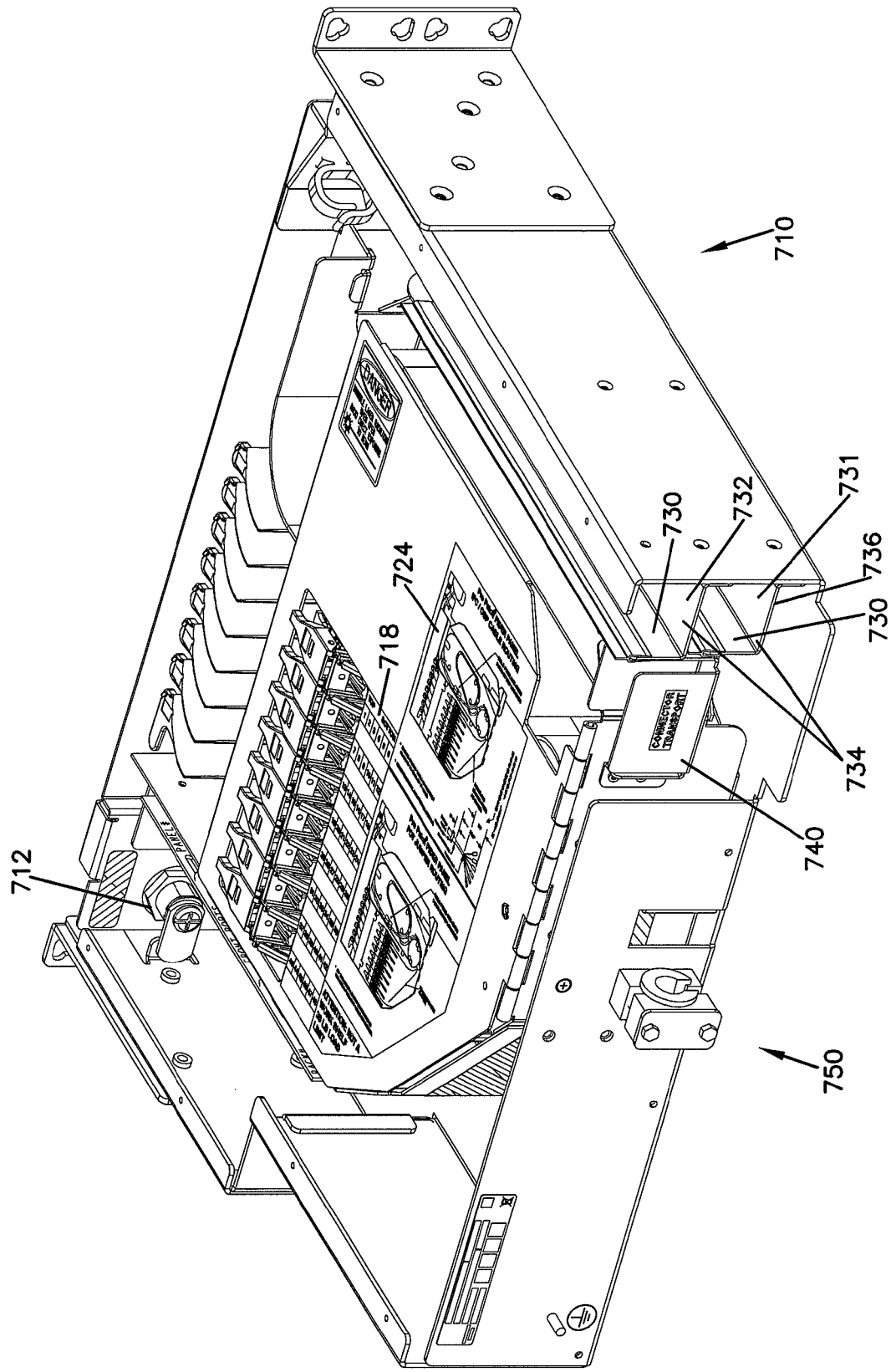
FIG. 79 is a rear perspective view of the termination panel of FIG. 78, with the tray in the closed position and with the top of the termination panel removed for clarity.

FIG. 83 is a top plan view of the termination panel 710 of FIG. 78, with the tray 716 in the open position. An example cable routing configuration is illustrated in FIG. 83 for the seventh embodiment of the termination panel 710 of FIGS. 78-85. It should be noted that the example cable routing configuration illustrated in FIG. 83 is similar to the configuration shown in FIG. 64 for the fourth embodiment of the termination panel 310.

Referring now to FIGS. 63 and 83, one of the differences between the fourth embodiment of the termination panel 310 and the seventh embodiment of the termination panel 710 is the replacement of one of the fingers (i.e., strain relief bracket) attached to the central bulkhead 384 in the fourth embodiment of the panel 310 with a strain relief spring clip 770 in the seventh embodiment of the panel 710. According to one embodiment of the strain relief spring clip 770 of the seventh embodiment, cables may be secured to the central bulkhead 772 using a spring clip and a thumb screw.

Figure 91:
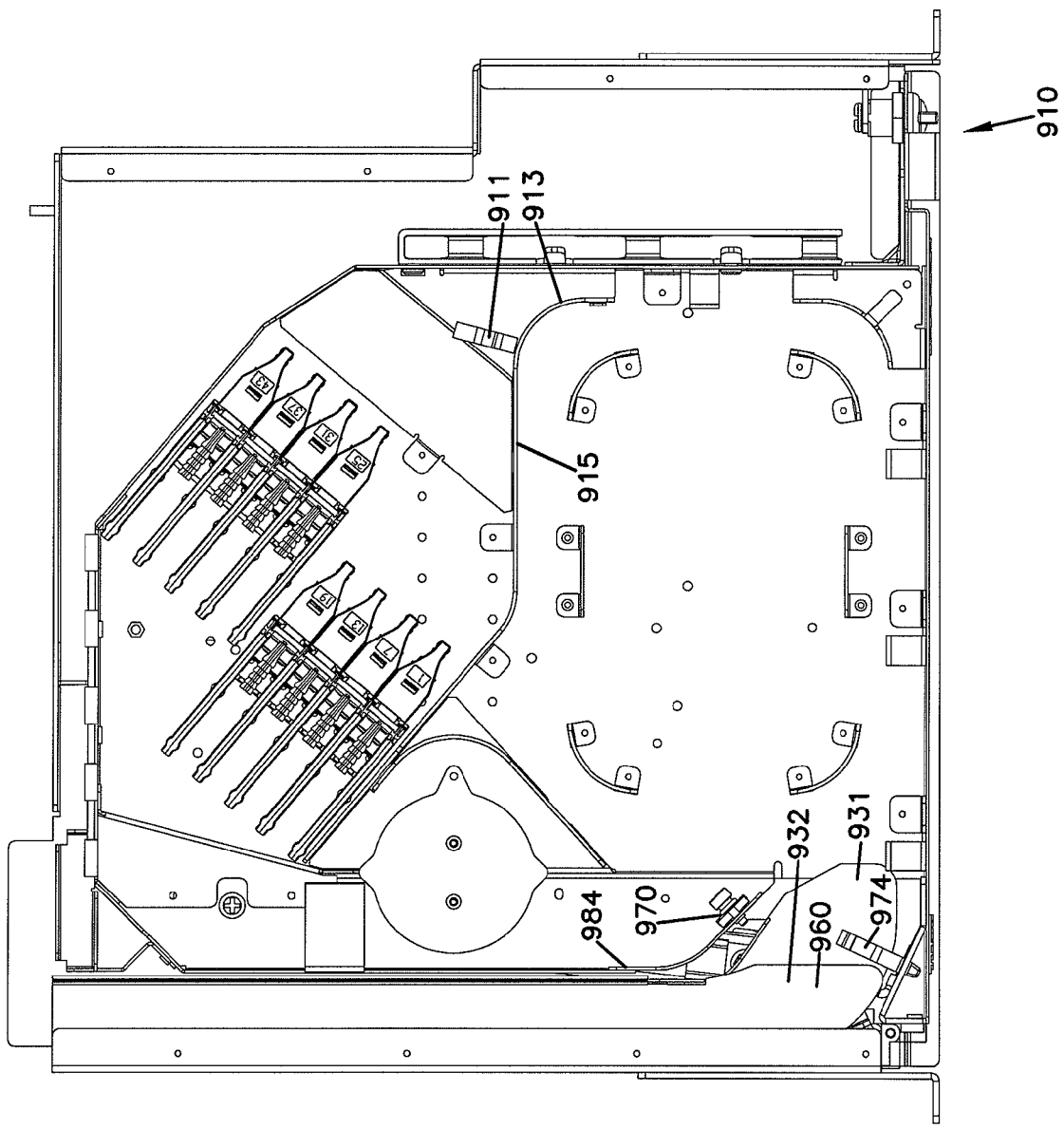
FIG. 91 is a top plan view of the termination panel of FIG. 90, with the cover of the tray in the access position.
Figure 92:
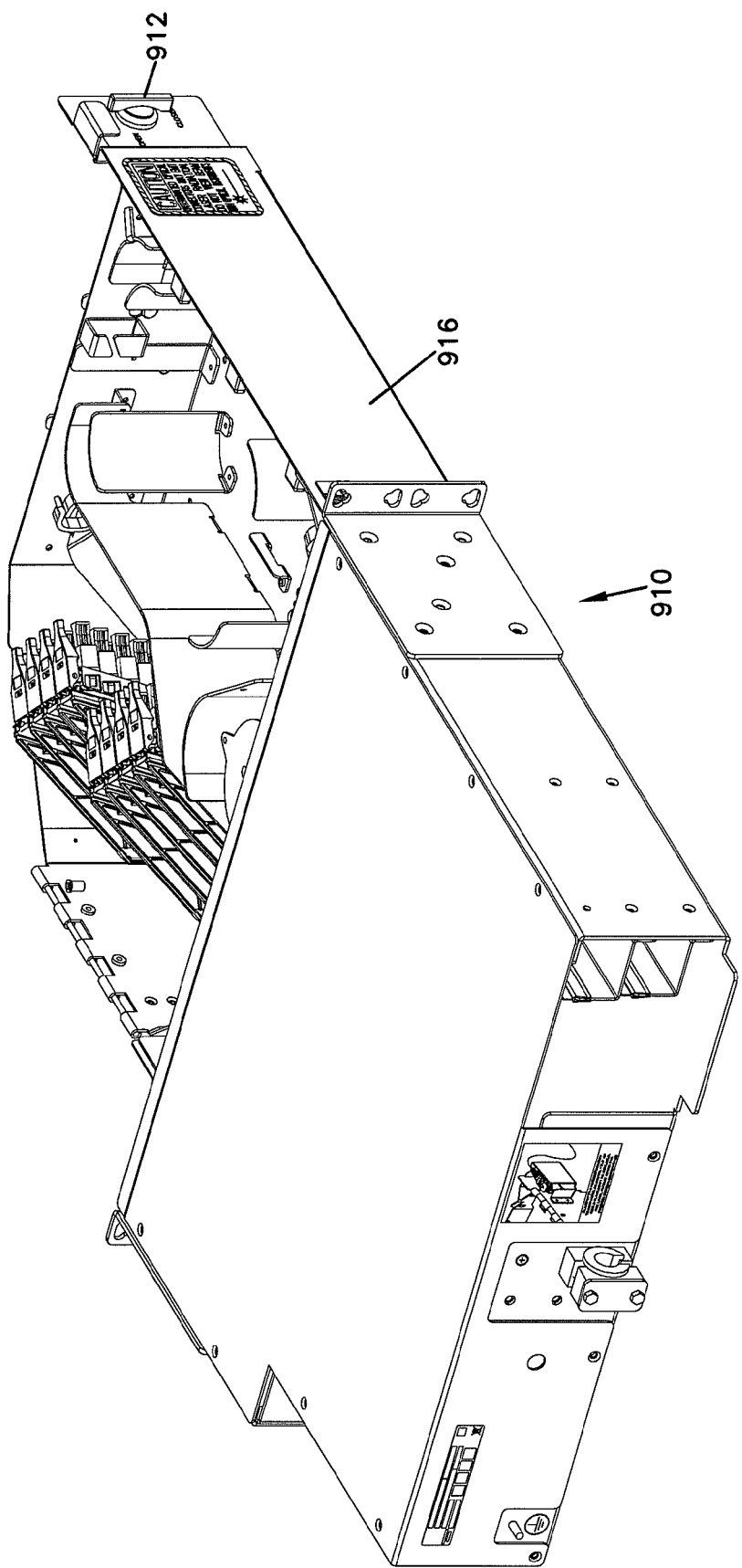
FIG. 92 is a rear perspective view of the termination panel of FIG. 88, with the tray in the open position and with the cover of the tray removed for clarity.

A similar strain relief spring clip 970 is also mounted in the ninth embodiment of the termination panel 910. Referring to FIG. 91, the strain relief spring clip 970 is mounted to the second sidewall 984 of the tray 916 and is positioned adjacent the cable guides 931, 932 and the cable rings 974 when the tray 916 is in the closed configuration. It should be noted that the spring clip 770 shown is only one example of a securement structure that might be used to attach the cables to a sidewall of the tray 716. Other types of securement devices may be used.

In all of the embodiments of the termination panel, fasteners 776 (e.g., PEM type fasteners) may be mounted on various parts of the termination panel 710 for the purpose of attaching grounding straps or cables to the panel 710. For example, according to one embodiment, the cover 714 and the tray 716 may include PEM type fasteners (see FIG. 78) for grounding the cover 714 to the tray 716.

Figure 86:
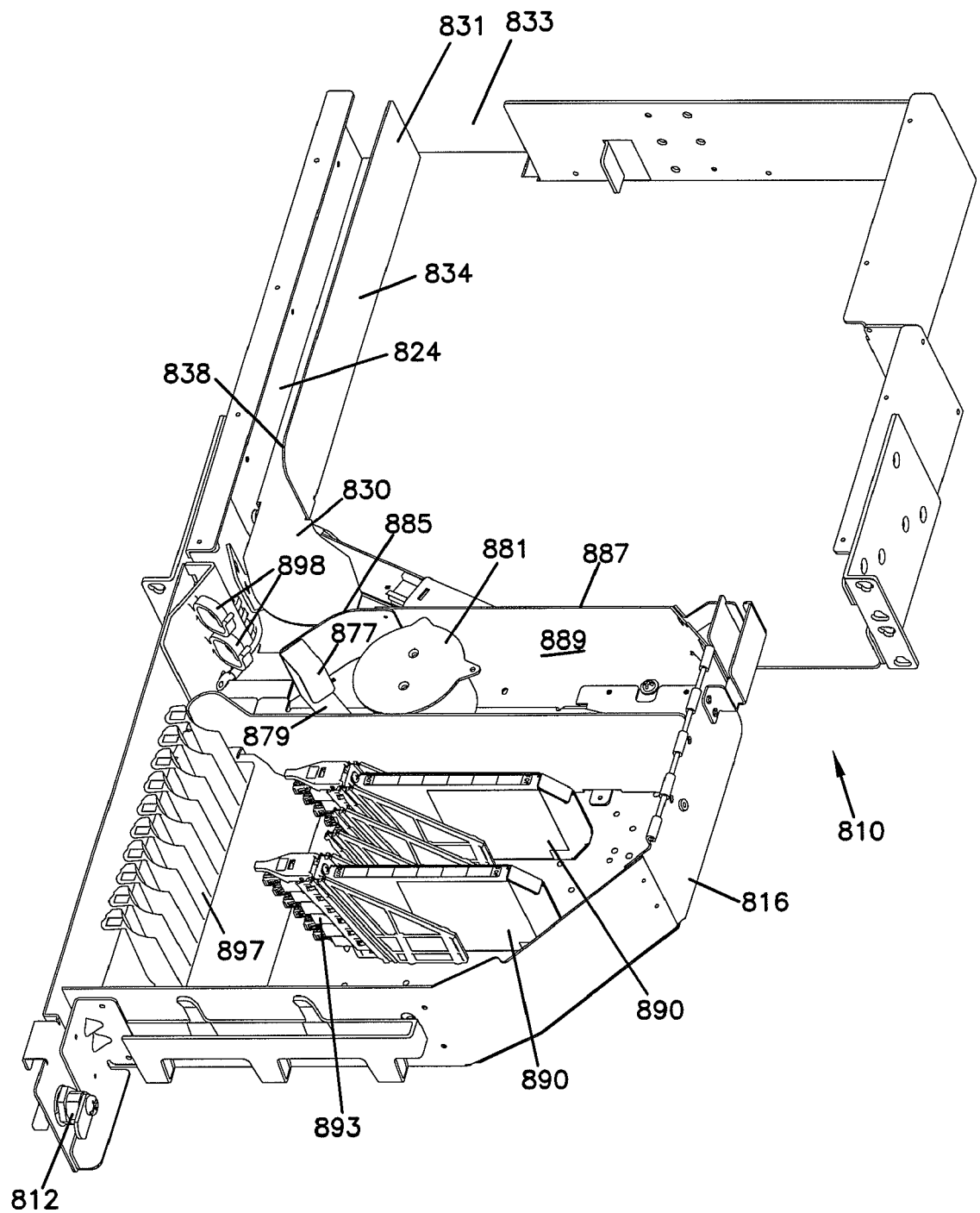
FIG. 86 is a front perspective view of an eighth embodiment of a termination panel according to the present disclosure, with the tray in the open position and with the cover of the tray and the top of the termination panel removed for clarity, the eighth embodiment of the termination panel including features similar to the fifth embodiment of the termination panel of FIGS. 65 and 65A.
Figure 87:
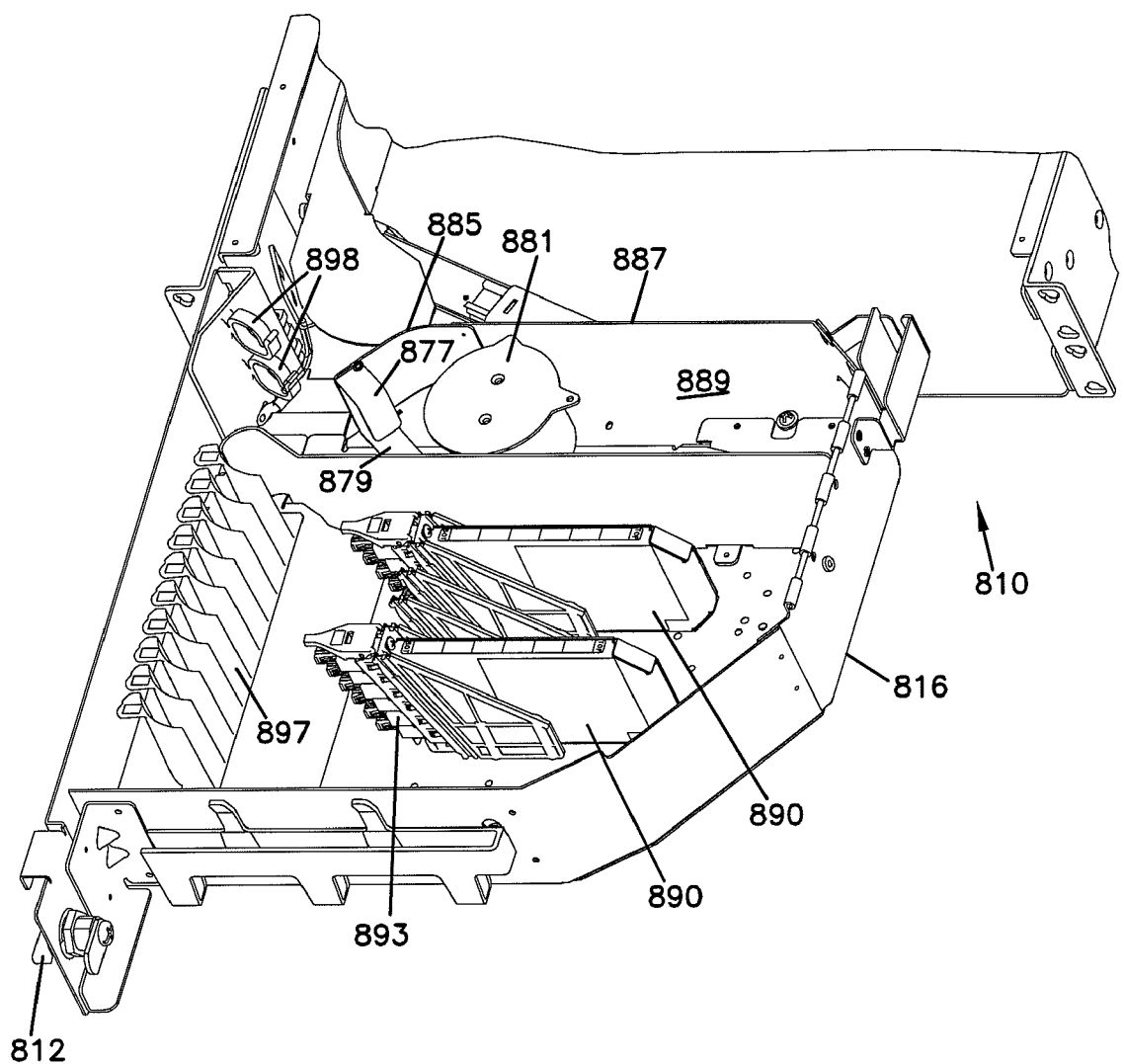
FIG. 87 is a close-up view of the tray of the termination panel of FIG. 86.

FIGS. 86-87 illustrate an eighth embodiment of a termination panel 810 according to the present disclosure. The eighth embodiment of the termination panel is similar to the fifth embodiment of the termination panel 510 of FIGS. 65 and 65A, except for a number of differences which will be discussed herein.

As in the fifth embodiment of the termination panel 510 of FIGS. 65 and 65A, the termination panel 810 is configured to house telecommunications modules 890 instead of adapter modules (that are configured to simply mate two fiber optic connectors) in the cable connection area. The telecommunications modules 890 are slidably disposed between parallel walls 891 as in the panel 510 of FIGS. 65 and 65A. The telecommunication modules 890, as discussed previously, can be configured to house different types of fiber optic equipment including couplers, splitters, combiners, wave division multiplexers, etc. The telecommunications modules 890 depicted each includes a plurality of connection locations 892 defined by fiber optic adapters 893. Adapters 893 define connection locations 894 for receiving connectors on the ends of fiber optic cables. The opposite back ends 895 of the adapters 893 are disposed within the telecommunications modules 890 and are configured to receive fiber optic connectors associated with the internal circuitry of the telecommunications modules 890. The signal entry and exit points are both located at the front portion 896 of the telecommunications modules 890 and are provided by the adapters 893.

Although the termination panel is shown with two telecommunications modules 890 mounted thereon, other numbers are certainly possible.

For further description relating to the configuration of modules 890 and the types of optical equipment that may be housed within the modules 890, please refer to U.S. Pat. Nos. 6,556,763 and 7,142,765, the entire disclosures of which are incorporated herein by reference. Examples of telecommunications modules that are suitable for use in the panel are available from ADC Telecommunications, Inc. under the Model Name MicroVAM (Value-Added Module).

The cable routing for the embodiment of the panel 810 shown in FIGS. 86 and 87 is similar to the cable routing shown in FIG. 64. However, since the adapters 893 mounted to the telecommunications modules 890 are used to both input a signal and output a signal, instead of cables leading to the rear ends of the adapters 893, connectorized cables will enter and exit the adapters from the same, front side of the adapters 893. Both the incoming and outgoing cables will go through the fingers 897. Also, both the incoming and the outgoing cables will go through the cable rings 898. A slack storage area 889 is provided between a first bulkhead 887 defining a curved portion 885 and a central bulkhead 883. The slack storage area 889 includes a spool 881 for organizing cables. Cables enter and exit the slack storage area 889 through an opening 879 located adjacent the curved portion 885 of the first bulkhead 887. A cable management finger 877 may be provided at the opening 879.

In the version of the termination panel 810 shown in FIGS. 86 and 87, since the incoming cables and the outgoing cables enter and exit through the same parts of the panel 810 and do not have to be kept separate from each other, only one cable guide 831 is provided adjacent the rear opening 833. The cable guide 831 defines a deep trough 824 for guiding both incoming and outgoing cables. The cable guide 831 defines a bottom wall or platform 830 and a vertical wall 834. A cable pusher 840 may be slidably inserted over the top edge 838 of the vertical wall 834 to help push portions of incoming and outgoing cables into the trough 824 as discussed previously. The cable pusher provides a way to close up the gap above the vertical wall 834 of the cable guide 831.

The cover 814 of the tray 816 may include an opening that provides visibility to the modules 890 and to information located on the modules 890 to determine the types of modules 890 that are within the tray 816 without having to open the cover 814.

FIG. 88-94 illustrate a ninth embodiment of a termination panel 910 according to the present disclosure. The ninth embodiment of the termination panel 910 is similar to the sixth embodiment of the termination panel 610 of FIGS. 66-77, except for a number of differences which will be discussed herein.

Figure 90:
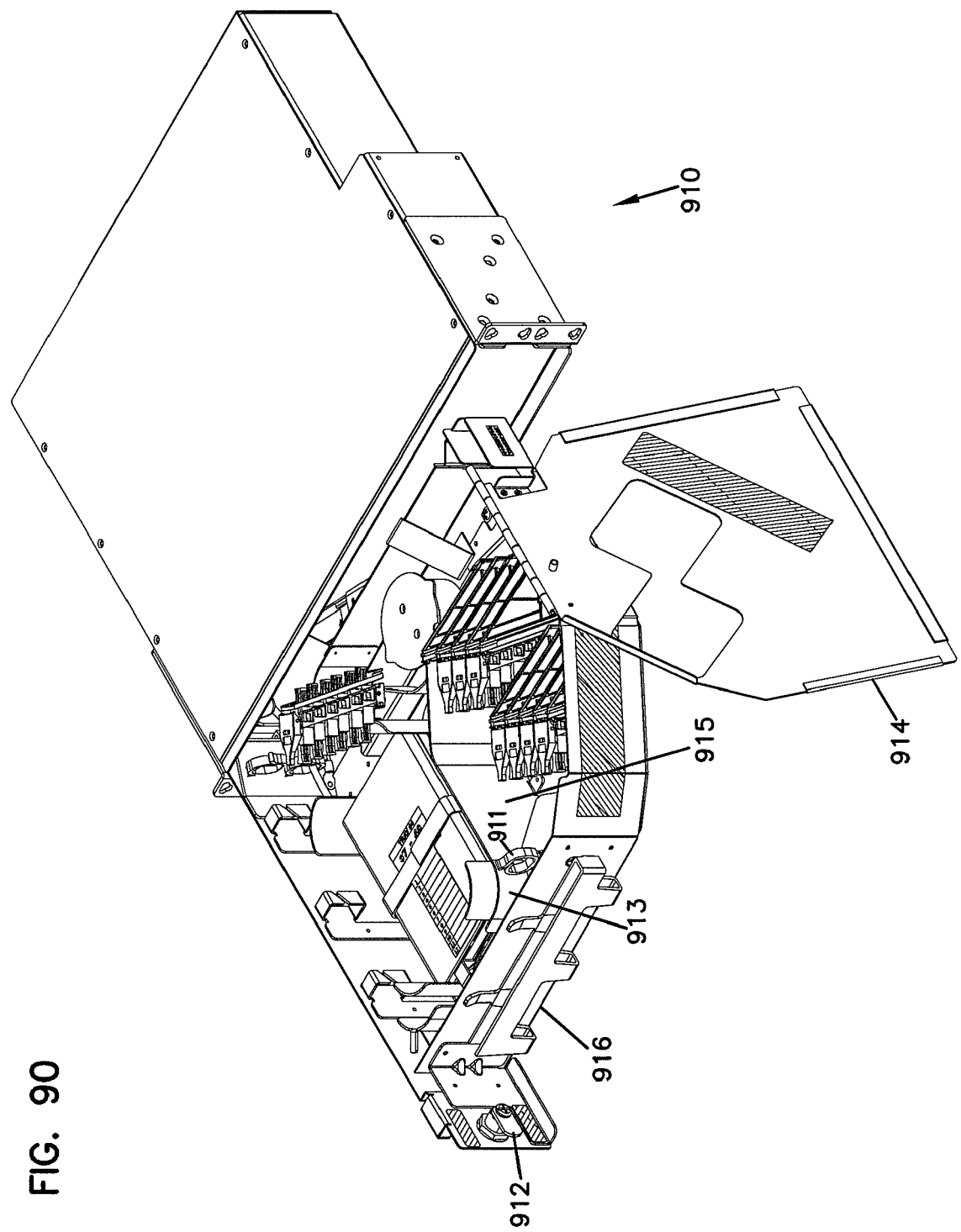
FIG. 90 is a front perspective view of the termination panel of FIG. 88, with the cover in an access position.

Now referring to FIG. 77 and FIG. 90, one of the differences between the sixth embodiment of the termination panel 610 and the ninth embodiment is the addition of a cable ring 911 to the curved portion 913 of the bulkhead 915 in the ninth embodiment of the termination panel 910 (please see FIG. 77 and curved portion 650 of bulkhead 640 of panel 610). As cables coming from the adapters enter the cable path defined between the first sidewall 917 and the curved bulkhead 915, the outgoing cables are supported by the cable ring 911.

Figure 88:
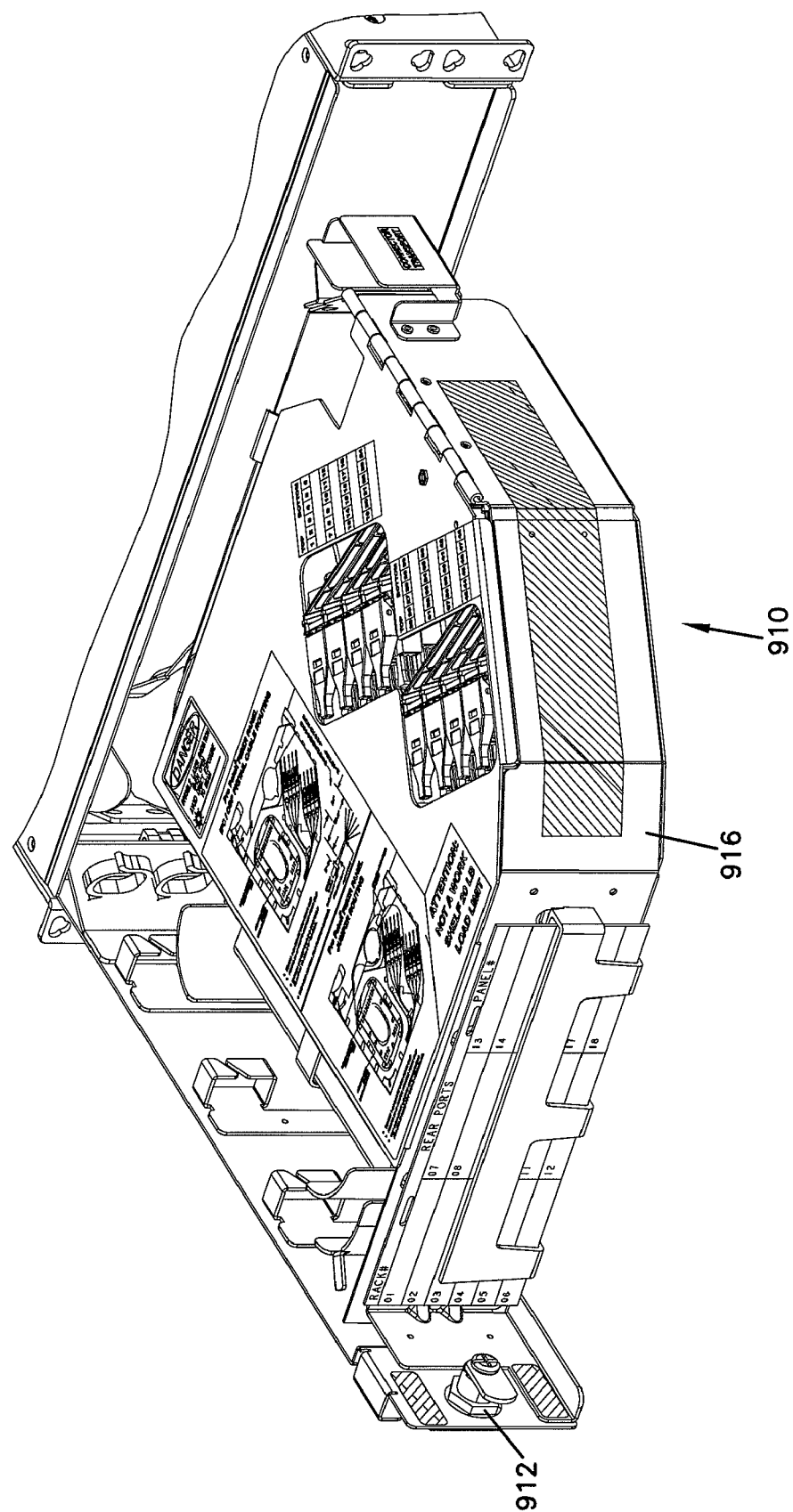
FIG. 88 is a partial front perspective view of a ninth embodiment of a termination panel according to the present disclosure, with the tray in the open position, the ninth embodiment of the termination panel including features similar to the sixth embodiment of the termination panel of FIGS. 66-77.
Figure 88A:
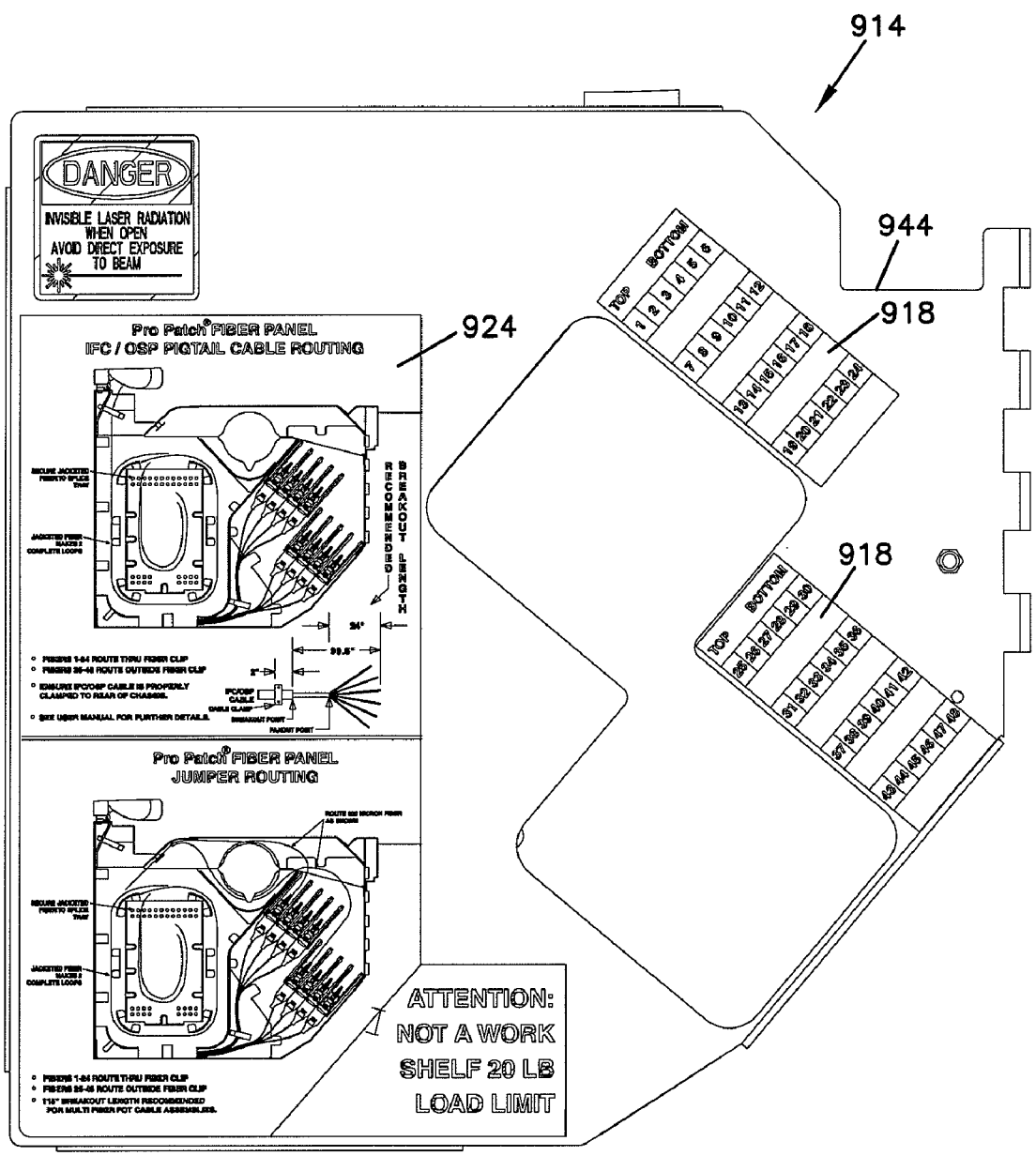
FIG. 88A illustrates the cover of the tray of the termination panel of FIG. 88 in isolation.
Figure 89:
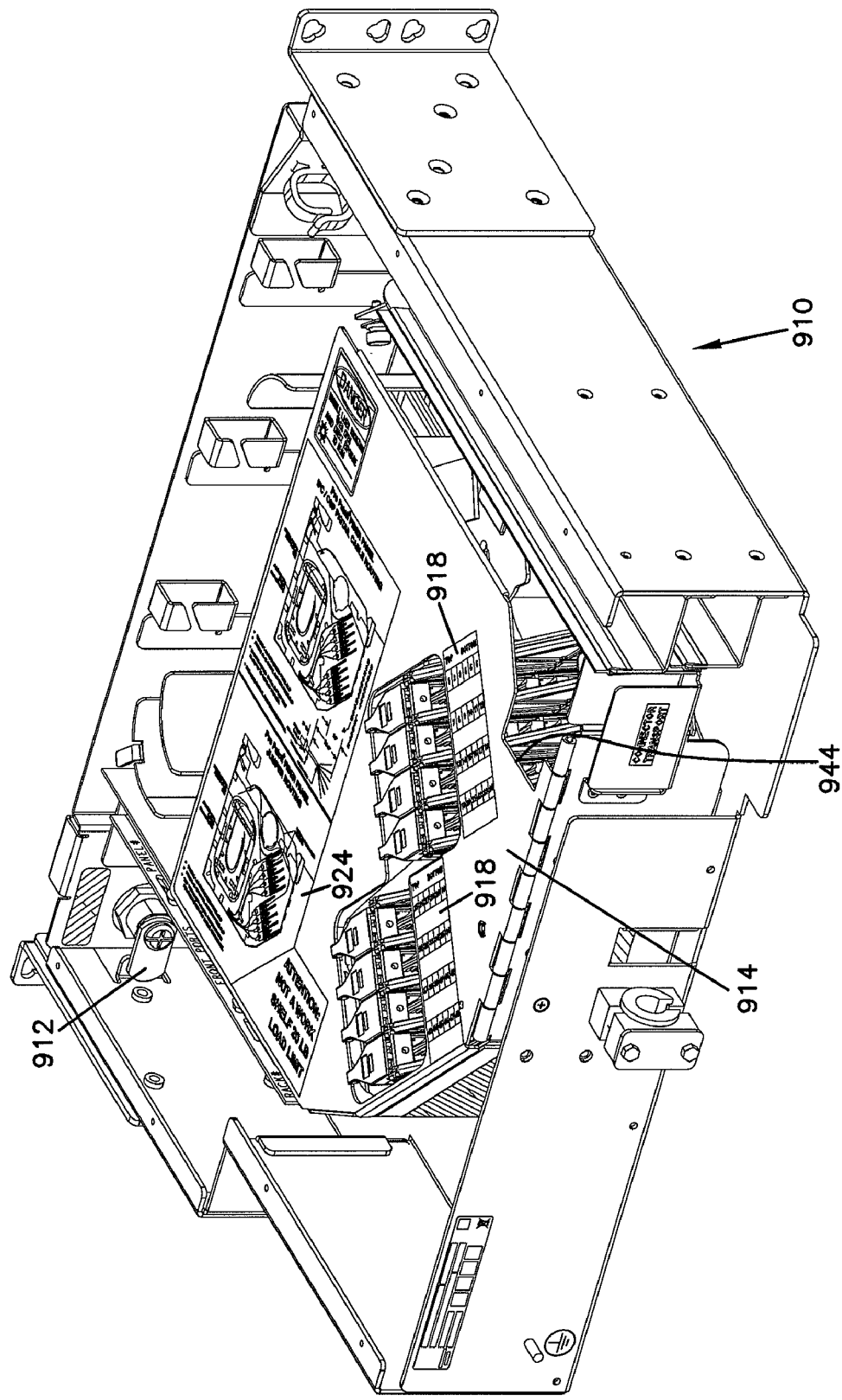
FIG. 89 is a rear perspective view of the termination panel of FIG. 88, with the tray in the closed position and with the top of the termination panel removed for clarity.
Figure 93:
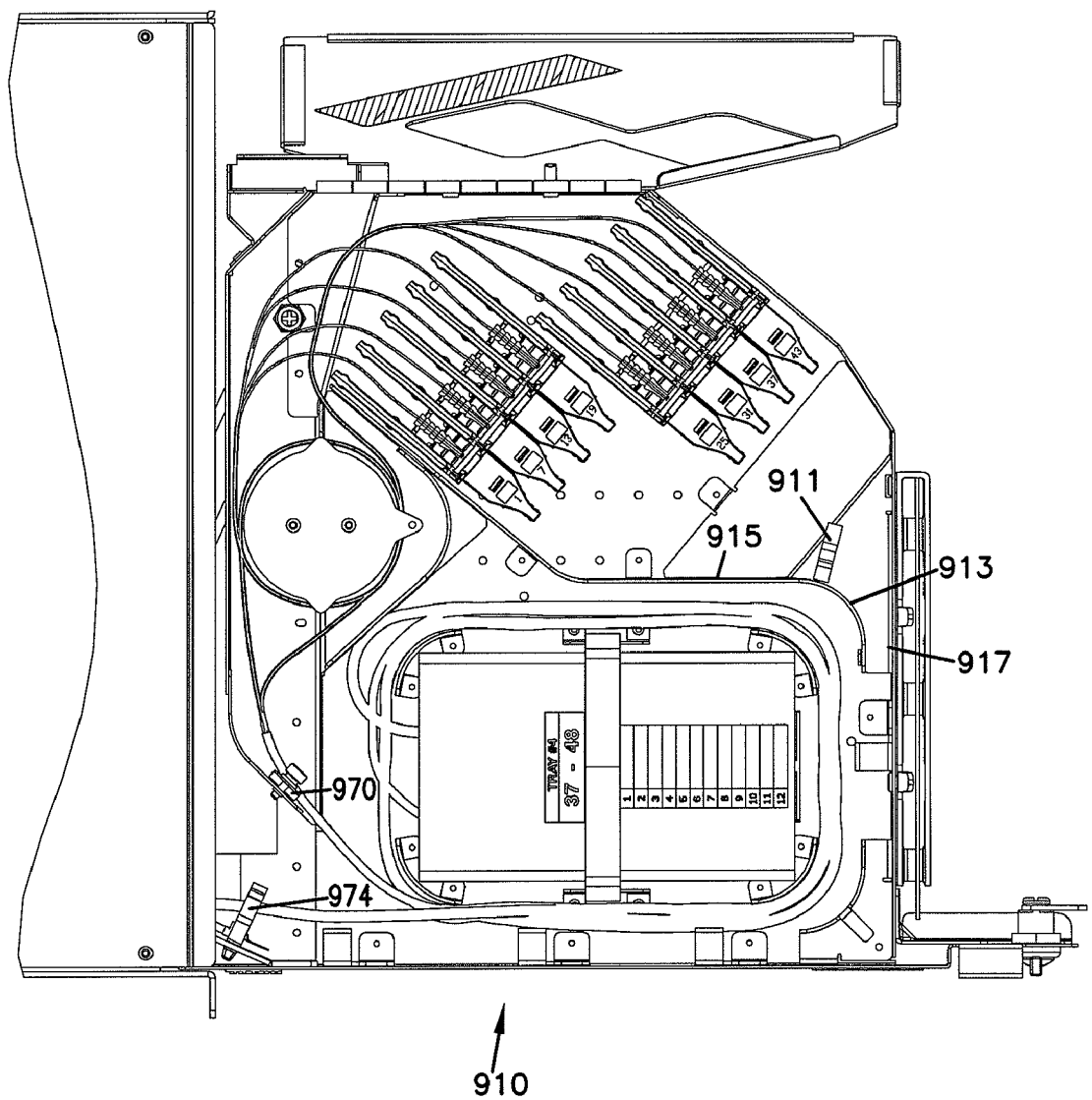
FIG. 93 is a top plan view of the termination panel of FIG. 88, with the tray in the open position, illustrating an example cable routing configuration similar to the configuration shown in FIG. 77.
Figure 94:
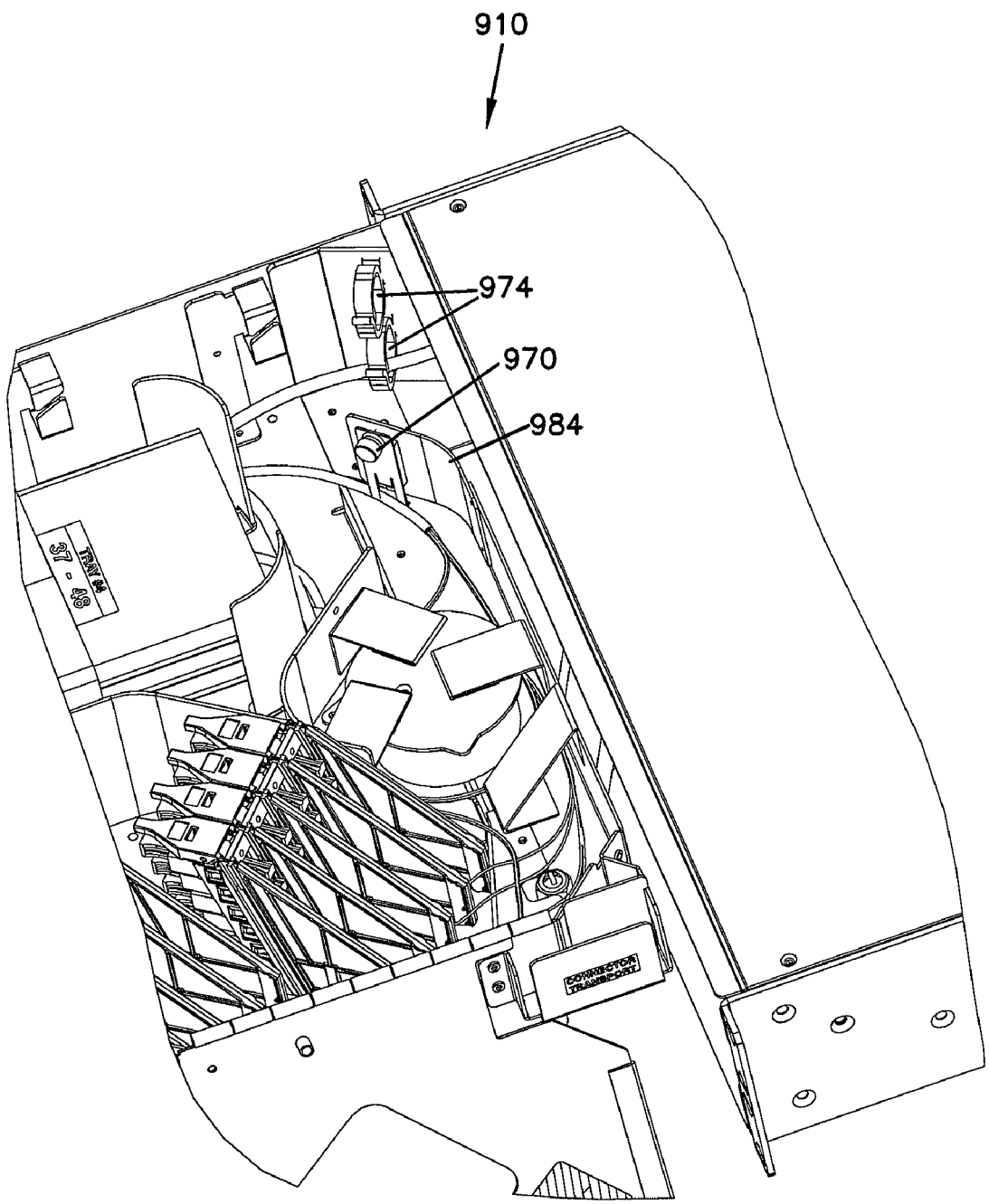
FIG. 94 illustrates a close-up view of a cable spool and fiber optic adapter modules configured for mounting in the tray of the termination panel of FIG. 88.

FIG. 93 is a top plan view of the termination panel 910 of FIG. 88, with the tray 916 in the open position. An example cable routing configuration is illustrated in FIG. 93 for the ninth embodiment of the termination panel 910 of FIGS. 88-94. It should be noted that the example cable routing configuration illustrated in FIG. 93 is similar to the configuration shown in FIG. 77 for the sixth embodiment of the termination panel 610.

FIGS. 95-99 is an exploded view of a cable management bracket 1000 configured for mounting to any of the termination panels illustrated in FIGS. 53-94. The cable management bracket 1000 manages cables entering and exiting the termination panels through the rear opening of the housing of the panels.

The cable management bracket 1000 includes a mounting plate 1002 (FIG. 96) that is attached to the second sidewall of the housing adjacent the rear opening of the housing. The mounting plate 1002 and the housing include corresponding mounting holes 1004 for receiving fasteners 1006 to attach the mounting bracket 1000 to the housing.

Figure 95:
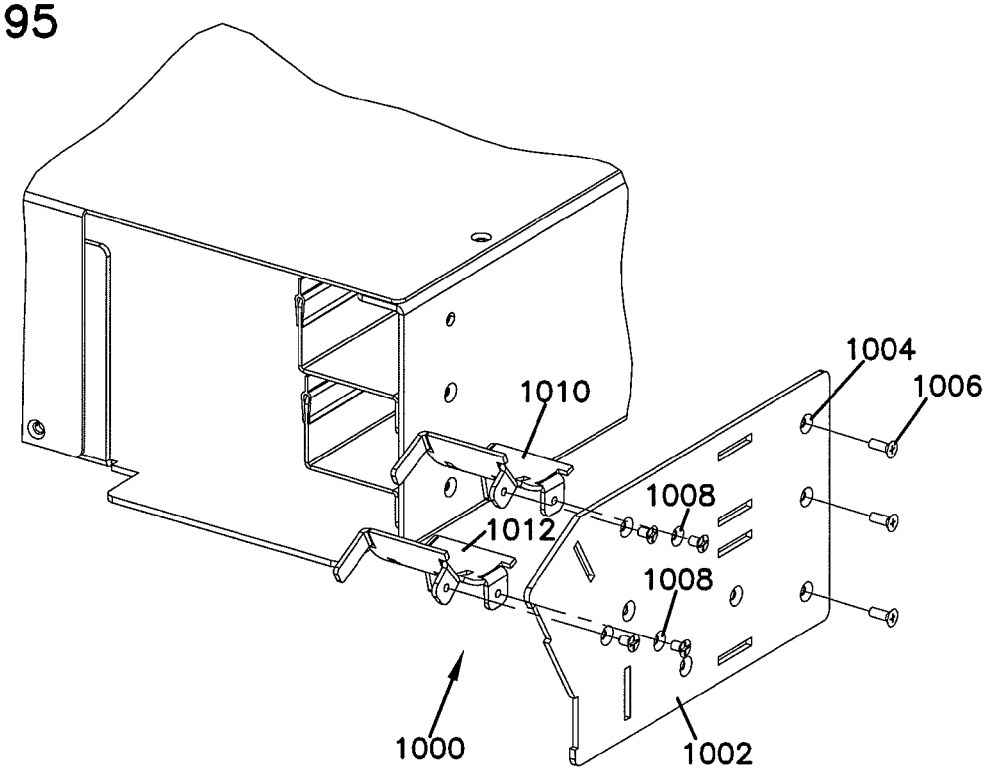
FIG. 95 is an exploded view of a cable management bracket configured for mounting to any of the termination panels illustrated in FIGS. 53-94, the cable management bracket for managing cables entering and exiting the termination panel through the rear opening.
Figure 96:
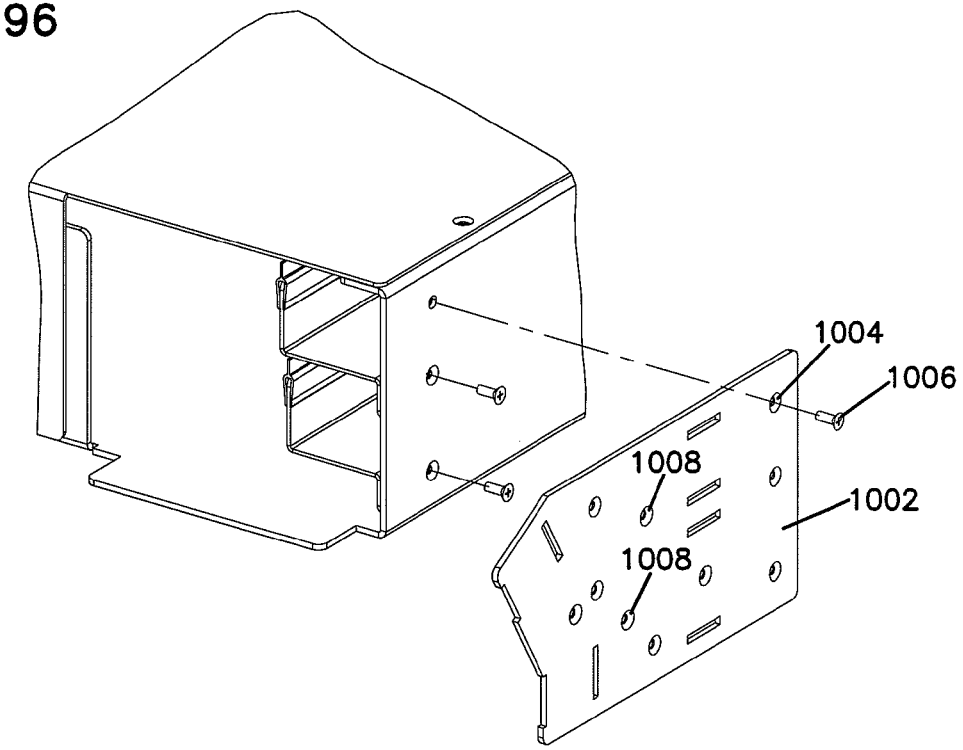
FIG. 96 illustrates a mounting plate of the cable management bracket of FIG. 95.

The mounting plate 1002 also includes radius limiter mounting holes 1008 for attaching radius limiters 1010, 1012 to the mounting plate 1002. As shown in FIG. 95, the radius limiters 1010, 1012 are attached to the mounting plate 1002 so as to be located behind the rear opening of the housing. In this manner, the radius limiters 1010, 1012 can guide cables coming in and/or out of the termination panel. The mounting plate 1002 includes a plurality of radius limiter mounting holes 1008 and in various positions such that the radius limiters 1010, 1012 may be removably mounted in different configurations, depending upon the desired routing.

Figure 97:
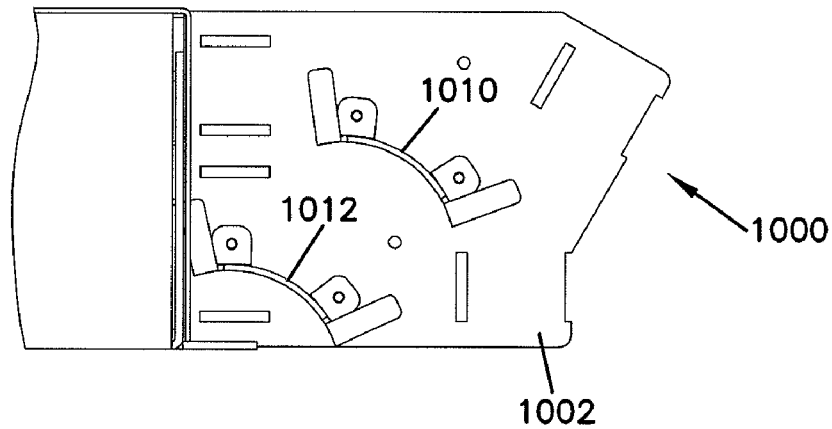
FIG. 97 illustrates one of the possible configurations for configuring the radius limiters on the cable management bracket of FIG. 95 for the incoming and outgoing cables.
Figure 98:
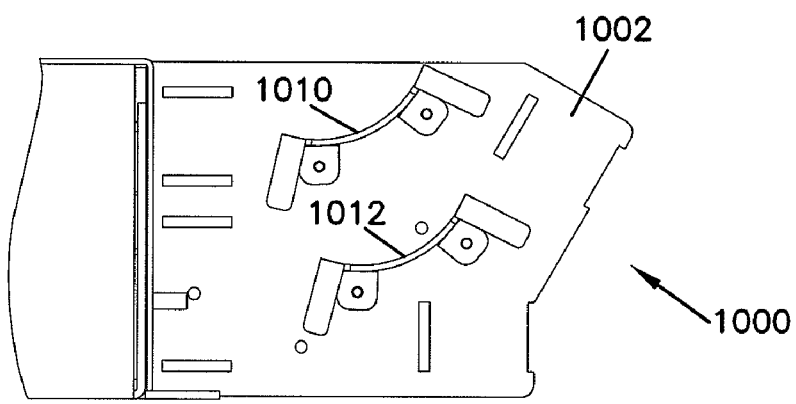
FIG. 98 illustrates another possible configuration for configuring the radius limiters on the cable management bracket of FIG. 95 for the incoming and outgoing cables.
Figure 99:
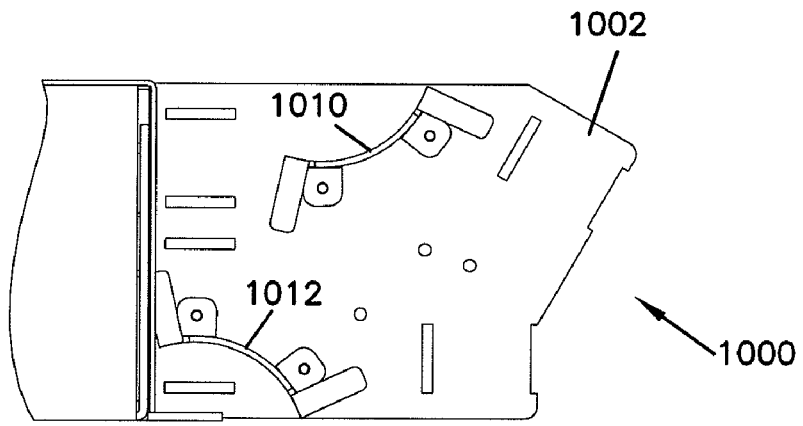
FIG. 99 illustrates yet another possible configuration for configuring the radius limiters on the cable management bracket of FIG. 95 for the incoming and outgoing cables.

FIGS. 97-99 illustrates a number of the different possible cable routing configurations that can be set up with the radius limiters 1010, 1012 of the cable management bracket 1000.

In the configuration shown in FIG. 97, the radius limiters 1010, 1012 are mounted and arranged to route both incoming and outgoing cables downwardly. In the configuration shown in FIG. 98, the radius limiters 1010, 1012 are mounted and arranged to route both incoming and outgoing cables upwardly. In the configuration shown in FIG. 99, the radius limiters 1010, 1012 are mounted and arranged to route the incoming cable downwardly and the outgoing cable upwardly. In the configuration shown in FIG. 99, the first upper radius limiter 1010 directs the outgoing cable upwardly, while the second lower radius limiter 1012 directs the incoming cable downwardly.

It should be noted that although three possible cable routing arrangements are shown in FIGS. 97-99, other routing arrangements using the radius limiters 1010, 1012 are certainly possible, depending upon the desired cable paths.

Furthermore, even though only two radius limiters are shown as being used with the cable management bracket 1000 in the depicted embodiment, other numbers are possible.

It is anticipated that all of the panels described herein may be modified to provide connection locations for high speed copper cables as well as optical fiber cables. As copper cables are used to transmit data at higher speed, bend radius rules similar to those for optical fiber cables may need to be enforced within the network. As with optical fibers, it is desirable to have higher densities of connections within copper panels as well.

The above specification, examples and data provide a complete description of the manufacture and use of the inventive aspects of the disclosure. Since many embodiments of the disclosure can be made without departing from the spirit and scope of the disclosure, the inventive aspects reside in the claims hereinafter appended.

The invention claimed is:

1. A telecommunications termination panel comprising:
a housing including a top, a bottom, a first side and a second opposing side defining a front opening and a rear opening, the housing defining a cable entry adjacent the rear opening and a cable exit adjacent the rear opening;
a tray pivotably mounted within the front opening of the housing, pivoting about a vertical axis located adjacent the first side and including a cable entry and a cable exit adjacent the vertical pivot axis and a plurality of connection locations, the tray movable between an open position and a closed position;
the rear opening of the housing being adjacent the first side;
a cable path defined between the rear opening of the housing and the tray, the cable path defined by a cable guide defining a channel for receiving cables, the cable guide including a slidable structure configured for pushing cables into the channel defined by the cable guide.

2. A telecommunications termination panel according to claim 1, wherein the tray defines an outer perimeter and including a wall extending upward along at least a portion of the outer perimeter, the tray including a cover hingedly mounted to the wall, the cover pivotable between an open position and a closed position, wherein the tray and the cover define a larger dimension than the front opening of the housing when the cover is in the open position such that the tray is movable from the open position to the closed position only when the cover is in the closed position.

3. A telecommunications termination panel according to claim 2, wherein the connection locations include adapters to connect optical fiber cables, the adapters mounted in one of a plurality of modules mounted to the tray with each module moveably mounted along a line of travel above the tray, each one of the modules including a plurality of adapters for holding a fiber optic connector, each adapter having opposite ends for coupling to a fiber optic connector, each one of the adapters movable with one of the modules along the line of travel, and further wherein the cover may not be moved to the closed position when any module is extending upward along the line of travel.

4. A telecommunications termination panel according to claim 3, wherein the cover and the adapters are positioned such that when the tray is pivoted from the open position to the closed position, the cover, when in the open position, contacts the housing before the adapters contact the housing to prevent damage to the adapters.

5. A telecommunications termination panel according to claim 1, wherein the tray includes a first series of cable management structures for routing optical fiber cables from the connection locations toward the axis of pivot with bend radius protection.

6. A telecommunications termination panel according to claim 1, wherein the housing includes a cable management bracket adjacent the rear opening of the housing, the cable management bracket including two removable radius limiters that can be selectively mounted to route a set of incoming cables and a set of outgoing cables both upwardly relative to the termination panel, a set of incoming cables and a set of outgoing cables both downwardly relative to the termination panel, or a set of incoming cables downwardly and a set of outgoing cables upwardly relative to the termination panel.

7. A telecommunications termination panel comprising:
a housing including a top, a bottom, a first side and a second opposing side defining a front opening, the housing further including a rear opening defining a cable entry and a cable exit;
a tray pivotably mounted within the front opening of the housing, pivoting about a vertical axis located adjacent the first side and including a cable entry adjacent the axis of pivot and a plurality of connection locations, the tray movable between an open position and a closed position;
the tray including perimeter, a wall extending upward adjacent the perimeter to enclose the plurality of connection locations, a first portion of the wall closing the front opening when the tray is in the closed position, and a cover hingedly mounted to a second portion of the wall opposite the first portion;
the cover movable between an access position and an operational position when the tray is in the open position, only the operational position of the cover allowing the tray to move from the open position to the closed position, the access position allowing access to the connection locations and to cables extending to or away from the connection locations, and the cover in the access position preventing the tray from moving from the open to the closed position;
the termination panel including a cable guide extending between the rear opening of the housing and the cable entry of the tray, the cable guide defining two vertically stacked channels, the first channel for guiding cables coming into the termination panel and the second channel for guiding cables going out of the termination panel.

8. A telecommunications termination panel according to claim 7, wherein the connection locations include adapters to connect optical fiber cables, the adapters mounted in one of a plurality of modules mounted to the tray with each module moveably mounted along a line of travel above the tray, each one of the modules including a plurality of adapters for holding a fiber optic connector, each adapter having opposite ends for coupling to a fiber optic connector, each one of the adapters movable with one of the modules along the line of travel, and further wherein the cover may not be moved to the operational position when any module is extending upward along the line of travel.

9. A telecommunications termination panel according to claim 8, wherein the cover and the adapters are positioned such that when the tray is pivoted from the open position to the closed position, the cover, when in the access position, contacts the housing before the adapters contact the housing to prevent damage to the adapters.

10. A telecommunications termination panel according to claim 7, wherein the tray includes a first series of cable management structures for routing optical fiber cables from the connection locations toward the axis of pivot with bend radius protection.

11. A telecommunications termination panel according to claim 1, wherein the housing includes a cable management bracket adjacent the rear opening of the housing, the cable management bracket including two removable radius limiters that can be selectively mounted to route a set of incoming cables and a set of outgoing cables both upwardly relative to the termination panel, a set of incoming cables and a set of outgoing cables both downwardly relative to the termination panel, or a set of incoming cables downwardly and a set of outgoing cables upwardly relative to the termination panel.

12. A telecommunications termination panel comprising:
a housing including a top, bottom and opposing sides defining a front opening and a rear opening, the rear opening defining a cable entry and a cable exit;
a tray pivotably mounted within the front opening of the housing, pivoting about a vertical axis located adjacent one of the sides and including a cable entry and a cable exit adjacent the axis of pivot and a plurality of telecommunications modules housing fiber optic equipment, the telecommunications modules including fiber optic adapters extending from the telecommunications modules;
the tray including a raised floor adjacent the same side as the axis of pivot; and,
the telecommunications termination panel further including a cable guide extending from the rear opening of the housing to the cable entry and cable exit of the tray;
wherein the housing includes a cable management bracket adjacent the rear opening of the housing, the cable management bracket including two removable radius limiters that can be selectively mounted to route a set of incoming cables and a set of outgoing cables both upwardly relative to the termination panel, a set of incoming cables and a set of outgoing cables both downwardly relative to the termination panel, or a set of incoming cables downwardly and a set of outgoing cables upwardly relative to the termination panel.

13. A telecommunications termination panel according to claim 12, wherein the tray defines an outer perimeter and including a wall extending upward along at least a portion of the outer perimeter, the tray including a cover hingedly mounted to the wall, the cover pivotable between an open position and a closed position, wherein the tray and the cover define a larger dimension than the front opening of the housing when the cover is in the open position such that the tray is movable from the open position to the closed position only when the cover is in the closed position.

14. A telecommunications termination panel according to claim 13, wherein each telecommunications module is moveably mounted along a line of travel above the tray, wherein the cover may not be moved to the closed position when any module is extending upward along the line of travel.

15. A telecommunications termination panel according to claim 14, wherein the cover and the telecommunications modules are positioned such that when the tray is pivoted from the open position to the closed position, the cover, when in the open position, contacts the housing before the modules contact the housing to prevent damage to the modules.

16. A telecommunications termination panel according to claim 12, wherein the tray includes a first series of cable management structures for routing optical fiber cables from the adapters toward the axis of pivot with bend radius protection.

17. A telecommunications equipment rack comprising:
a vertical support structure defining a plurality of mounting locations for telecommunications equipment, the vertical support including a front, a rear, a first side and a second side;
at least one termination panel mounted to one of the mounting locations, the termination panel including:
a housing including a top, bottom and opposing sides defining a front opening and a rear opening, wherein the front opening is flush with the front of the vertical support when the termination panel is mounted to one of the mounting locations;
a tray pivotably mounted within the front opening of the housing, pivoting about a vertical axis located adjacent one of the sides and including a cable entry and a cable exit adjacent the axis of pivot and a plurality of connection locations within the tray;
the rear opening of the housing defining a cable entry into the panel and a cable exit from the panel, the rear opening of the housing being adjacent the same side as the axis of pivot;
the tray including a raised floor.

* * * * *